US005737609A

United States Patent [19]

Reed et al.

[11] Patent Number: 5,737,609

[45] Date of Patent: Apr. 7, 1998

[54] METHOD AND APPARATUS FOR TESTING OBJECT-ORIENTED PROGRAMMING CONSTRUCTS

[75] Inventors: Harvey G. Reed, Marlborough; John T. Dalton, Chelmsford; Jonathan B. Aibel, Concord; Stephen A. Sciandra, Kingston, all of Mass.

[73] Assignee: Marcam Corporation, Newton, Mass.

[21] Appl. No.: 324,810

[22] Filed: Oct. 18, 1994

[51] Int. Cl.$^6$ .................................................. G06F 11/30

[52] U.S. Cl. .................................................. 395/704

[58] Field of Search .................................. 395/650, 700, 395/701, 704

[56] References Cited

U.S. PATENT DOCUMENTS

| | | | |
|---|---|---|---|
| 4,885,717 | 12/1989 | Beck et al. | 364/705 |
| 4,989,132 | 1/1991 | Mellender et al. | 364/704 |
| 5,093,914 | 3/1992 | Coplien et al. | 395/704 |

OTHER PUBLICATIONS

Meyer, Bertrand. *Object–oriented Software Construction.* London: Prentice Hall, 1988.

*Primary Examiner*—Kevin A. Kriess
*Assistant Examiner*—John Q. Chavis
*Attorney, Agent, or Firm*—Choate, Hall & Stewart

[57] ABSTRACT

The invention provides methods and apparatus for generating, from a source signal defining a subject class to be tested, an inspection signal defining an inspection class that has one or more members for (i) generating a test object as an instantiation of the subject class or a class derived therefrom, (ii) invoking one or more selected method members of the test object, and (iii) generating a reporting signal based upon an outcome of invocation of those members. he inspection class, as defined by the inspection signal, can include one or more method members, referred to as "inspection members," for testing corresponding method members of the test object (and, therefore, in the subject class). So-called "test suite members," that are also defined as part of the inspection class, exercise the inspection members. The invention also provides methods and apparatus for responding to an inspection signal to create an inspection object instantiating the inspection class. Members of the inspection object are invoked to create the test object, to invoke method members thereof and to generate a signal reporting an effect of such invocation. The test object members can be invoked by corresponding inspection members of the inspection class, which in turn can be invoked by test suite members of the inspection class.

92 Claims, 11 Drawing Sheets

METHOD AND APPARATUS FOR TESTING OBJECT-ORIENTED PROGRAMMING CONSTRUCTS

RESERVATION OF COPYRIGHT

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

BACKGROUND OF THE INVENTION

The invention described herein pertains to digital data processing and, more particularly, to methods and apparatus for testing object-oriented programming constructs.

There are many competing factors determining how an organization tests its software. In the commercial environment, this includes allocating development resources, motivating developers to write unit tests, and maintaining those tests over the lifetime of the product. The central problem is focusing limited development resources on the unique aspects of unit tests, minimizing the overhead of creating test environments and packaging. Secondary factors include choosing which techniques (state-based, boundary analysis, etc.) are applicable to validate each production unit.

Traditional unit testing validates the function points within a software product to verify the correctness of its operation. Often, the strategy is to write a dedicated test program for each unit, requiring separate test control and execution, set up of the test environment, and production of output to describe the execution of the test, as shown in FIG. 1.

Implementing this strategy is often informal and ad hoc. Frequently unit testing is abandoned because of the difficulty of this approach. When a developer determines that some code does need unit testing, he will create his own test harness, writing code to set up the test environment, run the test case, output the results and shutdown the test environment. The developer is concerned about all support issues, such as memory management, output device control and formatting, and initializing and cleaning up the application-specific environment. The actual test code is generally a small percentage of the entire unit test.

This practice also tends to be invasive, where conditional test code is added to the production code to aid in debugging. Typically this code consists of commands to output the value of variables, trace the execution of the code and perhaps validate the state of the environment. Conditionally compiled code introduces a new dimension of complexity into the production code and bugs can be introduced that only appear when this conditional code is disabled. Thielen, *No Bugs! Delivering Error-Free Code in C and C++*, Addison Wesley Publishing Co. (1992) notes that this is a common problem.

One way to save time is to cut and paste code from previous test cases. The cut and paste development methodology saves time in developing the code, but it also requires that changes be propagated to multiple places in the test code, increasing maintenance cost. The mount of time which is saved by this method is typically only short term. Since the test code is usually not part of a developer's deliverables, code standards may not be followed and often each developer creates his or her own set of tools for managing the environment and tests. This makes it hard for developers to share unit test code outside of a development group, for example in quality assurance (QA) or system integration groups. Moreover, if the test code is not included in the source control system, it may become lost or thrown away when it becomes obsolete.

Some development organizations, when faced with the expense of developing unit test code or with the expense of maintaining an unwieldy collection of disorganized test programs, give up on the test effort, leaving validation to the QA group. This is particularly detrimental in an object-oriented programming environment where a system test approach is less effective in detecting certain classes of errors than a unit test approach.

Programs produced using procedural techniques are highly function oriented, whereas programs produced with object-oriented techniques have a much greater emphasis upon the data being manipulated. This places a different emphasis on the program's construction. Traditional testing techniques can be adapted to object-oriented programs, however, they are not guaranteed to exercise all of the facilities that are peculiar to object-oriented programming.

Traditional practice in industry is to continue using the procedural organization of unit tests for class-based production code, as shown in FIG. 2. Since the number of classes in commercial applications can be quite large, the cut and paste technique is even more costly. Most important is the paradigm mismatch between class-based production code and procedural unit testing.

Objects consist of both a state and a defined behavior (operations). The functionality of the class is defined by both the operations and the interaction between the operations and the state. Traditional testing techniques can eventually exercise many of these interactions, however, this is not guaranteed. Additionally, object-oriented programming uses techniques such as polymorphism which are rarely found in traditional procedural programs.

Current research into the testing of object-oriented programs is concerned with a number of issues. The black-box nature of classes and objects implies that a black-box testing technique would be beneficial. A number of black-box approaches have been developed, including the module validation technique of Hoffman et al "Graph-Based Class Testing," *Proceedings of the 7th Australian Software Engineering Conference*, ASWEC (1993) and "Graph-Based Module Testing," *Proceedings of the 16th Australian Computer Science Conference*, pp. 479–487, Australian Computer Science Communications, Queensland University of Technology, and the ASTOOT suite of tools by Frankl et al, "Testing Object-Oriented Programs," *Proceedings of the 8th Pacific Northwest Conference on Software Quality*, pp. 309–324 (1990). Both of these techniques concentrate upon the modular nature of object oriented programs. However Fielder, "Object-Oriented Unit Testing," *Hewlett-Packard Journal*, pp. 69–74, April (1989) notes that a more adequate testing technique can be gained by combining black-box testing with the use of a whitebox coverage measure.

In view of the foregoing, an object of the invention is to provide improved methods and apparatus for testing object-oriented programming constructs. More particularly, an object is to provide such methods and apparatus for testing classes in object-oriented programs and libraries.

A related object is to provide such methods and apparatus for testing all members of a class and exercising each member over a full range of expected runtime parameters.

Still another object is to provide such methods and apparatus for implementation in a wide range of digital data processing operating environments.

SUMMARY OF THE INVENTION

The invention provides methods and apparatus for testing object-oriented software systems and, more particularly, class constructs that provide the basis for programming and data structures used in those systems.

In one broad aspect, a method according to the invention calls for generating, from a source signal defining a subject class to be tested, an inspection signal defining an inspection class that has one or more members for (i) generating a test object as an instantiation of the subject class or a class derived therefrom, (ii) invoking one or more selected method members of the test object, and (iii) generating a reporting signal based upon an outcome of invocation of those members. The source and inspection signals can be, for example, digital representations of source-code programming instructions of the type typically contained in source-code "header" files.

The inspection class, as defined by the inspection signal, can include one or more method members, referred to as "inspection members," for testing corresponding method members of the test object and, therefore, of the subject class. Thus, for example, the inspection class can include inspection members corresponding to, and taking similar arguments to, constructors and operators in the test object. Likewise, the inspection class can include members corresponding to destructors in the test object. The inspection members can have function names similar to those of their corresponding method members of the test object.

So-called test suite members, that are also defined as part of the inspection class, can invoke for test purposes, or exercise, the inspection members. The test suite members can, for example, test accessor, transformer, operator or semantically unique members of the test object. The test suite members can also test the persistence of the test object, as well as memory leaks associated with its creation or destruction. A "run test" member can also be included in the inspection class in order to invoke the test suite.

According to further aspects of the invention, the inspection class includes method members that provide common services used by the test suite members. These include reporting services that permit uniform generation of tracking and error reports.

Methods as described above can further include generating, from the source signal, a test signal that defines a test class. The test class may comprise the subject class, or an instantiable class derived therefrom, that inherits members of the subject class. In related aspects of the invention, the test class substantially duplicates pure virtual functions of the subject class, absent programming constructs that denote those functions as having both pure and virtual attributes (e.g., the "pure" and "virtual" keywords). The test class can also be defined to give instantiations of the inspection class access to members of the subject class, e.g., via so-called "friend" declarations. In accord with these methods, the inspection class includes members that create the test object as an instantiation of the test class.

The invention provides, in yet another aspect, methodology that responds to an inspection signal to create an inspection object instantiating the inspection class. Members of the inspection object are invoked to create the test object, to invoke method members thereof and to generate a signal reporting an effect of such invocation. The test object members can be invoked by corresponding inspection members of the inspection class, which in turn can be invoked by test suite members of the inspection class, as described above.

According to other aspects of the invention, arguments are applied to the test object upon instantiation of the object, (in the case of constructors) or upon invocation of the selected member methods. Those arguments can, by way of example, be specified interactively or generated automatically.

In a related aspect of the invention, invocation of a member function is reported by comparing the results of invocation of a member function with an expected value. In the case of disagreement, an error message can be displayed, e.g., to the user console or to an output file. By way of further example, the contents of the test object can be "dumped" following invocation. Moreover, signals indicative of the results of these and other results of invocation, e.g., statistics regarding the number of successful and erred member function calls, can be stored in data members of the inspection object. Reporting signals, such as the foregoing, generated in accord with the invention can be generated at selected verbosity levels.

Still other aspects of the invention provide an apparatus for testing object-oriented software systems having functionality for carrying out the functions described above.

These and other aspects of the invention are evident in the description that follows and in the accompanying drawings.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
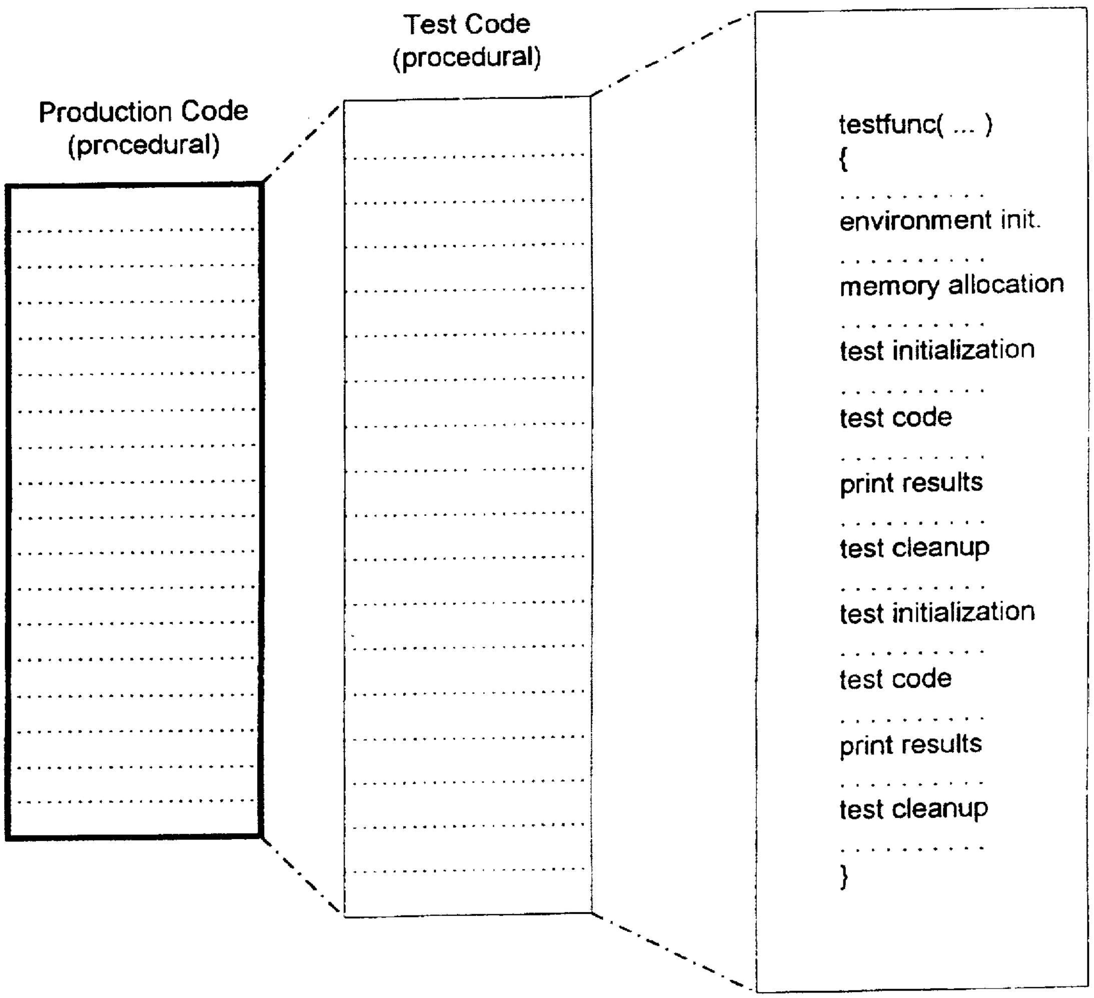
FIG. 1 depicts a prior art strategy for unit testing of procedural code.
Figure 2:
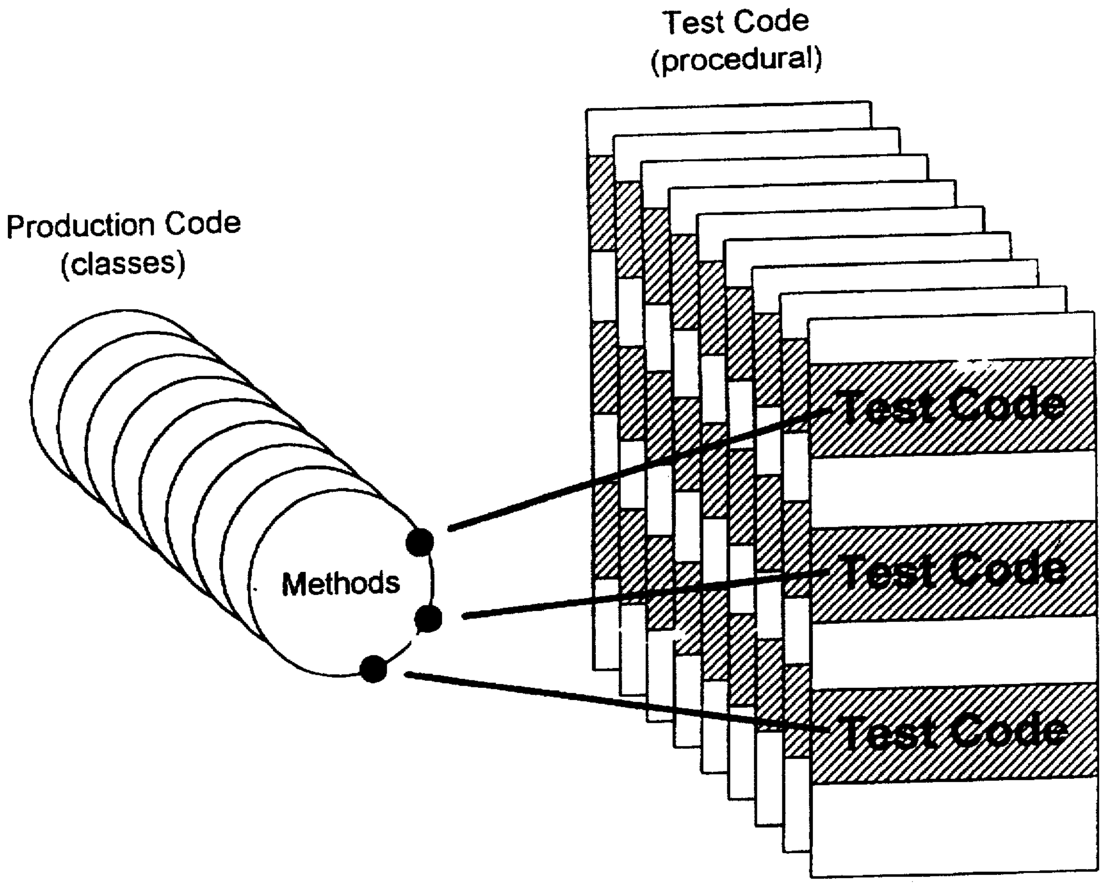
FIG. 2 depicts a prior art strategy for testing object-oriented code.
Figure 3:
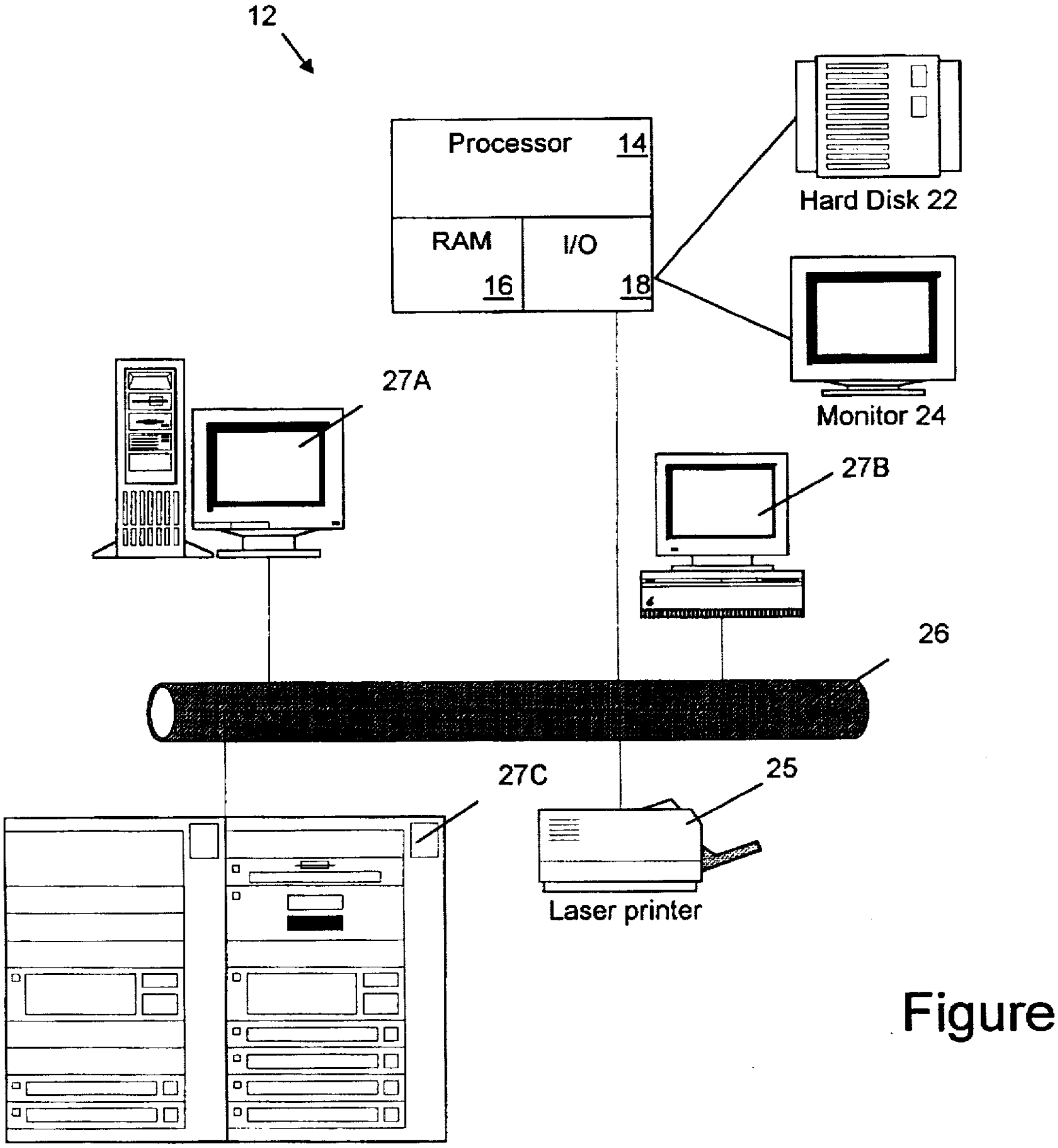
FIG. 3 depicts a preferred computing system for use in practice of the invention.

FIG. 3 depicts a preferred networked computing system for use in operation of the invention. The system includes a digital dam processor 12, including a processor section 14, a random access memory section 16 and an input/output control section 18. The digital data processor 12 is connected, via input/output control section 18, to monitor 24 (including a monitor, keyboard and pointing device) and to hard disk 22 for storage of software and data. Digital data processor 12, as well as its sub-components 14–18 and peripherals 22–24, preferably comprise a conventional commercially available personal computer or work station adapted in accord with the teachings below for the testing of object-oriented software. As further indicated by the drawing, digital data processor 12 is connected with printer 25 and with other other digital data processing apparatus 27A, 27B, 27C via network 26.

Inspection Methods

Reed, "Object-Oriented Design by Orthogonality," *Computer Language*, vol. 9, no. 1, pp. 51–56 (1992), discloses an object-oriented library architecture using orthogonality. Building on that architecture, methods and apparatus according to the invention utilize inspection methods to package test code and inspection classes package inspection methods.

Figure 4:
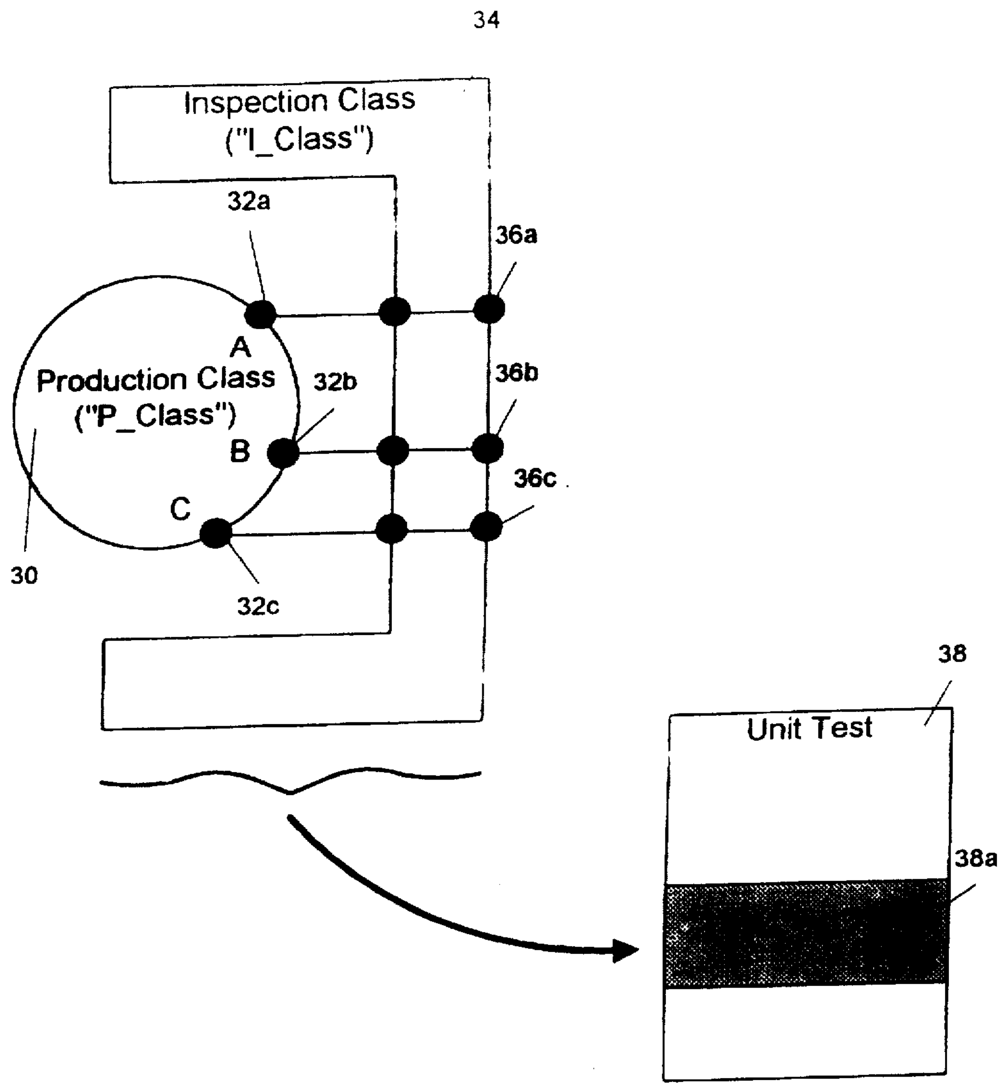
FIG. 4 depicts a production class and an inspection class according to the invention for testing thereof.

Referring to FIG. 4, a production class 30 (i.e., a class from the production code) to be tested includes three method members A (element 32*a*), B (element 32*b*), and C (element 32*c*). Method member A, by way of example, is a Boolean function that takes an integer argument and is prototyped, e.g., in the production class header file, as "bool A(int)."

An inspection class 34 according to the invention includes three method members I_Class::A (element 36*a*), I_Class::B (element 36*b*), I_Class::C (element 36*c*) corresponding to like-named method members A, B and C, respectively, of production class 30. Class 34 is defined as part 38*a* of unit test source code stored in a conventional manner (e.g., on disk 22) in source and header files 38 for compilation, linking, loading and execution using commercially operating system tools in connection with libraries constructed in accord with the teachings herein.

As shown in the drawing, method member I_Class::A takes arguments and returns values identical to those of corresponding member A. Member I_Class::A takes, as an additional argument, a pointer to a test object created from the production class or a test class derived therefrom. As further shown in the drawing, method I_Class::A includes instructions for invoking member A of the test object, as well as for reporting invocation, arguments to, and return values from that member. Thus, by way of example, where member A is declared as follows:

```
    bool A(Int arg1);
I_Class::A can be declared as follows:
  bool
  I_CLASS::Class:: A(P_Class* Obj,
       Int arg1)
  {
    AnnounceStart("A");              // report start of test
    AnnounceParameter(arg1);         // report parameters that will be
                                     // passed to member to be tested
    bool tstVal = Obj- > A(arg1);    // invoke member
    AnnounceRtnValue(tstVal);        // report member result
    AnnounceEnd("A");                // report end of test
    return(tstval);                  // return member result
  }
```

Each of the inspection methods take the object under test as a parameter, as well as the rest of the parameters necessary for the production method, as shown in FIG. 4. This not only reduces cut and paste code, but also eliminates the need for specialized test code in the production class that is used only during unit testing. It is much preferred to have instrumentation outside of production code rather than compiled in, even if the compilation is conditional.

The inspection class methods are capable of running against code built for general release as well as development and unit testing. With a "dump" method enabled during development, unit tests facilitated by the inspection class provide a white-box testing environment, allowing the developer to be most effective in determining corrective actions for failed tests. Black-box test techniques are in effect when the dump method is disabled for general release. Unit tests in this form can be run as acceptance tests by QA prior to product level tests. The dump method is a member method preferably included in all production classes that prints, or "dumps," state information of the contained member data and objects.

Inspection Classes

From the inspection methods, an "inspection class" providing a non-invasive instrumented interface is constructed. This interface includes an inspection method for each public and protected member in the production class. The inspection class interface is analogous to the production class interface; thus, developers need to learn very little in order to construct unit tests.

The inspection class 34 and its inspection methods 36*a*–36*c* are can be generated by parsing the production header files and constructing inspection class headers and source files from the production code header files.

The Test Subclass

Figure 5:
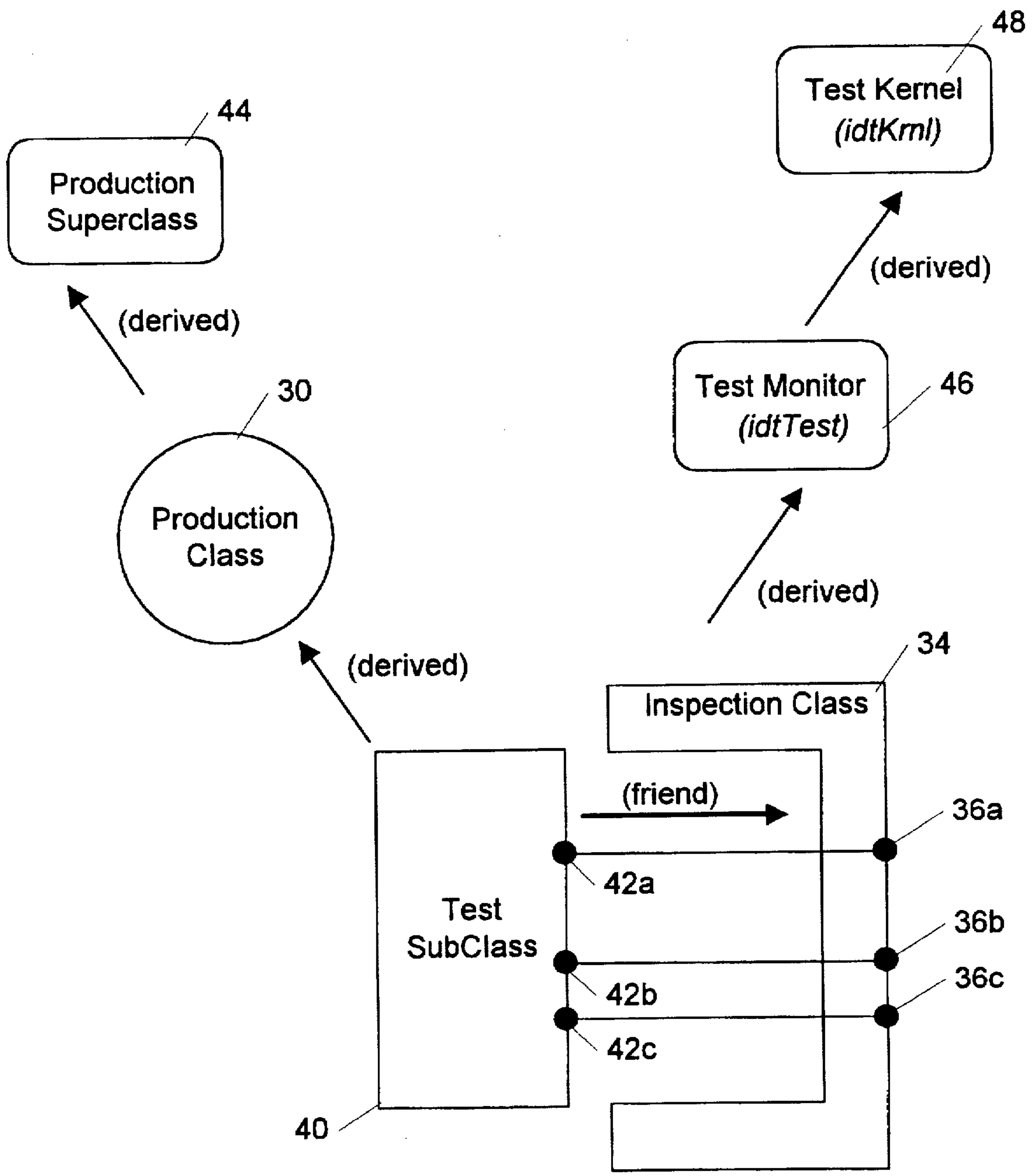
FIG. 5 depicts a relationship between the inspection class and test monitor and test kernel superclasses, as well as between the test subclass, the production class and the production superclass.

Referring to FIG. 5, there is shown a test subclass 40 that derives from production class 30. Thus, test subclass 40 includes method members 42*a*, 42*b*, 42*c* corresponding to method members 32*a*, 32*b*, 32*c*, respectively of the production class 30.

Definition of a test subclass 40 according to the invention solves problems associated with accessing protected production methods or instantiating abstract classes. Since the test subclass 40 is derived from the production class 30, it has access to the protected methods of its parent. Access to such protected methods by the inspection class 34 is granted by inclusion, in the test subclass definition, of statements declaring the inspection class as a "friend" (in C++ terminology). This insures that testing is completely non-invasive. For those classes which do not need a test class, the test class 40 is replaced with an alias to the actual production class 30.

The test subclass also provides a location for the implementation of the pure virtual functions of the production class. Typically, those functions are implemented by stubbed-out code.

As further shown in FIG. 5, the production class derives from a production superclass 44, while the inspection class 34 derives from a test monitor superclass class 46 which, in turn, derives from a test kernel superclass 48. The test monitor class 46 defines data members for storing results of each unit test. The test kernel class 48 defines method members for uniform reporting of unit test results, status and coverage.

Given a set of inspection methods 36*a*–36*c* grouped into an inspection class 34, common services of test output and test environment maintenance are provided by test instrumentation base classes 46, 48. The kernel test class 48 allows infrastructure objects to be tested in isolation. It provides services for output verbosity control, output formatting, memory management leak detection and reporting, expression checking, and reporting of errors encountered.

The monitor test class 46, derived from the kernel test class 48, provides additional services to application classes such as application environment initialization and cleanup, test case setup and cleanup, gross level coverage measurement and reporting, and unit test execution.

Organization of Test Suites

Source code and header files providing definitions of the inspection class 34 and test subclass 40 are preferably generated automatically from a header file defining the production class. This results in a reduction in the amount of code the developer needs to write in order to insure thorough testing of the production class. This section examines the definition and interrelationship of unit tests within the inspection class.

Figure 6:
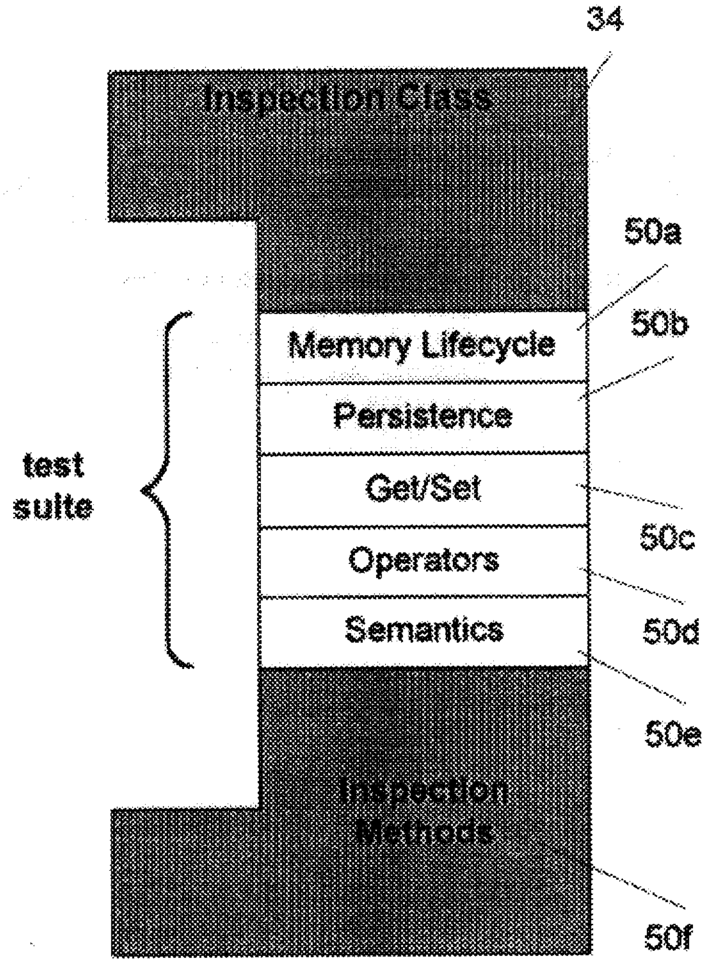
FIG. 6 depicts a test suite and inspection methods comprising an inspection class according to the invention.

Unit tests must achieve a certain minimum standard of coverage. This is ensured by dividing the set of production class methods, e.g., **32*a*–32*c*, into groups according to behavior and testing technique, taking into account dependencies between various groups. For example, all methods depend on the constructor methods. Referring to FIG. 6, production class 30 methods are tested by the following groups of inspection class tests: memory lifecycle 50*a*, persistence lifecycle 50*b*, get and set attributes 50*c*, operator members 50*d*, and semantics 50*e*.**

Memory lifecycle tests **50*a* exercise those methods of the production class which affect the life of the corresponding object in memory. These include the constructors, copy constructors, destructor and assignment methods of the production class. Generally, errors which occur in the lifecycle are memory leaks and improper initialization. Lifecycle tests involve creating test objects (based on the production class, or the test class derived therefrom) using each constructor in the production class 30**, assigning objects (e.g., in the case of copy constructors), and deleting the test objects from memory. Checks are then made for leftover allocated memory.

Persistence lifecycle tests **50*b* exercise those objects that are stored in a database (e.g., on disk 22**) for later retrieval or storage across invocations of the product. A state-based testing approach is used for persistent methods. The states defined in the memory and persistence lifecycles are so regular that a majority of the test cases in these sections can be predefined and therefore implemented by inspection class generator apparatus and methods according to the invention, thereby reducing developer effort.

Get and set tests **50*c*** exercise those methods which allow the access to and setting of value-based attributes of the production class. Testing assures that the values can be accessed, and that ancillary properties such as "rend-only" are complied with. A state-based testing approach is preferably used for this group.

Operator tests exercise **50*d*** those methods of the production class that perform comparison, arithmetic, logical operations and others. Operator testing is functional in nature and relies on techniques such as equivalence class partitioning and boundary value analysis.

Semantics tests exercise **50*e*** those members of the production class whose behavior that makes the object unique. Because of that uniqueness the inspection class generator apparatus and methods do not attempt to generate code for exercising those members but, rather, they merely generate method declarations (and comments) to remind the developer to draft his or her own test code.

Test Suite Packaging

An inspection class generator generatesindividual tests, along with inspection methods **50*f*** providing the instrumented interface. These inspection methods are, themselves, packaged into "test suites" As a consequence of the resulting uniform organization of all inspection classes, the set of unit test suites can be executed in a uniform manner.

A standard entry point, e.g., referred to as "testmain()," in testing code for constructing an instance of the inspection class and invoking a method member, e.g., "testrun()," that exercises the members of the test suite. The implementation of testmain() is a nonclass function which is automatically generated by the inspection class generator.

Persistence Testing

The following sections examine the application of state-based testing to the persistence of objects. State-based testing and its applicability are described. An example of a multi-state object is shown. Some additional testing problems due to the specific persistence approach are also discussed.

State Based Testing

Of the various methods considered in developing test cases, state-based testing was the most applicable to persistence. State-based testing was developed at the University of Durham to address some of the problems in adapting testing techniques to object-oriented programming, and is described in Turner et al, "The Testing of Object-Oriented Programs," Technical Report TR-13/92, University of Durham, England (1992).

An object's behavior is defined by the code within its operations. Events and situations occur that have to be communicated to the other operations of the object. This communication is usually performed by storing specific values within the attributes of the class. State-based testing models these interactions as a finite-state-automata which is then used to predict the response of each operation to a particular state.

Test cases are generated to validate that at no point in an object's lifetime can it be placed into an undefined or incorrect state. All operations are validated for the state changes which they are defined for, operations can also be validated for their robustness when faced with an illegal state situation.

An example deals with persistent classes. Persistence is implemented by a root persistent class from which all persistent objects are derived. The persistence paradigm requires six states that an object can enter:

New—the object was created and exists in memory only

Saved—the object exists in the database and not in memory

Figure 7:
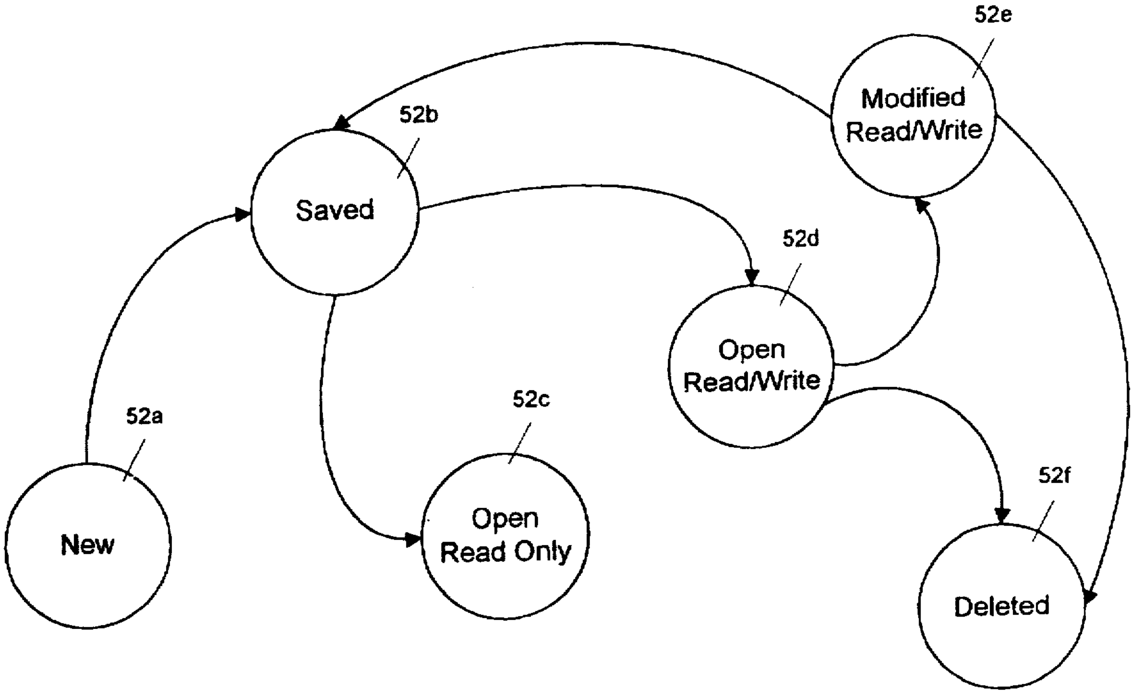
FIG. 7 depicts illustrative states an object can enter under the persistence paradigm.

Open for Read/Write—the object exists (and is identical) in memory and the database and the client may save changes to the object Modified Read/Write—the object exists in memory and the database with different values and the client may make changes to the object Open for Read Only—the object exists (and is identical) in memory and the database and the client may not make changes to the object Deleted—the object does not exist in memory or the database FIG. 7 illustrates some of the legal transitions between these states. Thus, for example, an object may transition from a New state **52*a*, or a Modified Read/Write state 52*e*, into a Saved state 52*b*. From that state 52*b*, an object may transition to an Open Read Only 52*c* or an Open Read/Write state 52*d*, whence it may transition to a Deleted state 52*f*. An object may also transition into a Deleted state from the Modified Read/Write state 52*e*.**

Since the root persistent class is inherited by all persistent classes, these classes share the above states 52*a*–52*f*, although the implementation is made specific to each class by providing some of the persistence code in a code template that is instantiated for each class. The test cases for these objects should also be similar, with minor changes from class to class. Because the persistence functions can be critical to the operation of an object-oriented product, it is not sufficient to test the functions solely at the root level.

The situation of shared critical functionality leads to another testing problem. Given the similarity of the tests, interest in rewriting the same test cases over and over for the persistent classes is likely to be low.

Figure 8:
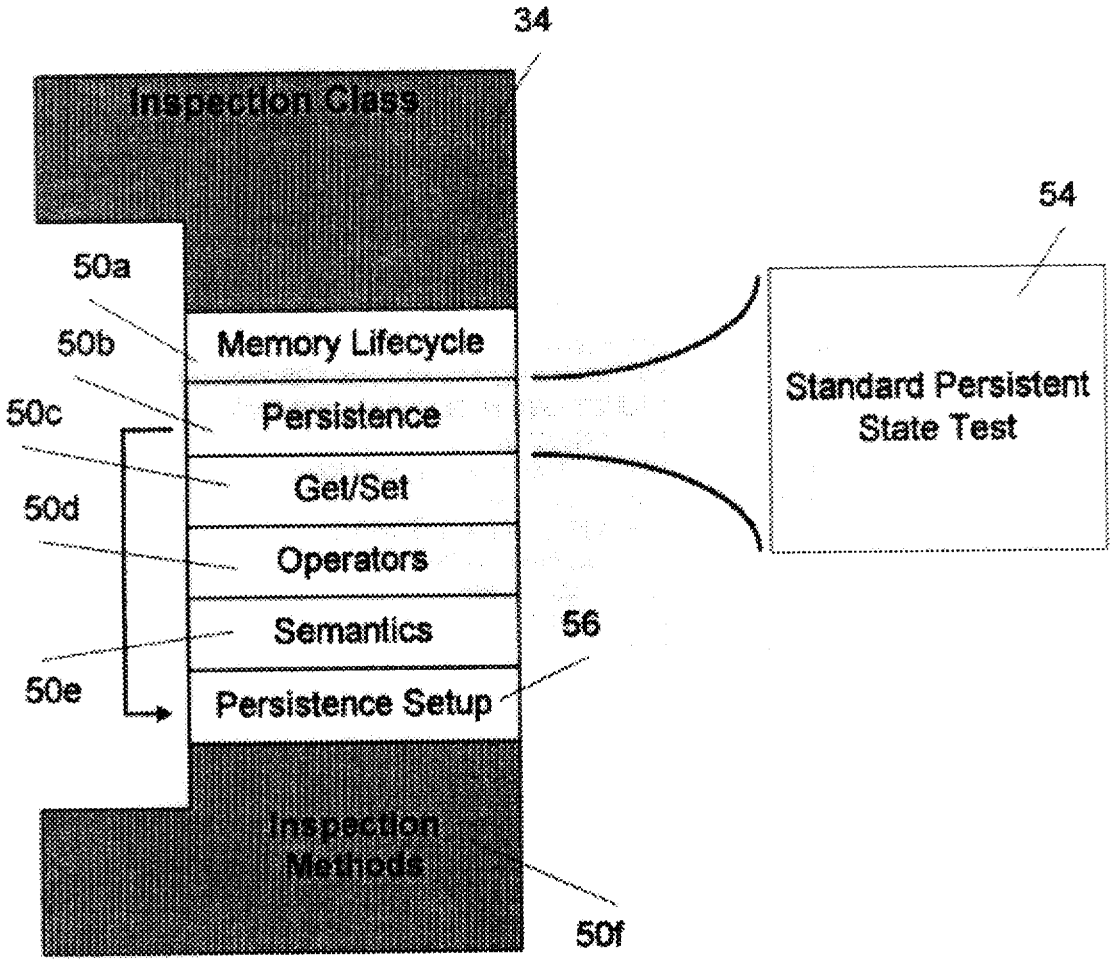
FIG. 8 depicts a relationship of persistence testing methods in an inspection class according to the invention.

As illustrated in FIG. 8, the inspection class generator conditionally generates the persistence lifecycle tests 50*b* to include standard persistence state tests 54. The condition which causes this generation is if the inspection class generator detects that the production class is persistent.

This solution allows each production class 30 to be tested with a minimum set of test cases assuring a certain level of test coverage. The developer must supply a test setup routine 56 specific to the class under test. This is a short and well-defined piece of code, and the inspection class generator supplies a function body skeleton. Then the developer can code additional test cases as deemed necessary to the particulars of the class 30.

An additional advantage to this approach is that it provides a single point for the maintenance of the test cases. If the persistence application program interface (API) is modified, the amount of test code to be changed is minimized.

This does not appear to be an unique situation; it seems likely that there will be other cases where a whole model—an API and series of states—is shared among many classes. Using state-based testing provides a significant savings here by allowing the development of a template of standard cases which are shared by the inspection classes. It should be noted that this approach not only demonstrates the correctness of the code under test but also demonstrates the correct integration of the shared production code template.

Inspection Code Generator

Figure 9:
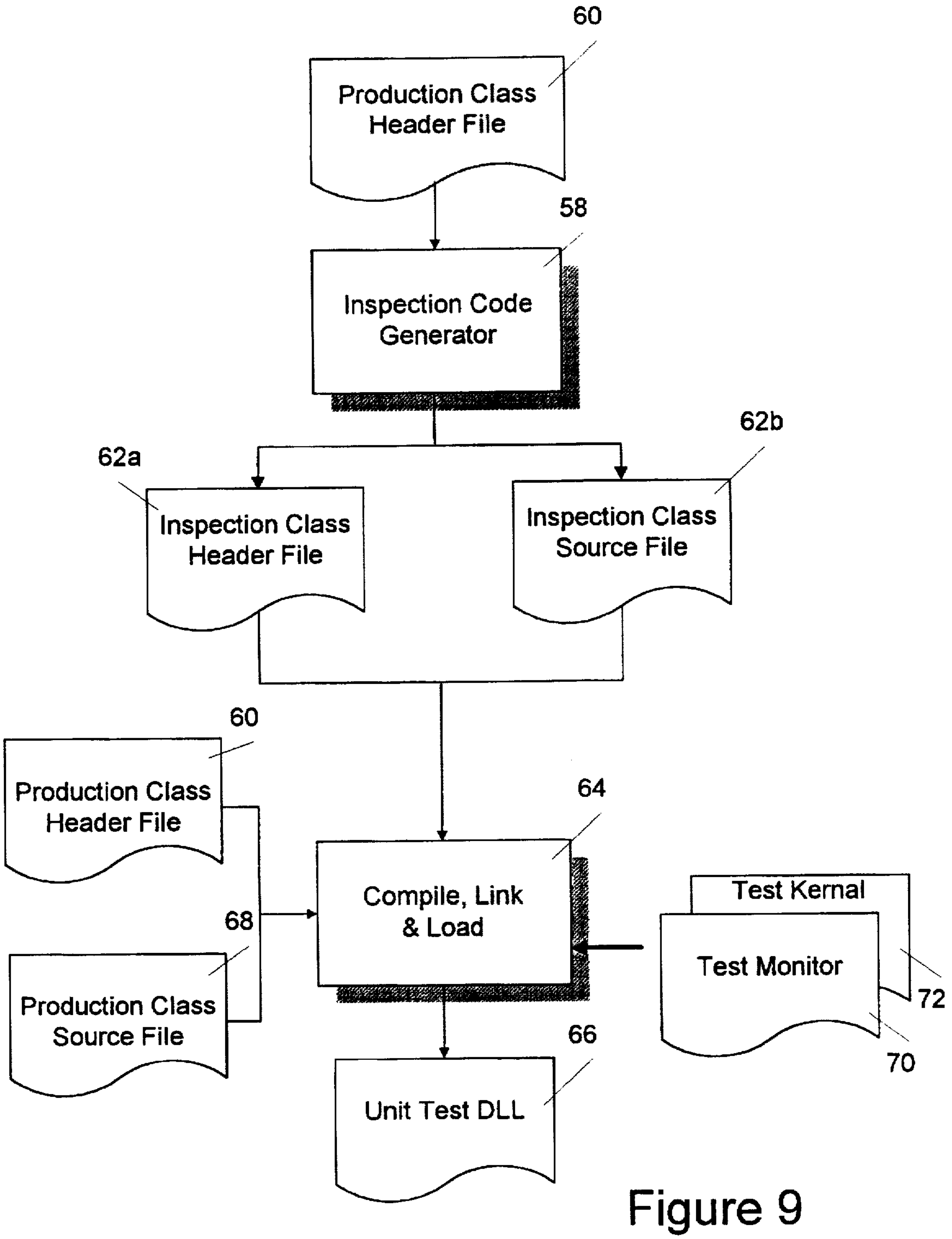
FIG. 9 depicts operation of an inspection class generator according to the invention.

FIG. 9 illustrates operation of an inspection code generator (ICG) 58 according to the invention. The generator 58 accepts, as input, a header file 60 defining the production class 30 be tested. The generator 58 generates, in accord with the teachings herein, a header file 62*a* and a source code file 62*b* defining the inspection class 34 and the test class 40 for testing the production class 30.

In the illustrated embodiment, files 60 and 62*a*–62*b* contain C++ programming statements in source-code format. The header file 62*a* contains function declarations or prototypes corresponding to those in the fie 62*b*. Those skilled in the art will appreciate that the teachings herein are likewise applicable to other programming languages including object-oriented constructs, e.g., Turbo Pascal. Likewise,. it will be appreciated that the information in the files may be input or output in other formats (e.g., object code) known in the art.

The statements contained in files 62*a*, 62*b* define the inspection class 34 to include members that (i) generate a test object as an instantiation of the test class, (ii) invoke selected method members of the test object, and (iii) generate a reporting signal based upon an outcome of invocation of those members.

The inspection class 34 particularly includes inspection members (also referred to as "inspection" members) that test corresponding method members of the test object. Thus, for example, the inspection class 34 includes inspection members, e.g., 36*a*–36*c*, corresponding to, and taking similar arguments to, constructors, destructors, operators and other method members, e.g., 32*a*–32*c*, in the test object. To facilitate testing, the inspection members (apart from constructors and destructors) have function names similar to those of the corresponding method members of the test object that they test.

The inspection class 34 defined by files 62*a*, 62*b* also includes test suite members that invoke or exercise the inspection members for test purposes. The test suite members 50*a*–50*e* that test accessor, transformer, operator or semantically unique members of the test object, as well as the persistence of the test object and memory leaks associated with its creation or destruction. A "test main" member 50*f* invokes the test suite. The inspection class provides, via inheritance from the test monitor class and test kernel class 48, members 50*f* that permit uniform tracking and reporting of test coverage and errors.

The statements in files 62*a*, 62*b* also define a test class 40 that derives from the production class 30 and, therefore, inherits members, e.g., 32*a*–32*c*, therefrom. The test class 40 duplicates pure virtual functions of the subject class 30, absent programming constructs that denote those functions as having both pure and virtual attributes (e.g., the "pure" and "virtual" keywords). The test class 40 affords the inspection class members, e.g., 36*a*–36*c*, access to members, e.g., 32*a*–32*c*, of the subject class, e.g., via C++ friend declarations.

Generation of the inspection class header and source fries 62*a*, 62*b* by the ICG 58 may be understood by reference to the Appendix A, providing a listing of a sample production class header file 60 named "utg.hh"; Appendix B, providing a listing of a sample inspection class header file 62*a* named "i_utg.hh" that is generated by the ICG 58 from file 60; and, Appendix C, providing a listing of a sample inspection class code file 62*b* named "i_utg.cpp" that is also generated by the ICG 58 from file 60.

The items listed below refer to the annotations made on the listings provided by Appendices A–C. In the description of each item, reference is made to the three classes involved in the unit test:

1. The source production class 30, which may be an abstract or concrete class.
2. The test class 40. This is a generated class which is derived from the production class to provide access to the public and protected member functions of the production class, and declarations for implementations of virtual functions declared pure virtual in the production class.
3. The inspection class 34. This class performs tests on instances of the test class 40.

Where dictated by context, references in the explanatory items below to the "production class" shall be interpreted as references to the corresponding file 60, and references to the "inspection class" and the "test class" shall be interpreted references to the files 62*a*, 62*b*.

EXPLANATION OF ANNOTATIONS TO PRODUCTION CLASS FILE 60 LISTING OF APPENDIX A

1. Copyright notice comment.
2. Include file guards are based on format <filename> HH.
3. Filename utg.hh becomes "i_utg.hh" for inspection class header file 62*a*. The inspection class source file 62*b* becomes "$i_{13}$ utg.cpp."

4. All #include's lines in production class file 60 are ignored.
5. Class comment is not copied to the inspection class files 62a, 62b.
6. The !LIBRARY keyword value (ER) is used for generating the inspection class file 62a, 62b comments.
7. The !NAME keyword value (utg) is used for generating the inspection class file 62a, 62b comment.
8. The name of the production class (utg) to be tested. The EXPORT keyword may appear before the declaration of the class.
9. The start of the public member functions (and member data) are signaled by the "public" keyword. The keywords "protected" or "private," or the close of the class declaration "};" end the public section. C++ permits multiple public sections within a class declaration.
10. ICG 58 ignores enumerations, indicated by the keyword "enum."
11. Constructors. C++ permits more than one per class. C++ also permits constructors to be overloaded.
12. Copy Constructor. If provided, there is only one. A copy constructor has as its first required argument a reference (&) to an instance of this class (usually declared const). In a preferred embodiment, there is a second, optional argument, a memory manager defaulted to NULL. All classes must have one, but they can be private and unimplemented.
13. Destructor. The definition of most classes include a public destructor.
14. Assignment operator. All classes must have one, however, they can be declared private and not implemented.
15. Conversion operator. This operator, also known as cast, is provided in addition to the operators defined by C++. This operator returns an object of the type identified in the operator statement (e.g., dtULong). Also notice, this member function is const, which is not used in generating the signature of the inspection member function.
16. The addition assignment operator returns a reference to an object of this class type.
17. A static member function (sometimes called a class function) returning an erStatus object. A pointer to a production object is an output parameter. The static specifier is not included in the corresponding statement in the inspection class files 62a, 62b.
18. Public member data is ignored when generating the inspection class files 62a, 62b.
19. The start of the protected member functions (and member data) is signaled by the "protected" keyword. The keywords "public" or "private," or the close of the class declaration "}; " ends the protected section. C++ permits multiple protected sections within a class declaration.
20. An overloaded index operator implemented as a const member function. Again, note that the const is ignored for the generated inspection function.
21. A pure virtual constant member function. This function signature is used to generate a private virtual function declaration in the test class. This is done in order to satisfy the compiler that no attempt is being made to instantiate an abstract class. The pure (=0) specifier is not included in the test class declared in the inspection class header, but the const specifier must be preserved for this one case. No implementation is generated.
22. A virtual set member function with a default argument. The default argument is used when generating the function signature of the inspection function. In this example, there exists a constant pointer to a constant object, with a default value of NULL.
23. The OPLDEBUG constant dump member function is defined for all objects. This member function is not duplicated in the generated inspection class.
24. Protected member data is ignored when generating the inspection class.
25. The start of the private member functions (and member data) are signaled by the private: keyword. The keywords public: or protected:, or the close of the class declaration }; ends the private section. Multiple private sections are possible within a class declaration.
26. Private member functions and data are ignored when generating the inspection class files 62a, 62b.
27. Nonclass function appearing in the header for the production class. These do not appear often, and are usually a specialized function used by the production class.
28. Global nonclass operator appearing after the production class declaration. Similar in use to nonclass functions.
29. Close of the include file guards.

EXPLANATION OF ANNOTATIONS TO INSPECTION CLASS HEADER FILE 62a LISTING OF APPENDIX B

1. Copyright notice comment copied from production class.
2. Include file guards are generated based on inspection class header filename (minus extension).
3. File name is $i_{13}$ utg.hh. The rules used to generate the filename are the same as those for the class. The name must be unique (in the output directory) so that existing inspection classes are not overwritten. An optional parameter on the command line specifies the name of the output filename.
4. The inspection base class declaration is included by the statement #include "idttest.hh".
5. The production class header is included by the statement #include "utg.hh".
6. Inspection class comment. The !AUTHOR, !REVIEWER, and !REVIEW_DATE keywords and values are defaulted from a template (values from production class header are not used).
7. The inspection class comment keyword !LIBRARY value adds an "I_" prefix to the value from the production class comment (I_ER).
8. The inspection class comment keyword !NAME value adds a "$i_{13}$ " prefix to the name of the class ($i_{13}$ utg).
9. The inspection class generator 58 places a comment indicating that this file 62a is generated by a tool, to wit, the generator 58. The comment is entered in the !TEXT section of the class comment, and includes a date, the name of the tool, and the version of the tool.
10. The test class declaration publicly inherits from its production class to provide access to protected member functions. The test class name has "s_" prepended to the production class name. All member functions are declared in the "public:" section of the test class.
11. The test class declares the inspection class as a "friend." This allows the inspection class to invoke protected (and public) member functions on the production class.
12. Test class constructors and copy constructors are declared and implemented inline to replicate the public and protected interface on the production class. The private interface of the production class is not used.
13. Declaration to satisfy the compiler for a pure virtual member function declared in the production class. The declaration has lost its pure specifier (=0), but not its const function specifier. Also, the virtual specifier from the production class is also not needed (if it is easy to strip off, do it, otherwise the virtual specifier can stay). A comment is generated as an indication to the unit test developer that an inline implementation may be required (if linking causes this function to be unresolved, i.e., it is being called by some object).

14. An enum named FUNCS contains entries for each inspection function and a final entry named TOTAL_FUNCS. Each entry is composed of a prefix of f_ followed by the name of the inspection function. Where functions are overloaded (e.g., multiple constructors) it is necessary to append a number indicating which of the functions this enumeration applies. This enum is used for calculating base coverage analysis.
15. An integer array the size of TOTAL_FUNCS is used for based coverage analysis. The name of this dtInt array is coverage.
16. The inspection class publicly inherits from the base test class idtTest.
17. The "public:" keyword is used to make all inspection class member functions available.
18. The inspection class itself requires a constructor and destructor. There is a difference between inspection class member functions and inspection member functions for the class under test. The member functions of the inspection class are needed to provide the behavior for the unit test as defined by idtTest and coding standards. The inspection member functions are those functions needed to test the production class member functions.
19. The inspection test suite functions are more inspection class member functions. These implement the pure virtual functions defined in idtTest. These functions are invoked from the runTest member function of idtTest. The test functions are: t_LifeCycle, t_Operators, t_Semantics, t_SetQrys, and t_Persist. The qryCoverage member function is used to provide the coverage data for the base coverage analysis.
20. For each public or protected constructor provided by the production class there is a "newInstance" inspection member function. The newInstance member function takes the same arguments as the production class constructor and returns a pointer to an instance of the test class.
21. If the production class has a public or protected copy constructor, then a copyInstance member function is generated. This inspection member function takes as the first argument a pointer to an instance of the test class, followed by the arguments of the production class' copy constructor (usually the memory manager). A pointer to an instance of the test class is returned. NOTE: the second parameter is optional and has a default value; this mirrors the production class copy constructor.
22. If there is a public or protected destructor declared on the production class, a deleteInstance inspection member function is generated. This inspection function takes one parameter, a pointer to an instance of the test class. There is no value returned (dtVoid).
23. Operator inspection member function naming. All operator functions must be mapped into a function name of the form "oper_<operator-name>." Above each declaration is a comment indicating its original name in the production class. In the annotations on Appendix B, the term "ARM" refers to the *Annotated C++ Reference Manual*, authored by M. A. Ellis and B. Stroustrup (Addison-Wesley, 1990).
24. Assignment operator inspection function. The first argument, as a general rule for all member functions, is a pointer to an instance of the test class, followed by the arguments from the production class assignment operator. The return type is modified to return a test class (s_utg&) instead of a production class (utg&). The suggested name for this operator is oper_equal.
25. The conversion operator must return an object of the same type as the conversion. Since a conversion operator itself has no arguments, the only argument becomes a pointer to an instance of the test class. The suggested naming for conversion operators is oper_<conversion-type>.
26. The addition assignment operator modifies the return type to a test class, and inserts a pointer to an instance of the test class, followed by the arguments defined by the production class. The suggested naming for this operator is oper_plusequal.
27. The static production member function has lost its static specifier in the inspection class. Also, production class parameter type has been replaced with the test class.
28. The index operator follows the same general rules as described for the assignment operator. The suggested name is oper_index.
29. The virtual setID member function contains a default argument, which is a constant pointer to a constant object. The virtual specifier from the production class is not needed on the inspection class (if it is easy to strip off then do it, otherwise the virtual specifier can stay). A pointer to an instance of the test class is inserted as the first argument, with the production class arguments following; including the default argument (=(const dtChar* const) NULL ).
30. The start of the "private" section, and the end of the "public" section.
31. Declaration of the inspection class' copy constructor and assignment operator member functions. These are not implemented in the inspection class source file 62b.
32. Nonclass functions are declared outside of the inspection class. Their return type and arguments are preserved (a pointer to an idtTest object is inserted as the first argument, and production class types are modified to test class types). The name is changed so it does not conflict with the production header nonclass function name. A suggested naming scheme for nonclass functions is <inspection-class-name>_<nonclass-function-name>. For example, export becomes $i_{13}$ utg_export.
33. Global operators are declared outside of the inspection class. Return type and arguments are preserved (a pointer to an idtTest object is inserted as the first argument, and production class types are modified to test class types). The name is changed so it cannot conflict with the production global operator name. A suggested naming scheme is <inspection-class-name>_oper_<operator-name>. Therefore, the global production operator+ becomes $i_{13}$ utg_oper_plus in the inspection header.
34. The end of the include file guard.

EXPLANATION OF ANNOTATIONS TO INSPECTION CLASS SOURCE FILE 62b LISTING OF APPENDIX C

1. Copyright notice comment.
2. Name of this file. Follows naming rule identified in item 3 of the prior section.
3. Include the inspection class header.
4. Insert the TESTRUNdeclare macro text. Substitute in the name of the inspection class ($i_{13}$ utg).
5. Insert the text for the comments, TESTRUN, and testname, substituting the name of the inspection class.
6. Class description comment, mostly a template with 3 substitutions.

7. Prefix the name of the library with an "I_".
8. Prefix the name of the class with an "i_".
9. Insert a string describing the date and version of the inspection class generator which generated this file.
10. Insert the class constructor with the coverage array initialization code, substituting the name of the inspection class.
11. Destructor, leave empty, and substitute the name of the inspection class.
12. Lifecycle testing comment, insert as is.
13. Lifecycle testing initialization, insert as is, substituting the inspection class name.
14. Invoke newInstance using ram, substitute test class name. In further embodiments, a constructor/destructor test (TLIFE_START through TLIFE_END) can be generated for each existing production class constructor. Likewise, they may include argument types in where/ *PARAMETERS,*/currently appears.
15. Copy as is.
16. Invoke newInstance using mm, substitute test class name.
17. Invoke copyInstance using mm2, substitute test class name. In further embodiments, a constructor/destructor test (TLIFE_START through TLIFE_END) can be generated for each constructor/copy constructor combination. Likewise, they may include argument types in where/ *PARAMETERS,*/currently appears.
18. Copy as is.
19. Invoke newInstance using mm, substitute test class name.
20. Invoke newInstance using mm2, substitute test class name. In further embodiments, a constructor/destructor test (TLIFE_START through TLIFE_END) can be generated for each constructor/assignment operator combination. Likewise, they may include argument types in where /*PARAMETERS,*/currently appears.
21. Copy as is.
22. Three invocations of newInstance using mm, mm2, and min. Substitute test class name.
23. Copy as is.
24. Invoke newInstance using ram, substitute test class name.
25. Copy as is.
26. Operators testing comment, copy as is.
27. Operators testing body skeleton, substitute inspection class name for scope name ($i_{13}$ utg::t_Operators).
28. Comment and body for set and query tests. Same rules as requirement 27.
29. Semantics testing comments and body. Same rules as requirement 27.
30. Persistence testing comments and body. Same rules as requirement 27. In this case, the class is not persistent, so that no persistence testing is generated. Such testing is shown in the example below for the persistent class BasResc (see Appendix F and the accompanying text, infra).
31. Return coverage information. Copy as is, substituting inspection class name for scope.
32. Comment for constructors (newInstance) for test class. Copy as is.
33. Generate function signature using production class constructor signature, substituting rest class name (s_utg) for production class name (utg), using inspection class name for scope ($i_{13}$ utg). Applies to all inspection functions.
34. Generate coverage counter code (applies to all inspection functions). Use the scheme outlined in requirements 14 and 15 of section 3. The member function name text is used to substitute into coverage index text.
35. All inspection functions have an announceMethodStart call, substituting a unique name (requirement 34) based on the function as the argument ("newInstance1 ").
36. Invoke the corresponding constructor on the test class, substituting the test class name for the production class name.
37. All inspection functions have an announceMethodEnd call, following the rules outlined in requirement 35.
38. All newInstance inspection functions return a pointer to an instance of the test class.
39. Invoke the test class copy constructor in copyInstance, dereference aInstance. Substitute test class name where appropriate.
40. The deleteInstance member function must generate a delete statement.
41. Generate function signatures for other inspection functions using same rules as outlined in requirement 33.
42. Invoke the corresponding member function on the test class.
43. If the inspection function returns a value, generate the return statement using either the aInstance pointer or the testVal variable.
44. Another version of requirement 42, this time the corresponding test class member function invoked returns an object. Declare testVal of the correct type.
45. Another version of requirement 43, this time a testVal is being returned.
46. Nonclass functions have a pointer to an idtTest passed in as the first argument. This pointer is used for invoking the announceXxxx member functions. This is done because nonclass functions are not member functions on an inspection object (an inspection object is-a idtTest object).

Generation of the inspection class header and source files 62*a*, 62*b* by the ICG 58 may be further understood by reference to the Appendix D, providing a listing of sample production class header 60 named "basresc.hh"; Appendix E, providing a listing of a sample inspection class header file 62*a* named "$i_{13}$ basres.hh" that is generated by the ICG 58 from the file basresc.hh; and, Appendix F, providing a listing of a sample inspection class code fie 62*b* named $i_{13}$ basres.cc that is also generated by the Icd 58 from the file basresc.hh.

The code generation operations revealed Appendices D–F include support for basic persistence testing of a persistable (or persistent) object is the body using the "t_persist()" function and two additional support member functions for setting up valid user keys and persistent objects.

The items listed below refer to the annotations made on the listings in Appendices D–F. In the description of each item, reference is made to the three classes involved in the unit test:

1. The source production class 30, which is a concrete persistent class.
2. The test class 40. This is a generated typedef which provides access to the public member functions of the production persistent class.
3. The inspection class 34. This class performs tests on instances of the test class 40.

As above, where dictated by context, references in the explanatory items below to the "production class," the "inspection class" and the "test class" shall be interpreted references to the corresponding files 60, 62*a*, 62*b*.

EXPLANATION OF ANNOTATIONS TO PRODUCTION CLASS FILE 60 LISTING OF APPENDIX D

User Key class name. A user key is a class that contains text which is the name of a persistent object. This can be obtained from scanning the second parameter type of the openForChange(), openForReview(), and saveAs() member functions. In an alternate embodiment, a hint as to the icg is obtained from the production class developer via a !USER-KEY keyword.

EXPLANATION OF ANNOTATIONS TO INSPECTION CLASS HEADER FILE **62*a*** LISTING OF APPENDIX E

1. User key setup member function signature. The setupUKs() member function takes four arguments: three user keys and a memory manager pointer. Copied as is except where noted in 2.
2. User key class name is used for each of the three user key arguments. This is the only item that needs to be substituted in this function signature.
3. persistent object setup member function signature. Takes two arguments: test class pointer and a memory manager pointer. Copied as is except where noted in 4.
4. Test class name is the only item that must be substituted.

EXPLANATION OF ANNOTATIONS TO INSPECTION CLASS SOURCE FILE **62*b*** LISTING OF APPENDIX F

1. Define the test class name. This must be substituted using the generated test class name.
2. Define the object reference template parameter. The value that must be substituted is the name of the production class within the angle brackets (oObjRef<ProdClass>).
3. Copy other definitions as is, only STDGIT_PRODUCTION should not be commented.
4. Declare three User Key objects. Substitute the class name of the user key.
5. Declare other test objects. This includes three persistent instances, a security context, and a commented kind reference.
6. Declare a kind reference with its template parameters. Declares a variable named "kr" of the appropriate kind reference. A kind reference is a templated class, and this item is calling out the production class name that must be substituted in the first template parameter, oObjRef (which is itself a templated class). Similar to item 2 in this section.
7. The second kind reference template parameter must be substituted with the user key class name.
8. The rest of the t_persist member function body is copied as is. Note the inclusion of the templated persistence test text.
9. The qryCoverage member function, which is currently being generated.
10. The user key setup member function body, setupUKs(). This is copied as is, except where noted in 11.
11. User key arguments for setupUKs() requires substitution of the user key class name.
12. The persistent object setup member function body, setupObj(). This is copied as is, except where noted in 13.
13. Test class pointer argument for setupObj() requires substitution of the test class name.

Unit Test Harness

With continued reference to FIG. 9, the inspection class source file **62*b* generated by ICG 58 is compiled, linked and loaded (see element 64), along with production class header and source files 60, 68, as well as library ties containing the test monitor class definitions 70 and the test kernel class definitions 72. Compiling, linking and loading is performed in a conventional manner, e.g., using a C++ compiler sold by Microsoft Corporation. The resulting file 66 containing executable code for the unit test harness is executed on digital data processor 12** to reconfigure that processor as the unit test harness.

Figure 10:
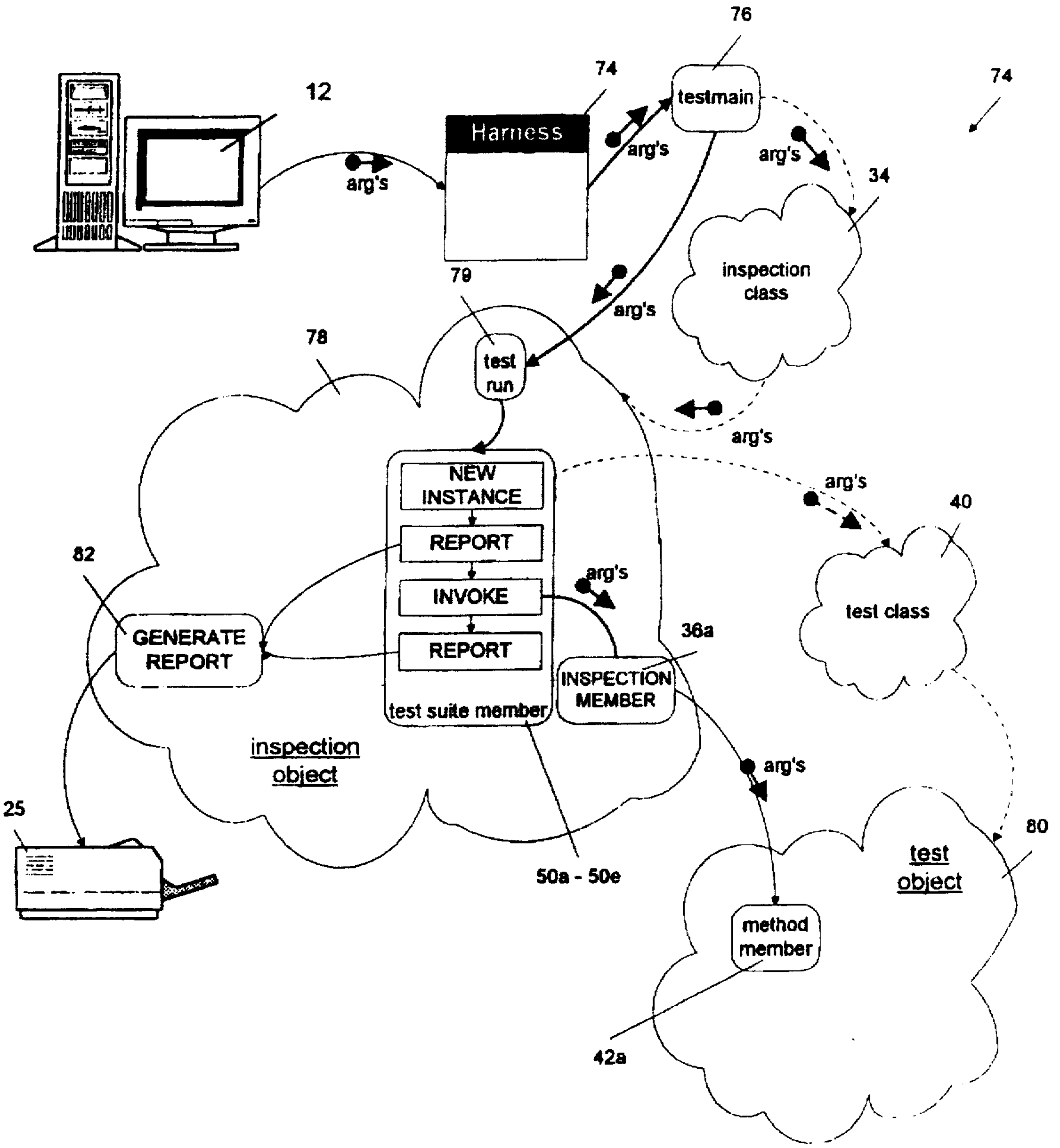
FIG. 10 depicts operation of a test harness according to the invention.

FIG. 10 depicts operation of the unit test harness 74. Particularly, testmain() routine 76 creates an inspection object 78 as an instantiation of the inspection class 34 defined in files **62*a* and 62*b*. Testmain() also invokes testrun(). The testrun() method 79 of the inspection object invokes test suite members 50*a*–50*e* of the inspection object, each of which (i) creates a test object 80 instantiating the test class 40 (defined in file 62*b*), (ii) invokes a members of the test class, e.g., 42*a*, via corresponding inspection members, e.g., 36*a*, of the inspection class, and (iii) utilizes reporting members 82 of the inspection object 78 to report results of the invocation of the test class members. Reports can be generated to printer 25, to monitor 24, to a file on disk drive 22**, or in other media as known in the art.

As illustrated, the test harness 74 accepts arguments, e.g., from the user, for application to the test object upon or upon invocation of the selected member methods, e.g., **42*a*. Such arguments can, alternatively, be generated automatically be the test harness 74**.

Reports generated by members 82 of the inspection object include those resulting from comparing the results of invocation of the test object member, e.g., **42*a*, with expected result values. In the case of disagreement, report members 82 cause an error message to be displayed, e.g., to the printer, monitor or a disk file. Report members 82 also permit the data members of the test object 80 to be "dumped" following invocation. The report members 82 store data reflecting errors that occur during invocation of the test object members, e.g., 42*a***, and coverage of the testing (i.e., which test object members are tested).

Unit Test Classes idtkrnl

Report member 82 includes macros inherited from class idtKrnl 48 (FIG. 5) providing unit test output. Significant among these are two that provide for error checking and a third that gives the developer the ability to output their own status message:

checkExpr( expression, testname )—Announces an error if the expression evaluates to FALSE, returning the value of the expression.

checkMemMgr( memoryMgr, testname )—Announces an error if the Memory Manager detects a memory leak. Returns TRUE if no leak was detected, FALSE when there is a leak.

announceStatus( message, testname )—Announces the message in standard unit test format.

These macros automatically report the standard output information such as current file and line. The report members 82 also include specific announcement members inherited from class idtKrnl 48, including announceObject(), which dumps the contents of the object to the output stream.

idtKrnl 48 also provides other announcement methods:

announceMethodStart( methodname )—Reports the start of the named method announceMethodEnd( methodname )—Reports the end of the named method announceParameter(parameterObj )—Dumps the contents of the object, under the label "Parameter"

announceRetVal( returnObj )—Dumps the contents of the object, under the label "Return Value"

idtTest

The superclass idtTest 46 also provides to inspection object 78 mechanisms for executing unit tests and monitoring test coverage. In this regard, the inspection object inherits from idtTest 46 the following macros to standardize the start and end of the test suite methods 50a–50e (also referred to as t_*methods):

T_INIT( methodname )—Initialize a t_*method, setting up a test memory manager, mm T_CLEANUP( methodname )—Clean up a t_*method, checking the memory manager for leaks.

TEST_START( testname )—Start a test scenario

TEST_END—End a test scenario; announces whether the scenario passed or failed.

TEST( testname, expression )—A combination of TEST_START() and TEST_END for tests which consist of a single expression to check.

checkExcept( expression, id, testname)—Verify that evaluating the expression throws an exception with the id indicated. CheckExcept is implemented in systems that do not otherwise support exception handling by the use of the setjump and longjump ANSI functions. Prior to evaluating the expression, setjump is performed to save the current stack frame. If an exception is thrown and it is required to restore the stackframe, longjump is performed.

In addition to the foregoing, the inspection object inherits from idtTest the testrun() method and other code for running the t_*methods and the code for analyzing the results of the unit tests.

Developing Unit Tests

The sections that follow provide still father discussion of the operation of the inspection class generator 58 and unit test harness 74. Also discussed is designer modification of the inspection class header and source files 62a, 62b for completing test suites for the test harness.

Although inspection class generator 58 creates most of the unit test code 66 from the production class header file 60, the scope of testing may necessitate that the developer complete implementation of the test and inspection classes, as well as the test scenarios themselves. As noted above, in order to manage the potentially large number of test scenarios, the methods are divided into the following logical groups for testing:

LifeCycle—creation and destruction of the object (tests for memory leaks)

Set & Query—Accessors and transformers of the object

Operators—Operator methods

Persist—methods involved in object persistence

Semantics—methods unique to the class.

Each of these groups are implemented in the inspection class as a method 50a–50e whose name is the class prefixed by "t_", such as t_LifeCycle. In order to preserve the isolation of the methods, each test case must be able to be executed on its own, without depending on other test cases running before or after it, although test cases may share test data.

Testing Object Creation and Deletion—t_LifeCycle

The purpose of t_LifeCycle is to test the apparent operation of the constructors and destructor of the object, including the copy constructor. In addition, because it interacts closely with the constructors, the basic assignment operator (=) is tested in t_LifeCycle. The major focus of t_LifeCycle is to catch memory leaks.

Because memory leaks can not be cleared from a memory manager, it is necessary to create a new manager for each test case. In addition, since the memory manager can only check for memory leaks if there are no outstanding blocks of memory allocated, all objects constructed using this memory manager must be deleted before the end of the test. A convenient way to do this is to enclose the test case within a block ({}), that way, local variables are deleted at the end of the block as they go out of scope.

Special TLIFE_*macros in idtTest 46 manage the creation of memory managers and the block. These macros are:

TLIFE_INIT—Initialize t_LifeCycle()

TLIFE_START( testname )—Starts a LifeCycle test case by creating two memory managers (mm and mm2) and starting a block TLIFE_END—Ends a LifeCycle test case by closing the block and checking the memory managers for leaks (before destroying them).

Within the scope of the test, two memory managers are available, in the variables mm and mm2. Constructor tests only need one memory manager, but the copy constructor and the assignment constructor should be tested with two memory managers to ensure that the data is completely copied from one object to another. This provides added memory integrity in a threaded environment.

Constructor/Destructor Testing

It is necessary to have at least one test case for each constructor. The strategy for a constructor test is as follows:

1. construct a test object
2. announce the test object
3. delete the test object Note that the destructor is tested along with the constructor in these cases. The basic test is illustrated in Appendix G.

Also note the use of the test class, s_erMsg, in this example. The test class should be used to represent the production class in all unit test code.

Another consideration in constructor operation is their behavior under error conditions. Usually this means testing constructors when there is insufficient memory for the new object.

In one embodiment, out-of-memory exceptions are thrown by the memory manager, and caught at the application level, so object constructors are not involved. However, constructors may require parameter testing.

Parameter testing should be performed when a parameter's value has some restrictions which are enforced by the constructor. In this case, use equivalence partitioning and boundary value analysis to determine the necessary test cases. For example, if an object had a member which was an unsigned integer, but the only legal values were in the range 1–100. In this case, test cases need to include calling the constructor with the values 0 (invalid), 1, 50, 100, 101 (invalid) and 500 (invalid) might be used.

If the parameters are pointers, test cases should be written to check behavior when the parameter is NULL. A test case to check the default constructor needs to be written as well.

Copy Constructor Testing

Testing the copy constructor follows the form of tests for the regular constructors, with slight modifications. In particular, the constructed object should be in a different memory area than the copied object to ensure that the copy is completely independent of the original. Referring to Appendix H, the scenario is as follows:

1. construct an object (obj1)with memory manager mm
2. construct the test object, by copying (obj2)with memory manager mm2

3. check the equality of the objects (if an equality operator exists) (obj1==obj2)
4. delete the original object (obj1)
5. announce the test object (obj2)
6. delete the test object (obj2)

Note that deleting the original object catches errors involved with incomplete copying. TLIFE_END check both memory managers for leaks. The copy constructor needs to have a test case for each constructor.

Assignment Operator Testing

The assignment operator is tested similarly to the copy constructor, although the basic scenario is slightly different:

1. construct an object (obj1) with memory manager mm
2. construct the test object (obj2) with memory manager mm2
3. assign the first object to the second object (obj2=obj1)
4. check the equality of the objects (if an equality operator exists) (obj1==obj2)
5. delete the original object (obj1)
6. announce the test object (obj2)
7. delete the test object (obj2)

The assignment operator needs to have a test scenario for each constructor, performing the assignment across memory areas. Additionally, the assignment operator needs two more test scenarios:

Chains of assignment (obj3=obj2=obj1, checking that obj3==obj1)

Assignment to self: (obj1=obj1, checking that the obj1 still contains its value)

Note that this tests assignment of two like objects; assignment of an object of another type to a production class object is tested in t_operators.

Example LifeCycle Test Design

Consider a class with three constructors: a default constructor, a constructor with 3 dtLong parameters, and a constructor with 3 dtLong and a bcStringi18n parameters, and a copy constructor and an assignment operator. It would have twelve test scenarios, as follows:

1. Default constructor test
2. Constructor 2 test—values (0, 0, 0)
3. Constructor 3 test 1—values (0, 0, 0, "")
4. Constructor 3 test 2—values (1, 2, 3, "abc")
5. Copy constructor test 1—copying object from default constructor
6. Copy constructor test 2—copying object from constructor 2
7. Copy constructor test 3—copying object from constructor 3
8. Assignment operator test 1—assigning object from default constructor
9. Assignment operator test 2—assigning object from constructor 2
10. Assignment operator test 3—assigning object from constructor 3
11. Assignment operator test 4—chain of assignment
12. Assignment operator test 5—assignment to self

Testing Set and Query Methods—t_SetQrys

The purpose of t_SetQrys is to test the operation of the accessors and transformers of the class; this includes the Query, Set and Validate methods.

Query Methods Testing

The query methods should be tested first, because they can then be used to test the Set methods. There are two approaches to testing the Query methods. If the method returns an unaltered value, the approach is to create an instance of the class with a known value in the member(s) being queried, and then check that the query returns these values, as illustrated in Appendix I.

Note the use of the TEST() macro; the TEST() macro combines TEST_START(), checkExpr() and TEST_END macros, allowing a test which consists of a single expression to be tested in a single line. Since the example test case consists of the expression, "fdMsgTest3==qryMsgID( msg1 )", the test can be implemented as a call to this macro.

The number of test cases that are needed to validate a query method depends on the complexity of the query and boundary conditions. In some queries, the member being queried may not be present; remember to test both the positive (member present) and the negative (member absent) cases, as illustrated in Appendix J. Null and 0 are the most common boundary values; always consider whether test cases for these need to be written.

Another consideration occurs when the value being queried undergoes some transformation either at creation or during the query. In this case, additional test cases would need to check the special cases, assumptions, or boundaries that the calculation imposed on the data. For example, a date class which stored its value in terms of month, day, year, but included a method qryDayOfYear() which calculates the number of days since the start of the year. This method adds to the class of valid test data the conditions of leap and non-leap years (and skipped leap years at century boundaries), and the special case of the year 1752; test cases need include Feb. 29 and Dec. 31, for both a leap and non-leap years, dates in the skipped leap years, such as 1900, and dates in 1752 (depending on locale).

There are no restrictions in setting up test data which satisfies several query unit tests at once, as shown in Appendix J.

Set Methods

The approach to testing the set methods is to apply the method and check the results with the appropriate query method(s). Test cases need to be written to test all of the boundary conditions in the same manner as for query methods described above.

Testing Operators—t_Operators

The set of all possible operators is large; all of the operators are considered here, for completeness. However it is expected that for any particular class only a few operators will be defined.

The general approach for operator testing is to use equivalence partitioning and boundary values to establish a list of test inputs and compare the result of the operation with a constant value. As with query and set methods, the comparison operators should be checked first, so that they can be used to test the other operators.

In the inspection class, the instrumented versions of the operators become procedural methods, so they are renamed, for example, "operator+" becomes "oper_plus".

Note that negative testing of operators will likely result in the production code raising exceptions.

Conversion Operators

The conversion operators are casts which convert the production class into another class. In many cases there is a natural mapping between the class and the target class; even so, make sure to check the 0/Null boundary. Where a natural mapping does not exist, check the code for special cases and equivalence classes.

Conversion operators are renamed in the inspection class to "oper_type", where type is the result of the cast. So in our example, the cast to dtLong* is renamed oper_dtLong in the inspection class. The original, in erMsg is:

```
////////////////////////////////////////
// !METHOD_DECL_S
// !NAME erMsg_operator_dtULong()
// !SATISIFIES
// 1)
// !TEXT
// erMsg conversion operator. Causes the
// value of the error message to be returned.
// Shorthand for qryMsgID().
////////////////////////////////////////
operator dtULong() const;
```

This is tested in $i_{13}$ erMsg as follows:

```
//
// Test 1: Cast to dtULong
//
const dtULong test1value = 1;
s_erMsg* msg1 = newInstance( test1value, ERMSGTEST_NAME,
ERMSGTEST_5, _FILE_, _LINE_, mm );
  // Do cast and check the value
TEST( "Cast to dtULong", test1value == oper_dtULong( msg1 ) );
deleteInstance ( msg1 );
```

Testing Object Persistence—t_Persist

The purpose of t_Persist is to test the object persistence for the class; this includes the Persist and Fetch methods.

Testing Unique Methods—t_Semantics

The purpose of t_Semantics is to test those methods unique to the class.

Test Execution Code

The inspection class generator 58 creates the code which allows the single unit test harness 74 to run the tests. The harness 74 collects arguments from the user to run the test. Then, the test harness 74 calls two exported routines: testname() and testmain(), to figure out what is being tested and to execute the tests. testname() returns a dtChar * which names the inspection class. testmain() serves as the top level of test execution, calling testrun() which, in turn, calls inspection class methods which test the production class. In the inspection class, two macros are used, TESTRUNdeclare and TESTRUN (supplied in idtTest 46), so that testmain is not coded directly. Implementation of these routines is illustrated in Appendix K in which the class "erMsgi" refers to the class "$i_{13}$ erMsg."

Once the inspection class code has been written, it is built into a dynamic link library, or "DLL." Each inspection class must have its own DLL, so that the testname() and testrun() routines do not clash.

Running Unit Tests

Using the Unit Test Harness

Figure 11:
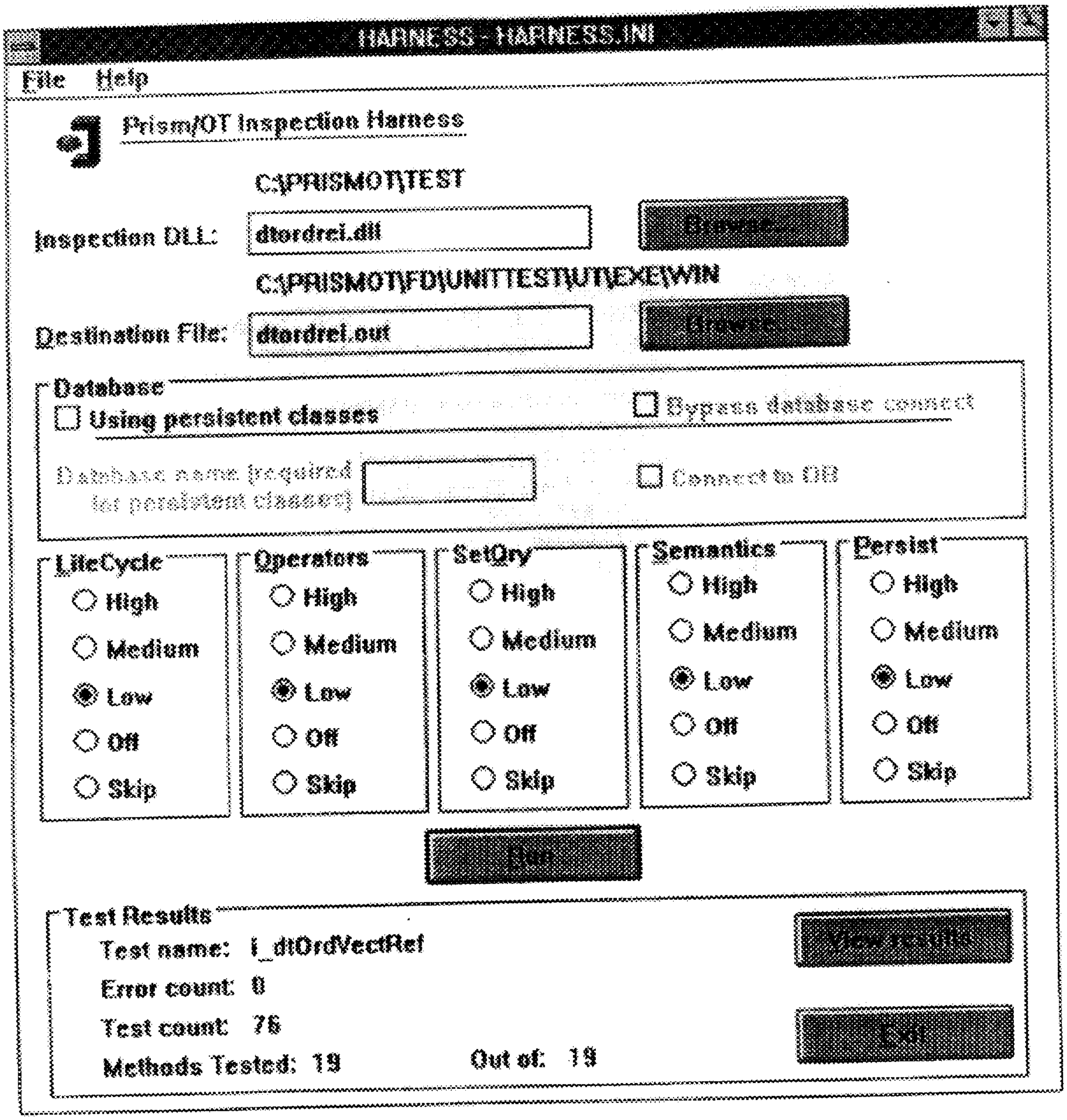
FIG. 11 depicts a window displayed and used in a test harness according to the invention.

In a preferred embodiment, when the unit test harness 74 is started up, it brings up the window shown in FIG. 11. The user fills in the first text field with the name of the DLL built with the inspection class (omitting the .dll extension), and the second text field with the name of the file to which report output is to be directed. The user also selects the desired verbosity level for each test suite member method .and hits the "Run" button.

The unit test harness 74 then loads the inspection class DLL, and executes the testname() and testrun() routines to perform the unit tests. When the tests are complete, the "Error count" field is filled with the number of errors detected during the run. Pressing the View Results buttons will bring up a multi-document notepad with the various output files.

Output of Unit Tests

Types of Unit Test Output

Aside from counting the number of errors detected, the unit test code 74 outputs messages in three categories: error messages, status messages and debugging information. The first class of messages demonstrates whether the production code has correct behavior; they are generated by checkExpr(), checkExcept(), checkMemMgr(), TEST(), and TLIFE_END macros when an expression fails to evaluate to TRUE or when a memory leak is detected. The second type of messages allows the execution of the unit tests to be traced and they are generated by the TEST_START(), TEST_END, TLIFE_START(), TLIFE_END macros and by code generated by the inspection class generator. The third class enables debugging; these messages are generated by the announceObject and code added by the developer.

A user may need some or all of these messages, depending on their goal in executing the unit tests. If they only wish to determine if the production code is operational, for example, they may just want the error messages. In order to give the user some control over the classes of messages they receive, each message has an associated "verbosity level." If the current verbosity level is equal to or higher than the level of the message, that message is put into the output stream. This is the effect of the verbosity widget in the unit test harness; by setting the verbosity higher or lower, the user can control what message they get. The verbosity level of the unit test messages are listed below.

| Verbosity | Class | Sample Messages |
|---|---|---|
| SKIP | Skip particular test suite | SKIPPING: t_LifeCycle, verbosity set to SKIP |
| OFF | None | |
| LOW | Error messages | ERROR: in test FOO, file FILE, line LINE, bad expression: EXPR |
| MED | Status messages | Starting test FOO<br>PASS: FOO |
| HIGH | Object dumps, other debug messages | Current value of mDate: FOO |

If the user sets the verbosity level to OFF, the unit tests will not output any messages, but if they set the verbosity level to MED, they will get the error and status messages in the output log fie. Appendices L, M and N depict of test runs at the various verbosity levels. SKIP allows execution of a test suite to be skipped, e.g., for purposes of initial test development and debugging.

In addition, the inspection class appends a simple analysis of the run at the end of a unit test execution. testmain() always returns the number of errors detected, so the test harness can display this information even with the verbosity level set to OFF. At LOW and MED verbosity levels, the unit test code 74 reports on the number of tests run and the number of errors found. At HIGH, coverage information is output; this allows the user to determine whether all of the production methods were tested.

Unit Test Output Files

Output by harness 74 and, particularly, by reporting members 82 is placed into five files:

Log file: <file>.out (<file> represents the destination file field in the unit test harness)

Error file: <file>.err

Memory Log file: memory.log

Exception Log file: except.log

Database Error file: sqlerror.log

The log file is the main file for unit test output. All of the output generated by the unit test code is placed into this file, giving the user a place where they can read the messages in context. As described above, the contents of the log file is controlled by setting the verbosity level.

The error file separates the error messages from the rest of the output for easier management. It is not affected by the verbosity level; it always contains all of the error messages generated by the unit test code. The memory log file includes information output by the memory management code, which can be useful in tracking down memory leaks. The exception log includes information on the exceptions which were thrown by the unit test code.

Generation Techniques

In an alternative embodiment, as inspection class 34 as described comprises an "inspection standard" class and an "inspection custom" class, the latter (i.e., the custom class) deriving from the former (i.e., the standard class). The inspection standard class includes all of inspection methods 50F (FIG. 6), while the inspection custom class includes the test suites 50A–50E. Those skilled in the art will appreciate that this facilitates maintenance of the system and, particularly, facilitates regeneration of the inspection standard class as necessitated when the API of the production class changes.

SUMMARY

Described above are improved methods and apparatus for testing object-oriented programming constructs. It will be appreciated that the illustrated embodiment is described by way of example and that other embodiments incorporating modifications may well fall within the scope of the invention. Thus, for example, it will be appreciated that class names,

08/324810

MAIL ROOM OCT 18 1994

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX A

UTG.HH

```
//////////////////////////////////////////////////////////////////////
//
// FILE_NAME: utg.hh
//
// Copyright 1993 by Marcam Corp., Newton, MA USA
//
// This unpublished copyrighted work contains
// TRADE SECRET information of Marcam Corporation.
//
// Use, transfer, disclosure, or copying without
// its expressed written permission is strictly
// forbidden.
//
//
//////////////////////////////////////////////////////////////////////

#ifndef utgHH
#define utgHH

#include "dtcore.hh"          // For dtCore

//////////////////////////////////////////////////////////////////////
// !CLASS_DECL_S
// !LIBRARY ER
// !NAME utg
// !TEXT
// Test case for the unit test generator.  This class header attempts
// to test a number of different items that need to be transformed
// when creating the inspection class header.  This includes the
// public and protected member functions, operators, static and nonstatic
// member functions, and nonclass functions appearing in a header file.
// Also, various styles of using spaces in a member function delcaration
// are tested.
//
// !AUTHOR      John Dalton          (dalton@opl.com)
// !REVIEWER    <Reviewer's name> <(Reviewer's E-mail address)>
// !REVIEW_DATE <date>
//////////////////////////////////////////////////////////////////////

class EXPORT utg : public dtCore
{

public:
    // Public enumeration should not end up in inspection class.
    enum stringSize
    {
        STRING_SIZE = 10
    };


    ///////////////////////////////////////////////////
    // !METHOD_DECL_S
    // !NAME utg_def_ctor
    // !TEXT
    // The default constructor.  Most classes are
    // required to have one.
    ///////////////////////////////////////////////////


    utg( dtMemoryMgr* aMemMgr );


    ///////////////////////////////////////////////////
    // !METHOD_DECL_S
    // !NAME utg_ctor1
```

APPENDIX A

UTG.HH

```
// !TEXT
// This constructor takes 3 arguments, all of which are required.
///////////////////////////////////////////////////

utg( dtULong              aArg1,
     const dtChar* const aArg2,
     dtMemoryMgr*         aMemMgr );

///////////////////////////////////////////////////
// !METHOD_DECL_S
// !NAME utg_ctor2
// !TEXT
// This constructor takes 4 arguments, all are required.
///////////////////////////////////////////////////

utg( dtULong              aArg1,
     const dtChar* const aArg2,
     dtInt                aArg3,
     dtMemoryMgr*         aMemMgr );
```

11

```
///////////////////////////////////////////////////
// !METHOD_DECL_S
// !NAME utg_copy_ctor
// !TEXT
// utg copy constructor.
///////////////////////////////////////////////////

utg(const utg&   aUtg,
    dtMemoryMgr* aMemMgr=(dtMemoryMgr*)NULL);
```

12

```
///////////////////////////////////////////////////
// !METHOD_DECL_S
// !NAME utg_dtor
// !TEXT
// utg destructor.  Does nothing special.
///////////////////////////////////////////////////

~utg();
```

13

```
///////////////////////////////////////////////////
// !METHOD_DECL_S
// !NAME utg_operator=
// !TEXT
// utg assignment operator.
///////////////////////////////////////////////////

utg& operator= ( const utg& aRhs );
```

14

```
///////////////////////////////////////////////////
// !METHOD_DECL_S
// !NAME utg_operator_dtULong()
// !TEXT
// utg conversion operator.
///////////////////////////////////////////////////

operator dtULong() const;
```

15

```
///////////////////////////////////////////////////
// !METHOD_DECL_S
// !NAME utg_operator+=()
// !TEXT
// An overloaded Addition Assignment operator.
///////////////////////////////////////////////////
```

16

UTG.HH

```
utg& operator += ( dtInt aRhs);

//////////////////////////////////////////////////
// !METHOD_DECL_S
// !NAME utg_openForRead
// !TEXT
// Static method generates a utg.
// Static specifier is dropped on inspection
// member function.
//////////////////////////////////////////////////

static erStatus openForRead( utg*& aUtg, dtMemoryMgr* aMM);

// Public member data.  Should not appear in generated inspection class.
dtUInt      publicID;
dtChar      publicIDstring[STRING_SIZE];

protected:
//////////////////////////////////////////////////
// !METHOD_DECL_S
// !NAME utg_operator[]()
// !TEXT
// An overloaded index operator.
//////////////////////////////////////////////////

dtChar operator []( dtInt aIndex ) const;

//////////////////////////////////////////////////
// !METHOD_DECL_S
// !NAME utg_rtnID
// !TEXT
// Returns ID. A pure virtual member function.
// makes this an abstract class.  These don't
// get tested by the unit test, but must be
// declared (as private) in the inspection class
// to satisfy compiler (instantiating an abstract
// class).  No source is generated for this, it
// can be declared and implemented.
//////////////////////////////////////////////////

virtual dtULong rtnID() const = 0;

//////////////////////////////////////////////////
// !METHOD_DECL_S
// !NAME utg_setID
// !TEXT
// Set the ID, has an optional parameter.
// Virtual function declaration is not used
// on generated inspection member function.
//////////////////////////////////////////////////

virtual dtBoolean setID( const dtULong aID,
                 const dtChar* const aName = (const dtChar* const) NULL );

#ifdef    OPLDEBUG
//////////////////////////////////////////////////
// !METHOD_DECL_S
// !NAME utg_dump
// !TEXT
// This is used by the announceXXX() methods, so
// there is no need to include this in the
// generated inspection class.
//////////////////////////////////////////////////

dtVoid dump(dtOStream& aOutStream, dtUInt aIndentLevel = 0) const;
```

UTG.HH

```
#endif // OPLDEBUG

    // Protected member data.  Should not appear in generated inspection class.
    dtUInt       protectedID;
    dtChar       protectedIDstring[STRING_SIZE];

private:
    // Of course, nothing private will appear in the inspection class.
    dtULong         mMsgID;

    //////////////////////////////////////////////////
    // !METHOD_DECL_S
    // !NAME utg_privateMemberFunction
    // !TEXT
    // Private member functions do not appear in the
    // generated inspection class.
    //////////////////////////////////////////////////

    const utg* copy( const utg* const aUtg ) const;
};

// Nonclass function appearing in the header.
// These appear in the generated header prepended
// with the name of the inspection class.

dtBoolean export( const utg& aUtg );

// Global operator (also a nonclass function)

utg& operator+( const utg& aLhs, const utg& aRhs );
#endif // utgHH
```

24 25 26 27 28 29

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX B

I_UTG.HH

```
////////////////////////////////////////////////////////////////////////
//
// FILE_NAME: i_utg.hh
//
// Copyright 1993 by Marcam Corp., Newton, MA USA
//
// This unpublished copyrighted work contains
// TRADE SECRET information of Marcam Corporation.
//
// Use, transfer, disclosure, or copying without
// its expressed written permission is strictly
// forbidden.
//
//
////////////////////////////////////////////////////////////////////////

#ifndef i_utgHH
#define i_utgHH

#include "idttest.hh"          // For idtTest
#include "utg.hh"              // For utg

////////////////////////////////////////////////////////////////////////
// !CLASS_DECL_S
// !LIBRARY I_ER
// !NAME i_utg
// !TEXT
// Generated 7/12/93 by Wutg version 1.0
//
// !AUTHOR      <Author's name>   <(Author's E-mail address)>
// !REVIEWER    <Reviewer's name> <(Reviewer's E-mail address)>
// !REVIEW_DATE <date>
////////////////////////////////////////////////////////////////////////


////////////////////////////////////////////////////////////////////////
// Class under test.  This class is derived from the production object.
// This provides access to the public and protected member functions
// of the production class, without modification to the production
// class.  Also, pure virtual functions declared in the production class
// are provided an implementation here.  This allows production abstract
// base classes to be instantiated and tested.
////////////////////////////////////////////////////////////////////////

class s_utg : public utg
{
public:
    friend class i_utg;

    ////////////////////////////////////////////////
    // Inline constructors, and copy constructor
    // for replicating the production class interface.
    ////////////////////////////////////////////////

    s_utg( dtMemoryMgr* aMemMgr ) : utg( aMemMgr ){}

    s_utg( dtULong aArg1,
           const dtChar* const aArg2,
           dtMemoryMgr* aMemMgr ) : utg( aArg1, aArg2, aMemMgr ){}

    s_utg( dtULong aArg1,
           const dtChar* const aArg2,
           dtInt aArg3,
           dtMemoryMgr* aMemMgr ) : utg( aArg1, aArg2, aArg3, aMemMgr ){}

    s_utg( const s_utg& aS_utg,
```

APPENDIX B

I_UTG.HH

```
        dtMemoryMgr* aMemMgr=(dtMemoryMgr*)NULL ) : utg( aS_utg, aMemMgr ){}
    ////////////////////////////////////////////////////
    // Provide an implementation for pure virtual
    // functions declared by the production class.
    ////////////////////////////////////////////////////

    virtual dtULong rtnID() const;
    //!FIX ( If this is called you need to add code here )
};


enum FUNCS
{
    f_newInstance1,
    f_newInstance2,
    f_newInstance3,
    f_copyInstance,
    f_deleteInstance,
    f_oper_equal,
    f_oper_dtULong,
    f_oper_plusequal,
    f_oper_index,
    f_setID,
    f_openForRead,
    f_i_utg_export,
    f_i_utg_oper_plus,
    TOTAL_FUNCS
};

dtInt coverage[TOTAL_FUNCS];


class EXPORT i_utg : public idtTest
{
public:

    ////////////////////////////////////////////////////
    // Inspection class member functions:
    ////////////////////////////////////////////////////

    i_utg( dtStreamExecutive* aStreamExec,
           dtMemoryExecutive& aMemExec,
           idtTestArgs&       aTestArgs,
           dtMemoryMgr*       aTestMM );

    ~i_utg();


    ////////////////////////////////////////////////////
    // Inspection test suite.
    ////////////////////////////////////////////////////

    virtual dtVoid t_LifeCycle();
    virtual dtVoid t_Operators();
    virtual dtVoid t_Semantics();
    virtual dtVoid t_SetQrys();
    virtual dtVoid t_Persist();
    virtual dtVoid qryCoverage( dtInt*& aCovAry, dtInt& aNumFuncs ) const;

    ////////////////////////////////////////////////////
    // Constructors for class under inspection
    ////////////////////////////////////////////////////
```

12 13 14 15 16 17 18 19 20

I_UTG.HH

```
s_utg* newInstance( dtMemoryMgr* aMemMgr );

s_utg* newInstance( dtULong            aArg1,
        const dtChar* const aArg2,
        dtMemoryMgr*        aMemMgr );

s_utg* newInstance( dtULong            aArg1,
        const dtChar* const aArg2,
        dtInt               aArg3,
        dtMemoryMgr*        aMemMgr );
```
20

```
//////////////////////////////////////////////////
// Copy constructor for class under inspection.
//////////////////////////////////////////////////

s_utg* copyInstance( s_utg* aInstance,
      dtMemoryMgr* aMemMgr=(dtMemoryMgr*)NULL);
```
21

```
//////////////////////////////////////////////////
// Destructor for class under inspection.
//////////////////////////////////////////////////

dtVoid deleteInstance( s_utg* aInstance );
```
22

```
//////////////////////////////////////////////////
// Other member functions.
//////////////////////////////////////////////////

s_utg& oper_equal( s_utg* aInstance,
        const s_utg& aRhs );                          > 24

dtULong oper_dtULong( s_utg* aInstance );             > 25

s_utg& oper_plusequal( s_utg* aInstance,
        dtInt aRhs );                                 > 26

erStatus openForRead( s_utg*& aUtg, dtMemoryMgr* aMM); > 27

dtChar oper_index( s_utg* aInstance,
        dtInt aIndex );                               > 28

dtBoolean setID( s_utg* aInstance,
        const dtULong aID,
        const dtChar* const aName = (const dtChar* const) NULL ); > 29
```
23

```
private: > 30
    //////////////////////////////////////////////////
    // Inspection class member functions, unimplemented
    // copy constructor and assignment operator.
    //////////////////////////////////////////////////

    i_utg( const i_utg& aI_utg );

    i_utg& operator=( const i_utg& aI_utg );
};
```
31

```
//////////////////////////////////////////////////
// Nonclass functions to be tested.
//////////////////////////////////////////////////

dtBoolean i_utg_export( idtTest* aTestObj, const s_utg& aUtg ); > 32

s_utg& i_utg_oper_plus( idtTest* aTestObj, const s_utg& aLhs, const s_utg& aRhs ); > 33

#endif // i_utgHH > 34
```

I_UTG.HH

AMENDMENT

```
    s_utg* copyInstance( s_utg* aInstance,
          dtMemoryMgr* aMemMgr=(dtMemoryMgr*)NULL);

    //////////////////////////////////////////////////
    // Destructor for class under inspection.
    //////////////////////////////////////////////////

    dtVoid deleteInstance( s_utg* aInstance );

    //////////////////////////////////////////////////
    // Other member functions.
    //////////////////////////////////////////////////

    // "oper_equal" tests "operator="
    s_utg& oper_equal( s_utg* aInstance,
            const s_utg& aRhs );

    // "oper_dtULong" tests "operator dtULong()"
    dtULong oper_dtULong( s_utg* aInstance );

    // "oper_plusequal" tests "operator+="
    s_utg& oper_plusequal( s_utg* aInstance,
            dtInt aRhs );

    erStatus openForRead( s_utg*& aUtg, dtMemoryMgr* aMM);

    // "oper_index" tests "operator[]"
    dtChar oper_index( s_utg* aInstance,
            dtInt aIndex );

    dtBoolean setID( s_utg* aInstance,
            const dtULong aID,
            const dtChar* const aName = (const dtChar* const) NULL );

private:

    //////////////////////////////////////////////////
    // Inspection class member functions, unimplemented
    // copy constructor and assignment operator.
    //////////////////////////////////////////////////

    i_utg( const i_utg& aI_utg );

    i_utg& operator=( const i_utg& aI_utg );
};

//////////////////////////////////////////////////
// Nonclass functions to be tested.
//////////////////////////////////////////////////

dtBoolean i_utg_export( idtTest* aTestObj, const s_utg& aUtg );

s_utg& i_utg_oper_plus( idtTest* aTestObj, const s_utg& aLhs, const s_utg& aRhs );


#endif // i_utgHH
```

23

USING ARM RULES FOR NAME ENCODING "OPERATOR=" BECOMES: "OPER_AS"

OPERATOR+= → OPER_APL

OPERATOR[] → OPER_VC

8/19/93 2:42PM Page 3

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX C

I_UTG.CPP

```
/////////////////////////////////////////////////////////////////////////
//
// FILE_NAME: i_utg.cpp
//
// Copyright 1993 by Marcam Corp., Newton, MA USA
//
// This unpublished copyrighted work contains
// TRADE SECRET information of Marcam Corporation.
//
// Use, transfer, disclosure, or copying without
// its expressed written permission is strictly
// forbidden.
//
//
/////////////////////////////////////////////////////////////////////////

#include "i_utg.hh"          // For i_utg

// Establish an instance of TESTRUN for this class
TESTRUNdeclare(i_utg)

//
// TESTRUN() and testname() are used by the unit test harness
// to run the tests and display the name of the unit test.
//
extern "C" dtInt FAR PASCAL EXPORT testmain( idtTestArgs& aTestArgs )
{
    return( TESTRUN(i_utg)( aTestArgs ) );
}

extern "C" dtChar * FAR PASCAL EXPORT testname()
{
    return( "i_utg" );
}

/////////////////////////////////////////////////////////////////////////
// !CLASS_DESC_S
// !LIBRARY ER
// !NAME i_utg
// !TEXT
// Generated 7/12/93 by utg version 1.0
//
// !AUTHOR      <Author's name>   <(Author's E-mail address)>
// !REVIEWER    <Reviewer's name> <(Reviewer's E-mail address)>
// !REVIEW_DATE <date>
/////////////////////////////////////////////////////////////////////////

///////////////////////////////////////////////////
// Inspection class constructor.
///////////////////////////////////////////////////

i_utg::i_utg(
    dtStreamExecutive* aStreamExec,
    dtMemoryExecutive& aMemExec,
    idtTestArgs&       aTestArgs,
    dtMemoryMgr*
    ): idtTest( aStreamExec, aMemExec, aTestArgs )

{
    for ( int i = 0 ; i < TOTAL_FUNCS ; i++ )
        coverage[i] = 0;
}

///////////////////////////////////////////////////
// Inspection class destructor.
```

APPENDIX C

I_UTG.CPP

```
///////////////////////////////////////////////////

i_utg::~i_utg()
{
}

///////////////////////////////////////////////////
// Lifecycle testing.
//
// The TLIFE_START and TLIFE_END macros are placed
// around each lifecycle test. These provide the
// announcement of each test and whether it has
// passed or failed. They also provide clean
// memory mamangers for each test. Throughout
// the lifecycle test (between the TLIFE_INIT and
// TLIFE_CLEANUP macros) two memory managers are
// available: mm and mm2.
///////////////////////////////////////////////////

dtVoid
i_utg::t_LifeCycle()
{
    TLIFE_INIT

    // CONSTRUCTOR/DESTRUCTOR TESTING
    //
    // Constructor and destructor testing. One test must
    // be performed for each constructor. The basic format
    // is construct the object, announce it, then delete it.
    //
    TLIFE_START( "ctor1 and dtor" )
        s_utg* testobjX = newInstance( /*PARAMETERS,*/ mm );
        announceObject( *testobjX );
        deleteInstance( testobjX );
    TLIFE_END

    // COPY CONSTRUCTOR TESTING
    //
    // Copy constructor tests. One test must be performed
    // for each copy constructor/constructor combination.
    // The format for each test is: construct an object
    // using mm, then invoked the copy constructor using
    // mm2, delete the original, announce the copy, then
    // delete the copy. This test copying across memory
    // spaces, as well as, incomplete copies and use of
    // aliases (shared pointers with no reference counting).
    //
    TLIFE_START( "Copy ctor and ctor1" )
        s_utg* testobjX = newInstance( /*PARAMETERS,*/ mm );
        s_utg* testobjY = copyInstance( testobjX, mm2 );
        deleteInstance( testobjX );
        announceObject( *testobjY );
        deleteInstance( testobjY );
    TLIFE_END

    // ASSIGNMENT OPERATOR TESTING
    //
    // Similar in nature to the copy constructor testing,
    // one test must be performed for each constructor/
    // assignment operator combination. The format is:
    // construct objectX using mm, construct objectY
    // using mm2, assign objectX to objectY, check for
    // equality if that operator is defined, delete
    // objectX, announce objectY, delete objectY.
    // Additionally, chained assignment (objZ=objY=objX,
    // where after the operation objZ == objX) and
    // assignment to self (objX=objX, where objX still
```

```
// has a value after assignment) must be tested.
//
TLIFE_START( "ctor1 and operator=" )
    s_utg* testobjX = newInstance( /*PARAMETERS,*/ mm );
    s_utg* testobjY = newInstance( /*PARAMETERS,*/ mm2 );
    *testobjY = *testobjX;
//!FIX      checkExpr( *testobjX == *testobjY, currTest );
    deleteInstance( testobjX );
    announceObject( *testobjY );
    deleteInstance( testobjY );
TLIFE_END

TLIFE_START( "Chained assignment" )
    s_utg* testobjX = newInstance( /*PARAMETERS,*/ mm );
    s_utg* testobjY = newInstance( /*PARAMETERS,*/ mm2 );
    s_utg* testobjZ = newInstance( /*PARAMETERS,*/ mm );
    *testobjZ = *testobjY = *testobjX;
//!FIX      checkExpr( *testobjZ == *testobjY, currTest );
    deleteInstance( testobjX );
    deleteInstance( testobjY );
    announceObject( *testobjZ );
    deleteInstance( testobjZ );
TLIFE_END

TLIFE_START( "Assignment to self" )
    s_utg* testobjX = newInstance( /*PARAMETERS,*/ mm );
    *testobjX = *testobjX;
    announceObject( *testobjX );
    deleteInstance( testobjX );
TLIFE_END

TLIFE_CLEANUP;
}

/////////////////////////////////////////////////////
// Operators testing.
//
// All operators are tested here.  The entire
// set of operators has been broken into like
// categories for ease of testing.  Between the
// T_INIT and T_CLEANUP macros the memory manager
// variable mm is available for constructing
// test objects.  Each individual test must be
// surrounded by the T_START and T_END macros,
// or alternately, the test itself can be performed
// within a TEST macro.
/////////////////////////////////////////////////////

dtVoid
i_utg::t_Operators()
{
    T_INIT( "t_Operators" )

    // COMPARISON OPERATORS: < > <= >= == !=

    // ARITHMETIC OPERATORS: + - * / % ++ --

    // LOGICAL OPERATORS: || && !

    // BITWISE OPERATORS: ^ | & ~ << >>

    // EXTENDED ASSIGNMENT OPERATORS: += -= *= /= %= ^= |= &= <<= >>=

    // CONVERSION OPERATORS:  type()
```

I_UTG.CPP

```
    // MISCELLANEOUS AND GLOBAL OPERATORS

    T_CLEANUP
}

///////////////////////////////////////////////////
// Set and Query testing.
//
// The set and query member functions are tested
// here.  If your class under test contains
// values that do not require being set first,
// then test the query methods for those values
// before testing the corresponding set methods.
// Between the T_INIT and T_CLEANUP macros the
// memory manager variable mm is available for
// constructing test objects.  Each individual
// test must be surrounded by the T_START and T_END
// macros, or alternately, the test itself can be
// performed within a TEST macro.
///////////////////////////////////////////////////

dtVoid
i_utg::t_SetQrys()
{
    T_INIT( "t_SetQrys" )

    // QUERY TESTS


    // SET TESTS


    T_CLEANUP
}

///////////////////////////////////////////////////
// Semantics testing.
//
// These tests are for those member functions
// unique to the production class.
// Between the T_INIT and T_CLEANUP macros the
// memory manager variable mm is available for
// constructing test objects.  Each individual
// test must be surrounded by the T_START and T_END
// macros, or alternately, the test itself can be
// performed within a TEST macro.
///////////////////////////////////////////////////

dtVoid
i_utg::t_Semantics()
{
    T_INIT( "t_Semantics" )

    //!FIX Add your semantic member function tests here.


    T_CLEANUP;
}

///////////////////////////////////////////////////
// Persistence testing.
//
// This tests behavior specific to the persistence
// member functions of a production class.
// Between the T_INIT and T_CLEANUP macros the
// memory manager variable mm is available for
```

27

28

29

30

I_UTG.CPP

```
// constructing test objects.  Each individual
// test must be surrounded by the T_START and T_END
// macros, or alternately, the test itself can be
// performed within a TEST macro.
//////////////////////////////////////////////////

dtVoid
i_utg::t_Persist()
{
    T_INIT( "t_Persist" )

    //!FIX Add your persistent member function tests here.


    T_CLEANUP;
}

//////////////////////////////////////////////////
// Return coverage information.
//
// NOTE: This is not to be modified by unit
//       test developers.
//////////////////////////////////////////////////

dtVoid
i_utg::qryCoverage(
    dtInt*& aCovAry,
    dtInt&  aNumFuncs
    ) const
{
    aCovAry = coverage;
    aNumFuncs = TOTAL_FUNCS;
}

//////////////////////////////////////////////////
// Constructors for class under inspection.
//
// NOTE: The following constructors can
//       be modified by unit test developers.
//       The parameters for a given constructor,
//       and the announcement of parameters and
//       resulting objects can be customized
//       by the unit test developer.
//////////////////////////////////////////////////

s_utg*
i_utg::newInstance(
    dtMemoryMgr* aMemMgr
    )
{
    coverage[f_newInstance1]++;
    announceMethodStart( "newInstance1" );
    s_utg* NewObj = new (aMemMgr) s_utg(aMemMgr);
    announceMethodEnd( "newInstance1" );
    return( NewObj );
}

s_utg*
i_utg::newInstance(
    dtULong              aArg1,
    const dtChar* const  aArg2,
    dtMemoryMgr*         aMemMgr )
{
    coverage[f_newInstance2]++;
    announceMethodStart( "newInstance2" );
    s_utg* NewObj = new (aMemMgr) s_utg( aArg1, aArg2, aMemMgr );
```

```
    announceMethodEnd( "newInstance2" );
    return( NewObj );
}


s_utg*
i_utg::newInstance(
    dtULong              aArg1,
    const dtChar* const aArg2,
    dtInt               aArg3,
    dtMemoryMgr*        aMemMgr )
{
    coverage[f_newInstance3]++;
    announceMethodStart( "newInstance3" );
    s_utg* NewObj = new (aMemMgr) s_utg( aArg1, aArg2, aArg3, aMemMgr );
    announceMethodEnd( "newInstance3" );
    return( NewObj );
}


//////////////////////////////////////////////////
// Copy constructor for class under inspection.
//
// NOTE: The following copy constructor can be
//       modified by unit test developers.
//////////////////////////////////////////////////

s_utg*
i_utg::copyInstance(
    s_utg* aInstance,
    dtMemoryMgr* aMemMgr
    )
{
    coverage[f_copyInstance]++;
    announceMethodStart( "copyInstance" );
    s_utg* NewObj = new (aMemMgr) s_utg( *aInstance, aMemMgr );   -- 39
    announceMethodEnd( "copyInstance" );
    return( NewObj );
}


//////////////////////////////////////////////////
// Destructor for class under inspection.
//
// NOTE: The following destructor can be
//       modified by unit test developers.
//////////////////////////////////////////////////

dtVoid
i_utg::deleteInstance( s_utg* aInstance )
{
    coverage[f_deleteInstance]++;
    announceMethodStart( "deleteInstance" );
    delete aInstance;   -- 40
    announceMethodEnd( "deleteInstance" );
}

//////////////////////////////////////////////////
// Other member functions.
//
// NOTE: The following inspection functions can be
//       modified by unit test developers.
//////////////////////////////////////////////////

s_utg&
i_utg::oper_equal(          ] 41
    s_utg* aInstance,
    const s_utg& aRhs
    )
{
```

I_UTG.CPP

```
    coverage[f_oper_equal]++;
    announceMethodStart( "oper_equal" );
    announceParameter( aRhs );
    aInstance->operator=( *aInstance ); —42
    announceMethodEnd( "oper_equal" );
    return( *aInstance ); 43
}


dtULong
i_utg::oper_dtULong(
    s_utg* aInstance
    )
{
    coverage[f_oper_dtULong]++;
    announceMethodStart( "oper_dtULong" );
    dtULong testVal = aInstance->operator dtULong(); —44
    announceMethodEnd( "oper_dtULong" );
    return( testVal ); 45
}

s_utg&
i_utg::oper_plusequal(
    s_utg* aInstance,
    dtInt aRhs
    )
{
    coverage[f_oper_plusequal]++;
    announceMethodStart( "oper_plusequal" );
//    announceParameter( aRhs );
    aInstance->operator+=( *aInstance );
    announceMethodEnd( "oper_plusequal" );
    return( *aInstance );
}


dtChar
i_utg::oper_index(
    s_utg* aInstance,
    dtInt aIndex
    )
{
    coverage[f_oper_index]++;
    announceMethodStart( "oper_index" );
//  announceParameter( aIndex );
    dtChar testVal = aInstance->operator[](aIndex);
    announceMethodEnd( "oper_index" );
    return( testVal );
}


dtBoolean
i_utg::setID(
    s_utg* aInstance,
    const dtULong aID,
    const dtChar* const aName
    )
{
    coverage[f_setID]++;
    announceMethodStart( "setID" );
//  announceParameter( aID );
//  announceParameter( aName );
    dtBoolean testVal = aInstance->setID(aID,aName);
    announceMethodEnd( "setID" );
    return( testVal );
}
```

I_UTG.CPP

```
erStatus
i_utg::openForRead(
    s_utg*& aArg,
    dtMemoryMgr* aMM
    )
{
    coverage[f_openForRead]++;
    announceMethodStart( "openForRead" );
    erStatus testVal = utg::openForRead( (utg*&)aArg, aMM );
    announceRetVal( testVal );
    announceMethodEnd( "openForRead" );
    return( testVal );
}


///////////////////////////////////////////////////
// Nonclass functions to be tested.
//
// NOTE: The following nonclass inspection functions
//       can be modified by unit test developers.
///////////////////////////////////////////////////


dtBoolean
i_utg_export(
    idtTest* testObj,
    const s_utg& aUtg
    )
{
    coverage[f_i_utg_export]++;
    testObj->announceMethodStart( "i_utg_export" );
    testObj->announceParameter( aUtg );
    dtBoolean testVal = export( aUtg );
    testObj->announceMethodEnd( "i_utg_export" );
    return( testVal );
}


s_utg&
i_utg_oper_plus(
    idtTest* testObj,
    const s_utg& aLhs,
    const s_utg& aRhs
    )
{
    coverage[f_i_utg_oper_plus]++;
    testObj->announceMethodStart( "i_utg_oper_plus" );
    testObj->announceParameter( aLhs );
    testObj->announceParameter( aRhs );
    s_utg& testVal = (s_utg&)operator+( aLhs, aRhs );
    testObj->announceMethodEnd( "i_utg_oper_plus" );
    return( testVal );
}
```

46

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX D

BASRESC.HH

```
///////////////////////////////////////////////////////////////////////////
//
// FILE_NAME:   basresc.hh
//
// Copyright 1993 by Marcam Corp., Newton, MA USA
//
// This unpublished copyrighted work contains
// TRADE SECRET information of Marcam Corporation.
//
// Use, transfer, disclosure, or copying without its expressed
// written permission is strictly forbidden.
//
///////////////////////////////////////////////////////////////////////////

#ifndef basrescHH
#define basrescHH

#include "geninst.hh"       // For fdGenInst
#include "bcdatet.hh"       // For bcDateTime
#include "nameuk.hh"        // For fdNameUK
#include "dtbitv.hh"        // For dtBitVector (dummy)

class EXPORT BasicResource;


#ifdef __OSE_TEMPLATES__
#include "orb.hh"
#endif

#ifndef SCHEMACOMPILER
#include "basresc.h"
#endif


///////////////////////////////////////////////////////////////////////////
// !CLASS_DECL_S
// !LIBRARY
// !NAME BasicResource
// !TEXT
// BasicRecource is the implementation of a generic instance-derived
// class.  This is an independently persistable kind (IPK).
//
// The user's access rights will be checked whenever fdSecurityContext
// appears as a parameter.  If the user does not have appropriate access
// in the standard UI/App API, an error message will be returned.
//
// A returned pointer to an erMsg or erMsgList indicates an error
// occurred.  A NULL pointer indicates successful completion of
// the member function.
//
// !AUTHOR       <Author's name>   <(Author's E-mail address)>
// !REVIEWER     <Reviewer's name> <(Reviewer's E-mail address)>
// !REVIEW_DATE <date>
//
///////////////////////////////////////////////////////////////////////////


class EXPORT BasicResource : public fdGenInst
{
  public:

    ///////////////////////////////////////////////////
    // !METHOD_DECL_S
    // !NAME close
    // !TEXT
    // This static method closes the current object,
    // releasing all database and memory resources.
    // When successful, the aBasicResource pointer
```

APPENDIX D

BASRESC.HH

```
// is set to Null.
//
// **Standard UI/App API, implemented in stdgi.cc**
/////////////////////////////////////////////////

static erMsg* close( BasicResource*& aBasicResource,
                     dbTransCtx*&    aDbCtx );


/////////////////////////////////////////////////
// !METHOD_DECL_S
// !NAME create
// !TEXT
// This static method creates a new BasicResource,
// which is returned in aBasicResource.  A Null
// pointer is returned if the object could not be
// created, along with an error message.
//
// **Standard UI/App API, implemented in stdgi.cc**
/////////////////////////////////////////////////

static erMsg* create( BasicResource*&    aBasicResource,
                      dbTransCtx*&       aDbCtx,
                      fdSecurityContext aSecurityCtx,
                      fdInstTypes::type aType,
                      dtMemoryMgr*       aMM );


/////////////////////////////////////////////////
// !METHOD_DECL_S
// !NAME create
// !TEXT
// This static method creates a BasicResource from
// another existing instance.  This is analogous
// to a copy constructor. A Null pointer is returned
// if the object could not be created, along with
// an error message.
//
// **Standard UI/App API, implemented in stdgi.cc**
/////////////////////////////////////////////////

static erMsg* create( BasicResource*&       aNewBasicResource,
                      const BasicResource& aOldBasicResource,
                      dbTransCtx*&          aDbCtx,
                      fdSecurityContext     aSecurityCtx,
                      fdInstTypes::type     aType,
                      dtMemoryMgr*          aMM );


/////////////////////////////////////////////////
// !METHOD_DECL_S
// !NAME openForChange
// !TEXT
// This static method retrieves an existing BasicResource
// from the database by its user key so that it can be
// modified. If an error occurs the aBasicResource
// pointer will be set to Null, and an error message
// is returned.
//
// **Standard UI/App API, implemented in stdgi.cc**
/////////////////////////////////////////////////

static erMsg* openForChange( BasicResource*&   aBasicResource,
                             const fdNameUK&   aBasicResourceUK,
                             dbTransCtx*&      aDbCtx,
                             fdSecurityContext aSecurityCtx,
                             fdInstTypes::type aType,
                             dtMemoryMgr*      aMM );
```

USER KEY CLASS NAME

BASRESC.HH

```
//////////////////////////////////////////////////
// !METHOD_DECL_S
// !NAME openForReview
// !TEXT
// This static method retrieves an existing BasicResource
// from the database by its user key in a nonmodifiable
// mode. If an error occurs the aBasicResource
// pointer will be set to Null, and an error message
// is returned.
//
// **Standard UI/App API, implemented in stdgi.cc**
//////////////////////////////////////////////////

static erMsg* openForReview( BasicResource*&   aBasicResource,
                             const fdNameUK&    aBasicResourceUK,
                             dbTransCtx*&       aDbCtx,
                             fdSecurityContext  aSecurityCtx,
                             fdInstTypes::type  aType,
                             dtMemoryMgr*       aMM );


//////////////////////////////////////////////////
// !METHOD_DECL_S
// !NAME remove
// !TEXT
// This static method removes an existing BasicResource
// from the database.  When successful, the
// aBasicResource pointer is Null (the object has been
// deleted from memory).  If an error occurs, e.g.,
// validateToRemove() fails, then an error message
// is returned.
//
// **Standard UI/App API, implemented in stdgi.cc**
//////////////////////////////////////////////////

static erMsgList* remove( BasicResource*&    aBasicResource,
                          dbTransCtx*&       aDbCtx,
                          fdSecurityContext  aSecurityCtx );


//////////////////////////////////////////////////
// !METHOD_DECL_S
// !NAME saveAs
// !TEXT
// This static method saves the current object as a new
// object using the supplied user key and type.  The
// original object (aOrigBasicResource) is closed,
// and the new object (aNewBasicResource) is saved
// to the database and remains in memory.  Validation
// errors during save are reported.
//
// **Standard UI/App API, implemented in stdgi.cc**
//////////////////////////////////////////////////

static erMsgList* saveAs( BasicResource*&    aNewBasicResource,
                          const fdNameUK*    aBasicResourceUK,
                          BasicResource*&    aOrigBasicResource,
                          dbTransCtx*&       aDbCtx,
                          fdSecurityContext  aSecurityCtx,
                          fdInstTypes::type  aType,
                          dtMemoryMgr*       aMM );


//////////////////////////////////////////////////
// !METHOD_DECL_S
// !NAME validateToRemove
// !TEXT
// This virtual method (declared pure virtual by fdGenInst)
// performs all validation (referential integrity)
// required before removing this object from the database.
```

USER KEY/
CLASS NAME

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX E

I_BASRES.HH

```
class EXPORT i_BasicResource : public idtTest
{
public:

   ///////////////////////////////////////////////////
   // Inspection class constructor.
   ///////////////////////////////////////////////////
   i_BasicResource(
      dtStreamExecutive* aStreamExec,
      dtMemoryExecutive& aMemExec,
      idtTestArgs&       aTestArgs,
      dtMemoryMgr*       aTestMM );

   ///////////////////////////////////////////////////
   // Inspection class destructor.
   ///////////////////////////////////////////////////
   ~i_BasicResource();

   ///////////////////////////////////////////////////
   // Inspection test suite.
   ///////////////////////////////////////////////////
   virtual dtVoid t_LifeCycle();
   virtual dtVoid t_Operators();
   virtual dtVoid t_Semantics();
   virtual dtVoid t_SetQrys();
   virtual dtVoid t_Persist();
   virtual dtVoid qryCoverage( dtInt*& aCovAry, dtInt& aNumFuncs ) const;
(1) dtVoid setupUKs( fdNameUK&    aUK1,              (2)
                     fdNameUK&    aUK2,
                     fdNameUK&    aUK3,
                     dtMemoryMgr* aMM );              (4)
(3) dtVoid setupObj( s_BasicResource* aInstance,
                     dtMemoryMgr* aMM );

   ///////////////////////////////////////////////////
   // Member function close.
   ///////////////////////////////////////////////////
   erMsg* close( s_BasicResource*& aBasicResource,
                           dbTransCtx*&    aDbCtx );
```

APPENDIX E

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX F

I_BASRES.CC

```
//////////////////////////////////////////////////
// Persistence testing.
//
// This tests behavior specific to the persistence
// member functions of a production class.
//
// Between the T_INIT and T_CLEANUP macros the
// memory manager variable mm is available for
// constructing test objects.  Each individual
// test must be surrounded by the TEST_START and TEST_END
// macros, or alternately, the test itself can be
// performed within a TEST macro.
//////////////////////////////////////////////////

dtVoid
i_BasicResource::t_Persist()
{
    // STDGIT_TESTCLASS and STDGIT_OBJREF must be established
    //
    #define STDGIT_TESTCLASS s_BasicResource
    #define STDGIT_OBJREF    oObjRef<BasicResource>

    // At least one of the following must be present.
    //
    #define STDGIT_PRODUCTION
    //#define STDGIT_WIP
    //#define STDGIT_TEMPLATE
    //#define STDGIT_IMPORT_EXPORT

    T_INIT( "t_Persist" )

    fdNameUK uk1( mm );
    fdNameUK uk2( mm );
    fdNameUK uk3( mm );
    STDGIT_TESTCLASS* obj1 = (STDGIT_TESTCLASS*) NULL;
    STDGIT_TESTCLASS* obj2 = (STDGIT_TESTCLASS*) NULL;
    STDGIT_TESTCLASS* obj3 = (STDGIT_TESTCLASS*) NULL;
//!FIX  You may need to specify a security context.
    fdSecurityContext security = FD_SC_NO_CONTEXT;
//!FIX  When implemented by STDGIT.CC the kindRef required is named "kr".
//!FIX  fdKindRef< oObjRef<BasicResource>, fdNameUK> kr;

    // Setup the user keys for the 3 test objects.
    //
    setupUKs( uk1, uk2, uk3, mm );

    // Standard test for fdGenInst derived classes.
    // Runs through normal persistent lifecycle for
    // production instances.
    //
    #include "stdgit.cc"

    T_CLEANUP
}

//////////////////////////////////////////////////
// Return coverage information.
//
// NOTE: This is not to be modified by unit
//       test developers.
//////////////////////////////////////////////////
dtVoid
i_BasicResource::qryCoverage(
  dtInt*& aCovAry,
  dtInt&  aNumFuncs
  ) const
{
  aCovAry = coverage;
```

APPENDIX F

I_BASRES.CC

```
  aNumFuncs = TOTAL_FUNCS;
}

//////////////////////////////////////////////////
// setupUKs:
//
// Helper function for persistence testing.
// Set up three user keys for the three
// objects used during the STDGIT.
//////////////////////////////////////////////////

dtVoid
i_BasicResource::setupUKs(
    fdNameUK&     aUK1,
    fdNameUK&     aUK2,
    fdNameUK&     aUK3,
    dtMemoryMgr*  aMM
    )
{
    // Remember maximum string lengths when setting up test
    // object names and site names.  Names are usually
    // a maximum of 15 characters, sites are 4 characters max.
    //
    bcStringi18n name1( (dtUChar*) "Test Object 111", aMM);
    bcStringi18n name2( (dtUChar*) "Test Object 222", aMM);
    bcStringi18n name3( (dtUChar*) "Test Object 333", aMM);
    bcStringi18n site1( (dtUChar*) "S111", aMM);
    bcStringi18n site2( (dtUChar*) "S222", aMM);
    bcStringi18n site3( (dtUChar*) "S333", aMM);

//!FIX  Set up 3 user keys.  The following works for a basic site
//!FIX  scoped user key (from SNUK skeleton).  Your UK may need more.

    aUK1.setName( name1 );
    aUK1.setSiteName( site1 );

    aUK2.setName( name2 );
    aUK2.setSiteName( site2 );

    aUK3.setName( name3 );
    aUK3.setSiteName( site3 );
}

//////////////////////////////////////////////////
// setupObj:
//
// Helper function for persistence testing.
// Set the attributes in the passed object
// so that it is valid and can be saved.
//////////////////////////////////////////////////

dtVoid
i_BasicResource::setupObj(
    s_BasicResource* aInstance,
    dtMemoryMgr*     aMM
    )
{
    // Descriptions have a maximum length of 15.
    //
    bcStringi18n descr1( (dtUChar*) "Description 111", aMM);
    bcStringi18n descr2( (dtUChar*) "Description 222", aMM);
    bcStringi18n secGrp( (dtUChar*) "Security GroupX", aMM);

    aInstance->setDescription1( &descr1 );
    aInstance->setDescription2( &descr2 );
    aInstance->setSecurityGroup( &secGrp );

//!FIX  >>> Add addtional setup here. <<<
}
```

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX G

```
//
// Test 1: First Constructor & Destructor
//

    // Set up test...
TLIFE_START( "Ctor1 and Dtor" )        — Memory manager mm set up, scope established

①       // First, run the constructor, then dump the object, then delete it.
    s_erMsg* msg1 = newInstance( fdMsgTest, ERMSGTEST_NAME, ERMSGTEST_1, __FILE__, __LINE__, mm );
                                                  — Standard erMsg Parameters
②   announceObject( *msg1 );
③   deleteInstance( msg1 );

    // Complete Lifecycle test...
TLIFE_END                              — Scope ended, Memory manager checked for leaks
```

APPENDIX G

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX H

```
  //
  // Test 6; Copy between two memory areas - Ctor2
  //

      // Set up test...
  TLIFE_START( "Copy Ctor - Copying Ctor2 across Memory Mgrs" )

      // set up test data - in first memory manager
      const bcStringi18n testDetail3((dtUChar *) "Still another test Detail string.", mm );
①—   s_erMsg* msg6 = newInstance( fdMsgTest2, &testDetail3, ERMSGTEST_NAME, ERMSGTEST_2, __FILE__, __LINE__, mm
  );
②—   // Do test - copy into second memory manager
      s_erMsg* msg6b = copyInstance( msg6, mm2 );

④—   deleteInstance( msg6 );
⑤—   announceObject( *msg6b );
⑥—   deleteInstance( msg6b );
```

APPENDIX H

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX I

```
//
// Test 1: qryMsgID
//
s_erMsg* msg1 = newInstance( fdMsgTest3, ERMSGTEST_NAME, ERMSGTEST_3, __FILE__, __LINE__, mm );

TEST( "qryMsgID", fdMsgTest3 == qryMsgID( msg1 ) )
```

APPENDIX I

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX J

```
    // test data
s_erMsg* msg1 = newInstance( fdMsgTest3, ERMSGTEST_NAME, ERMSGTEST_3, __FILE__, __LINE__, mm );
    // set up data for tests with the detail string
const bcStringi18n testDetail((dtUChar *) "SetQry test Detail string.", mm );
s_erMsg* msg3 = newInstance( fdMsgTest4, &testDetail, ERMSGTEST_NAME, ERMSGTEST_4, __FILE__, __LINE__, mm
);

//
// Test 5: qryDetail - negative case
//     Since the detail string is NULL, check that the length is 0
//
TEST( "qryDetail - negative", 0 == qryDetail( msg1 ).qryLength() );

//
// Test 6: qryDetail - positive case
//
TEST( "qryDetail - positive", testDetail == qryDetail( msg3 ) );
```

APPENDIX J

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX K

```
TESTRUNdeclare(erMsgi)

extern "C" {
        dtChar * FAR PASCAL EXPORT testname()
    {
        return( "erMsgi" );
    }

    dtInt FAR PASCAL EXPORT testmain( idtTestArgs& aTestArgs )
    {
    return( TESTRUN(erMsgi)( aTestArgs ) );
    }
}       // end extern C
```

APPENDIX K

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX L

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX M

```
========================================
 Starting test: Copy Ctor - Copying Ctor1 across Memory Mgrs, at line: 133, File: c:\view\prodn\fd\...
ERROR: MEMORY LEAK DETECTED IN MEMORY MANAGER, in test: Copy Ctor - Copying Ctor1 across Memory Mgrs, at Line: 146
ERROR: MEMORY LEAK DETECTED IN MEMORY MANAGER, in test: Copy Ctor - Copying Ctor1 across Memory Mgrs, at Line: 146
 FAILED test: Copy Ctor - Copying Ctor1 across Memory Mgrs, at line: 146, File: c:\view\prodn\fd\...
========================================
...
========================================
Starting test: qryMsgID, at line: 268, File: c:\view\prodn\fd\errors\ut\insp\erMsgi.cpp
 CHECKED: Expression: qryMsgID( msg1 | == 42, in test: qryMsgID, at line: 268, File: c:\view\prodn\fd\...
 PASS test: qryMsgID, at line: 268, File: c:\view\prodn\fd\errors\ut\insp\erMsgi.cpp
=======================================
```

APPENDIX M

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX N

```
METHOD START: t_LifeCycle
==========================================
Starting test: Ctor1 and Dtor, at line: 56, File: c:\view\prodn\fd\errors\ut\insp\erMsgi.cpp
 METHOD START: newInstance
 METHOD END: newInstance
 OBJECT:
  + erMsg +
    + bcStringi18n +
     Value:
       + csm_character +
       Value: erMsgi t_LifeCyclce:\view\prodn\fd\errors\ut\insp\erMsgi.cpp
       Number of Chars: 65
       - csm_character -
    Advanced: 0
    - bcStringi18n -
  : False
    + bcStringi18n +
    Value: NULL
    Advanced: 0
    - bcStringi18n -
  - erMsg -
 METHOD START: deleteInstance
 METHOD END: deleteInstance
ERROR: MEMORY LEAK DETECTED IN MEMORY MANAGER, in test: Ctor1 and Dtor, at Line: 66, File: c:\view\prodn\...
 FAILED test: Ctor1 and Dtor, at line: 66, File: c:\view\prodn\fd\errors\ut\insp\erMsgi.cpp
==========================================
```

APPENDIX N

MAIL ROOM OCT 18 1994

IN THE UNITED STATES PATENT AND TRADEMARK OFFICE

UNITED STATES PATENT APPLICATION FOR

METHOD AND APPARATUS FOR TESTING OBJECT-ORIENTED PROGRAMMING CONSTRUCTS

APPENDIX O

```
///////////////////////////////////////////////////////////////////////////
//
// FILE_NAME: basresc.hh
//
// Copyright 1993 by Marcam Corp., Newton, MA USA
//
// This unpublished copyrighted work contains
// TRADE SECRET information of Marcam Corporation.
//
// Use, transfer, disclosure, or copying without its expressed
// written permission is strictly forbidden.
//
// !IPK
///////////////////////////////////////////////////////////////////////////

#ifndef basrescHH
#define basrescHH

#include "geninst.hh"           // For fdGenInst
#include "bcdatet.hh"           // For bcDateTime
#include "nameuk.hh"            // For fdNameUK
#include "dtbitv.hh"            // For dtBitVector (dummy)

class EXPORT BasicResource;                        // Forward declaration

#ifdef __OSE_TEMPLATES__
#include "orb.hh"                      // For oObjRef<BasicResource>
#endif

#ifndef SCHEMACOMPILER
#include "basresc.h"
#endif

///////////////////////////////////////////////////////////////////////////
// !CLASS_DECL_S
// !LIBRARY
// !NAME BasicResource
// !TEXT
// BasicRecource is the implementation of a generic instance-derived
// class.  This is an independently persistable kind (IPK).
//
// The user's access rights will be checked whenever fdSecurityContext
// appears as a parameter.  If the user does not have appropriate access
// in the standard UI/App API, an error message will be returned.
//
// A returned pointer to an erMsg or erMsgList indicates an error
// occurred.  A NULL pointer indicates successful completion of
// the member function.
//
// !AUTHOR      <Author's name>   <(Author's E-mail address)>
// !REVIEWER    <Reviewer's name> <(Reviewer's E-mail address)>
// !REVIEW_DATE <date>
//
///////////////////////////////////////////////////////////////////////////


class EXPORT BasicResource : public fdGenInst
{
```

```
public:

    //////////////////////////////////////////////////
    // !METHOD_DECL_S
    // !NAME close
    // !TEXT
    // This static method closes the object pointed to
    // by the fdNameUK. When successful, the contained
    // BasicResource pointer is set to Null.
    //
    // **Standard UI/App API, implemented in stdgi.cc**
    //////////////////////////////////////////////////

  static erMsg* close( fdNameUK*    aUK,
                       dbTransCtx*& aDbCtx );


    //////////////////////////////////////////////////
    // !METHOD_DECL_S
    // !NAME create
    // !TEXT
    // This static method creates a new BasicResource,
    // which can be accessed by the fdNameUK.
    // If the object could not be created, the contained
    // BasicResource pointer is null and an error message
    // is returned.
    //
    // **Standard UI/App API, implemented in stdgi.cc**
    //////////////////////////////////////////////////

    static erMsg* create( fdNameUK*          aUK,
                          dbTransCtx*&       aDbCtx,
                          fdSecurityContext aSecurityCtx,
                        dtMemoryMgr*       aMM );


    //////////////////////////////////////////////////
    // !METHOD_DECL_S
    // !NAME create_from_another
    // !TEXT
    // This static method creates a BasicResource from
    // another existing instance.  This is analogous
    // to a copy constructor. Inside this function
    // the copy() member function for this
    // object are invoked.  If the new object could not
    // be created, the contained BasicResource
    // pointer is null and an error message is returned.
    //
    // **Standard UI/App API, implemented in stdgi.cc**
    //////////////////////////////////////////////////

    static erMsg* create( fdNameUK*          aNewUK,
                        fdNameUK*          aOldUK,
                          dbTransCtx*&       aDbCtx,
                          fdSecurityContext aSecurityCtx,
                        dtMemoryMgr*       aMM );


    //////////////////////////////////////////////////
    // !METHOD_DECL_S
```

```
// !NAME openForChange
// !TEXT
// This static method retrieves an existing BasicResource
// from the database by its user key so that it can be
// modified. If an error occurs the BasicResource
// pointer (contained in the fdNameUK) will be set
// to Null, and an error message is returned.
//
// **Standard UI/App API, implemented in stdgi.cc**
/////////////////////////////////////////////////

static erMsg* openForChange( fdNameUK*          aUK,
                             dbTransCtx*&       aDbCtx,
                             fdSecurityContext aSecurityCtx,
                             dtMemoryMgr*       aMM );

/////////////////////////////////////////////////
// !METHOD_DECL_S
// !NAME openForReview
// !TEXT
// This static method retrieves an existing BasicResource
// from the database by its user key in a nonmodifiable
// mode. If an error occurs the BasicResource
// pointer (contained in the fdNameUK) will be set
// to Null, and an error message is returned.
//
// **Standard UI/App API, implemented in stdgi.cc**
/////////////////////////////////////////////////

static erMsg* openForReview( fdNameUK*          aUK,
                             dbTransCtx*&       aDbCtx,
                             fdSecurityContext aSecurityCtx,
                             dtMemoryMgr*       aMM );

/////////////////////////////////////////////////
// !METHOD_DECL_S
// !NAME remove
// !TEXT
// This static method removes an existing BasicResource
// from the database.  When successful, the
// BasicResource pointer contained by the fdNameUK
// is Null (the object has been deleted from memory).
// If an error occurs, e.g., validateToRemove() fails,
// then an error message is returned.
// NOTE: Remove always starts a transaction.  If
//       one is started outside of remove, an
//       error will be returned.
//
// **Standard UI/App API, implemented in stdgi.cc**
/////////////////////////////////////////////////

static erMsgList* remove( fdNameUK*          aUK,
                          dbTransCtx*&       aDbCtx,
                          fdSecurityContext aSecurityCtx );

/////////////////////////////////////////////////
// !METHOD_DECL_S
```

```
// !NAME save
// !TEXT
// This static method saves the current BasicResource
// object to the database using the supplied fdNameUK.
// Validation errors during save are reported.
//
// **Standard UI/App API, implemented in stdgi.cc**
//////////////////////////////////////////////////

static erMsgList* save( fdNameUK*          aUK,
                        dbTransCtx*&       aDbCtx,
                        fdSecurityContext aSecurityCtx );


//////////////////////////////////////////////////
// !METHOD_DECL_S
// !NAME saveAs
// !TEXT
// This static method saves the current BasicResource
// as a new object using the supplied fdNameUK.
// The original, accessed through the aOldUK
// is closed.  The new BasicResource is saved
// to the database and remains accessible (in memory)
// through the aNewUK user key.  Validation errors
// during save are reported by the returned erMsgList.
//
// **Standard UI/App API, implemented in stdgi.cc**
//////////////////////////////////////////////////

static erMsgList* saveAs( fdNameUK*          aNewUK,
                        fdNameUK*          aOldUK,
                          dbTransCtx*&       aDbCtx,
                          fdSecurityContext aSecurityCtx,
                        dtMemoryMgr*       aMM );


//////////////////////////////////////////////////
// !METHOD_DECL_S
// !NAME validate
// !TEXT
// This static method validates that the current
// BasicResource object, accessed via the
// fdNameUK, can be saved to the database.
// Validation errors are reported by the returned
// erMsgList.
//
// **Standard UI/App API, implemented in stdgi.cc**
//////////////////////////////////////////////////

static erMsgList* validate( fdNameUK*    aUK,
                            dbTransCtx*& aDbCtx );


//////////////////////////////////////////////////
// !METHOD_DECL_S
// !NAME validateToRemove
// !TEXT
// This static method validates that the current
// BasicResource object, accessed via the
// fdNameUK, can be removed from the database.
```

```
    // Validation errors are reported by the returned
    // erMsgList.
    //
    // **Standard UI/App API, implemented in stdgi.cc**
    /////////////////////////////////////////////////

    static erMsgList* validateToRemove( fdNameUK*    aUK,
                                        dbTransCtx*& aDbCtx );


    /////////////////////////////////////////////////
    // !METHOD_DECL_S
    // !NAME pre/post
    // !TEXT
    // Give derived class an opportunity to perform
    // specialized processing before or after standard
    // procesing.  When implemented this virtual member
    // function overrides the default implementation
    // provided by fdGenInst.
    //
    // **Standard UI/App API** >>Implemented in basresc.cc<<
    /////////////////////////////////////////////////

    erMsg* postCreate(   const dbTransCtx* aDbCtx );
    erMsg* postCreate(   const dbTransCtx* aDbCtx, const fdGenInst* aOldObj
);
    erMsg* preValidate(  const dbTransCtx* aDbCtx );
    erMsg* postValidate( const dbTransCtx* aDbCtx );
    erMsg* preSave(      const dbTransCtx* aDbCtx );
    erMsg* postSave(     const dbTransCtx* aDbCtx );
    erMsg* preClose(     const dbTransCtx* aDbCtx );
    erMsg* preRemove(    const dbTransCtx* aDbCtx );
    erMsg* preValidateToRemove(  const dbTransCtx* aDbCtx );
    erMsg* postValidateToRemove( const dbTransCtx* aDbCtx );
    erMsg* postOpenForChange(    const dbTransCtx* aDbCtx );
    erMsg* postOpenForReview(    const dbTransCtx* aDbCtx );


    /////////////////////////////////////////////////
    // !METHOD_DECL_S
    // !NAME rtnLegalTypes
    // !TEXT
    // This virtual method (declared pure virtual by fdAbsInst)
    // returns the legal types that this fdGenInst derived
    // class may become.
    //
    // **Standard UI/App API, implemented in stdgi.cc**
    /////////////////////////////////////////////////

    fdInstTypes rtnLegalTypes() const;


#ifdef OPLDEBUG
    /////////////////////////////////////////////////
    // !METHOD_DECL_S
    // !NAME dump
    // !TEXT
    // This is the dump method for a BasicResource.
    /////////////////////////////////////////////////
```

```
        dtVoid dump( dtOStream& aOutStream,
                     dtUInt     aIndentLevel = 0 ) const;
#endif // OPLDEBUG


        // Dummy persistent member data.  Used to schema
        // compile the dtBitVector class.
        //
        dtBitVector  mBitVector;

  protected:


        ///////////////////////////////////////////////////
        // !METHOD_DECL_S
        // !NAME doValidate
        // !TEXT
        // This virtual method (declared pure virtual by fdGenInst)
        // performs all inter- and intra-object validation required
        // to save to the database.  This is called from the
        // save (via validate) method.  The transaction context
        // and message list will always be valid, as they are
        // set up by fdGenInst::validate().
        //
        // **Standard UI/App API**  >>Implemented in %FILE%.cc<<
        ///////////////////////////////////////////////////

        erStatus doValidate( const dbTransCtx* aDbCtx, erMsgList* aMsgList );


        ///////////////////////////////////////////////////
        // !METHOD_DECL_S
        // !NAME doValidateToRemove
        // !TEXT
        // This virtual method (declared pure virtual by fdGenInst)
        // performs all validation (referential integrity)
        // required before removing this object from the database.
        // This method is invoked by the static remove method.
        // (via the fdGenInst validateToRemove member function).
        // The transaction context and message list will always
        // be valid, as they are set up by fdGenInst::validate().
        //
        // **Standard UI/App API**  >>Implemented in %FILE%.cc<<
        ///////////////////////////////////////////////////

        erStatus doValidateToRemove( const dbTransCtx* aDbCtx, erMsgList*
aMsgList );


        ///////////////////////////////////////////////////
        // !METHOD_DECL_S
        // !NAME copy
        // !TEXT
        // Copies contained member data, objects,
        // collections, and references from another
        // BasicResource instance.
        //
        // **Standard UI/App API** >>Implemented in basresc.cc<<
        ///////////////////////////////////////////////////
```

```
    erMsg* copy( const BasicResource* aOtherInst,
                 const dbTransCtx*    aDbCtx );

    //////////////////////////////////////////////////
    // !METHOD_DECL_S
    // !NAME setType
    // !TEXT
    // Set this instance to a specific type.  Will
    // fail if attempting to set to an illegal type.
    // Not for general consumption, use with care.
    // Defined virtual on fdAbsInst.
    //
    // **Standard UI/App API, implemented in stdgi.cc**
    //////////////////////////////////////////////////

    erStatus setType( fdInstTypes::type aType );


 private:

    //////////////////////////////////////////////////
    // !METHOD_DECL_S
    // !NAME cleanUp
    // !TEXT
    // This static convenience method is used to clean up
    // the current database transaction (by performing
    // a rollback) and closing this object.  When
    // successful, the BasicResource pointer is Nulled.
    //
    // **Standard UI/App API, implemented in stdgi.cc**
    //////////////////////////////////////////////////

    static erMsg* cleanUp( fdNameUK*    aUK,
                           dbTransCtx*& aDbCtx );


    //////////////////////////////////////////////////
    // !METHOD_DECL_S
    // !NAME operator=
    // !TEXT
    // Assignment operator, inimplemented.
    //////////////////////////////////////////////////

    BasicResource& operator = (const BasicResource& aBasicResourceUK);

    //////////////////////////////////////////////////
    // !ATTR_DECL_S
    // !NAME mUserKey
    // !TEXT
    // User key for accessing the BasicResource class.
    //
    // **Standard UI/App API, used by stdgi.cc**
    //////////////////////////////////////////////////

    fdNameUK mBasicResourceUK;

#ifdef SCHEMACOMPILER
_OSH_userKey( mBasicResourceUK );
_OSH_sourceName( basresc );
```

```
#endif

#ifndef SCHEMACOMPILER
#include "basresc.hhl"
#endif
};

#endif // basrescHH
```

File Name: dtcore.cpp

// Copyright 1992 by Marcam Corp., Newton, MA USA
//
// This unpublished copyrighted work contains
// TRADE SECRET information of Marcam Corporation.
//
// Use, transfer, disclosure, or copying without
// its express written permission is strictly
// forbidden.
//

```
////////////////////////////////////////////////////////////////////////

// Implementation of dtCore methods

//  09-22-93 JohnH removed use of fstream from new() member func

#include <limits.h>
#include <assert.h>

#include "dtcore.hh"
#include "dtmarcme.hh"
#include "fdassert.h"

// initialize static member data
dtMemoryMgr* dtCore::sMissingMM = (dtMemoryMgr*) NULL;



dtCore::dtCore(dtMemoryMgr* aMemoryMgr) : mCurrMM (aMemoryMgr)
{
     if ( mCurrMM == (dtMemoryMgr*) NULL )
     {
          #ifdef OPLDEBUG
          // open/create file to write errors into.
          dtOStream aLogStream ("memory.log", dtOStream::app );
          dtChar *aMsg =
          "ERROR!! dtCore::ctor was passed a NULL dtMemoryMgr*";

          writeErrorLog (aLogStream, 0, aMsg );
          #endif

          // Make sure we have a missing memory manager before
          // assigning it as the current memory manager.
          //
          if ( !sMissingMM )
          {
               throw( dtCore::NoMissingMM( dtMsgNoMissingMM,
                              DTCORE_NAME,
                              DTCORE_NAME,
                              __FILE__,
                              __LINE__ ) );
          }

          mCurrMM = sMissingMM;
     }
}

dtCore::dtCore(dtCore& adtCore, dtMemoryMgr* aMemoryMgr)
{
    mCurrMM = aMemoryMgr;
```

```
    if ( aMemoryMgr == NULL )
     {
#ifdef OPLDEBUG
          FDASSERT(0,"dtCore copy ctor called with NULL memmgr ptr!");
#endif

          // Make sure we have a missing memory manager before
          // assigning it as the current memory manager.
          //
          if ( !sMissingMM )
          {
              throw( dtCore::NoMissingMM( dtMsgNoMissingMM,
                                          DTCORE_NAME,
                                          DTCORE_COPY_CTOR,
                                          __FILE__,
                                          __LINE__ ) );
          }

          mCurrMM = sMissingMM;
     }
}

dtCore::~dtCore()
{ }


#ifdef  OPLDEBUG
#undef new
// Use the specified MemoryManager to get space.
void* dtCore::operator new( size_t                aSize,
                            const dtChar* const alpszFileName,
                            dtUInt                anLineNumber,
                            dtMemoryMgr*          aMemMgr)
{
    // cout << "inside dtcore::new()" << endl;
    if ( aMemMgr == (dtMemoryMgr*) NULL )
    {
       // open/create file to write errors into.
       dtOStream aLogStream ("memory.log", dtOStream::app );
       dtChar *aMsg =
              "ERROR!! dtCore:: new() was passed a NULL dtMemoryMgr*";
       aLogStream << dumpTab(0) << aMsg << endl;

       // Make sure we have a missing memory manager before
       // assigning it as the current memory manager.
       //
       if ( !sMissingMM )
       {
          throw( dtCore::NoMissingMM( dtMsgNoMissingMM,
                                      DTCORE_NAME,
                                      DTCORE_NEW,
                                      __FILE__,
                                      __LINE__ ) );
       }

       aMemMgr = sMissingMM;
    }
```

```
    return aMemMgr->malloc(aSize, alpszFileName, anLineNumber,
dtMemoryMgr::OBJ);
}

#endif  //OPLDEBUG

// Use the specified MemoryManager to get space.
void* dtCore::operator new( size_t              aSize,
                            dtMemoryMgr*        aMemMgr)
{
    // cout << "inside dtcore::new()" << endl;
    if ( aMemMgr == (dtMemoryMgr*) NULL )
    {
#ifdef OPLDEBUG
        // open/create file to write errors into.
        dtOStream aLogStream ("memory.log", dtOStream::app );
        dtChar *aMsg =
               "ERROR!! dtCore:: new() was passed a NULL dtMemoryMgr*";
        aLogStream << dumpTab(0) << aMsg << endl;
#endif

        // Make sure we have a missing memory manager before
        // assigning it as the current memory manager.
        //
        if ( !sMissingMM )
        {
            throw( dtCore::NoMissingMM( dtMsgNoMissingMM,
                                        DTCORE_NAME,
                                        DTCORE_NEW,
                                        __FILE__,
                                        __LINE__ ) );
        }

        aMemMgr = sMissingMM;
    }

    return aMemMgr->malloc(aSize, dtMemoryMgr::OBJ);
}


// Use the current MemoryMgr to release space - HP compiler does not like dtVoid
// for return type of operator delete even though dtVoid is typedefed as void
// 2nd parameter to delete not named in order to supress "not used" warning

void dtCore::operator delete(dtVoid* aPlace, dtUInt )
{
   ((dtCore*)aPlace)->free(aPlace);
}

// Use the current MM to get space.
dtVoid* dtCore::malloc(dtUInt aSize) const
{
   // cout << "inside dtcore::malloc()" << endl;
   return mCurrMM->malloc(aSize, dtMemoryMgr::NON_OBJ);
}

#ifdef OPLDEBUG

dtVoid
dtCore::writeErrorLog (dtOStream& aOutStream,
```

```
                    dtUInt   aLevel,
                    dtChar * aMessage ) const
{
    aOutStream << dumpTab(aLevel) << aMessage << endl;
}

#endif


#if defined (_MSC_VER) || defined(__BCPLUSPLUS__)
   // Use the current MM to release space.
   dtVoid dtCore::free(dtVoid __far* aPlace) const
   {
        mCurrMM->free(aPlace);
   }
#else
   // Use the current MM to release space.
   dtVoid dtCore::free(dtVoid* aPlace) const
   {
      mCurrMM->free(aPlace);
   }
#endif

dtVoid
dtCore::setMissingMemoryMgr(
    const dtMemoryMgr* aMissingMM
    )
{
    // We are never going to manipulate the object pointed to,
    // but we need to cast to a nonconst value.  This object will
    // never delete the Missing Memory Manager.  It is owned by
    // the caller, fdSystemGlobal.
    //
    sMissingMM = ( dtMemoryMgr*) aMissingMM;
}

// Returns the instances Memory Manager
dtMemoryMgr* dtCore::qryCurrentMemoryMgr() const

{
   return mCurrMM;
}


// Exception constructor for the missing memory manager not found.
//
dtCore::NoMissingMM::NoMissingMM(
    dtULong             aMsgID,
    const dtChar* const aClassName,
    const dtChar* const aMethodName,
    const dtChar* const aFilename,
    dtInt               aLineNumber
    ) : erException ( aMsgID, aClassName, aMethodName, aFilename, aLineNumber )
{
}
```

```
//////////////////////////////////////////////////////////////////////
// Added Unix and Dos filename header.
// UNIX_FILE_NAME: dtCore.hh
// DOS_FILE_NAME:  dtcore.hh
//
// Copyright 1992 by Marcam Corp., Newton, MA USA
//
// This unpublished copyrighted work contains
// TRADE SECRET information of Marcam Corporation.
//
// Use, transfer, disclosure, or copying without
// its expressed written permission is strictly
// forbidden.
//
//
// Adapted from: Abstract Data Type Classes by Harvey Reed
//
//////////////////////////////////////////////////////////////////////
// 8/28/93  JohnH  remove ';' from definition of CURR_MM

#ifndef dtcoreHH
#define dtcoreHH

#include "dtprims.hh"                // c++  primitve types
#include "erexcept.hh"               // For erException

class EXPORT dtMemoryMgr;

#ifdef OPLDEBUG
#include "dtdumpin.hh"
#endif

#ifdef WIN
#else
#define halloc malloc
#endif

#define CURR_MM qryCurrentMemoryMgr()

class EXPORT dtMemoryExecutive;

// For exceptions thrown by dtCore.
//!FIX - move definitions to msg dev tool.
#define dtMsgNoMissingMM 33 // // "Bad Handle - data appears to be already
deleted"
const dtChar* const DTCORE_NAME = "dtCore";
const dtChar* const DTCORE_COPY_CTOR = "dtCore Copy Ctor";
const dtChar* const DTCORE_NEW  = "new";


//////////////////////////////////////////////////////////////////////
// !CLASS_DESC_S
// !LIBRARY ADT
// !NAME dtCore
// !TEXT
// ABSTRACT OPL Base Class for all memory managed classes.
//
// <HR> clarify
//
// The dtCore class provides access to the MemoryMgr class subhierarchy.
```

```
// Access is provided via familiar methods like malloc.
// Note that this class should be derived as a base class, so
// there is only one instance of this class.
//
// The dtCore class also provides printing services to subclasses.
// These printing services can be conditionally compiled into subclasses by
// specifying the OPLDEBUG flag to the C++ compiler.
//
// A subclass can define a dump method to dump or pretty print an object
// of its class. The dump method can use the following idtOStream
// manipulators as in the following example of class Xyz:
//
// s << dumpTab(level) << dumpHdr("Xyz", DUMP_HDR_START) << endl
//   << dumpTab(level) << "The value of someObject is: " << someObject << endl
//   << dumpTab(level) << "Contained class anotherObject is:" << endl;
//  anotherObject.dump(s, level + 1);
// s << dumpTab(level) << dumpHdr("Xyz", DUMP_HDR_END) << endl;
//
//
// Note also that subclasses of dtCore should themselves not be virtual,
// and should always be subclassed from first. This ensures that
// derived classes of dtCore are always the first component at byte 0 of
// any subsequent subclass.
////////////////////////////////////////////////////////////////////////////////


class EXPORT dtCore
{
   ///////
   public:
   ///////

      //////////////////////////////////////////////////////////////////////
      // !METHOD_DESC_S
      // !NAME dtor
      // !TEXT
      // Do nothing.  Defined to allow all Core subclasses to be
      // treated polymorphically.
      //////////////////////////////////////////////////////////////////////
      virtual ~dtCore();

      //////////////////////////////////////////////////////////////////////
      // !METHOD_DESC_S
      // !NAME qryCurrentMemoryMgr
      // !TEXT
      // Return the Memory Manager of the particular instance object.
      //////////////////////////////////////////////////////////////////////////
      dtMemoryMgr*           qryCurrentMemoryMgr() const;

     //////////////////////////////////////////////////////////////////////
     // !METHOD_DESC_S
     // !NAME operator new
     // !TEXT
     // Take over new for all subclasses of dtCore
     //
     //////////////////////////////////////////////////////////////////////////
     void* operator new( size_t aSize, dtMemoryMgr* = (dtMemoryMgr*)NULL);

#ifdef OPLDEBUG
     //////////////////////////////////////////////////////////////////////
```

```
     // !METHOD_DESC_S
     // !NAME operator new
     // !TEXT
     // Take over new for all subclasses of dtCore. Add params
     // filename and line number. This should only be used via
     // NEW macro.
     //
     ////////////////////////////////////////////////////////////////////
     void* operator new(  size_t          aSize,
                          const dtChar*  const  lpszFileName,
                          dtUInt          nLineNumber,
                     dtMemoryMgr* =       (dtMemoryMgr*) NULL);
#endif // OPLDEBUG

     ////////////////////////////////////////////////////////////////
     // !METHOD_DESC_S
     // !NAME operator delete
     // !TEXT
     // Take over delete for all subclasses of dtCore
     //
     // !FIX ?? HP compiler does not like use of dtVoid rather than void as
     //         return type
     ////////////////////////////////////////////////////////////////////
     void  operator delete( dtVoid* aCoreObject, dtUInt aSize);

//------------------------------------------------------------------------

#ifdef OPLDEBUG          // Dump/Pretty Printing Stuff

      ////////////////////////////////////////////////////////////////
      // !METHOD_DESC_S
      // !NAME writeErrorLog
      // !TEXT
      // Method that writes error message to a well-known error file
      // memory.log.
      //
      ////////////////////////////////////////////////////////////////////
      dtVoid
      dtCore::writeErrorLog (dtOStream& aOutStream,
                             dtUInt   aLevel,
                             dtChar * aMessage ) const;

      ////////////////////////////////////////////////////////////////
      // !METHOD_DESC_S
      // !NAME dumpTab
      // !TEXT
      // Ostream manipulator to tab over by n number of spaces. The number
      // is the indent level.  Only defined if OPLDEBUG flag specified at
      // compile time.
      ////////////////////////////////////////////////////////////////////
      //static DTOMANIP(dtInt)   dumpStreamTab( dtUInt aIndentLevel) ;


      ////////////////////////////////////////////////////////////////
      // !METHOD_DESC_S
      // !NAME dumpHdr
      // !TEXT
      // Ostream manipulator to print a class name banner at the start or
      // end of a dump method. Uses static dumpHdrInsert below.  Only defined
      // if OPLDEBUG flag specified at compile time.
```

```
////////////////////////////////////////////////////////////////////////
//static DTOMANIP(dtDumpHdrInfo) dumpStreamHdr( const dtChar* aClassName,
//                              dtDumpHdrPos aBannerPos) ;

//////////////////////////////////////////////////////////////////
// !METHOD_DESC_S
// !NAME dump
// !TEXT
// Dump/Prettyprint an object. Called directly or by the static dtOStream
&
// operator << below. Every subclass needs to implement this. This method
// can use the manipulators declared above to format output. Contained
// objects should be dumped/prettyprinted recursively.
// Only defined if OPLDEBUG flag specified at compile time.
///////////////////////////////////////////////////////////////////////
virtual dtVoid dump( dtOStream& aOutStream,dtUInt aIndentLevel = 0) const
= 0;

#endif    // OPLDEBUG

//------------------------------------------------------------------------
  //////////
  protected:
  //////////

//////////////////////////////////////////////////////////////////
// !METHOD_DESC_S
// !NAME ctor
// !TEXT
// All dtCore derived classes must supply memory manager to dtCore
// constructor.
//////////////////////////////////////////////////////////////////
dtCore(dtMemoryMgr* aInstanceMemoryMgr);

//////////////////////////////////////////////////////////////////
// !METHOD_DESC_S
// !NAME malloc
// !TEXT
// Use system MemoryMgr for malloc.  The size of the memory request
// may not exceed the limits of size_t (dtUInt) for any implementation.
///////////////////////////////////////////////////////////////////////
dtVoid* malloc( dtUInt aSize ) const;

//////////////////////////////////////////////////////////////////
// !METHOD_DESC_S
// !NAME free
// !TEXT
// Use system MemoryMgr for free
///////////////////////////////////////////////////////////////////////
#ifdef _MSC_VER
dtVoid free( dtVoid __far* aMemPtr ) const;
#else
dtVoid free ( dtVoid* aMemPtr ) const;
#endif

//////////////////////////////////////////////////////////////////
// !METHOD_DESC_S
// !NAME copy ctor
// !TEXT
```

```
    // Copy Constructor taking dtCore& and dtMemoryMgr*.  If This constructor
is
    // called via an implicit call by the compiler, an error entry will be
written
    // to memory.log and an exception will be thrown generating an except.log
file
    ///////////////////////////////////////////////////////////////////////
    dtCore(dtCore& adtCore, dtMemoryMgr* adtMemoryMgr = (dtMemoryMgr*) NULL );

    //////////////////////////////////////////////////////////////////
    // !METHOD_DESC_S
    // !NAME operator=
    // !TEXT
    // Protected and uimplemented will cause a compiler error when the
    // operator= method is called.
    ///////////////////////////////////////////////////////////////////////
    dtCore& operator=(const dtCore&);

 private:

    dtMemoryMgr* mCurrMM;                         // This instance's memory
manager.

    static dtMemoryMgr* sMissingMM;   // System's missing memory.

      friend class fdSystemGlobal;          // For access to
setMissingMemoryMgr().

    //////////////////////////////////////////////////////////////////
    // !METHOD_DESC_S
    // !NAME setMissingMemoryMgr
    // !TEXT
    // This static member function is called by fdSystemGlobal to
    // establish the memory manager used when the constructor
    // encounters a NULL.  This is timing dependent: fdSystemGlobal
    // should be the first object constructed, therefore no dtCore
    // objects should exist prior to establishing the missing
    // memory manager.
    //////////////////////////////////////////////////////////////////
    static dtVoid setMissingMemoryMgr( const dtMemoryMgr* aMissingMM );


 public:

    //////////////////////////////////////////////////////////////////
    // !METHOD_DESC_S
    // !NAME NoMissingMM_ctor
    // !TEXT
    // The NoMissingMM exception is generated when the dtCore
    // constructor or new operator attempts to use an invalid (NULL)
    // missing memory manager.  This occurs when a NULL pointer is
    // specified as the memory manager, indicating that the caller
    // has forgotten to provide one.  Instead of croaking, we use
    // the defined "Missing" memory manager.  Unless, or course,
    // the "Missing" memory manager is also missing.
    //////////////////////////////////////////////////////////////////
    class EXPORT NoMissingMM : public erException
    {
         public:
              NoMissingMM(dtULong              aMsgID,
```

```
                                            const dtChar* const aClassName,
                                            const dtChar* const aMethodName,
                                            const dtChar* const aFilename,
                                            dtInt               aLineNumber );
    };

};

// regular function

#ifdef OPLDEBUG
  DTOMANIP(dtInt) EXPORT dumpStreamTab( dtUInt aIndentLevel);
  DTOMANIP(dtDumpHdrInfo) EXPORT dumpStreamHdr( const dtChar* aClassName,
dtDumpHdrPos aBannerPos);
#endif

// define NEW for code so that memory leak dumps will print out
// file names and line numbers
//
#ifdef OPLDEBUG
#define OPLNEW(x) new(__FILE__,__LINE__,(x))
#else
#define OPLNEW(x) new((x))
#endif

#endif  // dtcoreHH
```

```
//////////////////////////////////////////////////////////////////////
// FILE NAME:  dtmarcme.cpp
// Copyright 1992 by Marcam Corp., Newton, MA USA
//
// This unpublished copyrighted work contains
// TRADE SECRET information of Marcam Corporation.
//
// Use, transfer, copying without
// its express written permission is strictly
// forbidden.
//
//////////////////////////////////////////////////////////////////////


#include <new.h>
#include <stdlib.h>
#include <assert.h>
#include <stdio.h>

#ifdef _MSC_VER
#include <windows.h>
#endif

#include "dtcore.hh"
#include "dtmarcme.hh"
#include "dtostrm.hh"
#include "dtfmtint.hh"
#include "dtfmtuin.hh"
#include "dtfmtulo.hh"
#include "dtfmtadd.hh"

const int MMhexdumpWIDTH = 8;

////////////////////////////////////////////////////////////////
// !METHOD_DESC_S
// !NAME ctor
// !TEXT
// Setup memory mgrs
////////////////////////////////////////////////////////////////

dtMarcamMemoryMgr::dtMarcamMemoryMgr()
{
}

dtMarcamMemoryMgr::dtMarcamMemoryMgr( dtInt aMemMgrId )
                                    : dtMemoryMgr ( aMemMgrId )
{
#ifdef OPLDEBUG
   mNumMalloc              = 0;
   mTotalAllocatedMemory   = 0;
   mTotalDeallocatedMemory = 0;
   mNumFree                = 0;
   mMaxReqSize             = 0;
   mMaxUserSpace           = 0;
#endif
}

////////////////////////////////////////////////////////////////
// !METHOD_DESC_S
// !NAME dtor
```

```
// !TEXT
// Free up block of memory allocated to this memory manager.
///////////////////////////////////////////////////////////////

dtMarcamMemoryMgr::~dtMarcamMemoryMgr()
{
}


///////////////////////////////////////////////////////////////
// !METHOD_DESC_S
// !NAME malloc
// !TEXT
// Allocates memory from system pool via MemoryLinkListNode object.
// !ENTRY_COND
// 1) aRepSize > 0
// !EXIT_COND
// 1) The return position != NULL
///////////////////////////////////////////////////////////////

dtVoid* dtMarcamMemoryMgr::malloc(  dtSize_t      aReqSize,       // generated
obj size
                                    MemoryReqType aReqType        // OBJ or
NON_OBJ
                                 )

{
    if (aReqSize == 0)
    {
        throw(dtMarcamMemoryMgr::IllegalSize(dtMsgIllegalSize,
                        DTMARCAMMEMORYMGR_NAME,
                        DTMARCAMMEMORYMGR_MALLOC,
                        __FILE__,
                        __LINE__));
    }

    // OriginalReqSize is user requested size BEFORE the 4 byte alignment
    dtSize_t originalReqSize = aReqSize;

#ifndef  OPLDEBUG

    // allocate new MemoryLinkListNode which performs actual allocation
    // via ::new
    dtVoid *mem_addr = (dtVoid *) new ( aReqSize ) MemoryLinkListNode ();

    // Add new node to linked list
    MemoryLinkListNode *ulListNode = (MemoryLinkListNode *)mem_addr;
    allocationList.addNode (ulListNode);

    return (dtVoid*) ((dtChar *) mem_addr + SIZEOF_LISTNODE );

#endif

#ifdef OPLDEBUG

    MemInfo memoryInfo;
    memoryInfo.Active   = dtTRUE;
    memoryInfo.MemType  = aReqType;
    memoryInfo.MemSize  = originalReqSize;
    memoryInfo.MemMgr   = (dtVoid*) this;
```

```
    memoryInfo.miFileName = (dtChar*)NULL;
    memoryInfo.miLineNumber = 0;

    // malloc total chunk = obj size + reqSize + endguardband .
    dtVoid *mem_addr = (dtVoid *) new ( aReqSize )
            MemoryLinkListNode (  memoryInfo,
                                  (MemoryLinkListNode*)NULL,
                                  (MemoryLinkListNode*)NULL
                                );

    // Add new node to linked list
    MemoryLinkListNode *ulListNode = (MemoryLinkListNode *)mem_addr;
    allocationList.addNode (ulListNode);

    // Gather staticstics   to be used in debug reports.
    mNumMalloc++;
    mTotalAllocatedMemory += originalReqSize;

    if ( aReqSize > mMaxReqSize )
    {
        mMaxReqSize = aReqSize;
    }

    // Return data pointer only ( no overhead data return to user.. ).
    return (dtVoid*) ((dtChar *) mem_addr + SIZEOF_LISTNODE );

#endif // OPLDEBUG

}

#ifdef  OPLDEBUG
/////////////////////////////////////////////////////////////////
// !METHOD_DESC_S
// !NAME malloc
// !TEXT
// Allocates memory from system pool via MemoryLinkListNode object.
// !ENTRY_COND
// 1) aRepSize > 0
// !EXIT_COND
// 1) The return position != NULL
/////////////////////////////////////////////////////////////////

dtVoid* dtMarcamMemoryMgr::malloc(  dtSize_t           aReqSize,        //
generated obj size
                                    const dtChar* const alpszFileName,
                                    dtUInt             anLineNumber,
                                    MemoryReqType      aReqType         // OBJ
or NON_OBJ
                                  )

{
    if (aReqSize == 0)
    {
        throw(dtMarcamMemoryMgr::IllegalSize(dtMsgIllegalSize,
                         DTMARCAMMEMORYMGR_NAME,
                         DTMARCAMMEMORYMGR_MALLOC,
                         __FILE__,
                         __LINE__));
    }
```

```
    // OriginalReqSize is user requested size BEFORE the 4 byte alignment
    dtSize_t originalReqSize = aReqSize;

    MemInfo memoryInfo;
    memoryInfo.Active  = dtTRUE;
    memoryInfo.MemType = aReqType;
    memoryInfo.MemSize = originalReqSize;
    memoryInfo.MemMgr  = (dtVoid*) this;
    memoryInfo.miFileName = (dtChar*)NULL;
    memoryInfo.miLineNumber = 0;

    if (alpszFileName)
    {
       memoryInfo.miFileName = (dtChar*) ::_fstrdup(alpszFileName);
    }

    memoryInfo.miLineNumber = anLineNumber;

    // malloc total chunk = obj size + reqSize + endguardband .
    dtVoid *mem_addr = (dtVoid *) new ( aReqSize )
            MemoryLinkListNode (  memoryInfo,
                                 (MemoryLinkListNode*)NULL,
                                 (MemoryLinkListNode*)NULL
                              );

    // Add new node to linked list
    MemoryLinkListNode *ulListNode = (MemoryLinkListNode *)mem_addr;
    allocationList.addNode (ulListNode);

    // Gather staticstics  to be used in debug reports.
    mNumMalloc++;
    mTotalAllocatedMemory += originalReqSize;

    if ( aReqSize > mMaxReqSize )
    {
        mMaxReqSize = aReqSize;
    }

    // Return data pointer only ( no overhead data return to user.. ).
    return (dtVoid*) ((dtChar *) mem_addr + SIZEOF_LISTNODE );

}
#endif // OPLDEBUG

/////////////////////////////////////////////////////////////////
// !METHOD_DESC_S
// !NAME free
// !TEXT
// Marks space as unused in debug mode.
// !ENTRY_COND
// 1) aPosition != NULL, and
/////////////////////////////////////////////////////////////////

dtVoid dtMarcamMemoryMgr::free(dtVoid* aPosition)
{

    // assures that position != NULL.
    if ( aPosition == NULL )
    {
        throw(dtMarcamMemoryMgr::BadHandle(dtMsgBadHandle,
```

```
                            DTMARCAMMEMORYMGR_NAME,
                            DTMARCAMMEMORYMGR_FREE,
                            __FILE__,
                            __LINE__));
    }

   dtChar* temp_mem = ( ((dtChar*) aPosition) - SIZEOF_LISTNODE );
   MemoryLinkListNode* mem_listnode = (MemoryLinkListNode*) temp_mem;

#ifdef OPLDEBUG

    // backup given pointer to retrieve the MemoryLinkListNode pointer

    // if OPLDEBUG is on, mark memory as inactive, otherwise,
    // deallocate acutal memory.

    if ( mem_listnode->getMemMgr() != this )
    {
        throw(dtMarcamMemoryMgr::BadHandle(dtMsgBadHandle_Non_Member,
              DTMARCAMMEMORYMGR_NAME,
              DTMARCAMMEMORYMGR_FREE,
              __FILE__,
              __LINE__));

    }

    if ( mem_listnode->isMemoryActive() )
    {
        // First check to see if end guard band is intact

           if ( isEndGuardBandValid (aPosition) )
           {
               dtChar *fillpointer = (dtChar *) aPosition;
               #ifdef WIN
                   _fmemset ( fillpointer, 0xFF, mem_listnode->getMemSize() );
               #else
                   memset ( fillpointer, 0xFF, mem_listnode->getMemSize() );
               #endif
           }
           else
           {
              throw(dtMarcamMemoryMgr::BadHandle(dtMsgBadHandle_Data_Corrupted,
                    DTMARCAMMEMORYMGR_NAME,
                    DTMARCAMMEMORYMGR_FREE,
                    __FILE__,
                    __LINE__));
           }

           mem_listnode->setActive ( dtFALSE );
           mTotalDeallocatedMemory += mem_listnode->getMemSize();
           mNumFree++;
    }
    else
    {

throw(dtMarcamMemoryMgr::BadHandle(dtMsgBadHandle_Duplicate_Delete,
                    DTMARCAMMEMORYMGR_NAME,
                    DTMARCAMMEMORYMGR_FREE,
                    __FILE__,
                    __LINE__));
```

```
    }
#else

    allocationList.removeNode(mem_listnode);
    //!FIX delete the memory starting at mem_listnode, this way we give all up
    delete (mem_listnode);

#endif  // OPLDEBUG

}

//////////////////////////////////////////////////////////////////
// !METHOD_DESC_S
// !NAME qryAvailSpace
// !TEXT
// Returns space left on system heap.
//////////////////////////////////////////////////////////////////

dtDouble dtMarcamMemoryMgr::qryAvailSpace() const
{
   dtDouble memfree = 0;

    #ifdef _MSC_VER
    memfree = ( GlobalCompact(0L) - mTotalAllocatedMemory );
    #endif

    // need hp implementation

    return memfree;
}

#ifdef OPLDEBUG

//////////////////////////////////////////////////////////////////
// !METHOD_DESC_S
// !NAME calculateMemoryOverhead
// !TEXT
// Returns total amount of memory manager overhead
//////////////////////////////////////////////////////////////////
dtSize_t
dtMarcamMemoryMgr::calculateMemoryOverhead( ) const
{
    return (SIZEOF_LISTNODE + sizeof(MAGIC_GUARDBAND_VALUE) ) * mNumMalloc;
}

//////////////////////////////////////////////////////////////////
// !METHOD_DESC_S
// !NAME isBeginGuardBandValid
// !TEXT
// Returns dtTRUE if mem mgr's "begin guardband" is intact, indicating
// no memory overflow.
//
//////////////////////////////////////////////////////////////////
dtBoolean
dtMarcamMemoryMgr::isBeginGuardBandValid ( dtVoid *aPosition )  const
{
    // create temporaries
    dtBoolean isValid = dtTRUE;
    dtInt objAlignPad = ( SIZEOF_LISTNODE - BASE_SIZEOF_LISTNODE );
    dtChar* padBegin = ( (dtChar *) aPosition - objAlignPad );
```

```
    // check to see if guardband in object has been corrupted.
    if ( ! getBeginGuardBand(aPosition) == MAGIC_GUARDBAND_VALUE )
    {
          isValid = dtFALSE;
    }

    // now, iterate through the 4 byte padding area and test if that
    // area has been corrupted.

    for ( int i = 0; i < objAlignPad; padBegin++ )
    {
        if ( *padBegin != MAGIC_GUARDBAND_VALUE )
        {
        isValid = dtFALSE;
            return isValid;
        }
        i++;
    }

    return isValid;
}

/////////////////////////////////////////////////////////////////
// !METHOD_DESC_S
// !NAME isEndGuardBandValid
// !TEXT
// Returns dtTRUE if mem mgr's "end guardband" is intact, indicating
// no memory overflow.
//
/////////////////////////////////////////////////////////////////
dtBoolean
dtMarcamMemoryMgr::isEndGuardBandValid ( dtVoid *aPosition )  const
{
   return ( getEndGuardBand(aPosition) == MAGIC_GUARDBAND_VALUE )
                                     ? dtTRUE : dtFALSE;
}

/////////////////////////////////////////////////////////////////
// !METHOD_DESC_S
// !NAME getBeginGuardBand
// !TEXT
// Returns value of beginGuardBand.  Used to determine if a memory
// overrun has occurred.
/////////////////////////////////////////////////////////////////
dtInt
dtMarcamMemoryMgr::getBeginGuardBand ( dtVoid *aPosition ) const
{
   dtChar* temp_mem = ( ((dtChar*) aPosition) - SIZEOF_LISTNODE );
   MemoryLinkListNode* mem_listnode = (MemoryLinkListNode*) temp_mem;

   return mem_listnode->getBeginGuardBand();
}

/////////////////////////////////////////////////////////////////
// !METHOD_DESC_S
// !NAME getEndGuardBand
// !TEXT
// Returns value of endGuardBand.  Used to determine if a memory
// overrun has occurred.
```

```
/////////////////////////////////////////////////////////////////
dtInt
dtMarcamMemoryMgr::getEndGuardBand ( dtVoid *aPosition )  const
{
   // First, backup to beginning of overhead mem info.  get memory size.
   // Next, forward to endGuardBand and check value for validity.

   dtChar* temp_mem = ( ((dtChar*) aPosition) - SIZEOF_LISTNODE );
   MemoryLinkListNode* mem_listnode = (MemoryLinkListNode*) temp_mem;
   dtSize_t reqsize = mem_listnode->getMemSize();
   dtChar* endGuardBand = ( ((dtChar *)mem_listnode) + SIZEOF_LISTNODE + reqsize
);
   return *endGuardBand;
}

/////////////////////////////////////////////////////////////////
// !METHOD_DESC_S
// !NAME getMemoryLeakCount
// !SATISFIES
// !TEXT
// Calculates the number of memory leaks for this Memory Manager
/////////////////////////////////////////////////////////////////
dtInt
dtMarcamMemoryMgr::getMemoryLeakCount() const
{
    return ( mNumMalloc - mNumFree );
}

/////////////////////////////////////////////////////////////////
// !METHOD_DESC_S
// !NAME dumpStatistics
// !TEXT
// Prints vital statistics to specified OutStream detailing how
// much memory is used, available, and so on.
// Only available if OPLDEBUG specified at compile time.
/////////////////////////////////////////////////////////////////

dtVoid dtMarcamMemoryMgr::dumpStatistics(dtOStream& aOutStream,  // destination
                                          dtUInt aLevel) const        // indent
level
{
    dtSize_t totalmgrmem =  calculateMemoryOverhead();
    dtSize_t aMemMgrId = qryToolID();

    aOutStream << " ";
    aOutStream << dumpTab(aLevel)
               << "+++++ Memory Statistics +++++" << endl;

    aOutStream << dumpTab(aLevel)
               << "         Memory Manager ID"
               << dumpTab(aLevel)
               << dtFmtInt(aMemMgrId) << endl << endl;

        if ( mNumMalloc == mNumFree )
    {
    aOutStream << dumpTab(aLevel)
               << "  Allocations/Deallocations        :    "
                   << dtFmtUInt (mNumMalloc) << endl;
    }
    else
```

```
    {
    aOutStream << endl << dumpTab(aLevel)
               << "  MEMORY LEAK DETECTED!!!!!! "
               << endl;
    aOutStream << dumpTab(aLevel)
               << "               Allocations          :    "
                  << dtFmtUInt(mNumMalloc)      << endl;
    aOutStream <<  dumpTab(aLevel)
               << "               Deallocations        :    "
                  << dtFmtUInt(mNumFree)     << endl << endl;
    }

    aOutStream <<  dumpTab(aLevel)
               << "  User Bytes Allocated              :    "
               << dtFmtUInt(mTotalAllocatedMemory) << endl;

    aOutStream <<  dumpTab(aLevel)
               << "  User Bytes Deallocated              :   "
               << dtFmtUInt(mTotalDeallocatedMemory) << endl;


    aOutStream <<  dumpTab(aLevel)
               << "  Maximum User Request Size         :    "
               << dtFmtUInt(mMaxReqSize) << endl;

    aOutStream <<  dumpTab(aLevel)
               << "  Peak Memory Manager Overhead      :    "
               << dtFmtUInt(totalmgrmem) << endl;

    //
    // now count memory chunks
    //

    dtULong Ao = 0;   // active object count
    dtULong Io = 0;   // inactive object count
    dtULong Ar = 0;   // active "raw" count
    dtULong Ir = 0;   // inactive "raw" count

    MemoryLinkListNode* CurrNode = allocationList.getHeadOfList();

    while ( CurrNode != (MemoryLinkListNode *)NULL )
    {
        MemoryLinkListNode* Mark = (MemoryLinkListNode*) CurrNode;

        if ( (Mark->isMemoryActive()) == dtTRUE )
        {
           ( Mark->isMemoryTypeObj() == dtTRUE ) ? Ao++ : Ar++;
        }
        else
        {
            ( Mark->isMemoryTypeObj() == dtTRUE ) ? Io++ : Ir++;
        }

        CurrNode = CurrNode->getNextNode();
    }

    aOutStream <<  dumpTab(aLevel)                              << endl;
    aOutStream <<  dumpTab(aLevel) << "   active obj   :  " << dtFmtULong(Ao) <<
endl;
```

```
    aOutStream <<  dumpTab(aLevel) << "   inactive obj:  " << dtFmtULong(Io) <<
endl;
    aOutStream <<  dumpTab(aLevel) << "   active raw   :  " << dtFmtULong(Ar) <<
endl;
    aOutStream <<  dumpTab(aLevel) << "   inactive raw:  " << dtFmtULong(Ir) <<
endl;

    aOutStream <<  dumpTab(aLevel)
           << "----- Memory Statistics -----" << endl;

    aOutStream << endl;
}

/////////////////////////////////////////////////////////////////
// !METHOD_DESC_S
// !NAME dumpContents
// !TEXT
// Dump contents of memory manager.
// Only available if OPLDEBUG specified at compile time.
/////////////////////////////////////////////////////////////////
dtVoid
dtMarcamMemoryMgr::dumpContents (dtOStream& aOutStream,  // output destintation
                                  dtUInt aLevel) const  // indent level
{
    // start with basics
    aOutStream << endl;

    aOutStream <<  dumpTab(aLevel)
               << "+++++ Memory Contents +++++" << endl;

    MemoryLinkListNode* CurrNode = allocationList.getHeadOfList();

    // dtChar* tempNode = (dtChar*) allocationList.getHeadOfList();

    while ( CurrNode != (MemoryLinkListNode*) NULL )
    {
        MemoryLinkListNode* Mark = (MemoryLinkListNode*) CurrNode;
        dtChar* CharNode  = (dtChar*) CurrNode;
    dtCore *user_data = (dtCore *) (CharNode + SIZEOF_LISTNODE );
    dtChar *userdata  = (dtChar *) (CharNode + SIZEOF_LISTNODE );


            if ( Mark->isMemoryActive() == dtTRUE )
            {
      dtChar AddrBuf[MAX_FORMATTED_ADDRESS];
         sprintf (AddrBuf, "[%08p]", CurrNode + SIZEOF_LISTNODE );

         aOutStream << endl <<  dumpTab(aLevel)
         << "+++"                    << endl;

            aOutStream <<  dumpTab(aLevel) << AddrBuf << " ";


                if ( Mark->isMemoryTypeObj() )
                {
                   aOutStream << "object, size " <<
                   dtFmtUInt(Mark->getMemSize()) << ": ";
                     const dtChar*  lpszFileName = Mark->getFileName();
```

```
                if ( (dtChar*)NULL != lpszFileName )
                {
                   aOutStream << lpszFileName << "(" <<
                   dtFmtUInt(Mark->getLineNumber()) << ")" << endl;
                }
                else
                {
                   aOutStream << "unknown location" << endl;
                }
               // check if guardband are intact.  if so, print data
               // otherwise, printer OVERFLOW/UNDERFLOW warning...

               if ( isUserDataIntact (userdata, aLevel, aOutStream) )
               {
               user_data->dump(aOutStream, aLevel + 1);
               }
           }
       else
           {
               aOutStream << "raw, size " << dtFmtUInt(Mark->getMemSize())
<< endl;

               // check if guardband are intact.  if so, print data
               // otherwise, printer OVERFLOW/UNDERFLOW warning...

               if ( isUserDataIntact (userdata, aLevel, aOutStream) )
               {
                  dtMemoryMgr::HexDump(aOutStream, aLevel,
                                       userdata,
                                       Mark->getMemSize(),
                                       MMhexdumpWIDTH);
                }
           }
   aOutStream <<  dumpTab(aLevel) << "---"   << endl;
         }

//!FIX
// Only the memory leaks are being dumped out.  This significantly reduces the
amount
// of time a developer needs to wait for a memory report.  Now that the unit
test
// harness and the globals dump the contents when a leak is detected, reporting
all
// the clean (deleted) memory can take 10 minutes for a simple test (partly due
to
// dtOStream doing raw writes, but mostly due to the amount of clean memory).
// For future memory manager testing where deleted objects must be reported, we
// may want to consider adding an additional dump method, or adding a parameter
// to this method (that defaults to leaks only).  JTD 29-Mar-94
//!FIX
#if 0 //!FIX
            else if ( Mark->isMemoryActive() == dtFALSE )
            {
                if ( Mark->isMemoryTypeObj() )
                {
                    aOutStream << "DELETED, object, size " << dtFmtUInt(Mark-
>getMemSize()) << endl;
                }
                else
                {
```

```
                aOutStream << "DELETED, raw, size " << dtFmtUInt(Mark-
>getMemSize()) << endl;
                }
        }
#endif //!FIX
   CurrNode = CurrNode->getNextNode();
    }

    aOutStream << endl;
    aOutStream <<  dumpTab(aLevel)
               << "----- Memory Contents -----" << endl;
    aOutStream << endl;
}

/////////////////////////////////////////////////////////////////
// !METHOD_DESC_S
// !NAME isUserDataIntact
// !TEXT
// Returns a boolean indicating if the user data passed in is
// corrupted or not.  This is determined by checking the
// begin and end bounds surrounding the given user data
/////////////////////////////////////////////////////////////////
dtBoolean
dtMarcamMemoryMgr::isUserDataIntact ( dtChar* aUserData,     // data pointer
                                      dtUInt aLevel,        // tab level
                                      dtOStream& aOutStream ) const
{

    dtBoolean beginGuardBandValid = isBeginGuardBandValid(aUserData);
    dtBoolean endGuardBandValid = isEndGuardBandValid(aUserData);

    if ( ! beginGuardBandValid || ! endGuardBandValid )
    {
        if ( ! beginGuardBandValid )
        {
            aOutStream <<  dumpTab(aLevel)
                       << "AN UNDERFLOW HAS BEEN DETECTED!!!." << endl;
        }

        if ( ! endGuardBandValid )
        {
            aOutStream <<  dumpTab(aLevel)
                       << "AN OVERFLOW HAS BEEN DETECTED!!!." << endl;
        }

         return dtFALSE;
    }

    else
    {
        return dtTRUE;
    }
}

/////////////////////////////////////////////////////////////////
// !METHOD_DESC_S
// !NAME isMember
// !TEXT
// Returns a boolean indicating if the provided dtCore pointer is
// a member of this memory manager.
```

```
/////////////////////////////////////////////////////////////////

dtBoolean dtMarcamMemoryMgr::isMember(const dtVoid* aPosition) const
{
   dtChar* temp_mem = ( ((dtChar*) aPosition) - SIZEOF_LISTNODE );
   MemoryLinkListNode* mem_listnode = (MemoryLinkListNode*) temp_mem;

   return ( (dtMarcamMemoryMgr *)(mem_listnode->getMemMgr()) == this )
                                        ? dtTRUE : dtFALSE;
}

/////////////////////////////////////////////////////////////////
// !METHOD_DESC_S
// !NAME isMemoryClean
// !TEXT
// Returns a boolean indicating wether or not memory leaks
// exist in this memory manager.
/////////////////////////////////////////////////////////////////
dtBoolean dtMarcamMemoryMgr::isMemoryClean() const
{
    return ( getMemoryLeakCount() == 0 ) ? dtTRUE : dtFALSE;
}

#endif // OPLDEBUG

dtMarcamMemoryMgr::BadHandle::BadHandle(dtULong              aMsgID,
                                        const dtChar* const aClassName,
                                        const dtChar* const aMethodName,
                                        const dtChar* const aFilename,
                                        dtInt               aLineNumber )

: erException ( aMsgID, aClassName, aMethodName, aFilename, aLineNumber )
{
}

dtMarcamMemoryMgr::IllegalSize::IllegalSize(dtULong             aMsgID,
                                        const dtChar* const aClassName,
                                        const dtChar* const aMethodName,
                                        const dtChar* const aFilename,
                                        dtInt               aLineNumber )

: erException ( aMsgID, aClassName, aMethodName, aFilename, aLineNumber )
{
}
```

```
//////////////////////////////////////////////////////////////////////
// FILE NAME:  dtmarcme.hh
// Copyright 1992 by Marcam Corp., Newton, MA USA
//
// This unpublished copyrighted work contains
// TRADE SECRET information of Marcam Corporation.
//
// Use, transfer, disclosure, or copying without
// its expressed written permission is strictly
// forbidden.
//
//////////////////////////////////////////////////////////////////////

#ifndef dtmarcmeHH
#define dtmarcmeHH


// include for memset lib call
#include <string.h>

#include "dtprims.hh"
#include "dtmemory.hh"
#include "mlinklis.hh"
#include "erexcept.hh"

// defines and consts for erException use

//!FIX
#define dtMsgBadHandle 21 // "Bad Handle (pointer)"
#define dtMsgBadHandle_Non_Member 22 // "Bad Handle - data not member of Memory
Mgr"
#define dtMsgBadHandle_Data_Corrupted 23 // // "Bad Handle - data appears to be
corrupted"
#define dtMsgBadHandle_Duplicate_Delete 24 // // "Bad Handle - data appears to
be already deleted"
#define dtMsgIllegalSize 25 // "Illegal Size of Zero for memory allocation"
const dtChar* const DTMARCAMMEMORYMGR_NAME = "dtMarcamMemoryMgr";
const dtChar* const DTMARCAMMEMORYMGR_FREE = "free";
const dtChar* const DTMARCAMMEMORYMGR_MALLOC = "malloc";

// Memory Manager ID definitions for Globals
//
const dtInt DT_MISSING_MM_ID = -1;
const dtInt DT_SYSTEM_MM_ID  = -2;
const dtInt DT_DEFAULT_MM_ID = -3;
const dtInt DT_TEST_MM_ID    = -4;


class EXPORT dtOStream;

//////////////////////////////////////////////////////////////////////////////
// !CLASS_DESC_S
// !LIBRARY ADT
// !NAME dtMarcamMemoryMgr
// !TEXT
// SubClass Memory Manager - provides memory system services.
// Provides tracking information such as memory leaks, peak memory usage,
// overflow/underflow conditions, etc.
//////////////////////////////////////////////////////////////////////////////
```

```
class EXPORT dtMarcamMemoryMgr : public dtMemoryMgr
{
   public:

   ////////////////////////////////////////////////////////////////////
   // !METHOD_DECL_S
   // !NAME ctor
   // !TEXT
   // Create memory manager over block of specified Size.
   ////////////////////////////////////////////////////////////////////
   dtMarcamMemoryMgr( dtInt aMemMgrId );

   ////////////////////////////////////////////////////////////////////
   // !METHOD_DECL_S
   // !NAME dtor
   // !TEXT
   // Free up block of memory allocated to this memory manager.
   ////////////////////////////////////////////////////////////////////
   ~dtMarcamMemoryMgr();

   ////////////////////////////////////////////////////////////////////
   // !METHOD_DECL_S
   // !NAME malloc
   // !SATISFIES
   // 1) MM-DM-2
   // 2) MM-DM-3
   // 3) MM-DM-4
   // 4) MM-DM-5
   // 5) MM-DM-8
   // 6) MM-DD-5
   // !TEXT
   // Defer allocation to MemoryLinkListNode class. overloaded
   // new operator.
   // !ENTRY_COND
   // 1) aRepSize > 0
   // !EXIT_COND
   // 1) The return position != NULL
   ////////////////////////////////////////////////////////////////////
   dtVoid* malloc( dtSize_t      aReqSize,
                   MemoryReqType aReqType = NON_OBJ
                   );
#ifdef OPLDEBUG

   ////////////////////////////////////////////////////////////////////
   // !METHOD_DECL_S
   // !NAME malloc
   // !SATISFIES
   // 1) MM-DM-2
   // 2) MM-DM-3
   // 3) MM-DM-4
   // 4) MM-DM-5
   // 5) MM-DM-8
   // 6) MM-DD-5
   // !TEXT
   // Defer allocation to MemoryLinkListNode class. overloaded
   // new operator. Track data and record file name and line
   // number, if in OPLDEBUG mode.
   // !ENTRY_COND
   // 1) aRepSize > 0
```

```
    // !EXIT_COND
    // 1) The return position != NULL
    ////////////////////////////////////////////////////////////////////
    dtVoid* malloc( dtSize_t              aReqSize,
                    const dtChar* const alpszFileName,
                    dtUInt                anLineNumber,
                    MemoryReqType         aReqType = NON_OBJ
                );

#endif // OPLDEBUG

    ////////////////////////////////////////////////////////////////////
    // !METHOD_DECL_S
    // !NAME free
    // !SATISFIES
    // 1) MM-DM-10
    // 2) MM-DM-11
    // 3) MM-DM-13
    // !ENTRY_COND
    // 1) aPosition != NULL
    ////////////////////////////////////////////////////////////////////
    dtVoid free(dtVoid* aPosition);

    ////////////////////////////////////////////////////////////////////
    // !METHOD_DECL_S
    // !NAME qryAvailSpace
    // !TEXT
    // Returns space left in block (memory manager block).
    ////////////////////////////////////////////////////////////////////
    dtDouble qryAvailSpace( ) const;

#ifdef OPLDEBUG

    ////////////////////////////////////////////////////////////////////
    // !METHOD_DECL_S
    // !NAME isMember
    // !TEXT
    // Returns a boolean indicating if the provided dtCore pointer is
    // a member of this memory manager.
    ////////////////////////////////////////////////////////////////////
    dtBoolean isMember(const dtVoid* aCorePtr) const;

    ////////////////////////////////////////////////////////////////////
    // !METHOD_DECL_S
    // !NAME isMemoryClean
    // !TEXT
    // Returns a boolean indicating wether or not memory leaks
    // exist in this memory manager.
    ////////////////////////////////////////////////////////////////////
    dtBoolean isMemoryClean() const;

    ////////////////////////////////////////////////////////////////////
    // !METHOD_DECL_S
    // !NAME isPrintable
    // !TEXT
    // Returns a boolean indicating if the user data is
    // corrupted or not.  This is determined by checking the
    // begin and end bounds surrounding the given user data
    ////////////////////////////////////////////////////////////////////
    dtBoolean isUserDataIntact ( dtChar * aUserData,
```

```
                        dtUInt aLevel,
                        dtOStream& aOutStream ) const;

////////////////////////////////////////////////////////////////
// !METHOD_DECL_S
// !NAME calculateMemoryOverhead
// !SATISFIES
// 1) MM-DD-3
// !TEXT
// Caluclates the amount of memory expended for overhead information
////////////////////////////////////////////////////////////////
dtSize_t calculateMemoryOverhead( ) const;

////////////////////////////////////////////////////////////////
// !METHOD_DECL_S
// !NAME getBeginGuardBand
// !TEXT
// Returns eeginGuardBand data for memory position passed in.
//
////////////////////////////////////////////////////////////////
dtInt getBeginGuardBand ( dtVoid *aPosition ) const ;

////////////////////////////////////////////////////////////////
// !METHOD_DECL_S
// !NAME getEndGuardBand
// !TEXT
// Returns endGuardBand data for memory position passed in.
//
////////////////////////////////////////////////////////////////
dtInt getEndGuardBand ( dtVoid *aPosition ) const;

////////////////////////////////////////////////////////////////
// !METHOD_DECL_S
// !NAME isBeginGuardBandValid
// !SATISFIES
// 1) MM-DD-4
// !TEXT
// Returns dtTRUE if mem mgr's "begin guardbands" are intact, indicating
// no memory overwrite at begin position.
//
////////////////////////////////////////////////////////////////
dtBoolean isBeginGuardBandValid ( dtVoid *aPosition ) const ;

////////////////////////////////////////////////////////////////
// !METHOD_DECL_S
// !NAME isEndGuardBandValid
// !SATISFIES
// 1) MM-DD-4
// !TEXT
// Returns dtTRUE if mem mgr's "end guardbands" are intact, indicating
// no memory overwrite at begin position.
//
////////////////////////////////////////////////////////////////
dtBoolean isEndGuardBandValid ( dtVoid *aPosition ) const ;

////////////////////////////////////////////////////////////////
// !METHOD_DECL_S
// !NAME getMemoryLeakCount
// !SATISFIES
// !TEXT
```

```
    // Return number of memory leaks detected for this Mem Mgr.
    //////////////////////////////////////////////////////////////////
    dtInt getMemoryLeakCount() const;

    //////////////////////////////////////////////////////////////////
    // !METHOD_DECL_S
    // !NAME dumpStatistics
    // !SATISFIES
    // 1) MM-DD-1
    // 2) MM-DD-3
    // 3) MM-DM-12
    // !TEXT
    // Prints statistics to specified OutStream detailing memory
    // usage, availablity, etc.
    // Only available if OPLDEBUG specified at compile time.
    //////////////////////////////////////////////////////////////////
    dtVoid dumpStatistics(dtOStream& aOutStream, dtUInt aIndentLevel) const;

    //////////////////////////////////////////////////////////////////
    // .METHOD_DECL_S
    // .NAME dumpContents
    // .SATISFIES
    // 1) MM-DD-2
    // 2) MM-DD-3
    // 3) MM-DD-4
    // :TEXT
    // Prints the contents of the space to the specified
    // OutStream.  Any objects are assumed to be subclassed from Info.
    // Only available if OPLDEBUG specified at compile time.
    //////////////////////////////////////////////////////////////////
    dtVoid dumpContents(dtOStream& aOutStream,  dtUInt aIndentLevel) const;

#endif   // OPLDEBUG

    private:

    dtMarcamMemoryMgr();

    //////////////////////////////////////////////////////////////////
    // !ATTRIBUTE_DECL_S
    // !NAME allocationList;
    // !TEXT
    // Linked List of allocations.
    //////////////////////////////////////////////////////////////////
    MemoryLinkList allocationList;

#ifdef OPLDEBUG

    //////////////////////////////////////////////////////////////////
    // !ATTRIBUTE_DECL_S
    // !NAME mNumMalloc;
    // !SATISFIES
    // 1) MM-DD-1
    // 2) MM-DD-3
    // !TEXT
    // Number of memory allocations.
    //////////////////////////////////////////////////////////////////
    dtSize_t          mNumMalloc;

    //////////////////////////////////////////////////////////////////
```

```
// !ATTRIBUTE_DECL_S
// !NAME mNumFree;
// !SATISFIES
// 1) MM-DD-1
// 2) MM-DD-3
// !TEXT
// Number of memory deallocations
/////////////////////////////////////////////////////////////////
dtSize_t            mNumFree;

/////////////////////////////////////////////////////////////////
// !ATTRIBUTE_DECL_S
// !NAME mMaxReqSize;
// !SATISFIES
// 1) MM-DD-3
// !TEXT
// Maximum User Request Size.
/////////////////////////////////////////////////////////////////
dtSize_t            mMaxReqSize;

/////////////////////////////////////////////////////////////////
// !ATTRIBUTE_DECL_S
// !NAME mMaxUserSpace;
// !SATISFIES
// 1) MM-DD-3
// !TEXT
// Maximum User Space allocated
/////////////////////////////////////////////////////////////////
dtSize_t            mMaxUserSpace;

/////////////////////////////////////////////////////////////////
// !ATTRIBUTE_DECL_S
// !NAME mTotalAllocatedMemory;
// !SATISFIES
// 1) MM-DD-3
// !TEXT
// Total Allocated Memory ( user ).
/////////////////////////////////////////////////////////////////
dtSize_t            mTotalAllocatedMemory;

/////////////////////////////////////////////////////////////////
// !ATTRIBUTE_DECL_S
// !NAME mTotalDeallocatedMemory;
// !SATISFIES
// 1) MM-DD-3
// !TEXT
// Total Deallocated Memory ( user ).
/////////////////////////////////////////////////////////////////
dtSize_t            mTotalDeallocatedMemory;


#endif   // OPLDEBUG

    public:
        class BadHandle : public erException
        {
            public:
                    BadHandle(dtULong aMsgID,
                                const dtChar* const aClassName,
                                const dtChar* const aMethodName,
```

```
                              const dtChar* const aFilename,
                              dtInt               aLineNumber );
        };

        class IllegalSize : public erException
        {
            public:
                    IllegalSize(dtULong aMsgID,
                              const dtChar* const aClassName,
                              const dtChar* const aMethodName,
                              const dtChar* const aFilename,
                              dtInt               aLineNumber );
        };

};

#endif // dtMarcamMemoryMgrH
```

FILE NAME: dtmemory.cpp

```
// Copyright 1992 by Marcam Corp., Newton, MA USA
//
// This unpublished copyrighted work contains
// TRADE SECRET information of Marcam Corporation.
//
// Use, transfer, disclosure, or copying without
// its express written permission is strictly
// forbidden.
//
/////////////////////////////////////////////////////////////////////////

/////////////////////////////////////////////////////////////////////////////
// Implementation of methods for dtMemoryMgr exception classes
///////////////////////////////////////////////////////////////////////////////

#include "dtmemory.hh"
#include "osstring.hh"
#include "dtcore.hh"
#include "dtostrm.hh"
#include "dtfmtint.hh"
#include "dtfmtuin.hh"

// protected for msc compliance
dtMemoryMgr::dtMemoryMgr()
{
}

dtMemoryMgr::dtMemoryMgr( dtInt  aMemMgrId )  : mMemMgrId ( aMemMgrId )
{
}

///////////////////////////////////////////////////////////////////////////////
// dtMemoryMgr:: methods
///////////////////////////////////////////////////////////////////////////////

dtMemoryMgr::~dtMemoryMgr()
{ }

//////////////////////////////////////////////////////////////////
// !METHOD_DESC_S
// !NAME qryToolID
// !TEXT
// Sets the mMemMgrId member which associates a nnumeric id
// with each memory mgr    .  We're calling it qryToolID to associate
// this object with the tool globals.
//////////////////////////////////////////////////////////////////
dtInt dtMemoryMgr::qryToolID ( ) const
{
    return mMemMgrId;
}

#ifdef OPLDEBUG
///////////////////////////////////////////////////////////////////////////////
//
//Static method
//dtMemoryMgr::HexDump
///////////////////////////////////////////////////////////////////////////////

dtVoid dtMemoryMgr::HexDump(dtOStream & aOutStream,
                dtUInt aPrintLevel,
```

```
                dtChar * aRegion,
                dtUInt aRegionLength,
                dtUInt aLineWidth)
{
   char * curr_loc = aRegion;
   int counter = aRegionLength;
   char nextChar[3];  // to hold hex value of character

   while (counter > 0)
   {
      int num_cols = (counter / aLineWidth) ? aLineWidth : counter;

      aOutStream <<  dumpTab (aPrintLevel);

      for (int i = 0; i < num_cols; i++)
      {
       unsigned char ch = curr_loc [i];
         sprintf(nextChar, "%x", ch);

         if ( strcmp(nextChar, "0" ) == 0 )
         {
             aOutStream << "00" << " ";
         }
         else
         {
            aOutStream << nextChar << " ";
         }
      }

      for (dtUInt j = 0; j < aLineWidth - num_cols; j++)
      {
       aOutStream << "   ";
      }

      aOutStream << "  | ";

      // char ch = curr_loc[k];
      for (int k = 0; k < num_cols; k++)
      {
           aOutStream << curr_loc [k] << " ";
      }

      for (dtUInt l = 0; l < aLineWidth - num_cols; l++)
      {
       aOutStream << "  ";
      }

      aOutStream << "   |" << endl;

      counter -= aLineWidth;
      curr_loc += aLineWidth;
   }

}
#endif          // OPLDEBUG
```

```
/////////////////////////////////////////////////////////////////////////
// FILE NAME:  dtmemory.hh
// Copyright 1992 by Marcam Corp., Newton, MA USA
//
// This unpublished copyrighted work contains
// TRADE SECRET information of Marcam Corporation.
//
// Use, transfer, disclosure, or copying without
// its expresswritten permission is strictly
// forbidden.
//
/////////////////////////////////////////////////////////////////////////

#ifndef dtmemoryHH
#define dtmemoryHH

#include <stddef.h>
#include "dtprims.hh"

#include "erexcept.hh"

class EXPORT dtOStream;

/////////////////////////////////////////////////////////////////////////////
// !CLASS_DESC_S
// !LIBRARY ADT
// !NAME dtMemoryMgr
// !TEXT
// ABSTRACT Base Memory Manager Class - provides memory system services.
// It is the abstract superclass of a family of memory classes that
// provide tracking information such as memory leaks, peak memory usage,
// overflow/underflow conditions.
/////////////////////////////////////////////////////////////////////////////

class EXPORT dtMemoryMgr
{
    public:

        dtMemoryMgr( dtInt memMgrId );
        ////////////////////////////////////////////////////////////////////////
        // Enum for specifying the type of memory request.
        ////////////////////////////////////////////////////////////////////////
        enum MemoryReqType
        {
          UNKNOWN,     // unknown entity (should never happen!)
          OBJ,         // memory request for object
          NON_OBJ      // memory request for non object
        };

        ////////////////////////////////////////////////////////////////////////
        // !METHOD_DECL_S
        // !NAME dtor
        // !TEXT
        // Do nothing.  Defined to allow all memory manager subclasses to be
        // treated polymorphically.
        ////////////////////////////////////////////////////////////////////////
        virtual ~dtMemoryMgr();

        ////////////////////////////////////////////////////////////////////
        // !METHOD_DECL_S
```

```
        // !NAME malloc
        // !TEXT
        // Returns pointer to memory chunk of requested size.
        /////////////////////////////////////////////////////////////////////
#ifdef OPLDEBUG
        virtual dtVoid* malloc(   dtSize_t            aClassSize,
                           const dtChar* const alpszFileName,
                           dtUInt              anLineNumber,
                           MemoryReqType       aReq = dtMemoryMgr::UNKNOWN
                          ) = 0;

#endif
        virtual dtVoid* malloc(dtSize_t aClassSize,
                               MemoryReqType aReq = dtMemoryMgr::UNKNOWN) = 0;

        /////////////////////////////////////////////////////////////////////
        // !METHOD_DECL_S
        // !NAME setMemMgrId
        // !TEXT
        // Sets the mMemMgrId member which associates a nnumeric id
        // with each memory mgr
        /////////////////////////////////////////////////////////////////////
        // erStatus setMemMgrId ( dtInt aMemMgrId );

        /////////////////////////////////////////////////////////////////////
        // !METHOD_DECL_S
        // !NAME qryToolID
        // !TEXT
        // Sets the mMemMgrId member which associates a nnumeric id
        // with each memory mgr
        /////////////////////////////////////////////////////////////////////
        dtInt qryToolID ( ) const;

        /////////////////////////////////////////////////////////////////////
        // !METHOD_DECL_S
        // !NAME free
        // !TEXT
        // Releases memory chunk for possible reuse.
        /////////////////////////////////////////////////////////////////////
        virtual dtVoid  free(dtVoid* aPlace) = 0;

        /////////////////////////////////////////////////////////////////////
        // !METHOD_DECL_S
        // !NAME qryAvailSpace
        // !TEXT
        // Returns space available for requests.
        /////////////////////////////////////////////////////////////////////
        virtual dtDouble qryAvailSpace() const = 0;

#ifdef OPLDEBUG

        /////////////////////////////////////////////////////////////////////
        // !METHOD_DECL_S
        // !NAME isMember
        // !TEXT
        // Returns a boolean indicating if the provided dtCore* is a member
        // of this memory manager.
        /////////////////////////////////////////////////////////////////////
        virtual dtBoolean isMember(const dtVoid* aCorePtr) const = 0;
```

```
    ///////////////////////////////////////////////////////////////////
    // !METHOD_DECL_S
    // !NAME isMemoryClean
    // !TEXT
    // Returns a boolean indicating wether or not memory leaks
    // exist in this memory manager.
    ///////////////////////////////////////////////////////////////////
    virtual dtBoolean isMemoryClean() const = 0;

    ///////////////////////////////////////////////////////////////////
    // !METHOD_DECL_S
    // !NAME HexDump
    // !TEXT
    // Print a region of memory starting at the region for a length
    // of regionLen to the dtOStream aOutStream, at indent level.
    // Printing will be a formatted hex dump of width.
    // !ENTRY_COND
    // 1) aRegion should not be NULL
    // 2) aRegionLength > 0
    ///////////////////////////////////////////////////////////////////////

    static dtVoid HexDump(dtOStream& aOutStream, dtUInt aIndentLevel,
                          dtChar* aRegion, dtUInt aRegionLength,
                          dtUInt aLineWidth);

    ///////////////////////////////////////////////////////////////////
    // !METHOD_DECL_S
    // !NAME dumpStatistics
    // !TEXT
    // Only enabled if OPLDEBUG defined at compile time.
    // Prints vital statistics about how much memory is used,
    // available, and so on.
    ///////////////////////////////////////////////////////////////////
    virtual dtVoid dumpStatistics(dtOStream& aOutStream,
                                  dtUInt aPrintLevel) const = 0;

    ///////////////////////////////////////////////////////////////////
    // !METHOD_DECL_S
    // !NAME dumpContents
    // !TEXT
    // Only enabled if OPLDEBUG defined at compile time.
    // Prints the contents of the space.
    ///////////////////////////////////////////////////////////////////
    virtual dtVoid dumpContents(dtOStream& aOutStream,
                                dtUInt aPrintLevel) const = 0;
#endif    // OPLDEBUG

  protected:

    dtMemoryMgr();

  private:

    ///////////////////////////////////////////////////////////////////
    // !ATTRIBUTE_DECL_S
    // !NAME mMemMgrId;
    // !TEXT
    // Unique id is assigned to each MemoryManager created by Memory
    // Executive.
    ///////////////////////////////////////////////////////////////////
```

```
        dtInt     mMemMgrId;

};

#endif    // dtMemoryMgrH
```

```
////////////////////////////////////////////////////////////////////////
//
// FILE_NAME: basresci.cc
//
// Copyright 1993 by Marcam Corp., Newton, MA USA
//
// This unpublished copyrighted work contains
// TRADE SECRET information of Marcam Corporation.
//
// Use, transfer, disclosure, or copying without its expressed
// written permission is strictly forbidden.
//
// !IPK
////////////////////////////////////////////////////////////////////////

#include "basresci.hh"


// Establish an instance of TESTRUN for this class
TESTRUNdeclare(i_BasicResource)
//
// TESTRUN() and testname() are used by the unit test harness
// to run the tests and display the name of the unit test.
//
extern "C" dtInt FAR PASCAL EXPORT testmain( idtTestArgs& aTestArgs )
{
   return( TESTRUN(i_BasicResource)( aTestArgs ) );
}
extern "C" dtChar * FAR PASCAL EXPORT testname()
{
   return( "i_BasicResource" );
}


////////////////////////////////////////////////////////////////////
// !CLASS_DECL_S
// !LIBRARY I_
// !NAME i_BasicResource
// !TEXT
// Generated 93/12/15 by /us/mott/icg/bin/icg of Dec 15 18:28 (version 2.01)
//
// !AUTHOR      <Author's name>    <(Author's E-mail address)>
// !REVIEWER    <Reviewer's name> <(Reviewer's E-mail address)>
// !REVIEW_DATE <date>
////////////////////////////////////////////////////////////////////


   ////////////////////////////////////////////////
   // Inspection class constructor.
   ////////////////////////////////////////////////
   i_BasicResource::i_BasicResource(
      dtStreamExecutive* aStreamExec,
      dtMemoryExecutive& aMemExec,
      idtTestArgs&       aTestArgs,
      dtMemoryMgr*
      ): idtTest( aStreamExec, aMemExec, aTestArgs )
   {
      for ( int i = 0 ; i < TOTAL_FUNCS ; i++ ) coverage[i] = 0;
   }
```

```
//////////////////////////////////////////////////
// Inspection class destructor.
//////////////////////////////////////////////////
i_BasicResource::~i_BasicResource()
{
}


//////////////////////////////////////////////////
// Lifecycle testing.
//
// The TLIFE_START and TLIFE_END macros are placed
// around each lifecycle test as these provide the
// open ('{') and close ('}') of a code block
// (allows reuse of variable names). These macros
// announce each test and whether it has
// passed or failed.  They also provide clean
// memory mamangers for each test.  Throughout
// the lifecycle test (between the TLIFE_INIT and
// TLIFE_CLEANUP macros) two memory managers are
// available: mm and mm2.
//////////////////////////////////////////////////
dtVoid
i_BasicResource::t_LifeCycle()
{
   TLIFE_INIT
   // There is no t_LifeCycle for IPKs
   TLIFE_CLEANUP;
}


//////////////////////////////////////////////////
// Operators testing.
//
// All operators are tested here.
// The entire set of operators has been broken
// into like categories for ease of testing.
//
// Between the T_INIT and T_CLEANUP macros the
// memory manager variable mm is available for
// constructing test objects. Each individual
// test must be surrounded by the TEST_START and
// TEST_END macros, or alternately, the test
// itself can be performed within a TEST macro.
//////////////////////////////////////////////////
dtVoid
i_BasicResource::t_Operators()
{
   T_INIT( "t_Operators" )

   //!FIX The following must be tested from your production class:
   //
   // No applicable operators were found.

   // COMPARISON OPERATORS: < > <= >= == !=
   // ARITHMETIC OPERATORS: + - * / % ++ --
   // LOGICAL OPERATORS: || && !
   // BITWISE OPERATORS: ^ | & ~ << >>
   // EXTENDED ASSIGNMENT OPERATORS: += -= *= /= %= ^= |= &= <<= >>=
```

```
   // CONVERSION OPERATORS:  type()
   // MISCELLANEOUS AND GLOBAL OPERATORS

   T_CLEANUP
}


//////////////////////////////////////////////////
// Set and Query testing.
//
// The set and query member functions are tested
// here.  If your class under test contains
// values that do not require being set first,
// then test the query methods for those values
// before testing the corresponding set methods.
//
// Between the T_INIT and T_CLEANUP macros the
// memory manager variable mm is available for
// constructing test objects. Each individual
// test must be surrounded by the TEST_START and
// TEST_END macros, or alternately, the test
// itself can be performed within a TEST macro.
//////////////////////////////////////////////////
dtVoid
i_BasicResource::t_SetQrys()
{
   T_INIT( "t_SetQrys" )

   //!FIX The following must be tested from your production class:
   /*
    fdInstTypes rtnLegalTypes() const;
   */

   // QUERY TESTS
   // SET TESTS

   T_CLEANUP
}


//////////////////////////////////////////////////
// Semantics testing.
//
// These tests are for those member functions
// unique to the production class.
//
// Between the T_INIT and T_CLEANUP macros the
// memory manager variable mm is available for
// constructing test objects. Each individual
// test must be surrounded by the TEST_START and
// TEST_END macros, or alternately, the test
// itself can be performed within a TEST macro.
//////////////////////////////////////////////////
dtVoid
i_BasicResource::t_Semantics()
{
   T_INIT( "t_Semantics" )

   //!FIX Add your semantic member function tests here.
```

```
   T_CLEANUP
}

//////////////////////////////////////////////////
// Persistence testing.
//
// This tests behavior specific to the persistence
// member functions of a production class.
//
// Between the T_INIT and T_CLEANUP macros the
// memory manager variable mm is available for
// constructing test objects. Each individual
// test must be surrounded by the TEST_START and
// TEST_END macros, or alternately, the test
// itself can be performed within a TEST macro.
//////////////////////////////////////////////////
dtVoid
i_BasicResource::t_Persist()
{
   T_INIT( "t_Persist" )

      // STDGIT_TESTCLASS and STDGIT_VERSION must be established.
      //
      #define STDGIT_TESTCLASS s_BasicResource
      #define STDGIT_VERSION 1

      // At least one of the following must be present.
      //
      #define STDGIT_PRODUCTION
      //#define STDGIT_WIP
      //#define STDGIT_TEMPLATE
      //#define STDGIT_IMPORT_EXPORT
      //#define STDGIT_HISTORY

      fdNameUK* uk1 = new ( mm ) fdNameUK( mm );
      fdNameUK* uk2 = new ( mm ) fdNameUK( mm );
      fdNameUK* uk3 = new ( mm ) fdNameUK( mm );
//!FIX  You may need to specify a security context.
      fdSecurityContext security = FD_SC_NO_CONTEXT;

      // Setup the user keys for the 3 test objects.
      //
      setupUKs( uk1, uk2, uk3, mm );

      // Standard test for fdGenInst derived classes.
      // Runs through normal persistent lifecycle for
      // production instances.
      //
      #include "stdgit.cc"

   T_CLEANUP
}

//////////////////////////////////////////////////
// Return coverage information.
//
// NOTE: This is not to be modified by unit
//       test developers.
```

```
/////////////////////////////////////////////////
dtVoid
i_BasicResource::qryCoverage(
   dtInt*& aCovAry,
   dtInt&  aNumFuncs
   ) const
{
   aCovAry = coverage;
   aNumFuncs = TOTAL_FUNCS;
}


/////////////////////////////////////////////////
// setupUKs:
//
// Helper function for persistence testing.
// Set up three user keys for the three
// objects used during the STDGIT.
/////////////////////////////////////////////////
dtVoid
i_BasicResource::setupUKs(
     fdNameUK* aUK1,
     fdNameUK* aUK2,
     fdNameUK* aUK3,
     dtMemoryMgr* aMM
     )
{
     // Remember maximum string lengths when setting up test
     // object names and site names.  Names are usually
     // a maximum of 15 characters, sites are 4 characters max.
     //
     bcStringi18n site1( (dtUChar*) "S111", aMM);
     bcStringi18n site2( (dtUChar*) "S222", aMM);
     bcStringi18n site3( (dtUChar*) "S333", aMM);
     bcStringi18n name1( (dtUChar*) "Test Object 111", aMM);
     bcStringi18n name2( (dtUChar*) "Test Object 222", aMM);
     bcStringi18n name3( (dtUChar*) "Test Object 333", aMM);

     //  Setup 3 user keys.  First set the site on each and
     //  set the type.  This is common for all user keys.
     //
     aUK1->setSiteName( &site1 );
     aUK2->setSiteName( &site2 );
     aUK3->setSiteName( &site3 );
     aUK1->setType( fdInstTypes::PRODUCTION );
     aUK2->setType( fdInstTypes::PRODUCTION );
     aUK3->setType( fdInstTypes::PRODUCTION );

//!FIX  Finish setting up the user keys.  Use what is here
//!FIX  as a starting point for your specific user key.

//!FIX  aUK1->setXxxxName( &name1 );
//!FIX  aUK2->setXxxxName( &name2 );
//!FIX  aUK3->setXxxxName( &name3 );
}

/////////////////////////////////////////////////
// setupObj:
//
```

```
// Helper function for persistence testing.
// Set the attributes in the passed object
// so that it is valid and can be saved.
///////////////////////////////////////////////////
dtVoid
i_BasicResource::setupObj(
     s_BasicResource* aInstance,
     dtMemoryMgr*     aMM
     )
{
     // Descriptions have a maximum length of 15.
     //
     bcStringi18n descr1( (dtUChar*) "Description 111", aMM);
     bcStringi18n descr2( (dtUChar*) "Description 222", aMM);
     bcStringi18n secGrp( (dtUChar*) "Security GroupX", aMM);

     aInstance->setDescription1( &descr1 );
     aInstance->setDescription2( &descr2 );
     aInstance->setSecurityGroup( &secGrp );

//!FIX  >>> Add addtional setup here. <<<
}

///////////////////////////////////////////////////
// static Member function "close"
// NOTE: may be modified by unit test developers.
///////////////////////////////////////////////////
erMsg*
i_BasicResource::close( fdNameUK*     aUK,
                        dbTransCtx*& aDbCtx )
{
     coverage[f_close]++;
     announceMethodStart( "close" );
//   announceParameter( aUK );
//   announceParameter( aDbCtx );
     erMsg* testVal = BasicResource::close( aUK,
                        aDbCtx );
//   announceRetVal( testVal );
     announceMethodEnd( "close" );
     return( testVal );
}

///////////////////////////////////////////////////
// static Member function "create" #1
// NOTE: may be modified by unit test developers.
///////////////////////////////////////////////////
     erMsg*
i_BasicResource::create( fdNameUK*          aUK,
                         dbTransCtx*&       aDbCtx,
                         fdSecurityContext aSecurityCtx,
                      dtMemoryMgr*       aMM )
{
     coverage[f_create1]++;
     announceMethodStart( "create1" );
//   announceParameter( aUK );
//   announceParameter( aDbCtx );
//   announceParameter( aSecurityCtx );
//   announceParameter( aMM );
```

```
    erMsg* testVal = BasicResource::create( aUK,
                                 aDbCtx,
                                 aSecurityCtx,
                             aMM );
//  announceRetVal( testVal );
    announceMethodEnd( "create1" );
    return( testVal );
}

/////////////////////////////////////////////////
// static Member function "create" #2
// NOTE: may be modified by unit test developers.
/////////////////////////////////////////////////
    erMsg*
i_BasicResource::create( fdNameUK*          aNewUK,
                         fdNameUK*          aOldUK,
                            dbTransCtx*&       aDbCtx,
                            fdSecurityContext aSecurityCtx,
                         dtMemoryMgr*       aMM )
{
    coverage[f_create2]++;
    announceMethodStart( "create2" );
//  announceParameter( aNewUK );
//  announceParameter( aOldUK );
//  announceParameter( aDbCtx );
//  announceParameter( aSecurityCtx );
//  announceParameter( aMM );
    erMsg* testVal = BasicResource::create( aNewUK,
                             aOldUK,
                                aDbCtx,
                                aSecurityCtx,
                             aMM );
//  announceRetVal( testVal );
    announceMethodEnd( "create2" );
    return( testVal );
}

/////////////////////////////////////////////////
// static Member function "openForChange"
// NOTE: may be modified by unit test developers.
/////////////////////////////////////////////////
    erMsg*
i_BasicResource::openForChange( fdNameUK*          aUK,
                                dbTransCtx*&       aDbCtx,
                                fdSecurityContext aSecurityCtx,
                             dtMemoryMgr*       aMM )
{
    coverage[f_openForChange]++;
    announceMethodStart( "openForChange" );
//  announceParameter( aUK );
//  announceParameter( aDbCtx );
//  announceParameter( aSecurityCtx );
//  announceParameter( aMM );
    erMsg* testVal = BasicResource::openForChange( aUK,
                                aDbCtx,
                                aSecurityCtx,
                             aMM );
//  announceRetVal( testVal );
```

```
    announceMethodEnd( "openForChange" );
    return( testVal );
}

//////////////////////////////////////////////////
// static Member function "openForReview"
// NOTE: may be modified by unit test developers.
//////////////////////////////////////////////////
    erMsg*
i_BasicResource::openForReview( fdNameUK*         aUK,
                                dbTransCtx*&      aDbCtx,
                                fdSecurityContext aSecurityCtx,
                              dtMemoryMgr*      aMM )
{
    coverage[f_openForReview]++;
    announceMethodStart( "openForReview" );
//  announceParameter( aUK );
//  announceParameter( aDbCtx );
//  announceParameter( aSecurityCtx );
//  announceParameter( aMM );
    erMsg* testVal = BasicResource::openForReview( aUK,
                                aDbCtx,
                                aSecurityCtx,
                              aMM );
//  announceRetVal( testVal );
    announceMethodEnd( "openForReview" );
    return( testVal );
}

//////////////////////////////////////////////////
// static Member function "remove"
// NOTE: may be modified by unit test developers.
//////////////////////////////////////////////////
    erMsgList*
i_BasicResource::remove( fdNameUK*         aUK,
                         dbTransCtx*&      aDbCtx,
                         fdSecurityContext aSecurityCtx )
{
    coverage[f_remove]++;
    announceMethodStart( "remove" );
//  announceParameter( aUK );
//  announceParameter( aDbCtx );
//  announceParameter( aSecurityCtx );
    erMsgList* testVal = BasicResource::remove( aUK,
                         aDbCtx,
                         aSecurityCtx );
//  announceRetVal( testVal );
    announceMethodEnd( "remove" );
    return( testVal );
}

//////////////////////////////////////////////////
// static Member function "save"
// NOTE: may be modified by unit test developers.
//////////////////////////////////////////////////
    erMsgList*
i_BasicResource::save( fdNameUK*         aUK,
```

```
                          dbTransCtx*&       aDbCtx,
                          fdSecurityContext aSecurityCtx )
   {
      coverage[f_save]++;
      announceMethodStart( "save" );
//    announceParameter( aUK );
//    announceParameter( aDbCtx );
//    announceParameter( aSecurityCtx );
      erMsgList* testVal = BasicResource::save( aUK,
                          aDbCtx,
                          aSecurityCtx );
//    announceRetVal( testVal );
      announceMethodEnd( "save" );
      return( testVal );
   }

   //////////////////////////////////////////////////
   // static Member function "saveAs"
   // NOTE: may be modified by unit test developers.
   //////////////////////////////////////////////////
      erMsgList*
   i_BasicResource::saveAs( fdNameUK*         aNewUK,
                          fdNameUK*          aOldUK,
                            dbTransCtx*&       aDbCtx,
                            fdSecurityContext aSecurityCtx,
                          dtMemoryMgr*       aMM )
   {
      coverage[f_saveAs]++;
      announceMethodStart( "saveAs" );
//    announceParameter( aNewUK );
//    announceParameter( aOldUK );
//    announceParameter( aDbCtx );
//    announceParameter( aSecurityCtx );
//    announceParameter( aMM );
      erMsgList* testVal = BasicResource::saveAs( aNewUK,
                          aOldUK,
                            aDbCtx,
                            aSecurityCtx,
                          aMM );
//    announceRetVal( testVal );
      announceMethodEnd( "saveAs" );
      return( testVal );
   }

   //////////////////////////////////////////////////
   // static Member function "validate"
   // NOTE: may be modified by unit test developers.
   //////////////////////////////////////////////////
      erMsgList*
   i_BasicResource::validate( fdNameUK*    aUK,
                              dbTransCtx*& aDbCtx )
   {
      coverage[f_validate]++;
      announceMethodStart( "validate" );
//    announceParameter( aUK );
//    announceParameter( aDbCtx );
      erMsgList* testVal = BasicResource::validate( aUK,
                              aDbCtx );
```

```
//    announceRetVal( testVal );
      announceMethodEnd( "validate" );
      return( testVal );
   }

   //////////////////////////////////////////////////
   // static Member function "validateToRemove"
   // NOTE: may be modified by unit test developers.
   //////////////////////////////////////////////////
      erMsgList*
   i_BasicResource::validateToRemove( fdNameUK*    aUK,
                                         dbTransCtx*& aDbCtx )
   {
      coverage[f_validateToRemove]++;
      announceMethodStart( "validateToRemove" );
//    announceParameter( aUK );
//    announceParameter( aDbCtx );
      erMsgList* testVal = BasicResource::validateToRemove( aUK,
                                         aDbCtx );
//    announceRetVal( testVal );
      announceMethodEnd( "validateToRemove" );
      return( testVal );
   }

   //////////////////////////////////////////////////
   // Member function "rtnLegalTypes"
   // NOTE: may be modified by unit test developers.
   //////////////////////////////////////////////////
      fdInstTypes
   i_BasicResource::rtnLegalTypes(s_BasicResource* aInstance)
   {
      coverage[f_rtnLegalTypes]++;
      announceMethodStart( "rtnLegalTypes" );
      fdInstTypes testVal = aInstance->rtnLegalTypes();
//    announceRetVal( testVal );
      announceMethodEnd( "rtnLegalTypes" );
      return( testVal );
   }
```

```
/////////////////////////////////////////////////////////////////////////////
//
// FILE_NAME: basresci.hh
//
// Copyright 1993 by Marcam Corp., Newton, MA USA
//
// This unpublished copyrighted work contains
// TRADE SECRET information of Marcam Corporation.
//
// Use, transfer, disclosure, or copying without its expressed
// written permission is strictly forbidden.
//
// !IPK
/////////////////////////////////////////////////////////////////////////////

#ifndef i_basrescHH
#define i_basrescHH
#include "idttest.hh"
#include "basresc.hh"


/////////////////////////////////////////////////////////////////////////
// !CLASS_DECL_S
// !LIBRARY I_
// !NAME i_BasicResource
// !TEXT
// Generated 93/12/15 by /us/mott/icg/bin/icg of Dec 15 18:28 (version 2.01)
//
// !AUTHOR       <Author's name>     <(Author's E-mail address)>
// !REVIEWER     <Reviewer's name> <(Reviewer's E-mail address)>
// !REVIEW_DATE <date>
//
// Class under test.  This class is derived from the production
// object.  This provides access to the public and protected member
// functions of the production class, without modification to the
// production class.  Also, pure virtual functions declared in the
// production class are provided an implementation here.  This allows
// production abstract base classes to be instantiated and tested.
/////////////////////////////////////////////////////////////////////////
typedef BasicResource s_BasicResource;


////////////////////////////////////////////////////
// Global enum -- function tags used for
// coverage analysis
////////////////////////////////////////////////////
enum FUNCS
{
   f_close,
   f_create1,
   f_create2,
   f_openForChange,
   f_openForReview,
   f_remove,
   f_save,
   f_saveAs,
   f_validate,
   f_validateToRemove,
   f_rtnLegalTypes,
   TOTAL_FUNCS
```

```
};
dtInt coverage[TOTAL_FUNCS];

///////////////////////////////////////////////////////////////////////
// Inspection class
///////////////////////////////////////////////////////////////////////
class EXPORT i_BasicResource : public idtTest
{
public:

   ///////////////////////////////////////////////////
   // Inspection class constructor.
   ///////////////////////////////////////////////////
   i_BasicResource(
      dtStreamExecutive* aStreamExec,
      dtMemoryExecutive& aMemExec,
      idtTestArgs&       aTestArgs,
      dtMemoryMgr*       aTestMM );

   ///////////////////////////////////////////////////
   // Inspection class destructor.
   ///////////////////////////////////////////////////
   ~i_BasicResource();

   ///////////////////////////////////////////////////
   // Inspection test suite.
   ///////////////////////////////////////////////////
   virtual dtVoid t_LifeCycle();
   virtual dtVoid t_Operators();
   virtual dtVoid t_Semantics();
   virtual dtVoid t_SetQrys();
   virtual dtVoid t_Persist();
   virtual dtVoid qryCoverage( dtInt*& aCovAry, dtInt& aNumFuncs ) const;
   dtVoid setupUKs( fdNameUK* aUK1,
                    fdNameUK* aUK2,
                    fdNameUK* aUK3,
                    dtMemoryMgr* aMM );
   dtVoid setupObj( s_BasicResource* aInstance,
                    dtMemoryMgr* aMM );

   ///////////////////////////////////////////////////
   // static Member function "close"
   ///////////////////////////////////////////////////
   erMsg* close( fdNameUK*    aUK,
                 dbTransCtx*& aDbCtx );

   ///////////////////////////////////////////////////
   // static Member function "create" #1
   ///////////////////////////////////////////////////
      erMsg* create( fdNameUK*          aUK,
                     dbTransCtx*&       aDbCtx,
                     fdSecurityContext aSecurityCtx,
                   dtMemoryMgr*       aMM );
```

```
//////////////////////////////////////////////////
// static Member function "create" #2
//////////////////////////////////////////////////
    erMsg* create( fdNameUK*          aNewUK,
                   fdNameUK*          aOldUK,
                     dbTransCtx*&       aDbCtx,
                     fdSecurityContext aSecurityCtx,
                   dtMemoryMgr*       aMM );

//////////////////////////////////////////////////
// static Member function "openForChange"
//////////////////////////////////////////////////
    erMsg* openForChange( fdNameUK*          aUK,
                            dbTransCtx*&       aDbCtx,
                            fdSecurityContext aSecurityCtx,
                          dtMemoryMgr*       aMM );

//////////////////////////////////////////////////
// static Member function "openForReview"
//////////////////////////////////////////////////
    erMsg* openForReview( fdNameUK*          aUK,
                            dbTransCtx*&       aDbCtx,
                            fdSecurityContext aSecurityCtx,
                          dtMemoryMgr*       aMM );

//////////////////////////////////////////////////
// static Member function "remove"
//////////////////////////////////////////////////
    erMsgList* remove( fdNameUK*          aUK,
                       dbTransCtx*&       aDbCtx,
                       fdSecurityContext aSecurityCtx );

//////////////////////////////////////////////////
// static Member function "save"
//////////////////////////////////////////////////
    erMsgList* save( fdNameUK*          aUK,
                     dbTransCtx*&       aDbCtx,
                     fdSecurityContext aSecurityCtx );

//////////////////////////////////////////////////
// static Member function "saveAs"
//////////////////////////////////////////////////
    erMsgList* saveAs( fdNameUK*          aNewUK,
                     fdNameUK*          aOldUK,
                       dbTransCtx*&       aDbCtx,
                       fdSecurityContext aSecurityCtx,
                     dtMemoryMgr*       aMM );

//////////////////////////////////////////////////
// static Member function "validate"
//////////////////////////////////////////////////
    erMsgList* validate( fdNameUK*    aUK,
                         dbTransCtx*& aDbCtx );
```

```
   ////////////////////////////////////////////////////
   // static Member function "validateToRemove"
   ////////////////////////////////////////////////////
      erMsgList* validateToRemove( fdNameUK*    aUK,
                                   dbTransCtx*& aDbCtx );


   ////////////////////////////////////////////////////
   // Member function "rtnLegalTypes"
   ////////////////////////////////////////////////////
      fdInstTypes rtnLegalTypes(s_BasicResource* aInstance);


private:
   ////////////////////////////////////////////////////
   // Unimplemented CopyCtor and/or AssignOp.
   ////////////////////////////////////////////////////
   i_BasicResource           ( const i_BasicResource& aI_BasicResource );
   i_BasicResource& operator=( const i_BasicResource& aI_BasicResource );
};
#endif // i_basrescHH
```

```
/////////////////////////////////////////////////////////////////////////
//
// FILE_NAME: utgi.cpp
//
// Copyright 1993 by Marcam Corp., Newton, MA USA
//
// This unpublished copyrighted work contains
// TRADE SECRET information of Marcam Corporation.
//
// Use, transfer, disclosure, or copying without
// its expressed written permission is strictly
// forbidden.
//
//
/////////////////////////////////////////////////////////////////////////

#include "utgi.hh"

// Establish an instance of TESTRUN for this class
TESTRUNdeclare(i_utg)
//
// TESTRUN() and testname() are used by the unit test harness
// to run the tests and display the name of the unit test.
//
extern "C" dtInt FAR PASCAL EXPORT testmain( idtTestArgs& aTestArgs )
{
   return( TESTRUN(i_utg)( aTestArgs ) );
}
extern "C" dtChar * FAR PASCAL EXPORT testname()
{
   return( "i_utg" );
}

/////////////////////////////////////////////////////////////////////////
// !CLASS_DECL_S
// !LIBRARY I_ER
// !NAME i_utg
// !TEXT
// Generated 94/04/22 by /newopl/tools/bin/hpux/icg@@/main/20 of Dec 15 18:38
(version 2.01)
//
// !AUTHOR      <Author's name>    <(Author's E-mail address)>
// !REVIEWER    <Reviewer's name> <(Reviewer's E-mail address)>
// !REVIEW_DATE <date>
/////////////////////////////////////////////////////////////////////////

   ///////////////////////////////////////////////////
   // Inspection class constructor.
   ///////////////////////////////////////////////////
   i_utg::i_utg(
      dtStreamExecutive* aStreamExec,
      dtMemoryExecutive& aMemExec,
      idtTestArgs&       aTestArgs,
      dtMemoryMgr*
      ): idtTest( aStreamExec, aMemExec, aTestArgs )
   {
```

```
   for ( int i = 0 ; i < TOTAL_FUNCS ; i++ ) coverage[i] = 0;
}

//////////////////////////////////////////////////
// Inspection class destructor.
//////////////////////////////////////////////////
i_utg::~i_utg()
{
}

//////////////////////////////////////////////////
// Lifecycle testing.
//
// The TLIFE_START and TLIFE_END macros are placed
// around each lifecycle test as these provide the
// open ('{') and close ('}') of a code block
// (allows reuse of variable names). These macros
// announce each test and whether it has
// passed or failed.  They also provide clean
// memory mamangers for each test.  Throughout
// the lifecycle test (between the TLIFE_INIT and
// TLIFE_CLEANUP macros) two memory managers are
// available: mm and mm2.
//////////////////////////////////////////////////
dtVoid
i_utg::t_LifeCycle()
{
   TLIFE_INIT

   // CONSTRUCTOR/DESTRUCTOR TESTING
   //
   // Constructor and destructor testing.  One test must
   // be performed for each constructor.  The basic format
   // is construct the object, announce it, then delete it.
   //

   TLIFE_START( "ctor1 and dtor" )
      s_utg* testobjX = newInstance( mm );
      announceObject( *testobjX );
      deleteInstance( testobjX );
   TLIFE_END

   TLIFE_START( "ctor2 and dtor" )
      s_utg* testobjX = newInstance( aArg1,
     aArg2,
     mm );
      announceObject( *testobjX );
      deleteInstance( testobjX );
   TLIFE_END

   TLIFE_START( "ctor3 and dtor" )
      s_utg* testobjX = newInstance( aArg1,
     aArg2,
     aArg3,
     mm );
      announceObject( *testobjX );
      deleteInstance( testobjX );
```

```
TLIFE_END

// COPY CONSTRUCTOR TESTING
//
// Copy constructor tests.  One test must be performed
// for each copy constructor/constructor combination.
// The format for each test is: construct an object
// using mm, then invoke the copy constructor using
// mm2, delete the original, announce the copy, then
// delete the copy.  This tests copying across memory
// spaces, as well as, incomplete copies and use of
// aliases (shared pointers with no reference counting).
//

TLIFE_START( "Copyctor and ctor1" )
   s_utg* testobjX = newInstance( mm );
   s_utg* testobjY = copyInstance( testobjX, mm2 );
   deleteInstance( testobjX );
   announceObject( *testobjY );
   deleteInstance( testobjY );
TLIFE_END

TLIFE_START( "Copyctor and ctor2" )
   s_utg* testobjX = newInstance( aArg1,
  aArg2,
  mm );
   s_utg* testobjY = copyInstance( testobjX, mm2 );
   deleteInstance( testobjX );
   announceObject( *testobjY );
   deleteInstance( testobjY );
TLIFE_END

TLIFE_START( "Copyctor and ctor3" )
   s_utg* testobjX = newInstance( aArg1,
  aArg2,
  aArg3,
  mm );
   s_utg* testobjY = copyInstance( testobjX, mm2 );
   deleteInstance( testobjX );
   announceObject( *testobjY );
   deleteInstance( testobjY );
TLIFE_END


// ASSIGNMENT OPERATOR TESTING
//
// Similar in nature to the copy constructor testing,
// one test must be performed for each constructor/
// assignment operator combination.  The format is:
// construct objectX using mm, construct objectY
// using mm2, assign objectX to objectY, check for
// equality if that operator is defined, delete
// objectX, announce objectY, delete objectY.
// Additionally, chained assignment (objZ=objY=objX,
// where after the operation objZ == objX) and
// assignment to self (objX=objX, where objX still
// has a value after assignment) must be tested.
//
```

```
TLIFE_START( "ctor1 and operator=" )
   s_utg* testobjX = newInstance( mm );
   s_utg* testobjY = newInstance( mm2 );
   *testobjY = *testobjX;
   checkExpr( *testobjX == *testobjY, currTest );
   deleteInstance( testobjX );
   announceObject( *testobjY );
   deleteInstance( testobjY );
TLIFE_END

TLIFE_START( "ctor2 and operator=" )
   s_utg* testobjX = newInstance( aArg1,
  aArg2,
  mm );
   s_utg* testobjY = newInstance( aArg1,
  aArg2,
  mm2 );
   *testobjY = *testobjX;
   checkExpr( *testobjX == *testobjY, currTest );
   deleteInstance( testobjX );
   announceObject( *testobjY );
   deleteInstance( testobjY );
TLIFE_END

TLIFE_START( "ctor3 and operator=" )
   s_utg* testobjX = newInstance( aArg1,
  aArg2,
  aArg3,
  mm );
   s_utg* testobjY = newInstance( aArg1,
  aArg2,
  aArg3,
  mm2 );
   *testobjY = *testobjX;
   checkExpr( *testobjX == *testobjY, currTest );
   deleteInstance( testobjX );
   announceObject( *testobjY );
   deleteInstance( testobjY );
TLIFE_END

TLIFE_START( "Chained assignment" )
   s_utg* testobjX = newInstance( mm );
   s_utg* testobjY = newInstance( mm2 );
   s_utg* testobjZ = newInstance( mm );
   *testobjZ = *testobjY = *testobjX;
   checkExpr( *testobjZ == *testobjY, currTest );
   deleteInstance( testobjX );
   deleteInstance( testobjY );
   announceObject( *testobjZ );
   deleteInstance( testobjZ );
TLIFE_END

TLIFE_START( "Assignment to self" )
   s_utg* testobjX = newInstance( mm );
//!FIX   s_utg* testobjY = copyInstance( testobjX, mm );  // <--- copy X's value
   oper_as( testobjX, testobjX );
//!FIX   checkExpr( oper_eq( testobjY, testobjX) );  // <-- check that value is
unchanged
   announceObject( *testobjX );
   deleteInstance( testobjX );
```

```
   TLIFE_END

   TLIFE_CLEANUP;
}


//////////////////////////////////////////////////
// Operators testing.
//
// All operators are tested here.
// The entire set of operators has been broken
// into like categories for ease of testing.
//
// Between the T_INIT and T_CLEANUP macros the
// memory manager variable mm is available for
// constructing test objects. Each individual
// test must be surrounded by the TEST_START and
// TEST_END macros, or alternately, the test
// itself can be performed within a TEST macro.
//////////////////////////////////////////////////
dtVoid
i_utg::t_Operators()
{
   T_INIT( "t_Operators" )

   //!FIX The following must be tested from your production class:
   //
   operator dtULong() const;
   utg& operator += ( dtInt aRhs);
   dtChar operator [] ( dtInt aIndex ) const;

   // COMPARISON OPERATORS: < > <= >= == !=
   // ARITHMETIC OPERATORS: + - * / % ++ --
   // LOGICAL OPERATORS: || && !
   // BITWISE OPERATORS: ^ | & ~ << >>
   // EXTENDED ASSIGNMENT OPERATORS: += -= *= /= %= ^= |= &= <<= >>=
   // CONVERSION OPERATORS:  type()
   // MISCELLANEOUS AND GLOBAL OPERATORS

   T_CLEANUP
}


//////////////////////////////////////////////////
// Set and Query testing.
//
// The set and query member functions are tested
// here.  If your class under test contains
// values that do not require being set first,
// then test the query methods for those values
// before testing the corresponding set methods.
//
// Between the T_INIT and T_CLEANUP macros the
// memory manager variable mm is available for
// constructing test objects. Each individual
// test must be surrounded by the TEST_START and
// TEST_END macros, or alternately, the test
// itself can be performed within a TEST macro.
//////////////////////////////////////////////////
dtVoid
```

```
i_utg::t_SetQrys()
{
   T_INIT( "t_SetQrys" )

   //!FIX The following must be tested from your production class:
   /*
   virtual dtBoolean setID( const dtULong aID,
                           const dtChar* const aName = (const dtChar* const)
NULL );
   */

   // QUERY TESTS
   // SET TESTS

   T_CLEANUP
}


/////////////////////////////////////////////////
// Semantics testing.
//
// These tests are for those member functions
// unique to the production class.
//
// Between the T_INIT and T_CLEANUP macros the
// memory manager variable mm is available for
// constructing test objects. Each individual
// test must be surrounded by the TEST_START and
// TEST_END macros, or alternately, the test
// itself can be performed within a TEST macro.
/////////////////////////////////////////////////
dtVoid
i_utg::t_Semantics()
{
   T_INIT( "t_Semantics" )

   //!FIX Add your semantic member function tests here.

   T_CLEANUP
}


/////////////////////////////////////////////////
// Persistence testing.
//
// This tests behavior specific to the persistence
// member functions of a production class.
//
// Between the T_INIT and T_CLEANUP macros the
// memory manager variable mm is available for
// constructing test objects. Each individual
// test must be surrounded by the TEST_START and
// TEST_END macros, or alternately, the test
// itself can be performed within a TEST macro.
/////////////////////////////////////////////////
dtVoid
i_utg::t_Persist()
{
   T_INIT( "t_Persist" )
```

```
    // There is no t_Persist testing for non IPKs
    // If this is missing, read about Persistent Kinds in
    // /newopl/tools/doc/icg/cookbook.fm.

    T_CLEANUP
}


/////////////////////////////////////////////////
// Return coverage information.
//
// NOTE: This is not to be modified by unit
//       test developers.
/////////////////////////////////////////////////
dtVoid
i_utg::qryCoverage(
    dtInt*& aCovAry,
    dtInt&  aNumFuncs
    ) const
{
    aCovAry = coverage;
    aNumFuncs = TOTAL_FUNCS;
}


/////////////////////////////////////////////////
// Constructor for class under inspection. #1
// NOTE: may be modified by unit test developers.
/////////////////////////////////////////////////
s_utg*
i_utg::newInstance( dtMemoryMgr* aMemMgr )
{
    coverage[f_newInstance1]++;
    announceMethodStart( "newInstance1" );
//  announceParameter( aMemMgr );
    s_utg* testVal = new (aMemMgr) s_utg( aMemMgr );
//  announceRetVal( testVal );
    announceMethodEnd( "newInstance1" );
    return( testVal );
}


/////////////////////////////////////////////////
// Constructor for class under inspection. #2
// NOTE: may be modified by unit test developers.
/////////////////////////////////////////////////
s_utg*
i_utg::newInstance( dtULong             aArg1,
      const dtChar* const aArg2,
      dtMemoryMgr*        aMemMgr )
{
    coverage[f_newInstance2]++;
    announceMethodStart( "newInstance2" );
//  announceParameter( aArg1 );
//  announceParameter( aArg2 );
//  announceParameter( aMemMgr );
    s_utg* testVal = new (aMemMgr) s_utg( aArg1,
      aArg2,
      aMemMgr );
//  announceRetVal( testVal );
```

```
   announceMethodEnd( "newInstance2" );
   return( testVal );
}

//////////////////////////////////////////////////
// Constructor for class under inspection. #3
// NOTE: may be modified by unit test developers.
//////////////////////////////////////////////////
s_utg*
i_utg::newInstance( dtULong             aArg1,
      const dtChar* const aArg2,
      dtInt                     aArg3,
      dtMemoryMgr*        aMemMgr )
{
   coverage[f_newInstance3]++;
   announceMethodStart( "newInstance3" );
//    announceParameter( aArg1 );
//    announceParameter( aArg2 );
//    announceParameter( aArg3 );
//    announceParameter( aMemMgr );
   s_utg* testVal = new (aMemMgr) s_utg( aArg1,
     aArg2,
     aArg3,
     aMemMgr );
//    announceRetVal( testVal );
   announceMethodEnd( "newInstance3" );
   return( testVal );
}

//////////////////////////////////////////////////
// Copy constructor for class under inspection.
// NOTE: may be modified by unit test developers.
//////////////////////////////////////////////////
s_utg*
i_utg::copyInstance( s_utg* aInstance,
     dtMemoryMgr* aMemMgr)
{
   coverage[f_copyInstance]++;
   announceMethodStart( "copyInstance" );
//    announceParameter( aUtg );
//    announceParameter( aMemMgr );
   s_utg* testVal = new (aMemMgr) s_utg(*aInstance, aMemMgr);
//    announceRetVal( testVal );
   announceMethodEnd( "copyInstance" );
   return( testVal );
}

//////////////////////////////////////////////////
// Destructor for class under inspection.
// NOTE: may be modified by unit test developers.
//////////////////////////////////////////////////
dtVoid
i_utg::deleteInstance(s_utg* aInstance)
{
   coverage[f_deleteInstance]++;
   announceMethodStart( "deleteInstance" );
   delete aInstance;
```

```
      announceMethodEnd( "deleteInstance" );
   }


   //////////////////////////////////////////////////
   // "oper_as" tests "operator="
   // NOTE: may be modified by unit test developers.
   //////////////////////////////////////////////////
   s_utg&
   i_utg::oper_as ( s_utg* aInstance, const s_utg& aRhs )
   {
      coverage[f_oper_as]++;
      announceMethodStart( "oper_as" );
//    announceParameter( aRhs );
      s_utg& testVal = aInstance->operator= ( aRhs );
//    announceRetVal( testVal );
      announceMethodEnd( "oper_as" );
      return( testVal );
   }


   //////////////////////////////////////////////////
   // "oper_dtULong" tests "operator dtULong"
   // NOTE: may be modified by unit test developers.
   //////////////////////////////////////////////////
   dtULong
   i_utg::oper_dtULong(s_utg* aInstance)
   {
      coverage[f_oper_dtULong]++;
      announceMethodStart( "oper_dtULong" );
      dtULong testVal = aInstance->operator dtULong();
//    announceRetVal( testVal );
      announceMethodEnd( "oper_dtULong" );
      return( testVal );
   }


   //////////////////////////////////////////////////
   // "oper_apl" tests "operator +="
   // NOTE: may be modified by unit test developers.
   //////////////////////////////////////////////////
   s_utg&
   i_utg::oper_apl ( s_utg* aInstance, dtInt aRhs)
   {
      coverage[f_oper_apl]++;
      announceMethodStart( "oper_apl" );
//    announceParameter( aRhs );
      s_utg& testVal = aInstance->operator += ( aRhs);
//    announceRetVal( testVal );
      announceMethodEnd( "oper_apl" );
      return( testVal );
   }


   //////////////////////////////////////////////////
   // static Member function "openForRead"
   // NOTE: may be modified by unit test developers.
   //////////////////////////////////////////////////
   erStatus
   i_utg::openForRead( s_utg*& aUtg, dtMemoryMgr* aMM)
```

```
    {
       coverage[f_openForRead]++;
       announceMethodStart( "openForRead" );
//     announceParameter( aUtg );
//     announceParameter( aMM );
       erStatus testVal = utg::openForRead( aUtg, aMM);
//     announceRetVal( testVal );
       announceMethodEnd( "openForRead" );
       return( testVal );
    }

    //////////////////////////////////////////////////
    // "oper_vc" tests "operator []"
    // NOTE: may be modified by unit test developers.
    //////////////////////////////////////////////////
    dtChar
    i_utg::oper_vc( s_utg* aInstance, dtInt aIndex )
    {
       coverage[f_oper_vc]++;
       announceMethodStart( "oper_vc" );
//     announceParameter( aIndex );
       dtChar testVal = aInstance->operator []( aIndex );
//     announceRetVal( testVal );
       announceMethodEnd( "oper_vc" );
       return( testVal );
    }

    //////////////////////////////////////////////////
    // virtual Member function "setID"
    // NOTE: may be modified by unit test developers.
    //////////////////////////////////////////////////
    dtBoolean
    i_utg::setID( s_utg* aInstance, const dtULong aID,
                              const dtChar* const aName )
    {
       coverage[f_setID]++;
       announceMethodStart( "setID" );
//     announceParameter( aID );
//     announceParameter( aName );
       dtBoolean testVal = aInstance->setID( aID,
                              aName );
//     announceRetVal( testVal );
       announceMethodEnd( "setID" );
       return( testVal );
    }

    //////////////////////////////////////////////////
    // Nonclass function "export"
    // NOTE: may be modified by unit test developers.
    //////////////////////////////////////////////////
dtBoolean
i_utg_export( idtTest* testObj, const s_utg& aUtg )
    {
       coverage[f_i_utg_export]++;
       testObj->announceMethodStart( "i_utg_export" );
//     testObj->announceParameter( aUtg );
       dtBoolean testVal = export( aUtg );
```

```
//     testObj->announceRetVal( testVal );
       testObj->announceMethodEnd( "i_utg_export" );
       return( testVal );
   }


   ///////////////////////////////////////////////////
   // "i_utg_oper_pl" tests Nonclass "operator+"
   // NOTE: may be modified by unit test developers.
   ///////////////////////////////////////////////////
s_utg&
i_utg_oper_pl( idtTest* testObj, const s_utg& aLhs, const s_utg& aRhs )
   {
       coverage[f_i_utg_oper_pl]++;
       testObj->announceMethodStart( "i_utg_oper_pl" );
//     testObj->announceParameter( aLhs );
//     testObj->announceParameter( aRhs );
       s_utg& testVal = (s_utg&)operator+( aLhs, aRhs );
//     testObj->announceRetVal( testVal );
       testObj->announceMethodEnd( "i_utg_oper_pl" );
       return( testVal );
   }
```

```
//////////////////////////////////////////////////////////////////////
//
// FILE_NAME: utgi.hh
//
// Copyright 1993 by Marcam Corp., Newton, MA USA
//
// This unpublished copyrighted work contains
// TRADE SECRET information of Marcam Corporation.
//
// Use, transfer, disclosure, or copying without
// its expressed written permission is strictly
// forbidden.
//
//
//////////////////////////////////////////////////////////////////////

#ifndef i_utgHH
#define i_utgHH
#include "idttest.hh"
#include "utg.hh"

//////////////////////////////////////////////////////////////////////
// :CLASS_DECL_S
// !LIBRARY I_ER
// !NAME i_utg
// :TEXT
// Generated 94/04/22 by /newopl/tools/bin/hpux/icg@@/main/20 of Dec 15 18:38
(version 2.01)
//
// !AUTHOR      <Author's name>    <(Author's E-mail address)>
// :REVIEWER    <Reviewer's name> <(Reviewer's E-mail address)>
// :REVIEW_DATE <date>
//
// Class under test. This class is derived from the production
// object. This provides access to the public and protected member
// functions of the production class, without modification to the
// production class. Also, pure virtual functions declared in the
// production class are provided an implementation here. This allows
// production abstract base classes to be instantiated and tested.
//////////////////////////////////////////////////////////////////////
class s_utg : public utg
{
public:
   friend class i_utg;

   ///////////////////////////////////////////////////
   // Inline constructor for replicating the
   // production class interface.
   ///////////////////////////////////////////////////
   s_utg( dtMemoryMgr* aMemMgr ) : utg( aMemMgr ){}

   ///////////////////////////////////////////////////
   // Inline constructor for replicating the
   // production class interface.
   ///////////////////////////////////////////////////
   s_utg( dtULong              aArg1,
```

```
        const dtChar* const aArg2,
        dtMemoryMgr*        aMemMgr ) : utg( aArg1,
        aArg2,
        aMemMgr ){}

    //////////////////////////////////////////////////
    // Inline constructor for replicating the
    // production class interface.
    //////////////////////////////////////////////////
    s_utg( dtULong              aArg1,
        const dtChar* const aArg2,
        dtInt                    aArg3,
        dtMemoryMgr*        aMemMgr ) : utg( aArg1,
        aArg2,
        aArg3,
        aMemMgr ){}

    //////////////////////////////////////////////////
    // Inline copy constructor for replicating the
    // production class interface.
    //////////////////////////////////////////////////
    s_utg(const s_utg&      aUtg,
       dtMemoryMgr* aMemMgr=(dtMemoryMgr*)NULL) : utg(aUtg,
       aMemMgr){}

    //////////////////////////////////////////////////
    // Inline assignment operator for replicating the
    // production class interface.
    //////////////////////////////////////////////////
    s_utg& operator= ( const s_utg& aRhs )
    {
       utg::operator= ( aRhs );
       return *this;
    }

    //////////////////////////////////////////////////
    // Provide an implementation for pure virtual
    // function declared by the production class.
    //////////////////////////////////////////////////
    virtual dtULong rtnID() const ;
    //!FIX { If this is called you need to add code here }
};

//////////////////////////////////////////////////
// Global enum -- function tags used for
// coverage analysis
//////////////////////////////////////////////////
enum FUNCS
{
    f_newInstance1,
    f_newInstance2,
    f_newInstance3,
    f_copyInstance,
    f_deleteInstance,
    f_oper_as,
```

```
   f_oper_dtULong,
   f_oper_apl,
   f_openForRead,
   f_oper_vc,
   f_setID,
   f_i_utg_export,
   f_i_utg_oper_pl,
   TOTAL_FUNCS
};
dtInt coverage[TOTAL_FUNCS];

/////////////////////////////////////////////////////////////////////
// Inspection class
/////////////////////////////////////////////////////////////////////
class EXPORT i_utg : public idtTest
{
public:

   //////////////////////////////////////////////////
   // Inspection class constructor.
   //////////////////////////////////////////////////
   i_utg(
      dtStreamExecutive* aStreamExec,
      dtMemoryExecutive& aMemExec,
      idtTestArgs&       aTestArgs,
      dtMemoryMgr*       aTestMM );

   //////////////////////////////////////////////////
   // Inspection class destructor.
   //////////////////////////////////////////////////
   ~i_utg();

   //////////////////////////////////////////////////
   // Inspection test suite.
   //////////////////////////////////////////////////
   virtual dtVoid t_LifeCycle();
   virtual dtVoid t_Operators();
   virtual dtVoid t_Semantics();
   virtual dtVoid t_SetQrys();
   virtual dtVoid t_Persist();
   virtual dtVoid qryCoverage( dtInt*& aCovAry, dtInt& aNumFuncs ) const;

   //////////////////////////////////////////////////
   // Constructor for class under inspection. #1
   //////////////////////////////////////////////////
   s_utg* newInstance( dtMemoryMgr* aMemMgr );

   //////////////////////////////////////////////////
   // Constructor for class under inspection. #2
   //////////////////////////////////////////////////
   s_utg* newInstance( dtULong             aArg1,
        const dtChar* const aArg2,
        dtMemoryMgr*        aMemMgr );
```

```
//////////////////////////////////////////////////
// Constructor for class under inspection. #3
//////////////////////////////////////////////////
s_utg* newInstance( dtULong              aArg1,
     const dtChar* const aArg2,
     dtInt                    aArg3,
     dtMemoryMgr*        aMemMgr );

//////////////////////////////////////////////////
// Copy constructor for class under inspection.
//////////////////////////////////////////////////
s_utg* copyInstance( s_utg* aInstance,
    dtMemoryMgr* aMemMgr=(dtMemoryMgr*)NULL);

//////////////////////////////////////////////////
// Destructor for class under inspection.
//////////////////////////////////////////////////
dtVoid deleteInstance(s_utg* aInstance);

//////////////////////////////////////////////////
// "oper_as" tests "operator="
//////////////////////////////////////////////////
s_utg& oper_as ( s_utg* aInstance, const s_utg& aRhs );

//////////////////////////////////////////////////
// "oper_dtULong" tests "operator dtULong"
//////////////////////////////////////////////////
dtULong oper_dtULong(s_utg* aInstance);

//////////////////////////////////////////////////
// "oper_apl" tests "operator +="
//////////////////////////////////////////////////
s_utg& oper_apl ( s_utg* aInstance, dtInt aRhs);

//////////////////////////////////////////////////
// static Member function "openForRead"
//////////////////////////////////////////////////
erStatus openForRead( s_utg*& aUtg, dtMemoryMgr* aMM);

//////////////////////////////////////////////////
// "oper_vc" tests "operator []"
//////////////////////////////////////////////////
dtChar oper_vc( s_utg* aInstance, dtInt aIndex );

//////////////////////////////////////////////////
// virtual Member function "setID"
//////////////////////////////////////////////////
dtBoolean setID( s_utg* aInstance, const dtULong aID,
                             const dtChar* const aName = (const dtChar* const)
NULL );
```

```
private:
   ////////////////////////////////////////////////////
   // Unimplemented CopyCtor and/or AssignOp.
   ////////////////////////////////////////////////////
   i_utg           ( const i_utg& aI_utg );
   i_utg& operator=( const i_utg& aI_utg );
};

   ////////////////////////////////////////////////////
   // Nonclass function "export"
   ////////////////////////////////////////////////////
dtBoolean i_utg_export( idtTest* testObj, const s_utg& aUtg );

   ////////////////////////////////////////////////////
   // "i_utg_oper_pl" tests Nonclass "operator+"
   ////////////////////////////////////////////////////
s_utg& i_utg_oper_pl( idtTest* testObj, const s_utg& aLhs, const s_utg& aRhs );
#endif // i_utgHH
```

FILE NAME: icg

```
#!/usr/bin/awk -f
#
# Copyright 1993 by Marcam Corp., Newton, MA USA
#
# This unpublished copyrighted work contains
# TRADE SECRET information of Marcam Corporation.
#
# Use, transfer, disclosure, or copying without its
# expressed written permission is strictly forbidden.


# Inspection Class Generator
#
# by Greg Mott
#
# 93/07/16 icg@@/main/1        mott  from Reed/Dalton/Mott design sessions
# 93/09/24 icg@@/main/4   beta mott  Dalton requirements doc
# 93/10/03 icg@@/main/5        mott  ignores nested and fwd ref class statements
# 93/10/15 icg@@/main/6        mott  default ../ut/<name>i, func name finder fix
# 93/11/02 icg@@/main/7   1    mott  per Dalton reqs plus some improvments
# 93/11/06 icg@@/main/8   1.1  mott  completes handling of dtCore types
# 93/11/12 icg@@/main/9   2.B0 mott  persistent types
# 93/11/16 icg@@/main/10  2.B1 mott  averts dtVoid assignments
# 93/11/17 icg@@/main/11  2.B2 mott  ctor lifecycle tests match ctors
# 93/11/17 icg@@/main/12  2.B3 mott  fixed path search and #define...\
# 93/11/18 icg@@/main/13  2.B4 mott  AssignOp tests matched to ctors
# 93/11/18 icg@@/main/14  2.B5 mott  subclass AssignOp now generated
# 93/11/19 icg@@/main/15  2.B6 mott  pure virtual and assign op fixes
# 93/11/20 icg@@/main/16  2.B7 mott  matches IPK ref in cookbook
# 93/11/23 icg@@/main/17  2.B8 mott  SetQrys list only set/get/init/rtn/put/qry
# 93/12/01 icg@@/main/18  2.B9 mott  SetQrys list enclosed in comments
# 93/12/10 icg@@/main/19  2.0  mott  is** also listed in t_SetQrys
# 93/12/15 icg@@/main/20  2.01 mott  new user key stuff, new assignop test


# usagx -- error/usage message, exit
function usagx(ermsg){
   print ermsg"\nUsage:\n"ARGV[0]" [idr/]inam[.iex] [-o [odr/][onam]]"
   print"   .iex   defaults to .hh"
   print"   onam   defaults to <inam>i"
   print"   idr/   defaults to ./"
   print"   odr/   defaults to <idr/>../ut/"
   exit
}

# "Main" section -- setup regular expressions, call program subsections
BEGIN{
   icgver="2.01"    # icg's version (MAKE SURE THIS UP TO DATE!)

   az="[a-zA-Z0-9_]*"                    # regexp for optional alpha/numeric/_
   AZ="[a-zA-Z0-9_]+"                    # regexp for required alpha/numeric/_
   sp="[      \n]*"               # regexp for optional white space
   SP="[      \n]+"               # regexp for required white space
   DL="[][(){}<>,.!|&-=+*/%^~      \n]"   # regexp for delimiter

   icgargs()        # grab icg's args
   outflag="s_"            # enable output of filehead/subclass/lifecycle
   timever()        # get timestamp & icg's version, test output
   filehead()       # read/modify/copy file headers
   icg()            # generate subclass/lifecycle, tally function names
```

```
   rewhh()            # rewind input
   outflag="i_"             # end funcname tally, enable output of i_class
   resov()            # reset overload counts
   penum()            # output enum
   resov()            # reset overload counts
   icg()              # generate inspection class
   filefoot()         # output file footer
   exit                     # that's it!
}

# icg -- generate everything, output conditional on "outflag"
function icg(){
   clanm=""
   while(getstmt()){                    # get outermost statements in file
      if (clas()) continue          # handle class statement
      funct("i_"clanm"_")           # handle nonclass functions
   }
}

# clas -- handle class statement
function clas(){
   if ($1!="class") return 0                      # class?
   if (substr($0,length,1)!="{") return 0       # {?
   if ($2!="EXPORT") {clanm=$2} else {clanm=$3} # grab class name
   clanm=getmatch(clanm,AZ)                         # separate from :
   clashead()                     # output class header
   while(getstmt()){                    # get statements within class
      if ($1 ~ /^public:/)     {access=$1;sub(sp$1sp"\n","")}       # public:
      if ($1 ~ /^protected:/) {access=$1;sub(sp$1sp"\n","")}       # protected:
      if ($1 ~ /^private:/)    {access=$1;sub(sp$1sp"\n","")}       # private:
      funct("")                     # handle class functions
   }
   access=""                      # access only applies within class
   clasfoot()                     # output class footer
}

# funct -- handle function, ignore any other statement
function funct(i__){
   args=index($0,"(")                   # look for () before {}
   fullstmt($0)                         # get whole {} if any
   if (!args) return                    # ignore data or enum
   if (access~/^private:/) return       # ignore if access is private
   if (access~/^protected:/ && ipk) return# ignore if protected and persist
   ofunc=$0                       # remember unmodified function
   while (match(" "$0,DL clanm DL))     # prepend s_ on each clanm
      $0=substr($0,1,RSTART-1)"s_"substr($0,RSTART)
   parsfunc()                     # parse function into parts
   if (igfun()) return                  # ignore certain functions
   membf(i__)                     # handle member/nonclass
   stati()                        # handle static/nonstatic
   if (virtu()) return                  # handle virtual, rtn if pure
   if (cdtor()) {                 # handle con/de/structors
   }else if (opera()) {                 # handle operators
   }else otherfn()                # handle other functions
   funcbody()                     # emit result
}
# igfun -- return true if this function should be ignored
function igfun(){
   if (funam=="dump") return 1          # always ignore dump()
   if (!ipk)          return 0          # only ignore others if IPK
```

```
   if (funam=="postCreate"        ) return 1
   if (funam=="postValidate"      ) return 1
   if (funam=="preValidate"       ) return 1
   if (funam=="postValidateToRemove"      ) return 1
   if (funam=="preValidateToRemove"       ) return 1
   if (funam=="preSave"           ) return 1
   if (funam=="postSave"          ) return 1
   if (funam=="preSaveAs"         ) return 1
   if (funam=="postSaveAs"        ) return 1
   if (funam=="preClose"          ) return 1
   if (funam=="preRemove"         ) return 1
   if (funam=="preOpenForChange"  ) return 1
   if (funam=="postOpenForChange") return 1
   if (funam=="preOpenForReview"  ) return 1
   if (funam=="postOpenForReview") return 1
   return 0
}

# getstmt -- return true with statement thru ; or { in $0
#             "leftover" contains anything beyond
#             "leadlines" contains any leading linefeeds
#            return false upon ending } or EOF
# fullstmt -- if {, expand thru matching }
#
function fullstmt(part){
   if (substr($0,length,1)!="{") return $0     # no {
   part=$0
   while(getstmt()){                            # get nested stmts until }
      part=part leadlines               # preserve spacing
      part=part fullstmt($0)                    # add stmt, recurse if {}
   }
   $0=part$0                            # include final }
   return $0
}
function getstmt(){
   leadlines=""
   $0=leftover
   while(1){
      first=0
            findfirst(1,";")                    # look for ;
            findfirst(1,"{")                    #       or {
      irbra=findfirst(1,"}")                    #       or }
      if (i=r=first){                           # any?
        if (i==irbra){                              # }?
           if (i>1) i--                        # return what preceeds }
           else r=0                            # then return the }
        }
        leftover=substr($0,i+1)             # keep leftover
        $0=substr($0,1,i)                   # return stmt
        return r                            # true unless }
      }
      if (!gothh){                      # EOF?
        leftover=""                         # no leftover
        return $1!=""                              # true if anything in
      }
      partstmt=$0                       # keep partial stmt
      if ($1=="") partstmt=""                   # if blank make null
      for (leftover=""; gethh(); leftover=substr($0,1,length-1)) {# get line
        $0=leftover$0                           # combine if \
        if ($1 !~ /^#/) break                   # pp line?
```

```
      if (substr($0,length) == "\\") continue# combine if \
      $0=partstmt                      # ignore pp line
      leftover=""
      return 1                         # flush anything that preceeded
    }
    comment()                                   # purge comments
    if (partstmt=="") leadlines=leadlines"\n"      # leading linefeeds
    else $0=partstmt"\n"$0                      # add line to stmt
  }
}
# comment -- strip comments
function comment(){
  if ($1$2=="//!LIBRARY") {library=$3}          # // !LIBRARY <library>
  while(1){
    first=0
    ixcmt=findfirst(1,"//")                     # look for //
    ilcmt=findfirst(1,"/*")                     #      or /*
    if (!first) return                 # either?
    if (ixcmt==first) $0=substr($0,1,ixcmt-1)       # remove //
    else{                              # /* ...
      partline=substr($0,1,ilcmt-1)             # before /*
      $0=substr($0,ilcmt+2)
      while(0==ircmt=index($0,"*/")) if (!gethh()) return # read if no */
      $0=partline substr($0,ircmt+2)            # /*...*/ removed
    }
  }
}

# parsfunc -- returns funam = function name
#                     futyp = function type
#                     fulsp = leading space
#                     args = the complete arglist
#                    fuaal = everything after the arglist
#                        argl = list of arg names only
#                        argS = list of arg types and names (no defaults)
#                      argn = number of args
#                    arg[] = vector of arg names
#                   argt[] = vector of arg types
#                   memarg = argname of arg with type dtMemoryMgr
# parfnam -- parse function name
# parfargs -- parse function args
function parsfunc(){
  args=argS=argl=getmatch($0,sp"\("sp) # beginning ( with white space
  ity=RSTART+RLENGTH                   # after (
  parfnam(substr($0,1,RSTART-1)) # parse before (
  parfargs()                   # parse ( ... )
  fuaal=substr($0,irpar+1)             # after )
}
function parfnam(s){
  if (match(" "s" ",DL"operator"DL)) {
    futyp=substr(s,1,RSTART-1) # before operator
    funam=substr(s,RSTART)             # operator and after
    sub(SP"const"SP," ",funam) # remove const after operator
  }else{
    funam=getmatch(s,"~?"AZ"$") # optional ~ and last word
    futyp=substr(s,1,RSTART-1) # before that
  }
  fulsp=getmatch(futyp,sp)             # leading space
  futyp=substr(futyp,RSTART+RLENGTH)   # after that
}
```

```
function parfargs(){
   argn=0
   for (i=ity;; ity=i) {                        # loop for each arg
      for (;; i=matchlist(i)+RLENGTH) {              # bypass any ()
        first=0
        ilpar=findfirst(i,"(")                          # look for (
              findfirst(i,"=")                          #       or =
              findfirst(i,",")                          #       or ,
              findfirst(i,")")                          #       or )
        if (!first) return                      # none found
        if (first!=ilpar) break                 # break if = or , or )
      }
      dlim=substr($0,first,1)                        # = or , or )
      s=getmatch(substr($0,i),AZ sp"\\"dlim)         # argname & delim
      if (s!="") argn++                              # an arg?
      argt[argn]=substr($0,ity,i-1+RSTART-ity)        # argtype
      arg [argn]=getmatch(s,AZ)                       # argname alone
      if (argt[argn] ~ "^dtMemoryMgr"DL) memarg=arg[argn]
      for (;; i=matchlist(i)+RLENGTH) {              # bypass any ()
        first=0
        ilpar=findfirst(i,"(")                          # look for (
              findfirst(i,",")                          #       or ,
        irpar=findfirst(i,")")                          #       or )
        if (!first) return                      # none found
        if (first!=ilpar) break                 # break if , or )
      }
      dlim=substr($0,first,1)                        # , or )
      if (dlim==",") Dlim=getmatch(substr($0,i),sp"\\"dlim sp)
      else           Dlim=getmatch(substr($0,i),sp"\\"dlim)
      i+=RSTART+RLENGTH-1                       # after Dlim
      args=args substr($0,ity,i-ity)              # accumulate args
      argS=argS argt[argn] arg[argn] Dlim         # accumulate argS
      argl=argl            arg[argn] Dlim         # accumulate argl
      if (dlim==")") return                       # return after )
   }
}
# matchlist -- begin looking at i,
#            return RSTART = index of (, even if no matching )
#                   RLENGTH = length thru matching )
function matchlist(i){
   nest=0
   RSTART=index(substr($0,i),"(") # ( index in substr
   if (!RSTART) return RLENGTH=0  # ( exist?
   RSTART+=i-1                       # ( index in $0
   for (i=RSTART+1;; i=first+1) {# loop for each ( or )
      first=0
      ilpar=findfirst(i,"(")              # look for (
      irpar=findfirst(i,")")              #       or )
      if (!first) {              # neither found
        RLENGTH=0
        return RSTART
      }
      if (first==ilpar) nest++             # another (
      else if (nest)    nest--             # matching )
      else{                      # final )
        RLENGTH=irpar+1-RSTART
        return RSTART
      }
   }
}
```

```
# findfirst -- find first occurrence at or after "i" of current or previous "s"
function findfirst(i,s){
   j=index(substr($0,i),s)             # index at or after i of s
   if (!j) return 0                    # an occurrence?
   if (i+j-1<first || !first) first=i+j-1      # is it first?
   return i+j-1                                # return index in $0
}

# membf -- handle member/nonclass
# stati -- handle static/nonstatic
# virtu -- handle virtual, return true if pure
function membf(i__){
   i_fnm=i__                        # insp class fn name prefix
   if (i__=="") {                   # member fn?
      headc="Member function \""funam"\""
      newarg="s_"clanm"* aInstance"
      ccfp="\n   i_"clanm"::"
      tj=""
      actfp=actop="aInstance->"
   }else{                           # nonmember fn
      headc="Nonclass function \""funam"\""
      newarg="idtTest* testObj"
      ccfp="\n"
      tj="testObj->"
      actop="(s_"clanm"&)"
      actfp=""
   }
}
function stati(){
   if ($1 == "static") {            # static?
      headc=$1" "headc                       # put static in header
      sub($1sp,"",futyp)            # remove static
      newarg=""                              # no new arg
      sub("aInstance->",clanm"::",actop)
      sub("aInstance->",clanm"::",actfp)
   }else{                           # non static
      if (argn) newarg=newarg", "   # comma if other args
   }
}
function virtu(){
   if ($1 != "virtual") return 0 # virtual?
   headc=$1" "headc              # put virtual in header
   sub($1sp,"",futyp)                    # remove virtual
   if (fuaal ~ "="sp"0"sp";") {          # pure?
      purevirt()
      return 1
   }
   return 0
}

# opera -- handle operators, return false if not an operator
function opera(){
   if (opt("!"     ,"nt"  )) return 1           # map ops to ARM names
   if (opt("!="    ,"ne"  )) return 1
   if (opt("%"     ,"md"  )) return 1
   if (opt("%="    ,"amd" )) return 1
   if (opt("&"     ,"ad"  )) return 1
   if (opt("&&"    ,"aa"  )) return 1
   if (opt("&="    ,"aad" )) return 1
   if (opt(","     ,"cm"  )) return 1
```

```
   if (opt("-"     ,"mi"  )) return 1
   if (opt("--"    ,"mm"  )) return 1
   if (opt("-="    ,"ami" )) return 1
   if (opt("->"    ,"rf"  )) return 1
   if (opt("/"     ,"dv"  )) return 1
   if (opt("/="    ,"adv" )) return 1
   if (opt("<"     ,"lt"  )) return 1
   if (opt("<<"    ,"ls"  )) return 1
   if (opt("<<="   ,"als" )) return 1
   if (opt("<="    ,"le"  )) return 1
   if (opt("="     ,"as"  )) return 1
   if (opt("=="    ,"eq"  )) return 1
   if (opt(">"     ,"gt"  )) return 1
   if (opt(">="    ,"ge"  )) return 1
   if (opt(">>"    ,"rs"  )) return 1
   if (opt(">>="   ,"ars" )) return 1
   if (opt("^"     ,"er"  )) return 1
   if (opt("^="    ,"aer" )) return 1
   if (opt("~"     ,"co"  )) return 1
   if (opt("\+"    ,"pl"  )) return 1
   if (opt("\+\+"  ,"pp"  )) return 1
   if (opt("\+="   ,"apl" )) return 1
   if (opt("\*"    ,"ml"  )) return 1
   if (opt("\*="   ,"amu" )) return 1
   if (opt("->\*"  ,"rm"  )) return 1
   if (opt("\|"    ,"or"  )) return 1
   if (opt("\|="   ,"aor" )) return 1
   if (opt("\|\|"  ,"oo"  )) return 1
   if (opt("\[\]"  ,"vc"  )) return 1
   if (opt(AZ".*"  ,"cast")) return 1
   return 0
}
function opt(op,enc){
   if (funam !~ "^operator"sp op"$") return 0  # this op?
   if (enc=="cast") {                          # cast?
      futyp=funam" ";sub("operator"SP,"",futyp)        # name becomes type
      i_fnm=i_fnm"oper_"getmatch(futyp,AZ)       # leave nonAZ off name
   }else{                              # non cast
      i_fnm=i_fnm"oper_"enc
   }
   headc="\""i_fnm"\" tests "headc
   sub("(Member )?function ","",headc)
   action=futyp"testVal = "actop funam argl
   return 1
}
# cdtor -- handle con/de/structors, return false if neither
function cdtor(){
   if (funam !~ "^~?s_"clanm"$") return 0      # con/de/structor?
   sub("(Member )?func.*","Constructor for class under inspection.",headc)
   if (funam ~ "^~") {dtor();return 1}         # destructor
   newarg=""
   if (match(argS,DL"s_"clanm sp"&")) {        # copy constructor?
      copyc="copy "
      sub("Con","Copy con",headc)
      i_fnm=i_fnm"copyInstance"
      sub("const"SP"s_"clanm sp"&"sp AZ," s_"clanm"* aInstance",args)
      sub("const"SP"s_"clanm sp"&"sp AZ," s_"clanm"* aInstance",argS)
      i_argl="(*aInstance";for(i=2;i<=argn;i++)i_argl=i_argl", "arg[i]
      i_argl=i_argl")"
   }else{                              # constructor
```

```
      copyc=""
      i_fnm=i_fnm"newInstance"
      i_argl=argl
    }
    futyp="s_"clanm"* "
    action=futyp"testVal = new ("memarg") s_"clanm i_argl
    s_ctor()                              # output s_
    return 1
}
# dtor -- handle destructor
function dtor(){
   sub("Con","De",headc)
   futyp="dtVoid "
   i_fnm=i_fnm"deleteInstance"
   action="delete aInstance"
}
# otherfn -- handle function other than con/de/structor/operator
function otherfn(){
   i_fnm=i_fnm funam
   action=futyp"testVal = "
   if (futyp ~ "^dtVoid"SP) action=""          # no testVal if dtVoid
   action=action actfp funam argl
}

# s_ctor -- output ctor to s_
function s_ctor(){
   phsn("")
   phsn("")
   phsn("    ///////////////////////////////////////////////////")
   phsn("    // Inline "copyc"constructor for replicating the")
   phsn("    // production class interface.")
   phsn("    ///////////////////////////////////////////////////")
   sub(";"," : "clanm argl"{}")                # prepare s_
   phsn($0)                              # output s_
}
# s_asop -- Called from lifelist after determining that this is an
#           assignment operator whose type and arg both refer to
#           the class.  Output to s_.
function s_asop(){
   phsn("")
   phsn("")
   phsn("    ///////////////////////////////////////////////////")
   phsn("    // Inline assignment operator for replicating the")
   phsn("    // production class interface.")
   phsn("    ///////////////////////////////////////////////////")
   sub(";","")
   phsn($0)                              # output s_
   phsn("    {")
   phsn("        "clanm"::operator="argl";")
   phsn("        return *this;")
   phsn("    }")
}
# purevirt -- handle pure virtual functions
function purevirt(){
   phsn("")
   phsn("")
   phsn("    ///////////////////////////////////////////////////")
   phsn("    // Provide an implementation for pure virtual")
   phsn("    // function declared by the production class.")
   phsn("    ///////////////////////////////////////////////////")
```

```
   sub("="sp"0"sp";",";")                    # remove =0
   phsn($0)                                  # output s_
   phsn("   //!FIX { If this is called you need to add code here }")
}

# funcbody -- complete and emit function body to i_.
function funcbody(){
   ppi_("")
   ppi_("")
   if (ovgen(i_fnm) != "") headc=headc" #"ov   # if overloaded
   ppi_("   ///////////////////////////////////////////////////")
   ppi_("   // "headc)
   pci_("   // NOTE: may be modified by unit test developers.")
   ppi_("   ///////////////////////////////////////////////////")
   match(args,"\("sp)                               # prefix newarg in args
   args=substr(args,1,RSTART+RLENGTH-1)newarg substr(args,RSTART+RLENGTH)
   argS=substr(args,1,RSTART+RLENGTH-1)newarg substr(argS,RSTART+RLENGTH)
   sub("^"sp"const","",fuaal)                       # remove const after args
   phi_(fulsp futyp      i_fnm args fuaal)          # output i_
   sub("(=.*)?;","",fuaal)                   # remove = and ; after args
   pci_(fulsp futyp ccfp i_fnm argS fuaal)          # output i_.cpp
   pci_("   {")
   pci_("      coverage[f_"i_fnm ov"]++;")
   pci_("      "tj"announceMethodStart( \""i_fnm ov"\" );")
   for (i=1; i<=argn; i++) pci_("//     "tj"announceParameter( "arg[i]" );")
   pci_("      "action";")
   if (futyp !~ "^dtVoid"SP) pci_("//     "tj"announceRetVal( testVal );")
   pci_("      "tj"announceMethodEnd( \""i_fnm ov"\" );")
   if (futyp !~ "^dtVoid"SP) pci_("      return( testVal );")
   pci_("   }")
}
# ovgen -- In pass 1, set i_fu[] = inspection class function names
#                         ovn[] = total instances of ifu
#     In either pass, set ovi[] = this instance # of ifu
#          In pass 2, set     ov = suffix to make unique name
function ovgen(ifu){
   if (outflag=="s_") {           # pass 1?
      i_fu[++fun]=ifu             # make vector of i_ function names
      ++ovn[ifu]           # tally instances of ifu
      lifelist()           # tally constructors
      keygrab()                   # grab UserKey classname
   }
   return ovq(++ovi[ifu],ovn[ifu])       # unique suffix
}
# ovq -- if n==1 (not overloaded) output ov="", else output ov=i
function ovq(i,n){
   if (n==1) {ov=""} else {ov=i}
   return ov
}
# resov -- reset overload counts
function resov(){
   for (i=1; i<=fun; i++) ovi[i_fu[i]]=0
}
# penum -- generate and output enum for coverage analysis
function penum(){
   phi_("")
   phi_("")
   phi_("///////////////////////////////////////////////////")
   phi_("// Global enum -- function tags used for")
   phi_("// coverage analysis")
```

```
   phi_("///////////////////////////////////////////////////")
   phi_("enum FUNCS")
   phi_("{")
   for (i=1; i<=fun; i++)
      phi_("    f_"i_fu[i]ovgen(i_fu[i])",")
   phi_("    TOTAL_FUNCS")
   phi_("};")
   phi_("dtInt coverage[TOTAL_FUNCS];")
}

# lifelist -- Tally functions for LifeCycle/Operator/SetQrys testing.
#           Called from ovgen, first pass only.
#           For each constructor, save argl and memarg.
#           AssignOp counted if type and arg refer to class,
#               and output to s_ class.
#           Other operators saved for t_Operators list.
#           Save set/get/init/rtn/put/qry/is functions for t_SetQrys list.
function lifelist(){
   if (i_fnm=="newInstance") {
      if (!ctori[clanm])        ctori[clanm]=ctorn[clanm]=ovn[i_fnm] # first ctor
      else{                                ++ctorn[clanm]              # more
ctors
      }
                        ctorl[clanm    ctorn[clanm] ]=argl     # save argl
                        ctorm[clanm    ctorn[clanm] ]=memarg   # and memarg
   }
   if (i_fnm=="copyInstance")             ++copyn[clanm]           # copyctor
   if (i_fnm ~ "^oper_")
      if (i_fnm=="oper_as"\
       && match(futyp,"^s_"clanm sp"&")\
       && match(argS,DL"s_"clanm sp"&")){++opasn[clanm]           # class
AsignOp
        s_asop()                                          # output s_
      }else              operf[clanm (++opern[clanm])]=ofunc     # other opers
   if (i_fnm ~ "^set"\
    || i_fnm ~ "^get"\
    || i_fnm ~ "^init"\
    || i_fnm ~ "^rtn"\
    || i_fnm ~ "^put"\
    || i_fnm ~ "^is"\
    || i_fnm ~ "^qry")       setqf[clanm (++setqn[clanm])]=ofunc    # SetQrys
funcs
}
# keygrab -- grab UserKey from openForChange/openForReview/saveAs argl type
#           Called from ovgen, first pass only.
function keygrab(){
   if (ukey[clanm] != "") return
   if (funam=="openForChange"\
    || funam=="openForReview"\
    || funam=="saveAs") {
      ukey[clanm]=substr(argt[1],match(argt[1],AZ),RLENGTH)
   }
}

# clashead -- output class header
# clasfoot -- output class footer
function clashead(){
   pci_("")
   pci_("")
   pci_("// Establish an instance of TESTRUN for this class")
```

```
   pci_("TESTRUNdeclare(i_"clanm")")
   pci_("//")
   pci_("// TESTRUN() and testname() are used by the unit test harness")
   pci_("// to run the tests and display the name of the unit test.")
   pci_("//")
   pci_("extern \"C\" dtInt FAR PASCAL EXPORT testmain( idtTestArgs& aTestArgs
)")
   pci_("{")
   pci_("   return( TESTRUN(i_"clanm")( aTestArgs ) );")
   pci_("}")
   pci_("extern \"C\" dtChar * FAR PASCAL EXPORT testname()")
   pci_("{")
   pci_("   return( \"i_"clanm"\" );")
   pci_("}")
   ppp_("")
   ppp_("")
   ppp_("///////////////////////////////////////////////////////////////////////")
   pps_("// !CLASS_DECL_S")
   pps_("// !LIBRARY I_"library)
   pps_("// !NAME i_"clanm)
   pps_("// !TEXT")
   pps_("// Generated "timestamp" by "icgver)
   pps_("//")
   pps_("// !AUTHOR      <Author's name>        <(Author's E-mail address)>")
   pps_("// !REVIEWER    <Reviewer's name> <(Reviewer's E-mail address)>")
   pps_("// !REVIEW_DATE <date>")
   phs_("//")
   phs_("// Class under test.  This class is derived from the production")
   phs_("// object.  This provides access to the public and protected member")
   phs_("// functions of the production class, without modification to the")
   phs_("// production class.  Also, pure virtual functions declared in the")
   phs_("// production class are provided an implementation here.  This allows")
   phs_("// production abstract base classes to be instantiated and tested.")
   phi_("// Inspection class")
   ppp_("///////////////////////////////////////////////////////////////////////")
   phsp("typedef "clanm" s_"clanm";")
   phsn("class s_"clanm" : public "clanm)
   phi_("class EXPORT i_"clanm" : public idtTest")
   phCL("{")
   phCL("public:")
   phsn("   friend class i_"clanm";")
   icdt()                       # ic ctor, dtor, test suite
   testcode()                   # lifecycle et al testing
}
function clasfoot(){
   uiccao()                     # umimpl copyctor and assignop
   phCL("};")
}
# icdt -- inspection class constructor, destructor, test suite
function icdt(){
   ppi_("")
   ppi_("")
   ppi_("   ///////////////////////////////////////////////////")
   ppi_("   // Inspection class constructor.")
   ppi_("   ///////////////////////////////////////////////////")
   phi_("   i_"clanm"(")
   pci_("   i_"clanm"::i_"clanm"(")
   ppi_("      dtStreamExecutive* aStreamExec,")
   ppi_("      dtMemoryExecutive& aMemExec,")
   ppi_("      idtTestArgs&       aTestArgs,")
```

```
   phi_("      dtMemoryMgr*       aTestMM );")
   pci_("      dtMemoryMgr*")
   pci_("      ): idtTest( aStreamExec, aMemExec, aTestArgs )")
   pci_("   {")
   pci_("      for ( int i = 0 ; i < TOTAL_FUNCS ; i++ ) coverage[i] = 0;")
   pci_("   }")
   ppi_("")
   ppi_("")
   ppi_("   ////////////////////////////////////////////////////")
   ppi_("   // Inspection class destructor.")
   ppi_("   ////////////////////////////////////////////////////")
   phi_("   ~i_"clanm"();")
   pci_("   i_"clanm"::~i_"clanm"()")
   pci_("   {")
   pci_("   }")
   phi_("")
   phi_("")
   phi_("   ////////////////////////////////////////////////////")
   phi_("   // Inspection test suite.")
   phi_("   ////////////////////////////////////////////////////")
   phi_("   virtual dtVoid t_LifeCycle();")
   phi_("   virtual dtVoid t_Operators();")
   phi_("   virtual dtVoid t_Semantics();")
   phi_("   virtual dtVoid t_SetQrys();")
   phi_("   virtual dtVoid t_Persist();")
   phi_("   virtual dtVoid qryCoverage( dtInt*& aCovAry, dtInt& aNumFuncs )
const;")
   phip("   dtVoid setupUKs( "ukey[clanm]"* aUK1,")
   phip("                    "ukey[clanm]"* aUK2,")
   phip("                    "ukey[clanm]"* aUK3,")
   phip("                    dtMemoryMgr* aMM );")
   phip("   dtVoid setupObj( s_"clanm"* aInstance,")
   phip("                    dtMemoryMgr* aMM );")
}
# testcode -- lifecycle et al testing
function testcode(){
   testhead("Lifecycle")
   pci_("   // The TLIFE_START and TLIFE_END macros are placed")
   pci_("   // around each lifecycle test as these provide the")
   pci_("   // open ('{') and close ('}') of a code block")
   pci_("   // (allows reuse of variable names). These macros")
   pci_("   // announce each test and whether it has")
   pci_("   // passed or failed.  They also provide clean")
   pci_("   // memory mamangers for each test.  Throughout")
   pci_("   // the lifecycle test (between the TLIFE_INIT and")
   pci_("   // TLIFE_CLEANUP macros) two memory managers are")
   pci_("   // available: mm and mm2.")
   pci_("   ////////////////////////////////////////////////////")
   pci_("   dtVoid")
   pci_("   i_"clanm"::t_LifeCycle()")
   pci_("   {")
   pci_("      TLIFE_INIT")
   pcip("      // There is no t_LifeCycle for IPKs")
   lifetests()
   pcin("")
   pci_("      TLIFE_CLEANUP;")
   pci_("   }")
   tosqs()
   tpers()
   coverag()
```

```
   suuks()
   suobj()
}
function lifetests(){
   pcin("")
   if (!ctorn[clanm]) {
      pcin("      // No constructors were found.")
      return
   }
   pcin("")
   pcin("      // CONSTRUCTOR/DESTRUCTOR TESTING")
   pcin("      //")
   pcin("      // Constructor and destructor testing.  One test must")
   pcin("      // be performed for each constructor.  The basic format")
   pcin("      // is construct the object, announce it, then delete it.")
   pcin("      //")
   for (i=ctori[clanm]; i<=ctorn[clanm]; i++) {
      pcin("")
      pcin("      TLIFE_START( \"ctor"ovq(i,ctorn[clanm])" and dtor\" )")
      pcin("         s_"clanm"* testobjX = newInstance"submem(ctorl[clanm
i],ctorm[clanm i],"mm")";")
      pcin("         announceObject( *testobjX );")
      pcin("         deleteInstance( testobjX );")
      pcin("      TLIFE_END")
   }
   pcin("")
   pcin("")
   pcin("      // COPY CONSTRUCTOR TESTING")
   pcin("      //")
   if (!copyn[clanm]) {
      pcin("      // No copy constructor was found.")
   }else{
      pcin("      // Copy constructor tests.  One test must be performed")
      pcin("      // for each copy constructor/constructor combination.")
      pcin("      // The format for each test is: construct an object")
      pcin("      // using mm, then invoke the copy constructor using")
      pcin("      // mm2, delete the original, announce the copy, then")
      pcin("      // delete the copy.  This tests copying across memory")
      pcin("      // spaces, as well as, incomplete copies and use of")
      pcin("      // aliases (shared pointers with no reference counting).")
      pcin("      //")
      for (i=ctori[clanm]; i<=ctorn[clanm]; i++) {
        pcin("")
        pcin("      TLIFE_START( \"Copyctor and ctor"ovq(i,ctorn[clanm])"\" )")
        pcin("         s_"clanm"* testobjX = newInstance"submem(ctorl[clanm
i].ctorm[clanm i],"mm")";")
        pcin("         s_"clanm"* testobjY = copyInstance( testobjX, mm2 );")
        pcin("         deleteInstance( testobjX );")
        pcin("         announceObject( *testobjY );")
        pcin("         deleteInstance( testobjY );")
        pcin("      TLIFE_END")
      }
   }
   pcin("")
   pcin("")
   pcin("      // ASSIGNMENT OPERATOR TESTING")
   pcin("      //")
   if (!opasn[clanm]) {
      pcin("      // No "clanm"& operator=(..."clanm"&...) was found.")
      return
```

```
    }
    pcin("        // Similar in nature to the copy constructor testing,")
    pcin("        // one test must be performed for each constructor/")
    pcin("        // assignment operator combination.  The format is:")
    pcin("        // construct objectX using mm, construct objectY")
    pcin("        // using mm2, assign objectX to objectY, check for")
    pcin("        // equality if that operator is defined, delete")
    pcin("        // objectX, announce objectY, delete objectY.")
    pcin("        // Additionally, chained assignment (objZ=objY=objX,")
    pcin("        // where after the operation objZ == objX) and")
    pcin("        // assignment to self (objX=objX, where objX still")
    pcin("        // has a value after assignment) must be tested.")
    pcin("        //")
    for (i=ctori[clanm]; i<=ctorn[clanm]; i++) {
        pcin("")
        pcin("        TLIFE_START( \"ctor"ovq(i,ctorn[clanm])" and operator=\" )")
        pcin("            s_"clanm"* testobjX = newInstance"submem(ctorl[clanm
i],ctorm[clanm i],"mm")";")
        pcin("            s_"clanm"* testobjY = newInstance"submem(ctorl[clanm
i],ctorm[clanm i],"mm2")";")
        pcin("            *testobjY = *testobjX;")
        pcin("            checkExpr( *testobjX == *testobjY, currTest );")
        pcin("            deleteInstance( testobjX );")
        pcin("            announceObject( *testobjY );")
        pcin("            deleteInstance( testobjY );")
        pcin("        TLIFE_END")
    }
    i=ctori[clanm]
    pcin("")
    pcin("        TLIFE_START( \"Chained assignment\" )")
    pcin("            s_"clanm"* testobjX = newInstance"submem(ctorl[clanm
i],ctorm[clanm i],"mm")";")
    pcin("            s_"clanm"* testobjY = newInstance"submem(ctorl[clanm
i],ctorm[clanm i],"mm2")";")
    pcin("            s_"clanm"* testobjZ = newInstance"submem(ctorl[clanm
i],ctorm[clanm i],"mm")";")
    pcin("            *testobjZ = *testobjY = *testobjX;")
    pcin("            checkExpr( *testobjZ == *testobjY, currTest );")
    pcin("            deleteInstance( testobjX );")
    pcin("            deleteInstance( testobjY );")
    pcin("            announceObject( *testobjZ );")
    pcin("            deleteInstance( testobjZ );")
    pcin("        TLIFE_END")
    pcin("")
    pcin("        TLIFE_START( \"Assignment to self\" )")
    pcin("            s_"clanm"* testobjX = newInstance"submem(ctorl[clanm
i],ctorm[clanm i],"mm")";")
    pcin("//!FIX   s_"clanm"* testobjY = copyInstance( testobjX, mm );  // <---
copy X's value")
    pcin("            oper_as( testobjX, testobjX );")
    pcin("//!FIX   checkExpr( oper_eq( testobjY, testobjX) );       // <-- check
that value is unchanged")
    pcin("            announceObject( *testobjX );")
    pcin("            deleteInstance( testobjX );")
    pcin("        TLIFE_END")
}
# submem -- substitute mem argument
function submem(argl,memarg,mm){
    return substr(argl,1,match(argl,DL memarg DL))mm substr(argl,RSTART+RLENGTH-
1)
```

```
}
# tosqs -- testing operators, set/query, semantics
function tosqs(){
   testhead("Operators")
   pci_("   // All operators are tested here.")
   pci_("   // The entire set of operators has been broken")
   pci_("   // into like categories for ease of testing.")
   between("Operators")
   pci_("      //!FIX The following must be tested from your production class:")
   pci_("      //")
   if (!opern[clanm]) {
      pci_("      // No applicable operators were found.")
   }
   for (i=1; i<=opern[clanm]; i++) pci_("   "operf[clanm i])        # list other
opers
   pci_("")
   pci_("      // COMPARISON OPERATORS: < > <= >= == !=")
   pci_("      // ARITHMETIC OPERATORS: + - * / % ++ --")
   pci_("      // LOGICAL OPERATORS: || && !")
   pci_("      // BITWISE OPERATORS: ^ | & ~ << >>")
   pci_("      // EXTENDED ASSIGNMENT OPERATORS: += -= *= /= %= ^= |= &= <<=
>>=")
   pci_("      // CONVERSION OPERATORS: type()")
   pci_("      // MISCELLANEOUS AND GLOBAL OPERATORS")
   testfoot()
   testhead("Set and Query")
   pci_("   // The set and query member functions are tested")
   pci_("   // here.  If your class under test contains")
   pci_("   // values that do not require being set first,")
   pci_("   // then test the query methods for those values")
   pci_("   // before testing the corresponding set methods.")
   between("SetQrys")
   pci_("      //!FIX The following must be tested from your production class:")
   pci_("      /*")
   if (!setqn[clanm]) {
      pci_("      // No set/get/init/rtn/put/qry/is functions were found.")
   }
   for (i=1; i<=setqn[clanm]; i++) pci_("   "setqf[clanm i])        # list other
funcs
   pci_("      */")
   pci_("")
   pci_("      // QUERY TESTS")
   pci_("      // SET TESTS")
   testfoot()
   testhead("Semantics")
   pci_("   // These tests are for those member functions")
   pci_("   // unique to the production class.")
   between("Semantics")
   pci_("      //!FIX Add your semantic member function tests here.")
   testfoot()
}
# tpers -- testing persistence
function tpers(){
   testhead("Persistence")
   pci_("   // This tests behavior specific to the persistence")
   pci_("   // member functions of a production class.")
   between("Persist")
   pcin("      // There is no t_Persist testing for non IPKs")
   pcin("      // If this is missing, read about Persistent Kinds in")
   pcin("      // /newopl/tools/doc/icg/cookbook.fm.")
```

```
   pcip("        // STDGIT_TESTCLASS and STDGIT_VERSION must be established.")
   pcip("        //")
   pcip("        #define STDGIT_TESTCLASS s_"clanm)
   pcip("        #define STDGIT_VERSION 1")
   pcip("")
   pcip("        // At least one of the following must be present.")
   pcip("        //")
   pcip("        #define STDGIT_PRODUCTION")
   pcip("        //#define STDGIT_WIP")
   pcip("        //#define STDGIT_TEMPLATE")
   pcip("        //#define STDGIT_IMPORT_EXPORT")
   pcip("        //#define STDGIT_HISTORY")
   pcip("")
   pcip("        "ukey[clanm]"* uk1 = new ( mm ) "ukey[clanm]"( mm );")
   pcip("        "ukey[clanm]"* uk2 = new ( mm ) "ukey[clanm]"( mm );")
   pcip("        "ukey[clanm]"* uk3 = new ( mm ) "ukey[clanm]"( mm );")
   pcip("//!FIX  You may need to specify a security context.")
   pcip("        fdSecurityContext security = FD_SC_NO_CONTEXT;")
   pcip("")
   pcip("        // Setup the user keys for the 3 test objects.")
   pcip("        //")
   pcip("        setupUKs( uk1, uk2, uk3, mm );")
   pcip("")
   pcip("        // Standard test for fdGenInst derived classes.")
   pcip("        // Runs through normal persistent lifecycle for")
   pcip("        // production instances.")
   pcip("        //")
   pcip("        #include \"stdgit.cc\"")
   testfoot()
}
function testhead(test){
   pci_("")
   pci_("")
   pci_("   //////////////////////////////////////////////////")
   pci_("   // "test" testing.")
   pci_("   //")
}
function between(test){
   pci_("   //")
   pci_("   // Between the T_INIT and T_CLEANUP macros the")
   pci_("   // memory manager variable mm is available for")
   pci_("   // constructing test objects. Each individual")
   pci_("   // test must be surrounded by the TEST_START and")
   pci_("   // TEST_END macros, or alternately, the test")
   pci_("   // itself can be performed within a TEST macro.")
   pci_("   //////////////////////////////////////////////////")
   pci_("   dtVoid")
   pci_("   i_"clanm"::t_"test"()")
   pci_("   {")
   pci_("      T_INIT( \"t_"test"\" )")
   pci_("")
}
function testfoot(){
   pci_("")
   pci_("      T_CLEANUP")
   pci_("   }")
}
function coverag(){
   pci_("")
   pci_("")
```

```
   pci_("   ///////////////////////////////////////////////////")
   pci_("   // Return coverage information.")
   pci_("   //")
   pci_("   // NOTE: This is not to be modified by unit")
   pci_("   //       test developers.")
   pci_("   ///////////////////////////////////////////////////")
   pci_("   dtVoid")
   pci_("   i_"clanm"::qryCoverage(")
   pci_("      dtInt*& aCovAry,")
   pci_("      dtInt&  aNumFuncs")
   pci_("      ) const")
   pci_("   {")
   pci_("      aCovAry = coverage;")
   pci_("      aNumFuncs = TOTAL_FUNCS;")
   pci_("   }")
}
function suuks(){
   pcip("")
   pcip("")
   pcip("   ///////////////////////////////////////////////////")
   pcip("   // setupUKs:")
   pcip("   //")
   pcip("   // Helper function for persistence testing.")
   pcip("   // Set up three user keys for the three")
   pcip("   // objects used during the STDGIT.")
   pcip("   ///////////////////////////////////////////////////")
   pcip("   dtVoid")
   pcip("   i_"clanm"::setupUKs(")
   pcip("        "ukey[clanm]"* aUK1,")
   pcip("        "ukey[clanm]"* aUK2,")
   pcip("        "ukey[clanm]"* aUK3,")
   pcip("        dtMemoryMgr* aMM")
   pcip("        )")
   pcip("   {")
   pcip("        // Remember maximum string lengths when setting up test")
   pcip("        // object names and site names.  Names are usually")
   pcip("        // a maximum of 15 characters, sites are 4 characters max.")
   pcip("        //")
   pcip("        bcStringi18n site1( (dtUChar*) \"S111\", aMM);")
   pcip("        bcStringi18n site2( (dtUChar*) \"S222\", aMM);")
   pcip("        bcStringi18n site3( (dtUChar*) \"S333\", aMM);")
   pcip("        bcStringi18n name1( (dtUChar*) \"Test Object 111\", aMM);")
   pcip("        bcStringi18n name2( (dtUChar*) \"Test Object 222\", aMM);")
   pcip("        bcStringi18n name3( (dtUChar*) \"Test Object 333\", aMM);")
   pcip("")
   pcip("        //  Setup 3 user keys.  First set the site on each and")
   pcip("        //  set the type.  This is common for all user keys.")
   pcip("        //")
   pcip("        aUK1->setSiteName( &site1 );")
   pcip("        aUK2->setSiteName( &site2 );")
   pcip("        aUK3->setSiteName( &site3 );")
   pcip("        aUK1->setType( fdInstTypes::PRODUCTION );")
   pcip("        aUK2->setType( fdInstTypes::PRODUCTION );")
   pcip("        aUK3->setType( fdInstTypes::PRODUCTION );")
   pcip("")
   pcip("//!FIX  Finish setting up the user keys.  Use what is here")
   pcip("//!FIX  as a starting point for your specific user key.")
   pcip("")
   pcip("//!FIX  aUK1->setXxxxName( &name1 );")
   pcip("//!FIX  aUK2->setXxxxName( &name2 );")
```

```
   pcip("//!FIX  aUK3->setXxxxName( &name3 );")
   pcip("   }")
}
function suobj(){
   pcip("")
   pcip("")
   pcip("   ////////////////////////////////////////////////////")
   pcip("   // setupObj:")
   pcip("   //")
   pcip("   // Helper function for persistence testing.")
   pcip("   // Set the attributes in the passed object")
   pcip("   // so that it is valid and can be saved.")
   pcip("   ////////////////////////////////////////////////////")
   pcip("   dtVoid")
   pcip("   i_"clanm"::setupObj(")
   pcip("        s_"clanm"* aInstance,")
   pcip("        dtMemoryMgr*     aMM")
   pcip("        )")
   pcip("   {")
   pcip("        // Descriptions have a maximum length of 15.")
   pcip("        //")
   pcip("        bcStringi18n descr1( (dtUChar*) \"Description 111\", aMM);")
   pcip("        bcStringi18n descr2( (dtUChar*) \"Description 222\", aMM);")
   pcip("        bcStringi18n secGrp( (dtUChar*) \"Security GroupX\", aMM);")
   pcip("")
   pcip("        aInstance->setDescription1( &descr1 );")
   pcip("        aInstance->setDescription2( &descr2 );")
   pcip("        aInstance->setSecurityGroup( &secGrp );")
   pcip("")
   pcip("//!FIX  >>> Add addtional setup here. <<<")
   pcip("   }")
}
# uiccao -- Unimplemented copy constructor and assignment operator.
#           In s_, depends on whether copyctor/asignop were seen.
function uiccao(){
   if (outflag=="s_" && copyn[clanm] && opasn[clanm]) return      # both seen?
   phCL("")
   phCL("")
   phCL("private:")
   phCL("   ////////////////////////////////////////////////////")
   phCL("   // Unimplemented CopyCtor and/or AssignOp.")
   phCL("   ////////////////////////////////////////////////////")
   if (!copyn[clanm]) {
      phsn("   s_"clanm"            ( const s_"clanm"& aS_"clanm",")
      phsn("                dtMemoryMgr* aMemMgr=(dtMemoryMgr*)NULL );")
   }
   if (!opasn[clanm]) {
      phsn("   s_"clanm"& operator=( const s_"clanm"& aS_"clanm" );")
   }
      phi_("   i_"clanm"            ( const i_"clanm"& aI_"clanm" );")
      phi_("   i_"clanm"& operator=( const i_"clanm"& aI_"clanm" );")
}

# icgargs -- outputs iarg = specified input arg
#                    oarg = specified output arg
#                     ihh = input header, name only
#                     Ihh = input header, dir/name
#                     ohh = output header, name only
#                     Ohh = output header, dir/name
#                     occ = output source, name only
```

```
#                      Occ = output source, dir/name
function icgargs(){
   iarg=ARGV[1]                          # look for args in various permutations
   if (ARGV[1]=="-o") {oarg=       ARGV[2]    ;iarg=ARGV[3]}
   if (ARGV[2]=="-o") {oarg=       ARGV[3]    ;iarg=ARGV[1]}
   if (ARGV[1]~"-o.") {oarg=substr(ARGV[1],3);iarg=ARGV[2]}
   if (ARGV[2]~"-o.") {oarg=substr(ARGV[2],3);iarg=ARGV[1]}

   idir=getmatch(iarg,".*/")             # iarg path
   inam=substr(iarg,RSTART+RLENGTH)      # iarg name
   iext=getmatch(inam,"\..*")            # iarg extension
   if (RSTART) {
      sub("\..*","",inam)              # remove if specified
   }else{
      iext=".hh"                       # defaults to .hh
   }
   ihh=inam iext;Ihh=idir ihh            # ihh is input name, Ihh has path

   filehead()                        # look for !ICG_FILE_NAME, !IPK
   rewhh()                           # rewind input

   odir=getmatch(oarg,".*/")             # oarg path
   onam=substr(oarg,RSTART+RLENGTH)      # oarg name
   sub("\..*","",onam)                   # remove any extension
   if (odir=="") odir=idir"../ut/"         # <odr/> defaults to <idr/>../ut/
   if (onam=="") onam=substr(inam,1,7)"i" # <onam> defaults to <inam>i
   ohh=onam".hh" ;novw(Ohh=odir ohh)     # add .hh,  check if already exists
   if (ipk) {
      occ=onam".cc" ;novw(Occ=odir occ)    # add .cc,  check if already exists
   }else{
      occ=onam".cpp";novw(Occ=odir occ)    # add .cpp, check if already exists
   }
}
# filehead -- look for !I_FILE_NAME directive if -o not given on command line,
#             look for !IPK directive, set ipk if found
#            output header if outflag set
# filefoot -- output file footer
function filehead(){
   while(gethh()){
      if ($1$2 ~ "^//!?IPK") ipk=1
      if ($1$2 ~ "^//!?I(CG)?_FILE_?NAM" && oarg=="") oarg=$3
      if ($1$2 ~ "^//!?FILE_?NAM"){
        $3=ohh;phs_($0)              # fix FILE_NAME comment
        $3=occ;pcs_($0)
      }else if ($1=="#ifndef"){
        HHname=$2                    # grab name for #ifndef/define/endif
        phs_("#ifndef i_"HHname)
        phs_("#define i_"HHname)
        phs_("#include \"idttest.hh\"")
        phs_("#include \""ihh"\"")
        pcs_("#include \""ohh"\"")
        return                                # end filehead
      }else{
        phs_($0)                     # copy from .hh
        pcs_($0)
      }
   }
}
function filefoot(){
        phi_("#endif // i_"HHname)
```

```
}

# timever -- outputs timestamp = from date command
#                         icgver += clearcase info
# tests Ohh writeability (in syst)
function timever(){
   timestamp=syst("date -u '+%y/%m/%d'")
   lsARGV0()                              # ls self (icg)
   icgver=substr($0,42,13)"(version "icgver")" # grab icg date
   syst("cleartool describe -short "ARGV[0])   # icg ClearCase version
   icgver=$0" of "icgver
}
# lsARGV0 -- find ARGV[0], prepend path in ARGV[0], ls, result in $0
# Use Occ for shell script to search path
function lsARGV0(){
   if (!match(ARGV[0],"/")) {                  # path specified?
      pcs_("foreach p ($path)")
      pcs_("   set p=$p/"ARGV[0])
      pcs_("   if (-x $p && -f $p) then")
      pcs_("      echo $p")
      pcs_("      break")
      pcs_("   endif")
      pcs_("end")
      close(Occ)
      ARGV[0]=syst("csh -sf <"Occ)              # search $path
   }
   syst("ls -l "ARGV[0])                       # ls -l <icg>
   while (substr($0,1,1)=="l") {               # softlink?
      if ($1 == "ls:") break                    # error?
      ARGV[0]=getmatch(ARGV[0],".*/")$NF          # follow it
      syst("ls -l "ARGV[0])                       # ls -l <softlink/icg>
   }
}
# syst -- execute shell command, results (single line) in $0 and as rtn value
# Use Ohh for intermediate results, and give error if unaccesable.
function syst(cmd){
   system(cmd">"Ohh" 2>&1")        # use output file
   if ((getline<Ohh) < 0) usagx("Unable to open output "Ohh)
   close(Ohh)               # erase it (next write will truncate it)
   return $0
}

# getmatch -- return matched string, or null string if no match
#             returns RSTART and RLENGTH as from "match", both zero if no match
function getmatch(s,re){
   s=substr(s,match(s,re),RLENGTH)
   if (!RSTART) {s="";RLENGTH=0}
   return s
}

# gethh -- get line from Ihh, strip CRs, return 0 if EOF
#           returns gothh = gethh return value
function gethh(){
   if ((gothh=getline<Ihh) < 0) usagx("Unable to read "Ihh)
   if (substr($0,length)=="\r") $0=substr($0,1,length-1)    # strip CR
   return gothh
}
# rewhh -- rewind Ihh, set gothh with non-EOF value
function rewhh(){
   close(Ihh)
```

```
   gothh=1          # clear EOF indication
}
# novw -- exit if file already exists
function novw(file){
   if ((getline<file) >= 0) usagx("Sorry, "file" already exists.")
}

# phs_ -- put line to Ohh if s_                (subclass or typedef)
# phsn -- put line to Ohh if s_ and not ipk (subclass)
# phsp -- put line to Ohh if s_ and     ipk (persistent typedef)
# phi_ -- put line to Ohh if i_                (inspection class)
# phip -- put line to Ohh if i_ and     ipk (persistent inspection class)
# pcs_ -- put line to Occ if s_                (filehead)
# pci_ -- put line to Occ if i_
# pcip -- put line to Occ if i_ and     ipk (persistent tests)
# pcin -- put line to Occ if i_ and not ipk (nonpersistent tests)
# phCL -- both phsn and phi_                   (subCLass or inspection CLass)
# pps_ -- both phs_ and pci_                   (clashead)
# ppi_ -- both phi_ and pci_                   (clashead)
# ppp_ -- both phs_ and ppi_                   (clashead)
# prid -- for debug, print, one pass only
function prid(line) {if(outflag=="s_"      )print line    }
function phs_(line) {if(outflag=="s_"      )print line>Ohh}
function phsp(line) {if(outflag=="s_"&& ipk)print line>Ohh}
function phsn(line) {if(outflag=="s_"&&!ipk)print line>Ohh}
function phi_(line) {if(outflag=="i_"      )print line>Ohh}
function phip(line) {if(outflag=="i_"&& ipk)print line>Ohh}
function pcs_(line) {if(outflag=="s_"      )print line>Occ}
function pci_(line) {if(outflag=="i_"      )print line>Occ}
function pcip(line) {if(outflag=="i_"&& ipk)print line>Occ}
function pcin(line) {if(outflag=="i_"&&!ipk)print line>Occ}
function phCL(line) {phsn(line);phi_(line)}
function pps_(line) {phs_(line);pci_(line)}
function ppi_(line) {phi_(line);pci_(line)}
function ppp_(line) {phs_(line);ppi_(line)}
```

```
////////////////////////////////////////////////////////////////
//
// FILE_NAME: idtexcpt.cc
//
// Copyright 1994 by Marcam Corp., Newton, MA USA
//
// This unpublished copyrighted work contains
// TRADE SECRET information of Marcam Corporation.
//
// Use, transfer, disclosure, or copying without its expressed
// written permission is strictly forbidden.
//
////////////////////////////////////////////////////////////////

#include "idtexcpt.hh"
#include "fddeskgl.hh"      // for fdDesktopGlobal::oplExit()
#include "dtostrm.hh"       // For dtOStream
#include "erexcept.hh"      // for erException
#include "bcstil8n.hh"      // For bcStringi18n
#include "dtfmtuin.hh"      // For dtFmtUInt (used by putExInfo)

extern "C"
{
#include "windows.h"        // for Windows Catch/Throw API
}

// Initialize the static pointer to the currently active object.
//
idtExceptionTester* idtExceptionTester::mObj = (idtExceptionTester*) NULL;

////////////////////////////////////////////////////////////////
// !CLASS_DESC_S
// !LIBRARY
// !NAME idtExceptionTester
// !TEXT
// This class makes use of the Windows versions of the ANSI setjmp
// and longjmp, respectively Catch and Throw.  As defined by Microsoft
// setjmp and longjmp are not compatible with C++ (due to optimizations
// of the stack when calling member functions).
//
// This provides crude stack unwinding.  That is, no destructors are
// invoked for any objects created on the stack that is unwound.
// Therefore we expect to find memory leaks as a side effect for
// objects allocated on the stack that make heap allocations for
// contained objects.  For example, a bcStringi18n class can be
// instantiated on the stack and have its contained string allocated
// from the heap.
//
// !AUTHOR     John Dalton         (dalton@marcam.com)
// !REVIEWER   <Reviewer's name>   <(Reviewers E-Mail address)>
// !REVIEW_DATE <date>
//
////////////////////////////////////////////////////////////////

////////////////////////////////////////////////////////////////
//
//                        Public Methods
```

```
//
////////////////////////////////////////////////////////////////////////////////

////////////////////////////////////////////////////////////////////////////////
// !METHOD_DESC_S
// !NAME testExceptionHandler
// !TEXT
// We install this handler so that we can capture the thrown exception
// and filter it based on the error message ID registered by the ctor.
// If this isn't the exception we're expecting, invoke the normal
// desktop global handler and say goodbye.  This is a public static method.
// NOTE: There is a lot of monkey business going on in this class, so
//       don't get any ideas that we should put some of this in the
//       production code.
////////////////////////////////////////////////////////////////////////////////

dtVoid
idtExceptionTester::testExceptionHandler(
    const erException& aException
    )
{
    idtExceptionTester& TestObj = idtExceptionTester::rtnObj();

    if ( aException.qryMsgID() == TestObj.rtnMsgID() )
    {
        // Save information about the exception that was thrown.
        TestObj.putExInfo( aException );

#ifdef WIN
        // Use the windows sdk throw since longjmp can't be used.
        ::Throw( TestObj.rtnEnv(), 1 );
#endif //WIN
        // Boing! We never get here.  Stack is unwound by Throw.
    }
    else
    {
        // Not our exception, so let normal handler take care of it.
        //
        fdDesktopGlobal::oplExit( aException );
        // Goodbye!
    }
}

////////////////////////////////////////////////////////////////////////////////
// !METHOD_DESC_S
// !NAME rtnObj
// !TEXT
// Return a reference to the current object.  If one is not found
// throw an exception.  We can only test one exception at a time.
////////////////////////////////////////////////////////////////////////////////

idtExceptionTester&
idtExceptionTester::rtnObj()
{
    if ( !mObj )
    {
        // Install the normal handler before throwing the exception.
        //
```

```
        setOplExitCallback(fdDesktopGlobal::oplExit);
        TEST_NULL(mObj);
    }

    return( *mObj );
}


///////////////////////////////////////////////////////////////////////////
// !METHOD_DESC_S
// !NAME def_ctor
// !TEXT
// Create a idtExceptionTester object.
// Install our own exception handler so that we can capture the thrown
// exception.
///////////////////////////////////////////////////////////////////////////

idtExceptionTester::idtExceptionTester(
    dtULong aMsgID
    ) : mMsgID( aMsgID ),
        mExInfo( (bcStringi18n*) NULL )
{
    // Initialize the current object pointer to ourselves.
    // Check to see that no one else is active.
    //
    TEST_NULL( !mObj );

    mObj = this;

    // Install our own handler for filtering.
    setOplExitCallback(idtExceptionTester::testExceptionHandler);
}


///////////////////////////////////////////////////////////////////////////
// !METHOD_DESC_S
// !NAME dtor
// !TEXT
// Destructor for idtExceptionTester.
// Restore the normal desktop global exception handler now that we
// have finished testing for an exception.
///////////////////////////////////////////////////////////////////////////

idtExceptionTester::~idtExceptionTester()
{
    setOplExitCallback(fdDesktopGlobal::oplExit);

    // Reset the pointer to null for next use.
    //
    mObj = (idtExceptionTester*) NULL;

    // Clean up any allocated objects.
    //
    delete mExInfo;
}


///////////////////////////////////////////////////////////////////////////
// !METHOD_DESC_S
```

```
// !NAME rtnMsgID
// !TEXT
// Return the message ID for this exception being tested.
//////////////////////////////////////////////////////////////////////////////

dtULong
idtExceptionTester::rtnMsgID() const
{
    return( mMsgID );
}


//////////////////////////////////////////////////////////////////////////////
// !METHOD_DESC_S
// !NAME rtnEnv
// !TEXT
// Returns the current environment.  May be modified by caller.
//////////////////////////////////////////////////////////////////////////////

dtInt*
idtExceptionTester::rtnEnv()
{
    return( mEnv );
}


//////////////////////////////////////////////////////////////////////////////
// !METHOD_DESC_S
// !NAME rtnExInfo
// !TEXT
// Return information about the exception under test if one was thrown.
// If the exception was not detected, a null pointer is returned.
//////////////////////////////////////////////////////////////////////////////

const bcStringi18n*
idtExceptionTester::rtnExInfo() const
{
    return( mExInfo );
}


//////////////////////////////////////////////////////////////////////////////
// !METHOD_DESC_S
// !NAME putExInfo
// !TEXT
// Extract information from the exception to be used for later reporting.
//////////////////////////////////////////////////////////////////////////////

dtVoid
idtExceptionTester::putExInfo(
    const erException& aExcept
    )
{
    if ( mExInfo )
    {
        delete mExInfo;
    }
```

```
    dtMemoryMgr* MM = DESK_DEF_MM;
    mExInfo = new( MM ) bcStringi18n( MM );

    *mExInfo = (dtUChar*)aExcept.qryClassName();

    bcStringi18n Separator( (dtUChar*)":", MM );
    bcStringi18n MethName( (dtUChar*)aExcept.qryMethodName(), MM );
    bcStringi18n FileName( (dtUChar*)aExcept.qryFileName(), MM );
    dtFmtUInt    Line( aExcept.qryLineNumber() );
    bcStringi18n LineStr( (dtUChar*)(dtChar*)Line, MM );

    add( *mExInfo, *mExInfo, Separator );
    add( *mExInfo, *mExInfo, MethName );
    add( *mExInfo, *mExInfo, Separator );
    add( *mExInfo, *mExInfo, FileName );
    add( *mExInfo, *mExInfo, Separator );
    add( *mExInfo, *mExInfo, LineStr );
}


#ifdef OPLDEBUG
///////////////////////////////////////////////////////////////////////////////
// !METHOD_DESC_S
// !NAME dump
// !TEXT
// Displays the contents of an instance of idtExceptionTester.
// All output lines will be tabbed over by the amount
// specified in aIndentLevel.  This permits nested
// output in recursive dumps.
//
// NOTE: This method is only available when OPLDEBUG
//       has been defined.
//
///////////////////////////////////////////////////////////////////////////////

dtVoid
idtExceptionTester::dump(
    dtOStream& aOutStream,
    dtUInt     aIndentLevel
    ) const
{
    // header
    aOutStream << dumpTab(aIndentLevel)
               << dumpHdr("idtExceptionTester", DUMP_START)
               << endl;

    // non class attribute (primitive types)
    aOutStream << dumpTab(aIndentLevel)
               << "mMsgID: "
               << mMsgID
               << endl;

    aOutStream << dumpTab(aIndentLevel)
               << "mExInfo: "
               << (dtUChar*)mExInfo
               << endl;

    // trailer
```

```
    aOutStream << dumpTab(aIndentLevel)
               << dumpHdr("idtExceptionTester", DUMP_END)
               << endl;
}
#endif // OPLDEBUG


////////////////////////////////////////////////////////////////////////////////
//
//                            Protected Methods
//
////////////////////////////////////////////////////////////////////////////////


////////////////////////////////////////////////////////////////////////////////
//
//                             Private Methods
//
////////////////////////////////////////////////////////////////////////////////
```

```
///////////////////////////////////////////////////////////////////////////////
//
// FILE_NAME: idtexcpt.hh
//
// Copyright 1994 by Marcam Corp., Newton, MA USA
//
// This unpublished copyrighted work contains
// TRADE SECRET information of Marcam Corporation.
//
// Use, transfer, disclosure, or copying without its expressed
// written permission is strictly forbidden.
//
///////////////////////////////////////////////////////////////////////////////

#ifndef idtexcptHH
#define idtexcptHH


#include "dtprims.h"
#include "dtnoncor.hh"      // for parent dtNonCore

class EXPORT bcStringi18n;  // forward declaration
class EXPORT erException;


///////////////////////////////////////////////////////////////////////////////
// !CLASS_DECL_S
// !LIBRARY Foundation
// !NAME idtExceptionTester
// !TEXT
// This class provides the necessary evils to test OT exceptions.
//
// !AUTHOR      John Dalton       (dalton@marcam.com)
// !REVIEWER    <Reviewer's Name> <(Reviewer's E-Mail address)>
// !REVIEW_DATE <date>
//
///////////////////////////////////////////////////////////////////////////////


class EXPORT idtExceptionTester : public dtNonCore
{
  public:

    //////////////////////////////////////////////////
    // !METHOD_DECL_S
    // !NAME testExceptionHandler
    // !TEXT
    // This method is installed so that we can filter
    // the thrown exception.
    //////////////////////////////////////////////////

    static dtVoid testExceptionHandler( const erException& aException);

    //////////////////////////////////////////////////
    // !METHOD_DECL_S
    // !NAME rtnObj
    // !TEXT
    // Static method which returns a reference to
    // the current object.  If none found an
```

```
// exception is thrown.
///////////////////////////////////////////////////

static idtExceptionTester& rtnObj();

///////////////////////////////////////////////////
// !METHOD_DECL_S
// !NAME def_ctor
// !TEXT
// Constructor for idtExceptionTester.
// aMsgID is the error message ID for the
// exception we are expecting to catch.
///////////////////////////////////////////////////

idtExceptionTester( dtULong aMsgID );

///////////////////////////////////////////////////
// !METHOD_DECL_S
// !NAME dtor
// !TEXT
// Destructor for a idtExceptionTester.
// Restores the normal desktop global exception handler.
///////////////////////////////////////////////////

~idtExceptionTester();

///////////////////////////////////////////////////
// !METHOD_DECL_S
// !NAME rtnMsgID
// !TEXT
// Returns the message ID for the exception
// under test.
///////////////////////////////////////////////////

dtULong rtnMsgID() const;

///////////////////////////////////////////////////
// !METHOD_DECL_S
// !NAME rtnEnv
// !TEXT
// Returns the environment information that is
// current at the beginning of the test.
///////////////////////////////////////////////////

dtInt* rtnEnv();

///////////////////////////////////////////////////
// !METHOD_DECL_S
// !NAME rtnExInfo, putExInfo
// !TEXT
// Returns (and sets) information about the exception
// thrown by the statement under test.  If no
// exception was caught a null pointer is returned.
///////////////////////////////////////////////////
```

```
    const bcStringi18n* rtnExInfo() const;
    dtVoid putExInfo( const erException& aException );


#ifdef OPLDEBUG
    ///////////////////////////////////////////////////
    // !METHOD_DECL_S
    // !NAME dump
    // !TEXT
    // Displays the contents of an instance of idtExceptionTester.
    // All output lines will be tabbed over by the amount
    // specified in aIndentLevel.  This permits nested
    // output in recursive dumps.
    //
    // NOTE: This method is only available when OPLDEBUG
    //       has been defined.
    ///////////////////////////////////////////////////

    dtVoid dump( dtOStream& aOutStream,
                 dtUInt     aIndentLevel = 0) const;
#endif //OPLDEBUG


  protected:


  private:

    ///////////////////////////////////////////////////
    // !METHOD_DECL_S
    // !NAME copy_ctor
    // !TEXT
    // Copy constructor, unimplemented.
    ///////////////////////////////////////////////////

    idtExceptionTester(const idtExceptionTester& aidtExceptionTester);


    ///////////////////////////////////////////////////
    // !METHOD_DECL_S
    // !NAME operator=
    // !TEXT
    // Assignment operator, unimplemented.
    ///////////////////////////////////////////////////

    idtExceptionTester& operator=(const idtExceptionTester& aidtExceptionTester);

    ///////////////////////////////////////////////////
    // !ATTR_DECL_S
    // !NAME mMsgID
    // !TEXT
    // The error message ID for the exception we are
    // expecting to catch in the test.
    ///////////////////////////////////////////////////

    dtULong mMsgID;

    ///////////////////////////////////////////////////
    // !ATTR_DECL_S
```

```
    // !NAME mExInfo
    // !TEXT
    // Information about the caught exception.
    ///////////////////////////////////////////////////

    bcStringi18n* mExInfo;


    ///////////////////////////////////////////////////
    // !ATTR_DECL_S
    // !NAME mObj
    // !TEXT
    // Static pointer to the current instance.
    // Only one exception can be tested at a time.
    ///////////////////////////////////////////////////

    static idtExceptionTester* mObj;


    ///////////////////////////////////////////////////
    // !ATTR_DECL_S
    // !NAME mEnv
    // !TEXT
    // Contains the current environment as captured
    // by ANSI setjmp() or Windows Catch().
    // NOTE: The size and type are stolen from
    //       windows.h to avoid pulling it in
    //       by this header.
    // typedef int CATCHBUF[9]; /* bp, di, si, sp, ret addr, ds */
    // CATCHBUF mJmpBuf;
    ///////////////////////////////////////////////////
#ifdef WIN
    int mEnv[9];
#endif //WIN
};

#endif  // idtexcptHH
```

```
/////////////////////////////////////////////////////////////////////////
// DOS_FILE_NAME:   idtkrnl.cpp
//                      ADT Unit Test Kernel Implementation
//
// Copyright 1993 by Marcam Corp., Newton, MA USA
//
// This unpublished copyrighted work contains
// TRADE SECRET information of Marcam Corporation.
//
// Use, transfer, copying without
// its express written permission is strictly
// forbidden.
//
/////////////////////////////////////////////////////////////////////////

#include <time.h>                // for timestamping
#include <string.h>

#include "idtkrnl.hh"
#include "dtmemexe.hh"
#include "dtfmtcha.hh"      // For dtFmtChar
#include "dtfmtdou.hh"      // For dtFmtDouble
#include "dtfmtflo.hh"      // For dtFmtFloat
#include "dtfmtint.hh"      // For dtFmtInt
#include "dtfmtlog.hh"      // For dtFmtLogical
#include "dtfmtlon.hh"      // For dtFmtLong
#include "dtfmtsho.hh"      // For dtFmtShort
#include "dtfmtuch.hh"      // For dtFmtUChar
#include "dtfmtuin.hh"      // For dtFmtUInt
#include "dtfmtulo.hh"      // For dtFmtULong
#include "dtfmtush.hh"      // For dtFmtUShort

// String constants for announce methods.
//
const dtChar* cParameter   = "  PARAMETER:";
const dtChar* cObject      = "  OBJECT:";
const dtChar* cReturnValue = "  RETURN VALUE:";

/////////////////////////////////////////////////////////////////
// !METHOD_DESC_S
// !NAME ctor
// !TEXT
// Initializes the dtKrnl superclass object
/////////////////////////////////////////////////////////////////
idtKrnl::idtKrnl (dtStreamExecutive* aStreamExec)
                 : mStreamExec (aStreamExec ), mNumErr (0)
{
}

/////////////////////////////////////////////////////////////////
// !METHOD_DESC_S
// !NAME dtor
// !TEXT
/////////////////////////////////////////////////////////////////
idtKrnl::~idtKrnl ( )
{
}

/////////////////////////////////////////////////////////////////
// !METHOD_DESC_S
```

```
// !NAME qryOutputStream
// !TEXT
// The qryOutputStream method will return the appropriate output
// dtOStream based on the VERBOSITY level passed in as a parameter.
//
// This method calls the qryOstream method of the dtMarcamStream
// class to retrieve the correct output dtOStream.
/////////////////////////////////////////////////////////////////////
dtOStream& idtKrnl::qryOutputStream ( dtMarcamStream::Verbosity aVerbosity )
{
    return *(mStreamExec->qryOutputStream ( aVerbosity ) );
}

/////////////////////////////////////////////////////////////////////
// !METHOD_DESC_S
// !NAME qryErrorStream
// !TEXT
// The qryErrorStream method will return the appropriate error
// dtOStream based on the VERBOSITY level passed in as a parameter.
//
// This method calls the qryOstream method of the dtMarcamStream
// class to retrieve the correct error dtOStream.
/////////////////////////////////////////////////////////////////////
dtOStream& idtKrnl::qryErrorStream ( dtMarcamStream::Verbosity aVerbosity )
{
    return *(mStreamExec->qryErrorStream ( aVerbosity ) );
}

/////////////////////////////////////////////////////////////////////
// !METHOD_DESC_S
// !NAME timeString
// !TEXT
// The timeString method will return a string loaded with a
// timestamp.  The digits will be ordered least significant
// first (ssmmhhddmmyy) to allow the string to be truncated
// while preserving (mostly) uniqueness.  The first parameter
// specifies the length of the string returned.  The maximum
// length is 12.
/////////////////////////////////////////////////////////////////////
dtChar*
idtKrnl::timeString( int pChars, dtMemoryMgr* aMM )
{
      char                dateStamp[9];
      char                timeStamp[9];
    char                  dateTime[12];
    char*                 rtnStr = new char[pChars+1];

      // Get the time & date
      _strdate( dateStamp );          // returns mm/dd/yy
      _strtime( timeStamp );          // returns hh:mm:ss

      // Put the date & time into dateTime, putting each
      // field in an order to promote random strings when truncated
      //          order: ssmmhhddmmyy
      int         i=0;

      dateTime[ i++ ] = timeStamp[6];
      dateTime[ i++ ] = timeStamp[7];
      dateTime[ i++ ] = timeStamp[3];
      dateTime[ i++ ] = timeStamp[4];
```

```
    dateTime[ i++ ] = timeStamp[0];
    dateTime[ i++ ] = timeStamp[1];
    dateTime[ i++ ] = dateStamp[3];
    dateTime[ i++ ] = dateStamp[4];
    dateTime[ i++ ] = dateStamp[0];
    dateTime[ i++ ] = dateStamp[1];
    dateTime[ i++ ] = dateStamp[6];
    dateTime[ i++ ] = dateStamp[7];

    // Truncate time to pChar characters, or 12, whichever is less
    //
    dateTime[ ( pChars < 12 ? pChars : 12 )] = '\0';

    // Copy the truncated string into the memory we allocated
    //
    strcpy( rtnStr, dateTime );

    return( rtnStr );
}

//////////////////////////////////////////////////////////////////////
// !METHOD_DESC_S
// !NAME announceMethodStart
// !TEXT
// This method provides a standard message announcing the beginning
// of a method execution.
//////////////////////////////////////////////////////////////////////
dtVoid idtKrnl::announceMethodStart (const dtChar* aBanner )
{
    // qryOstream of the MarcamStream gives a valid dtOStream& ONLY if
    // aVerbosityLevel is equal or less than the level the MarcamStream
    // was created at.
    qryOutputStream( dtMarcamStream::HIGH ) << "  METHOD START: " << aBanner <<
endl;
}

//////////////////////////////////////////////////////////////////////
// !METHOD_DESC_S
// !NAME announceMethodEnd
// !TEXT
// This method provides a standard message announcing the end
// of a method execution.
//////////////////////////////////////////////////////////////////////
dtVoid idtKrnl::announceMethodEnd (const dtChar* aBanner )
{
    qryOutputStream( dtMarcamStream::HIGH ) << "  METHOD END: " << aBanner <<
endl;
}

//////////////////////////////////////////////////////////////////////
// !METHOD_DECL_S
// !NAME announceStatusMsg
// !TEXT
// This method formats a status message from the parameters
// and output it to the correct stream(s).  This allows the
// unit test developers to add their own messages.
//////////////////////////////////////////////////////////////////////
dtVoid idtKrnl::announceStatusMsg ( const dtChar*       aMessage,
                                    const dtChar*       testname,
                                    const dtChar*       aFile,
```

```
                            dtUInt                        aLine,
                            dtMarcamStream::Verbosity     aVerbosity
                         )
{
    qryOutputStream( aVerbosity )
                << aMessage << " test: " << testname
                << ", at line: " << (dtChar *) dtFmtUInt(aLine) << ", File: " <<
aFile
                << endl;
}


/////////////////////////////////////////////////////////////////
// !METHOD_DESC_S
// !NAME checkMemory
// !TEXT
// This method will check the dtMemoryExecutive for any memory leaks.
/////////////////////////////////////////////////////////////////
dtBoolean idtKrnl::checkMemory (const dtChar*            aFile,
                                dtUInt                    aLine,
                                const dtMemoryExecutive&  aMemoryExec,
                                const dtChar*             testname )
{

    if ( ! aMemoryExec.isEmpty() )
    {
        announceErrorMsg( "MEMORY LEAK DETECTED IN MEMORY EXECUTIVE" , testname,
aFile, aLine );
        mNumErr++;

        return( dtFALSE );
    }

    announceStatusMsg( " CHECKED: Memory Executive, No Leaks Detected. " ,
                       testname, aFile, aLine );

    return( dtTRUE );
}

/////////////////////////////////////////////////////////////////
// !METHOD_DESC_S
// !NAME checkMemory
// !TEXT
// This method will check the dtMemoryMgr to see if any
// dtMemoryMgr objects are left over, indicating a possible
// memory leak.
/////////////////////////////////////////////////////////////////
dtBoolean idtKrnl::checkMemory (const dtChar*            aFile,
                                dtUInt                  aLine,
                                const dtMemoryMgr*      aMemoryMgr,
                                const dtChar*            testname )
{
    if (! aMemoryMgr->isMemoryClean() )
    {
        // dtInt aMemMgrId = aMemoryMgr.getMemMgrId();
        announceErrorMsg( "MEMORY LEAK DETECTED IN MEMORY MANAGER", testname,
aFile, aLine );
        mNumErr++;

        return( dtFALSE );
```

```
    }

    announceStatusMsg( " CHECKED: Memory Manager, No Leaks Detected. ",
        testname, aFile, aLine );

    return( dtTRUE );
}

////////////////////////////////////////////////////////////////
// !METHOD_DESC_S
// !NAME checkExpression
// !TEXT
// This method will verify if the passed in expression resolves
// to dtTRUE or dtFALSE.
////////////////////////////////////////////////////////////////
dtBoolean idtKrnl::checkExpression(
    dtInt                    aExprResult,
    const dtChar*            aExprString,
    const dtChar*            aFile,
    dtUInt                   aLine,
    const dtChar*              testname
    )
{
    if( !aExprResult )  // Resolves to dtFALSE.
    {
        announceErrorMsg( "EXPRESSION FAILED: ", testname, aFile, aLine,
aExprString );
        mNumErr++;

        return( dtFALSE );
    }

    qryOutputStream( dtMarcamStream::MED )
                << " CHECKED: Expression: " << aExprString << ", in test: " <<
testname
                << ", at line: " << (dtChar *) dtFmtUInt(aLine) << ", File: " <<
aFile
                << endl;

    return( dtTRUE );
}

////////////////////////////////////////////////////////////////
// !METHOD_DESC_S
// !NAME qryNumErr
// !TEXT
// Return the number of errors logged. This value will be used as the
// return value of the whole test suite.
// During batch runs, this can be used as a pass/fail switch
////////////////////////////////////////////////////////////////
dtUInt idtKrnl::qryNumErr ()
{
    return mNumErr;
}

////////////////////////////////////////////////////////////////
// !METHOD_DESC_S
// !NAME incNumErr
// !TEXT
// Increment the number of errors logged.
```

```
//////////////////////////////////////////////////////////////
dtVoid idtKrnl::incNumErr ()
{
    mNumErr++;
}

    //////////////////////////////////////////////////////////////
    // !METHOD_DECL_S
    // !NAME setVerbosity
    // !TEXT
    // Sets the current verbosity level to the value of the parameter.
    //////////////////////////////////////////////////////////////
dtVoid
idtKrnl::setVerbosity( dtMarcamStream::Verbosity aLevel )
{
    mStreamExec->setVerbosity( aLevel );
}

    //////////////////////////////////////////////////////////////
    // !METHOD_DECL_S
    // !NAME resetVerbosity
    // !TEXT
    // Resets the current verbosity level to the last used level.
    //////////////////////////////////////////////////////////////
dtVoid
idtKrnl::resetVerbosity( )
{
    mStreamExec->resetVerbosity();
}

//////////////////////////////////////////////////////////////
// !METHOD_DECL_S
// !NAME announceErrorMsg
// !TEXT
// This method formats an error message from the parameters
// and output it to the correct stream(s).  aDetail is an
// optional parameter to allow two strings to be output in
// the error message.
//////////////////////////////////////////////////////////////
dtVoid idtKrnl::announceErrorMsg ( const dtChar*        aMessage,
                            const dtChar*               testname,
                            const dtChar*               aFile,
                            dtUInt                      aLine,
                            const dtChar*               aDetail
                        )
{
        // Error messages go to the error stream and the output stream
        // !FIX in the future we may remove the error stream
        //
        qryErrorStream( dtMarcamStream::LOW )
                    << "ERROR: " << aMessage
                    << ( aDetail == (dtChar*) NULL ? "" : aDetail )
                    << ", in test: " << testname
                    << ", at Line: " << (dtChar *) dtFmtUInt(aLine) << ", File:
" << aFile
                    << endl;

        qryOutputStream( dtMarcamStream::LOW )
                    << "ERROR: " << aMessage
                    << ( aDetail == (dtChar*) NULL ? "" : aDetail )
```

```
                    << ", in test: " << testname
                    << ", at Line: " << (dtChar *) dtFmtUInt(aLine) << ", File:
" << aFile
                    << endl;

}


//////////////////////////////////////////////////////////////////
// !METHOD_DESC_S
// !NAME announceParameter
// !TEXT
// These methods provide a standard message announcing
// a particular parameter for all Prism OT object types.
//////////////////////////////////////////////////////////////////

dtVoid idtKrnl::announceParameter (const dtCore& aParam )
{
    dtOStream&  out = qryOutputStream( dtMarcamStream::HIGH );

    out << cParameter << endl;
    aParam.dump ( out, 1);
}


dtVoid idtKrnl::announceParameter (const dtCore* aParam )
{
    dtOStream&  out = qryOutputStream( dtMarcamStream::HIGH );

    if ( !aParam )                // check for null pointer
    {
        announceErrorMsg( "Null Pointer passed to announce method" ,
"announceParameter", __FILE__, __LINE__ );
        mNumErr++;
        return;
    } else {
       out << cParameter << endl;
       aParam->dump ( out, 1);
    }
}


dtVoid idtKrnl::announceParameter (const dtNonCore& aParam )
{
    dtOStream&  out = qryOutputStream( dtMarcamStream::HIGH );

    out << cParameter << endl;
    aParam.dump ( out, 1);
}


dtVoid idtKrnl::announceParameter (const dtNonCore* aParam )
{
    dtOStream&  out = qryOutputStream( dtMarcamStream::HIGH );

    if ( !aParam )                // check for null pointer
    {
        announceErrorMsg( "Null Pointer passed to announce method" ,
"announceParameter", __FILE__, __LINE__ );
        mNumErr++;
```

```
        return;
    } else {
      out << cParameter << endl;
      aParam->dump ( out, 1);
    }
}


dtVoid idtKrnl::announceParameter (const dtChar* aParam )
{
    dtOStream&  out = qryOutputStream( dtMarcamStream::HIGH );

    if ( !aParam )              // check for null pointer
    {
        announceErrorMsg( "Null Pointer passed to announce method" ,
"announceParameter", __FILE__, __LINE__ );
        mNumErr++;
        return;
    } else {
      out << cParameter << endl;
      out << dumpTab( 1 ) << aParam << endl;
    }
}


dtVoid idtKrnl::announceParameter (const dtUChar* aParam )
{
    dtOStream&  out = qryOutputStream( dtMarcamStream::HIGH );

    if ( !aParam )              // check for null pointer
    {
        announceErrorMsg( "Null Pointer passed to announce method" ,
"announceParameter", __FILE__, __LINE__ );
        mNumErr++;
        return;
    } else {
      out << cParameter << endl;
      out << dumpTab( 1 ) << aParam << endl;
    }
}


dtVoid idtKrnl::announceParameter (dtBoolean aParam )
{
    dtOStream&  out = qryOutputStream( dtMarcamStream::HIGH );

    out << cParameter << endl;
    out << dumpTab( 1 ) << aParam << endl;
}


dtVoid idtKrnl::announceParameter (dtChar aParam )
{
    dtOStream&  out = qryOutputStream( dtMarcamStream::HIGH );

    out << cParameter << endl;
    out << dumpTab( 1 ) << aParam << endl;
}
```

```
dtVoid idtKrnl::announceParameter (dtDouble aParam )
{
    dtOStream&  out = qryOutputStream( dtMarcamStream::HIGH );

    out << cParameter << endl;
    out << dumpTab( 1 ) << aParam << endl;
}


dtVoid idtKrnl::announceParameter (dtFloat aParam )
{
    dtOStream&  out = qryOutputStream( dtMarcamStream::HIGH );

    out << cParameter << endl;
    out << dumpTab( 1 ) << aParam << endl;
}


dtVoid idtKrnl::announceParameter (dtInt aParam )
{
    dtOStream&  out = qryOutputStream( dtMarcamStream::HIGH );

    out << cParameter << endl;
    out << dumpTab( 1 ) << aParam << endl;
}


dtVoid idtKrnl::announceParameter (dtLong aParam )
{
    dtOStream&  out = qryOutputStream( dtMarcamStream::HIGH );

    out << cParameter << endl;
    out << dumpTab( 1 ) << aParam << endl;
}


dtVoid idtKrnl::announceParameter (dtShort aParam )
{
    dtOStream&  out = qryOutputStream( dtMarcamStream::HIGH );

    out << cParameter << endl;
    out << dumpTab( 1 ) << aParam << endl;
}


dtVoid idtKrnl::announceParameter (dtUChar aParam )
{
    dtOStream&  out = qryOutputStream( dtMarcamStream::HIGH );

    out << cParameter << endl;
    out << dumpTab( 1 ) << aParam << endl;
}


dtVoid idtKrnl::announceParameter (dtUInt aParam )
{
    dtOStream&  out = qryOutputStream( dtMarcamStream::HIGH );

    out << cParameter << endl;
    out << dumpTab( 1 ) << aParam << endl;
```

```
}


dtVoid idtKrnl::announceParameter (dtULong aParam )
{
    dtOStream&  out = qryOutputStream( dtMarcamStream::HIGH );

    out << cParameter << endl;
    out << dumpTab( 1 ) << aParam << endl;
}


dtVoid idtKrnl::announceParameter (dtUShort aParam )
{
    dtOStream&  out = qryOutputStream( dtMarcamStream::HIGH );

    out << cParameter << endl;
    out << dumpTab( 1 ) << aParam << endl;
}


//////////////////////////////////////////////////////////////////
// !METHOD_DESC_S
// !NAME announceObject
// !TEXT
// These methods provide a standard message announcing
// an object for all Prism OT object types.
//////////////////////////////////////////////////////////////////

dtVoid idtKrnl::announceObject (const dtCore& anObject )
{
    dtOStream&  out = qryOutputStream( dtMarcamStream::HIGH );

    out << cObject << endl;
    anObject.dump ( out, 1);
}


dtVoid idtKrnl::announceObject (const dtCore* anObject )
{
    dtOStream&  out = qryOutputStream( dtMarcamStream::HIGH );

    if ( !anObject )              // check for null pointer
    {
        announceErrorMsg( "Null Pointer passed to announce method" ,
"announceParameter", __FILE__, __LINE__ );
        mNumErr++;
        return;
    } else {
       out << cObject << endl;
       anObject->dump ( out, 1);
    }
}


dtVoid idtKrnl::announceObject (const dtNonCore& anObject )
{
    dtOStream&  out = qryOutputStream( dtMarcamStream::HIGH );

    out << cObject << endl;
```

```
    anObject.dump ( out, 1);
}


dtVoid idtKrnl::announceObject (const dtNonCore* anObject )
{
    dtOStream&  out = qryOutputStream( dtMarcamStream::HIGH );

    if ( !anObject )               // check for null pointer
    {
        announceErrorMsg( "Null Pointer passed to announce method" ,
"announceParameter", __FILE__, __LINE__ );
        mNumErr++;
        return;
    } else {
       out << cObject << endl;
       anObject->dump ( out, 1);
    }
}


dtVoid idtKrnl::announceObject (const dtChar* anObject )
{
    dtOStream&  out = qryOutputStream( dtMarcamStream::HIGH );

    if ( !anObject )               // check for null pointer
    {
        announceErrorMsg( "Null Pointer passed to announce method" ,
"announceParameter", __FILE__, __LINE__ );
        mNumErr++;
        return;
    } else {
       out << cObject << endl;
       out << dumpTab( 1 ) << anObject << endl;
    }
}


dtVoid idtKrnl::announceObject (const dtUChar* anObject )
{
    dtOStream&  out = qryOutputStream( dtMarcamStream::HIGH );

    if ( !anObject )               // check for null pointer
    {
        announceErrorMsg( "Null Pointer passed to announce method" ,
"announceParameter", __FILE__, __LINE__ );
        mNumErr++;
        return;
    } else {
       out << cObject << endl;
       out << dumpTab( 1 ) << anObject << endl;
    }
}


dtVoid idtKrnl::announceObject (dtBoolean anObject )
{
    dtOStream&  out = qryOutputStream( dtMarcamStream::HIGH );

    out << cObject << endl;
```

```
    out << dumpTab( 1 ) << anObject << endl;
}

dtVoid idtKrnl::announceObject (dtChar anObject )
{
    dtOStream&  out = qryOutputStream( dtMarcamStream::HIGH );

    out << cObject << endl;
    out << dumpTab( 1 ) << anObject << endl;
}

dtVoid idtKrnl::announceObject (dtDouble anObject )
{
    dtOStream&  out = qryOutputStream( dtMarcamStream::HIGH );

    out << cObject << endl;
    out << dumpTab( 1 ) << anObject << endl;
}

dtVoid idtKrnl::announceObject (dtFloat anObject )
{
    dtOStream&  out = qryOutputStream( dtMarcamStream::HIGH );

    out << cObject << endl;
    out << dumpTab( 1 ) << anObject << endl;
}

dtVoid idtKrnl::announceObject (dtInt anObject )
{
    dtOStream&  out = qryOutputStream( dtMarcamStream::HIGH );

    out << cObject << endl;
    out << dumpTab( 1 ) << anObject << endl;
}

dtVoid idtKrnl::announceObject (dtLong anObject )
{
    dtOStream&  out = qryOutputStream( dtMarcamStream::HIGH );

    out << cObject << endl;
    out << dumpTab( 1 ) << anObject << endl;
}

dtVoid idtKrnl::announceObject (dtShort anObject )
{
    dtOStream&  out = qryOutputStream( dtMarcamStream::HIGH );

    out << cObject << endl;
    out << dumpTab( 1 ) << anObject << endl;
}

dtVoid idtKrnl::announceObject (dtUChar anObject )
{
```

```
    dtOStream&  out = qryOutputStream( dtMarcamStream::HIGH );

    out << cObject << endl;
    out << dumpTab( 1 ) << anObject << endl;
}

dtVoid idtKrnl::announceObject (dtUInt anObject )
{
    dtOStream&  out = qryOutputStream( dtMarcamStream::HIGH );

    out << cObject << endl;
    out << dumpTab( 1 ) << anObject << endl;
}

dtVoid idtKrnl::announceObject (dtULong anObject )
{
    dtOStream&  out = qryOutputStream( dtMarcamStream::HIGH );

    out << cObject << endl;
    out << dumpTab( 1 ) << anObject << endl;
}

dtVoid idtKrnl::announceObject (dtUShort anObject )
{
    dtOStream&  out = qryOutputStream( dtMarcamStream::HIGH );

    out << cObject << endl;
    out << dumpTab( 1 ) << anObject << endl;
}

/////////////////////////////////////////////////////////////////////
// !METHOD_DESC_S
// !NAME announceRetVal
// !TEXT
// These methods provide a standard message announcing
// a return value for all Prism OT object types.
/////////////////////////////////////////////////////////////////////

dtVoid idtKrnl::announceRetVal (const dtCore& aRetVal )
{
    dtOStream&  out = qryOutputStream( dtMarcamStream::HIGH );

    out << cReturnValue << endl;
    aRetVal.dump (out, 1);
}

dtVoid idtKrnl::announceRetVal (const dtCore* aRetVal )
{
    dtOStream&  out = qryOutputStream( dtMarcamStream::HIGH );

    if ( !aRetVal )                // check for null pointer
    {
        announceErrorMsg( "Null Pointer passed to announce method" ,
"announceParameter", __FILE__, __LINE__ );
        mNumErr++;
```

```
        return;
    } else {
      out << cReturnValue << endl;
      aRetVal->dump (out, 1);
    }
}


dtVoid idtKrnl::announceRetVal (const dtNonCore& aRetVal )
{
    dtOStream&  out = qryOutputStream( dtMarcamStream::HIGH );

    out << cReturnValue << endl;
    aRetVal.dump (out, 1);
}


dtVoid idtKrnl::announceRetVal (const dtNonCore* aRetVal )
{
    dtOStream&  out = qryOutputStream( dtMarcamStream::HIGH );

    if ( !aRetVal )              // check for null pointer
    {
        announceErrorMsg( "Null Pointer passed to announce method" ,
"announceParameter", __FILE__, __LINE__ );
        mNumErr++;
        return;
    } else {
      out << cReturnValue << endl;
      aRetVal->dump (out, 1);
    }
}


dtVoid idtKrnl::announceRetVal (const dtChar* aRetVal )
{
    dtOStream&  out = qryOutputStream( dtMarcamStream::HIGH );

    if ( !aRetVal )              // check for null pointer
    {
        announceErrorMsg( "Null Pointer passed to announce method" ,
"announceParameter", __FILE__, __LINE__ );
        mNumErr++;
        return;
    } else {
      out << cReturnValue << endl;
      out << dumpTab( 1 ) << aRetVal << endl;
    }
}


dtVoid idtKrnl::announceRetVal (const dtUChar* aRetVal )
{
    dtOStream&  out = qryOutputStream( dtMarcamStream::HIGH );

    if ( !aRetVal )              // check for null pointer
    {
        announceErrorMsg( "Null Pointer passed to announce method" ,
"announceParameter", __FILE__, __LINE__ );
        mNumErr++;
```

```
        return;
    } else {
        out << cReturnValue << endl;
        out << dumpTab( 1 ) << aRetVal << endl;
    }
}


dtVoid idtKrnl::announceRetVal (dtBoolean aRetVal )
{
    dtOStream&  out = qryOutputStream( dtMarcamStream::HIGH );

    out << cReturnValue << endl;
    out << dumpTab( 1 ) << aRetVal << endl;
}


dtVoid idtKrnl::announceRetVal (dtChar aRetVal )
{
    dtOStream&  out = qryOutputStream( dtMarcamStream::HIGH );

    out << cReturnValue << endl;
    out << dumpTab( 1 ) << aRetVal << endl;
}


dtVoid idtKrnl::announceRetVal (dtDouble aRetVal )
{
    dtOStream&  out = qryOutputStream( dtMarcamStream::HIGH );

    out << cReturnValue << endl;
    out << dumpTab( 1 ) << aRetVal << endl;
}


dtVoid idtKrnl::announceRetVal (dtFloat aRetVal )
{
    dtOStream&  out = qryOutputStream( dtMarcamStream::HIGH );

    out << cReturnValue << endl;
    out << dumpTab( 1 ) << aRetVal << endl;
}


dtVoid idtKrnl::announceRetVal (dtInt aRetVal )
{
    dtOStream&  out = qryOutputStream( dtMarcamStream::HIGH );

    out << cReturnValue << endl;
    out << dumpTab( 1 ) << aRetVal << endl;
}


dtVoid idtKrnl::announceRetVal (dtLong aRetVal )
{
    dtOStream&  out = qryOutputStream( dtMarcamStream::HIGH );

    out << cReturnValue << endl;
    out << dumpTab( 1 ) << aRetVal << endl;
}
```

```
dtVoid idtKrnl::announceRetVal (dtShort aRetVal )
{
    dtOStream&  out = qryOutputStream( dtMarcamStream::HIGH );

    out << cReturnValue << endl;
    out << dumpTab( 1 ) << aRetVal << endl;
}


dtVoid idtKrnl::announceRetVal (dtUChar aRetVal )
{
    dtOStream&  out = qryOutputStream( dtMarcamStream::HIGH );

    out << cReturnValue << endl;
    out << dumpTab( 1 ) << aRetVal << endl;
}


dtVoid idtKrnl::announceRetVal (dtUInt aRetVal )
{
    dtOStream&  out = qryOutputStream( dtMarcamStream::HIGH );

    out << cReturnValue << endl;
    out << dumpTab( 1 ) << aRetVal << endl;
}


dtVoid idtKrnl::announceRetVal (dtULong aRetVal )
{
    dtOStream&  out = qryOutputStream( dtMarcamStream::HIGH );

    out << cReturnValue << endl;
    out << dumpTab( 1 ) << aRetVal << endl;
}


dtVoid idtKrnl::announceRetVal (dtUShort aRetVal )
{
    dtOStream&  out = qryOutputStream( dtMarcamStream::HIGH );

    out << cReturnValue << endl;
    out << dumpTab( 1 ) << aRetVal << endl;
}
```

```
/////////////////////////////////////////////////////////////////////////
// DOS_FILE_NAME:   idtkrnl.hh
//                     ADT Unit Test Kernal Object Header
//
// Copyright 1993 by Marcam Corp., Newton, MA USA
//
// This unpublished copyrighted work contains
// TRADE SECRET information of Marcam Corporation.
//
// Use, transfer, copying without
// its express written permission is strictly
// forbidden.
//
/////////////////////////////////////////////////////////////////////////

#ifndef idtkrnlHH
#define idtkrnlHH
//!FIX
// 12/22/93 mxe and rick H
// This is a mess but we need to include windows.h since some of the
// unit test have a winmain and they were relying on an errors header
// file that used to include windows.h but doesn't. This needs to be corrected
// but Harvey Reed sugested this as a temp fix for the FD 2.0 build.
// I will submit a UFO for this
//
#include <windows.h>

#include "dtostrm.hh"
#include "dtcore.hh"
#include "dtnoncor.hh"
#include "dtprims.hh"
#include "dtstexec.hh"  // dtStreamExecutive

//////////////////////////////////////////////////////////////////////////////
// :CLASS_DESC_S
// :LIBRARY ADT
// !NAME idtKrnl
// !TEXT
// This class defines "helper methods" wiich will be executed
// from withing "inspection classes" for each OPL class. The inspection
// class will inherit from this class.
//
// The methods in this class allow for checking for error conditions
// and reporting error and status messages.  All messages have an
// associated verbosity level; if the output stream has a verbosity
// level the same or higher than that of the message, then the message
// will be displayed.  Error messages are prefixed with the term
// "ERROR:" and all have a verbosity of dtMarcamStream::LOW.  Error
// messages can only be generated by calling checkMemoryMgr or checkExpr.
// There are two levels of status messages. "Progress" messages indicate
// the progress through the unit test code and they have a verbosity of
// dtMarcamStream::MED and are generated by the macro announceStatus.
// checkMemoryMgr and checkExpr will also output progress messages if
// their tests resolve without error. Other status messages are used to
// dump debugging information and have a verbosity of dtMarcamStream::HIGH.
//
// !AUTHOR      Jonathan Aibel      aibel@opl.com
// !REVIEWER
// !REVIEW_DATE
//////////////////////////////////////////////////////////////////////////////
```

```
////////////////////////////////////////////////////////////////////////////////
//
// Three quick forms of checking for errors or announcing status.  In general
// these are the preferred methods of calling these routines, but note that
// announceStatusMsg can be called directly if you need to override the default
// verbosity setting.
////////////////////////////////////////////////////////////////////////////////

    // checkExpr - check expression with testname specified
#define checkExpr( expr, testname )    checkExpression( expr, #expr, __FILE__,
__LINE__, testname )

    // checkMemMgr - check memory manager for leaks
#define checkMemMgr( mgr, testname )
checkMemory(__FILE__,__LINE__,mgr,testname)

    // announceStatus - output your own status message
#define announceStatus( msg, testname )
announceStatusMsg(msg,testname,__FILE__,__LINE__)


class EXPORT idtKrnl
{
    public:

    ///////////////////////////////////////////////////////////////////
    // !METHOD_DECL_S
    // !NAME ctor
    // !TEXT
    // Initializes the dtKrnl superclass object
    ///////////////////////////////////////////////////////////////////
    idtKrnl (dtStreamExecutive* aStreamExec);

    ///////////////////////////////////////////////////////////////////
    // !METHOD_DECL_S
    // !NAME dtor
    // !TEXT
    ///////////////////////////////////////////////////////////////////
    virtual ~idtKrnl ();

    ///////////////////////////////////////////////////////////////////
    // !METHOD_DECL_S
    // !NAME qryOutputStream
    // !TEXT
    // The qryOutputStream method will return the appropriate output
    // dtOStream based on the VERBOSITY level passed in as a parameter.
    //
    // This method calls the qryOstream method of the dtMarcamStream
    // class to retrieve the correct output dtOStream.
    ///////////////////////////////////////////////////////////////////
    dtOStream& qryOutputStream (dtMarcamStream::Verbosity aVerbosityLevel);

    ///////////////////////////////////////////////////////////////////
    // !METHOD_DECL_S
    // !NAME qryErrorStream
    // !TEXT
    // The qryErrorStream method will return the appropriate output
    // dtOStream based on the VERBOSITY level passed in as a parameter.
    //
```

```
// This method calls the qryOstream method of the dtMarcamStream
// class to retrieve the correct error dtOStream.
////////////////////////////////////////////////////////////////////
dtOStream& qryErrorStream  (dtMarcamStream::Verbosity aVerbosityLevel);

////////////////////////////////////////////////////////////////////
// !METHOD_DESC_S
// !NAME timeString
// !TEXT
// The timeString method will return a string loaded with a
// timestamp.  The digits will be ordered least significant
// first (ssmmhhddmmyy) to allow the string to be truncated
// while preserving (mostly) uniqueness.  The first parameter
// specifies the length of the string returned.  The maximum
// length is 12.
//
// This is used by IPK/IPS tests to generate unique user keys.
////////////////////////////////////////////////////////////////////
dtChar* timeString( int pChars, dtMemoryMgr* aMM );

////////////////////////////////////////////////////////////////////
// !METHOD_DECL_S
// !NAME announceMethodStart
// !TEXT
// This method provides a standard message announcing the beginning
// of a method execution.  The verbosity level of this message is
// HIGH.
////////////////////////////////////////////////////////////////////
dtVoid announceMethodStart (const dtChar * aMsg );

////////////////////////////////////////////////////////////////////
// !METHOD_DECL_S
// !NAME announceMethodEnd
// !TEXT
// This method provides a standard message announcing the end
// of a method execution.  The verbosity level of this message is
// HIGH.
////////////////////////////////////////////////////////////////////
dtVoid announceMethodEnd (const dtChar* aMsg );

////////////////////////////////////////////////////////////////////
// !METHOD_DECL_S
// !NAME announceStatusMsg
// !TEXT
// This method formats a status message from the parameters
// and puts it in the correct stream(s).  This allows the
// unit test developers to output their own messages.  The
// announceStatus macro is the preferred use, but this method can
// be called directly if the default verbosity level needs to
// be overrided.
////////////////////////////////////////////////////////////////////
dtVoid announceStatusMsg (  const dtChar*              aMessage,
                         const dtChar*              testname,
                         const dtChar*              aFile,
                         dtUInt                     aLine,
                         dtMarcamStream::Verbosity  aVerbosity
                                     = dtMarcamStream::MED
                    );

////////////////////////////////////////////////////////////////////
```

```
// !METHOD_DECL_S
// !NAME checkMemory
// !TEXT
// This method will check the dtMemoryMgr for any memory leaks.
// The macro checkMemoryMgr is recommended as the preferred usage.
////////////////.///////////////////////////////////////////////////
dtBoolean checkMemory (const dtChar*                   aFile,
                      dtUInt                          aLine,
                      const dtMemoryMgr*,
                      const dtChar*                   testname
                                 = (const dtChar*) NULL );

////////////////////////////////////////////////////////////////////
// !METHOD_DECL_S
// !NAME checkMemory
// !TEXT
// This method will check the dtMemoryExecutive to see if any
// dtMemoryMgr objects are left over, resulting in a possible
// mmemory leak.
////////////////////////////////////////////////////////////////////
dtBoolean checkMemory ( const dtChar*                  aFile,
                          dtUInt                       aLine,
                          const dtMemoryExecutive &,
                          const dtChar*                testname
                                 = (const dtChar*) NULL );


////////////////////////////////////////////////////////////////////
// !METHOD_DECL_S
// !NAME checkExpression
// !TEXT
// This method will verify if the passed in expression resolves
// to dtTRUE or dtFALSE.  If expression resolves to dtFALSE
// the expression is logged to the error stream and the error
// count is incremented.
////////////////////////////////////////////////////////////////////

dtBoolean checkExpression (dtInt                   aExprResult,
                          const dtChar*            aExprString,
                          const dtChar*            aFile,
                          dtUInt                   aLine,
                          const dtChar*            testname );

////////////////////////////////////////////////////////////////////
// !METHOD_DECL_S
// !NAME qryNumErr
// !TEXT
// Return the number of errors logged. This value will be used as the
// return value of the whole test suite.
// During batch runs, this can be used as a pass/fail switch
////////////////////////////////////////////////////////////////////
dtUInt qryNumErr ();

////////////////////////////////////////////////////////////////////
// !METHOD_DECL_S
// !NAME incNumErr
// !TEXT
// Increments the number of errors logged.  Public because it
// is used by idtTest when checking test coverage.
////////////////////////////////////////////////////////////////////
```

```
dtVoid incNumErr ();

//////////////////////////////////////////////////////////////////
// !METHOD_DECL_S
// !NAME setVerbosity
// !TEXT
// Sets the current verbosity level to the value of the parameter.
//////////////////////////////////////////////////////////////////
dtVoid setVerbosity( dtMarcamStream::Verbosity aLevel ) ;

//////////////////////////////////////////////////////////////////
// !METHOD_DECL_S
// !NAME resetVerbosity
// !TEXT
// Resets the current verbosity level to the last used level.
// The intention is that set- and resetVerbosity can be used
// to bracket a section of unit test code to be run at a higher
// verbosity than the rest.
//////////////////////////////////////////////////////////////////
dtVoid resetVerbosity( ) ;

//////////////////////////////////////////////////////////////////
// !METHOD_DECL_S
// !NAME announceParameter, announceObject, announceRetVal
// !TEXT
// These methods provide a standard way in which to announce
// an object in a unit test.  The verbosity level for these
// messages is set to HIGH.  Therefore the output will only
// be placed in the output file when HIGH is selected on the
// unit test harness.
//
// These methods are overloaded to accept all object types
// used by Prism OT.
//////////////////////////////////////////////////////////////////

dtVoid announceParameter (const dtCore& );
dtVoid announceParameter (const dtCore* );
dtVoid announceParameter (const dtNonCore& );
dtVoid announceParameter (const dtNonCore* );
dtVoid announceParameter (const dtChar* );
dtVoid announceParameter (const dtUChar* );
dtVoid announceParameter (dtBoolean );
dtVoid announceParameter (dtChar );
dtVoid announceParameter (dtDouble );
dtVoid announceParameter (dtFloat );
dtVoid announceParameter (dtInt );
dtVoid announceParameter (dtLong );
dtVoid announceParameter (dtShort );
dtVoid announceParameter (dtUChar );
dtVoid announceParameter (dtUInt );
dtVoid announceParameter (dtULong );
dtVoid announceParameter (dtUShort );

dtVoid announceObject (const dtCore& );
dtVoid announceObject (const dtCore* );
dtVoid announceObject (const dtNonCore& );
dtVoid announceObject (const dtNonCore* );
dtVoid announceObject (const dtChar* );
dtVoid announceObject (const dtUChar* );
dtVoid announceObject (dtBoolean );
```

```
  dtVoid announceObject (dtChar );
  dtVoid announceObject (dtDouble );
  dtVoid announceObject (dtFloat );
  dtVoid announceObject (dtInt );
  dtVoid announceObject (dtLong );
  dtVoid announceObject (dtShort );
  dtVoid announceObject (dtUChar );
  dtVoid announceObject (dtUInt );
  dtVoid announceObject (dtULong );
  dtVoid announceObject (dtUShort );

  dtVoid announceRetVal (const dtCore& );
  dtVoid announceRetVal (const dtCore* );
  dtVoid announceRetVal (const dtNonCore& );
  dtVoid announceRetVal (const dtNonCore* );
  dtVoid announceRetVal (const dtChar* );
  dtVoid announceRetVal (const dtUChar* );
  dtVoid announceRetVal (dtBoolean );
  dtVoid announceRetVal (dtChar );
  dtVoid announceRetVal (dtDouble );
  dtVoid announceRetVal (dtFloat );
  dtVoid announceRetVal (dtInt );
  dtVoid announceRetVal (dtLong );
  dtVoid announceRetVal (dtShort );
  dtVoid announceRetVal (dtUChar );
  dtVoid announceRetVal (dtUInt );
  dtVoid announceRetVal (dtULong );
  dtVoid announceRetVal (dtUShort );

protected:

  //////////////////////////////////////////////////////////////////
  // !METHOD_DECL_S
  // !NAME announceErrorMsg
  // !TEXT
  // This method formats an error message from the parameters
  // and puts it in the correct stream(s).  This is private so
  // that we have control over the output and format of error
  // messages.  Note that error message verbosity is dtMarcamStream::LOW
  // This is called by checkMemory and checkExpression.
  //////////////////////////////////////////////////////////////////
  dtVoid announceErrorMsg (   const dtChar*           aMessage,
                         const dtChar*               testname,
                         const dtChar*               aFile,
                         dtUInt                      aLine,
                         const dtChar*               aDetail
                                       = (const dtChar*) NULL
                    );

private:

  //////////////////////////////////////////////////////////////////
  // !ATTRIBUTE_DECL_S
  // !NAME mStreamExec;
  // !TEXT
  // StreamExecutive from which dtOStreams will be created
  // and used in the test suites.
  //////////////////////////////////////////////////////////////////
  dtStreamExecutive* mStreamExec;
```

```
    ////////////////////////////////////////////////////////////////////
    // !ATTRIBUTE_DECL_S
    // !NAME mNumErr;
    // !TEXT
    // Number of errors encounter during the test suite.  This value
    // will be used as the return value for the entire test suite and
    // can be used as a pass/fail switch.
    ////////////////////////////////////////////////////////////////////
    dtUInt           mNumErr;
};

#endif
```

```
//////////////////////////////////////////////////////////////////////////////
//
// FILE_NAME: idtsetup.cc
//
// Copyright 1993 by Marcam Corp., Newton, MA USA
//
// This unpublished copyrighted work contains
// TRADE SECRET information of Marcam Corporation.
//
// Use, transfer, disclosure, or copying without its expressed
// written permission is strictly forbidden.
//
//////////////////////////////////////////////////////////////////////////////

#include "idtsetup.hh"


idtSetup::idtSetup( idtKrnl* pInspect,dtMemoryMgr* aMM , bcStringi18n* pPrefix )
:
       dtCore(aMM),
    mIDTKrnl ( pInspect ),
    mUKPrefix( pPrefix )
{
    unsigned long randomNumber;

    randomNumber = rand();
    mCount = (randomNumber+1) % 26;
    mDefaultSite = new(aMM) bcStringi18n((dtUChar*) "UT1",aMM);
}

idtSetup::idtSetup(dtMemoryMgr* aMM) : dtCore(aMM)
{
    mDefaultSite = new(aMM) bcStringi18n((dtUChar*) "UT1",aMM);
}

idtSetup::~idtSetup()
{

    delete mDefaultSite;

}


erStatus
idtSetup::setUKPrefix(bcStringi18n* newPrefix)
{
  erStatus stat (erFail);

  if (((bcStringi18n*)NULL != newPrefix) && (! newPrefix->isNullStr() ) )
  {
     stat = erSuccess;
     *mUKPrefix = *newPrefix;

  }

   return (stat);

}
```

```
erStatus
idtSetup::setDefaultSite(bcStringi18n* aNewSite)
{
  erStatus stat (erFail);

  if (((bcStringi18n*)NULL != aNewSite) && (! aNewSite->isNullStr() ) )
  {
     stat = erSuccess;
     *mDefaultSite = *aNewSite;
  }

   return (stat);
}


dtVoid
idtSetup::dump( dtOStream& aOutStream,dtUInt aIndentLevel) const
{
}


erStatus
idtSetup::getDefaultSite(bcStringi18n*& aSite)
{
  erStatus stat (erFail);

  stat = erSuccess;
  *aSite = *mDefaultSite;

  return (stat);
}
```

```
///////////////////////////////////////////////////////////////////////////
//
// FILE_NAME: idtSetup.hh
//
// Copyright 1993 by Marcam Corp., Newton, MA USA
//
// This unpublished copyrighted work contains
// TRADE SECRET information of Marcam Corporation.
//
// Use, transfer, disclosure, or copying without its expressed
// written permission is strictly forbidden.
//
///////////////////////////////////////////////////////////////////////////

#ifndef idtSetupHH
#define idtSetupHH

#include "dtcore.hh"                  // for dtCore, parent class
#include "idtkrnl.hh"          // For idtKrnl
#include "idtsrvs.hh"                 // For idtSrvs, parent class
#include "security.hh"         // For fdSecurityContext
#include "ermsglis.hh"         // For error message list

class EXPORT idtSetup : public dtCore, public idtSrvs
{
public:

    //////////////////////////////////////////////////////////////////
    // !METHOD_DECL_S
    // !NAME ctor
    // !TEXT
    // Initializes the x_pdPM object.  The first parameter (an idtTest
    // pointer) is expected to be a pointer to the inspection
    // class being run, allowing the x_pdPM object to report errors
    // to the inspection class's output streams.  The second parameter
    // is a pointer to a string to be used as the prefix to the
    // user keys generated by x_pdPM.
    //////////////////////////////////////////////////////////////////
    idtSetup( idtKrnl* ,dtMemoryMgr*,  bcStringi18n* = NULL );

    idtSetup(dtMemoryMgr*);
    ///////////////////////////////////////////////////
    // !METHOD_DECL_S
    // !NAME dtor
    // !TEXT
    // Destructor; removes the x_pdPM object from memory
    ///////////////////////////////////////////////////
    virtual ~idtSetup();

    ///////////////////////////////////////////////////
    // !METHOD_DECL_S
    // !NAME setUKPrefix
    // !TEXT
    // Destructor; changes the prefix of the names of randomly generated userkeys..
    ///////////////////////////////////////////////////


    virtual
    erStatus setUKPrefix(bcStringi18n* newPrefix);
```

```
    ////////////////////////////////////////////////////
    // !METHOD_DECL_S
    // !NAME setDefaultSite
    // !TEXT
    // Destructor; changes the Site of the randomly generated userkeys..
    ///////////////////////////////////////////////////

    virtual
    erStatus setDefaultSite(bcStringi18n* aNewSite);

    virtual dtVoid dump( dtOStream& aOutStream,dtUInt aIndentLevel = 0) const ;

    ////////////////////////////////////////////////////
    // !METHOD_DECL_S
    // !NAME getDefaultSite
    // !TEXT
    // Destructor; gets the Site of the randomly generated userkeys..
    ///////////////////////////////////////////////////

    virtual
    erStatus getDefaultSite(bcStringi18n*& aNewSite);


protected:

    ///////////////////////////////////////////////////
    // !ATTRIBUTE_DECL_S
    // !NAME mIDTKrnl;
    // !TEXT
    // A pointer to the "parent" inspection class, used
    // to access output streams for reporting messages
    ///////////////////////////////////////////////////
    idtKrnl*    mIDTKrnl;

    ///////////////////////////////////////////////////
    // !ATTRIBUTE_DECL_S
    // !NAME mUKPrefix;
    // !TEXT
    // A seperating a user key, to help make the random
    // userkeys identifiable.
    // This is passed in through the ctor.
    ///////////////////////////////////////////////////
    bcStringi18n*   mUKPrefix;

    bcStringi18n*   mDefaultSite;

    int mCount;

};

#endif
```

```
/////////////////////////////////////////////////////////////////////////
// DOS_FILE_NAME:   idtsrvs.cpp
//                      ADT Unit Test Kernel Implementation
//
// Copyright 1993 by Marcam Corp., Newton, MA USA
//
// This unpublished copyrighted work contains
// TRADE SECRET information of Marcam Corporation.
//
// Use, transfer, copying without
// its express written permission is strictly
// forbidden.
//
/////////////////////////////////////////////////////////////////////////

#include <time.h>                // for timestamping
#include <string.h>          // for char* manipulation

#include "bcsti18n.hh"      // for bcStringi18n
#include "idtsrvs.hh"

/////////////////////////////////////////////////////////////////
// !METHOD_DESC_S
// !NAME ctor
// !TEXT
// Initializes the dtsrvs superclass object
/////////////////////////////////////////////////////////////////
idtSrvs::idtSrvs( )
{
      TEST_UNDEFINED = "<Undefined>";
}

/////////////////////////////////////////////////////////////////
// !METHOD_DESC_S
// !NAME dtor
// !TEXT
/////////////////////////////////////////////////////////////////
idtSrvs::~idtSrvs ( )
{
}

////////////////////////////////////////////////////////////////
// !METHOD_DESC_S
// !NAME timeString
// !TEXT
// The timeString method will return a string loaded with a
// timestamp.  The digits will be ordered least significant
// first (ssmmhhddmmyy) to allow the string to be truncated
// while preserving (mostly) uniqueness.  The first parameter
// specifies the length of the string returned.  The maximum
// length is 12.
////////////////////////////////////////////////////////////////
dtVoid
idtSrvs::timeString( bcStringi18n*& pString, dtUInt pChars, dtMemoryMgr* aMM )
{
      char              dateStamp[9];
      char              timeStamp[9];
      char              dateTime[13];           // 1 + max length

      // Get the time & date
```

```
    _strdate( dateStamp );            // returns mm/dd/yy
    _strtime( timeStamp );            // returns hh:mm:ss

    // Put the date & time into dateTime, putting each
    // field in an order to promote random strings when truncated
    //          order: ssmmhhddmmyy
    int         i=0;

    dateTime[ i++ ] = timeStamp[6];
    dateTime[ i++ ] = timeStamp[7];
    dateTime[ i++ ] = timeStamp[3];
    dateTime[ i++ ] = timeStamp[4];
    dateTime[ i++ ] = timeStamp[0];
    dateTime[ i++ ] = timeStamp[1];
    dateTime[ i++ ] = dateStamp[3];
    dateTime[ i++ ] = dateStamp[4];
    dateTime[ i++ ] = dateStamp[0];
    dateTime[ i++ ] = dateStamp[1];
    dateTime[ i++ ] = dateStamp[6];
    dateTime[ i++ ] = dateStamp[7];

    // Truncate time to pChar characters, or 12, whichever is less
    //
    dateTime[ ( pChars < 12 ? pChars : 12 )] = '\0';

    // Copy the truncated string into the passed to us
    //
    *pString = (dtUChar*) dateTime;
}
```

```
/////////////////////////////////////////////////////////////////////////
// DOS_FILE_NAME:   idtsrvs.hh
//                        ADT Unit Test Services Class Header
//
// Copyright 1993 by Marcam Corp., Newton, MA USA
//
// This unpublished copyrighted work contains
// TRADE SECRET information of Marcam Corporation.
//
// Use, transfer, copying without
// its express written permission is strictly
// forbidden.
//
/////////////////////////////////////////////////////////////////////////

#ifndef idtsrvsHH
#define idtsrvsHH

#include "dtprims.hh"

class bcStringi18n;              // forward declaration

//dtChar* TEST_UNDEFINED = "<undefined>";  // Used by Macros.
////////////////////////////////////////////////////////////////////////////////
// !CLASS_DESC_S
// !LIBRARY ADT
// !NAME idtsrvs
// !TEXT
// This class defines "test services" which will be used
// by inspection classes, setup classes and populate classes.
//
// The services include:
//           timeString:  generate a string from the current time.
//
// This class is inherited by its clients, so it is important
// that it contains *no* data members and developers must be
// careful about interface overlaps.  This should not be the
// first class inherited (i.e. "public dtCore, idtSrvs", not
// the other way around).
//
// !AUTHOR      Jonathan Aibel      aibel@opl.com
// !REVIEWER
// !REVIEW_DATE
////////////////////////////////////////////////////////////////////////////////


class EXPORT idtSrvs
{
    public:

    //////////////////////////////////////////////////////////////////
    // !METHOD_DECL_S
    // !NAME ctor
    // !TEXT
    // Initializes the dtsrvs superclass object
    //////////////////////////////////////////////////////////////////
    idtSrvs( );

    //////////////////////////////////////////////////////////////////
    // !METHOD_DECL_S
```

```
    // !NAME dtor
    // !TEXT
    /////////////////////////////////////////////////////////////////////
    virtual ~idtSrvs();

    ////////////////////////////////////////////////////////////////////
    // :METHOD_DESC_S
    // !NAME timeString
    // !TEXT
    // The timeString method will return a string loaded with a
    // timestamp.  The digits will be ordered least significant
    // first (ssmmhhddmmyy) to allow the string to be truncated
    // while preserving (mostly) uniqueness.  The first parameter
    // specifies the length of the string returned.  The maximum
    // length is 12.
    //
    // This is used by IPK/IPS tests to generate unique user keys.
    ////////////////////////////////////////////////////////////////////
    dtVoid timeString( bcStringi18n*& pString, dtUInt pChars, dtMemoryMgr* aMM
);

  protected:
      dtChar*        TEST_UNDEFINED;

  private:

};

#endif
```

```
/////////////////////////////////////////////////////////////////////
// FILE NAME:  idttargs.cpp
// Copyright 1993 by Marcam Corp., Newton, MA USA
//
// This unpublished copyrighted work contains
// TRADE SECRET information of Marcam Corporation.
//
// Use, transfer, copying without
// its express written permission is strictly
// forbidden.
//
/////////////////////////////////////////////////////////////////////

#include "idttargs.hh"

    idtTestArgs::idtTestArgs ()
    {
    }

    /////////////////////////////////////////////////////////////////
    // !METHOD_DESC_S
    // !NAME ctor
    // !TEXT
    // Initializes the idtTestArgs object
    /////////////////////////////////////////////////////////////////
    idtTestArgs::idtTestArgs (dtChar* filename,
                              dtMarcamStream::Verbosity aLifeCycleVerbosity,
                                        dtMarcamStream::Verbosity aSetQrysVerbosity,
                                        dtMarcamStream::Verbosity aOperatorsVerbosity,
                                        dtMarcamStream::Verbosity aSemanticsVerbosity,
                                        dtMarcamStream::Verbosity aPersistVerbosity )
                              : mDestinationFile (filename ),
                                mLifeCycleVerbosity( aLifeCycleVerbosity ),
                                        mSetQrysVerbosity( aSetQrysVerbosity ),
                                        mOperatorsVerbosity( aOperatorsVerbosity
),
                                        mSemanticsVerbosity( aSemanticsVerbosity
),
                                        mPersistVerbosity( aPersistVerbosity )
    {
      mErrorCount = 0;
      mMethodsTested = 0;
      mMethodsTotal = 0;
      mTestCount = 0;
    }

    /////////////////////////////////////////////////////////////////
    // !METHOD_DESC_S
    // !NAME dtor
    // !TEXT
    /////////////////////////////////////////////////////////////////
    idtTestArgs::~idtTestArgs( )
    {
    }

    /////////////////////////////////////////////////////////////////
    // !METHOD_DESC_S
    // !NAME qryDestination
    // !TEXT
    // The qryDestination method will return the
```

```
// mDestinationFile attribute.
//
///////////////////////////////////////////////////////////////////
dtChar *idtTestArgs::qryDestination ()
{
     return mDestinationFile;
}

///////////////////////////////////////////////////////////////////
// !METHOD_DECL_S
// !NAME qryLifeCycleVerbosity,....
// !TEXT
// The qryVerbosity method will return the
// the mVerbosity attribute.
//////////////////////////////////////////////////////////////////
dtMarcamStream::Verbosity
idtTestArgs::qryLifeCycleVerbosity  ()
{
    return mLifeCycleVerbosity ;
}

dtMarcamStream::Verbosity
idtTestArgs::qrySetQrysVerbosity  ()
{
    return mSetQrysVerbosity ;
}

dtMarcamStream::Verbosity
idtTestArgs::qryOperatorsVerbosity  ()
{
    return mOperatorsVerbosity ;
}

dtMarcamStream::Verbosity
idtTestArgs::qrySemanticsVerbosity  ()
{
       return mSemanticsVerbosity ;
}

dtMarcamStream::Verbosity
idtTestArgs::qryPersistVerbosity  ()
{
    return mPersistVerbosity ;
}

      ///////////////////////////////////////////////////////////////
    // :METHOD_DECL_S
    // :NAME qryMaxVerbosity
    // :TEXT
    // The qryMaxVerbosity method will return the
    // the maximum setting amoung the mVerbosity attributes.
      ///////////////////////////////////////////////////////////////
dtMarcamStream::Verbosity
idtTestArgs::qryMaxVerbosity()
{
       dtMarcamStream::Verbosity  result;

       result = (mPersistVerbosity > mSemanticsVerbosity) ? mPersistVerbosity : mSemanticsVer
       result = (mOperatorsVerbosity > result ) ? mOperatorsVerbosity : result ;
       result = (mSetQrysVerbosity > result ) ? mSetQrysVerbosity : result ;
```

```
    result = (mLifeCycleVerbosity > result ) ? mLifeCycleVerbosity : result ;

    return result;
}

    ////////////////////////////////////////////////////////////////
    // !METHOD_DECL_S
    // !NAME setNumErrors
    // !TEXT
    // The setNumErrors method will set the number of errors member.
    ////////////////////////////////////////////////////////////////
    dtVoid
    idtTestArgs::setNumErrors( dtInt aInt )
    {
    mErrorCount = aInt ;
    }

    ////////////////////////////////////////////////////////////////
    // !METHOD_DECL_S
    // !NAME setNumMethodsTested
    // !TEXT
    // The setNumMethodsTested method will set the number of methods
    // tested member.
    ////////////////////////////////////////////////////////////////
    dtVoid
    idtTestArgs::setNumMethodsTested( dtInt aInt )
    {
    mMethodsTested = aInt ;
    }

    ////////////////////////////////////////////////////////////////
    // !METHOD_DECL_S
    // !NAME setNumMethodsTotal
    // !TEXT
    // The setNumMethodsTotal method will set the total number of methods
    // member.
    ////////////////////////////////////////////////////////////////
    dtVoid
    idtTestArgs::setNumMethodsTotal( dtInt aInt )
    {
    mMethodsTotal = aInt ;
    }


    ////////////////////////////////////////////////////////////////
    // !METHOD_DECL_S
    // !NAME setNumTests
    // !TEXT
    // The setNumTests method will set the number of tests member.
    ////////////////////////////////////////////////////////////////
    dtVoid
    idtTestArgs::setNumTests( dtInt aInt )
      {
    mTestCount = aInt ;
    }


    ////////////////////////////////////////////////////////////////
    // !METHOD_DECL_S
    // !NAME qryNumErrors
```

```
// !TEXT
// The qryNumErrors method will return the number of errors found.
   //////////////////////////////////////////////////////////////
dtInt
idtTestArgs::qryNumErrors( )
{
return mErrorCount ;
}

   //////////////////////////////////////////////////////////////
// !METHOD_DECL_S
// !NAME qryNumMethodsTested
// !TEXT
// The qryNumMethodsTested method will set the number of methods
// tested member.
   //////////////////////////////////////////////////////////////
dtInt
idtTestArgs::qryNumMethodsTested(  )
{
return mMethodsTested ;
}

   //////////////////////////////////////////////////////////////
// !METHOD_DECL_S
// !NAME qryNumMethodsTotal
// !TEXT
// The qryNumMethodsTotal method will return the total number of
// methods
   //////////////////////////////////////////////////////////////
dtInt
idtTestArgs::qryNumMethodsTotal(  )
{
return mMethodsTotal ;
}

   //////////////////////////////////////////////////////////////
// !METHOD_DECL_S
// !NAME qryNumTests
// !TEXT
// The qryNumTests method will return the number of tests run.
   //////////////////////////////////////////////////////////////
dtInt
idtTestArgs::qryNumTests(  )
{
return mTestCount ;
}
```

```
//////////////////////////////////////////////////////////////////////
// FILE NAME:  idttargs.hh
// Copyright 1993 by Marcam Corp., Newton, MA USA
//
// This unpublished copyrighted work contains
// TRADE SECRET information of Marcam Corporation.
//
// Use, transfer, copying without
// its express written permission is strictly
// forbidden.
//
//////////////////////////////////////////////////////////////////////

#ifndef idttargsHH
#define idttargsHH

#include "dtprims.hh"
#include "dtmarstr.hh"  // dtMarcamStream


/////////////////////////////////////////////////////////////////////////////
// :CLASS_DESC_S
// !LIBRARY ADT
// :NAME idtTestArgs
// :TEXT
// This class defines test suite arguments to be used by a test suites
// testmain() function.  This class will be modified to add any other test
// arguments that may be necessary in the future...
/////////////////////////////////////////////////////////////////////////////

class EXPORT idtTestArgs
{
    public:

    /////////////////////////////////////////////////////////////////
    // :METHOD_DECL_S
    // !NAME ctor
    // :TEXT
    // Initializes the idtTestArgs object
    /////////////////////////////////////////////////////////////////
    idtTestArgs (dtChar* filename,
                     dtMarcamStream::Verbosity aLifeCycleVerbosity
                                   = dtMarcamStream::HIGH,
                 dtMarcamStream::Verbosity aSetQrysVerbosity
                                   = dtMarcamStream::HIGH,
                 dtMarcamStream::Verbosity aOperatorsVerbosity
                                   = dtMarcamStream::HIGH,
                  dtMarcamStream::Verbosity aSemanticsVerbosity
                                   = dtMarcamStream::HIGH,
                 dtMarcamStream::Verbosity aPersistVerbosity
                                   = dtMarcamStream::HIGH);

    /////////////////////////////////////////////////////////////////
    // :METHOD_DECL_S
    // !NAME dtor
    // :TEXT
    /////////////////////////////////////////////////////////////////
    virtual ~idtTestArgs( );

    /////////////////////////////////////////////////////////////////
```

```
// !METHOD_DECL_S
// !NAME qryDestination
// !TEXT
// The qryDestinationut method will return the
// mDestinationFile attribute.
//
////////////////////////////////////////////////////////////////////
dtChar *qryDestination ();

////////////////////////////////////////////////////////////////////
// !METHOD_DECL_S
// !NAME qryLifeCycleVerbosity,....
// !TEXT
// The qryVerbosity method will return the
// the mVerbosity attribute.
////////////////////////////////////////////////////////////////////
dtMarcamStream::Verbosity qryLifeCycleVerbosity  ();
dtMarcamStream::Verbosity qrySetQrysVerbosity  ();
dtMarcamStream::Verbosity qryOperatorsVerbosity  ();
dtMarcamStream::Verbosity qrySemanticsVerbosity  ();
dtMarcamStream::Verbosity qryPersistVerbosity  ();

   ////////////////////////////////////////////////////////////////////
// !METHOD_DECL_S
// !NAME qryMaxVerbosity
// !TEXT
// The qryMaxVerbosity method will return the
// the maximum setting amoung the mVerbosity attributes.
   ////////////////////////////////////////////////////////////////////
dtMarcamStream::Verbosity qryMaxVerbosity();

   ////////////////////////////////////////////////////////////////////
// !METHOD_DECL_S
// !NAME setNumErrors
// !TEXT
// The setNumErrors method will set the number of errors member.
   ////////////////////////////////////////////////////////////////////
dtVoid setNumErrors( dtInt );

   ////////////////////////////////////////////////////////////////////
// !METHOD_DECL_S
// !NAME setNumMethodsTested
// !TEXT
// The setNumMethodsTested method will set the number of methods
// tested member.
   ////////////////////////////////////////////////////////////////////
dtVoid setNumMethodsTested( dtInt );

   ////////////////////////////////////////////////////////////////////
// !METHOD_DECL_S
// !NAME setNumMethodsTotal
// !TEXT
// The setNumMethodsTotal method will set the total number of methods
// member.
   ////////////////////////////////////////////////////////////////////
dtVoid setNumMethodsTotal( dtInt );

   ////////////////////////////////////////////////////////////////////
// !METHOD_DECL_S
// !NAME setNumTests
```

```
// !TEXT
// The setNumTests method will set the number of tests member.
   /////////////////////////////////////////////////////////////
dtVoid setNumTests( dtInt );

   /////////////////////////////////////////////////////////////
// !METHOD_DECL_S
// !NAME qryNumErrors
// !TEXT
// The qryNumErrors method will return the number of errors found.
   /////////////////////////////////////////////////////////////
dtInt qryNumErrors( );

   /////////////////////////////////////////////////////////////
// !METHOD_DECL_S
// !NAME qryNumMethodsTested
// !TEXT
// The qryNumMethodsTested method will set the number of methods
// tested member.
   /////////////////////////////////////////////////////////////
dtInt qryNumMethodsTested(  );

   /////////////////////////////////////////////////////////////
// !METHOD_DECL_S
// !NAME qryNumMethodsTotal
// !TEXT
// The qryNumMethodsTotal method will return the total number of
// methods
   /////////////////////////////////////////////////////////////
dtInt qryNumMethodsTotal(  );

   /////////////////////////////////////////////////////////////
// !METHOD_DECL_S
// !NAME qryNumTests
// !TEXT
// The qryNumTests method will return the number of tests run.
   /////////////////////////////////////////////////////////////
dtInt qryNumTests(  );

private:

 idtTestArgs();

 ///////////////////////////////////////////////////////////////
 // !ATTRIBUTE_DECL_S
 // !NAME mDestionationFile;
 // !TEXT
 // Destination File which will be used to output both normal and error
 // output.  this filename will be used in the creation of two files,
 // a .out and a .err file, one for normal output and error messages
 // respectively.
 ///////////////////////////////////////////////////////////////
 dtChar* mDestinationFile;

 ///////////////////////////////////////////////////////////////
 // !ATTRIBUTE_DECL_S
 // !NAME mLifeCycleVerbosity, ...;
 // !TEXT
 // mVerbosity contains the level of Verbosity which defines the
 // verbosity level of the test suite.
```

```
//////////////////////////////////////////////////////////////////////
dtMarcamStream::Verbosity           mLifeCycleVerbosity;
dtMarcamStream::Verbosity           mSetQrysVerbosity;
dtMarcamStream::Verbosity           mOperatorsVerbosity;
dtMarcamStream::Verbosity           mSemanticsVerbosity;
   dtMarcamStream::Verbosity           mPersistVerbosity;

//////////////////////////////////////////////////////////////////////
// !ATTRIBUTE_DECL_S
// !NAME mErrors, mMethodsTested, mMethodsTotal, mTestCount;
// !TEXT
// These members hold the summary of the test results, so they
// can be handed back to the harness.
//        mErrors - the number of errors found in testing
//        mMethodsTested - the number of methods actually tested
//        mMethodsTotal - the total number of methods
//        mTestCount - the number of tests run
//////////////////////////////////////////////////////////////////////
   dtInt        mErrorCount;
   dtInt        mMethodsTested;
   dtInt        mMethodsTotal;
   dtInt        mTestCount;
};

#endif
```

```
///////////////////////////////////////////////////////////////////////////
// DOS_FILE_NAME: idttest.cpp
//                  ADT Unit Test superclass implementation
//
// Copyright 1993 by Marcam Corp., Newton, MA USA
//
// This unpublished copyrighted work contains
// TRADE SECRET information of Marcam Corporation.
//
// Use, transfer, disclosure, or copying without its expressed
// written permission is strictly forbidden.
//
///////////////////////////////////////////////////////////////////////////

#include "idttest.hh"           // For idtTest
#include <time.h>               // For date/time stamp
#include <windows.h>            // For CALLBACK
#include "dtfmtulo.hh"          // For dtFmtULong
#include <string.h>             // For strcpy

///////////////////////////////////////////////////////////////////////////
// !FUNC_DESC_S
// !LIBRARY UNITTEST
// !NAME libmain
// !TEXT
// This is the DLL initialization code.  This handles the initialization
// of the Marcam unit test code.
//
// !AUTHOR       John Dalton        (dalton@opl.com)
// !REVIEWER     <Reviewer's name> <(Reviewer's E-Mail address)>
// !REVIEW_DATE  <date>
//
///////////////////////////////////////////////////////////////////////////


extern "C" int CALLBACK
LibMain(
    HINSTANCE   hInstance,
    WORD        wDataSegment,
    WORD        wHeapSize,
    LPSTR       lpszCmdLine )
{
    return( 1 );   // Indicate that the DLL was initialized successfully.
}


extern "C" int FAR PASCAL _WEP(int)
{
    return 1;
}

//////////////////////////////////////////////////
// This is a destructor for a idtTest.
//////////////////////////////////////////////////

idtTest::~idtTest()
{
}
```

```
//////////////////////////////////////////////////
// These functions control the running of the
// unit test.  The runTest member function is
// invoked by the testmain().  The runTest()
// in turn invokes preTest(), test(), and
// postTest().  These are virtuals with default
// implementation, however only runTest() and test()
// actually do anything.  The author of the inspection
// class may override the implementation to
// provide additional behavior.
//////////////////////////////////////////////////

dtVoid
idtTest::runTest()
{
    preTest();
    test();
    postTest();
}


dtVoid
idtTest::preTest()
{
   char dbuffer [9];
   char tbuffer [9];

   _strdate( dbuffer );
   _strtime( tbuffer );

    setVerbosity( mTestArgs.qryMaxVerbosity() );
    dtOStream&  out = qryOutputStream( dtMarcamStream::LOW );

    out << "UNIT TESTS STARTING" << endl;
    out << " Started:   " << dbuffer << "   " << tbuffer << endl;
    out << " Testing Style: " ;
    if ( ID_LITE == mTestType )
        out << "LITE";
    else if ( ID_REGULAR == mTestType )
        out << "Regular";
    else
        out << "UNKNOWN";
    out << endl;
}

/////////////////////////////////////////////////////
// test()
//
// This member function runs the test components for
// this unit test.  Default verbosity control is
// implemented here.  These defaults are set up so
// that as the class matures, the verbosity can be
// lowered to concentrate on the more complex aspects
// of the class.
//
// The progression of verbosity for the output stream
// is HIGH, MED, LOW, NONE.  At NONE, only the
// errors stream is used, where memory alarms are
// reported.
```

```
/////////////////////////////////////////////////////

dtVoid
idtTest::test()
{
       dtOStream&  out = qryOutputStream( dtMarcamStream::OFF );
       dtMarcamStream::Verbosity  currVerbosity;

       // Lifecycle
       currVerbosity = mTestArgs.qryLifeCycleVerbosity();
       if( dtMarcamStream::SKIP != currVerbosity )
       {
       setVerbosity( currVerbosity );
       t_LifeCycle();
    } else {
           out << "----------------------------------------\n>>>>>>>>>>>
SKIPPING t_LifeCycle due to Verbosity set to SKIP" << endl;
       }

       // SetQrys
       currVerbosity = mTestArgs.qrySetQrysVerbosity();
       if( dtMarcamStream::SKIP != currVerbosity )
       {
          setVerbosity( currVerbosity );
       t_SetQrys( );
    } else {
           out << "----------------------------------------\n>>>>>>>>>>>
SKIPPING  t_SetQrys due to Verbosity set to SKIP" << endl;
       }

       // Operators
       currVerbosity = mTestArgs.qryOperatorsVerbosity();
       if( dtMarcamStream::SKIP != currVerbosity )
       {
       setVerbosity( currVerbosity );
       t_Operators( );
    } else {
           out << "----------------------------------------\n>>>>>>>>>>>
SKIPPING  t_Operators due to Verbosity set to SKIP" << endl;
       }

       // Semantics
       currVerbosity = mTestArgs.qrySemanticsVerbosity();
       if( dtMarcamStream::SKIP != currVerbosity )
       {
       setVerbosity( currVerbosity );
       t_Semantics( );
    } else {
           out << "----------------------------------------\n>>>>>>>>>>>
SKIPPING  t_Semantics due to Verbosity set to SKIP" << endl;
       }

       // Persist
       currVerbosity = mTestArgs.qryPersistVerbosity();
       if( dtMarcamStream::SKIP != currVerbosity )
       {
       setVerbosity( currVerbosity );
       t_Persist();
    } else {
```

```
        out << "-----------------------------------------\n>>>>>>>>>>>
SKIPPING  t_Persist due to Verbosity set to SKIP" << endl;
    }
}


dtVoid
idtTest::postTest()
{
   char dbuffer [9];
   char tbuffer [9];

   _strdate( dbuffer );
   _strtime( tbuffer );

    setVerbosity( mTestArgs.qryMaxVerbosity() );
    dtOStream&  out = qryOutputStream( dtMarcamStream::LOW );

    out << "========================================" << endl;
    out << "UNIT TESTS COMPLETE" << endl;
    out << " Ended: " << dbuffer << "    " << tbuffer << endl;
    reportCoverage();
    out << "Tests run: " <<  qryNumTest()
        << " Errors found: " <<  qryNumErr() << endl;

    // Put the results into the TestArgs, so the
    // harness can find it.
    //
    mTestArgs.setNumErrors( qryNumErr() );
    mTestArgs.setNumTests( qryNumTest() );


}

//////////////////////////////////////////////////
// Report base coverage for this unit test.
//////////////////////////////////////////////////

dtVoid
idtTest::reportCoverage()
{
    dtInt*     coverage = (dtInt*)NULL;
    dtInt      numFuncs = 0;
    dtInt      notCovered = 0;
    dtBoolean covered  = dtTRUE;

    // Get the coverage information from the derived class.
    //
    qryCoverage( coverage, numFuncs );

    // Put the total number of methods into the TestArgs, so the
    // harness can find it.
    //
    mTestArgs.setNumMethodsTotal( numFuncs );

    // First scan coverage looking for no calls (0).
    //
    for ( dtInt i = 0 ; i < numFuncs ; i++ )
    {
        if ( 0 == *(coverage+i) )
```

```
        {
            qryOutputStream( dtMarcamStream::LOW )
            << "ERROR: Function not called: "
            << i << endl;

            // incNumErr();          // Don't count coverage errors with the prodn code errors
            notCovered++;            // But do count them
            covered = dtFALSE;
        }
    }

    // Put the number of methods tested into the TestArgs, so the
    // harness can find it.
    //
    mTestArgs.setNumMethodsTested( (numFuncs - notCovered) );

    dtOStream& out = qryOutputStream( dtMarcamStream::MED );

    if ( covered )
    {
        out << "Function Call Analysis:" << endl;
    }

    // Print coverage frequency per function based on verbosity.
    //
    out << "Function #          Frequency" << endl;
    for ( dtInt f = 0 ; f < numFuncs ; f++ )
    {
        out << "      " << f << "                    " << *(coverage+f) << endl;
    }
}


dtMemoryExecutive&
idtTest::qryMemExec() const
{
    return( mMemExec );
}

//////////////////////////////////////////////////
// :METHOD_DESC_S
// :NAME idtTest_qryNumTest
// :SATISIFIES
// 1)
// :TEXT
// Returns the number of tests which have been run.
// For the user's information only.
//////////////////////////////////////////////////
dtUInt
idtTest::qryNumTest() const
{
  return( mNumTest );
}

//////////////////////////////////////////////////
// :METHOD_DESC_S
// :NAME idtTest_setTestType
// :TEXT
// Allows the inspection class to set the test type
//////////////////////////////////////////////////
```

```
dtVoid
idtTest::setTestType( idTestType pType )
{
    mTestType = pType;
}


//////////////////////////////////////////////////
// !METHOD_DESC_S
// !NAME qryTestType
// !TEXT
// Allows the inspection class to retrieve the test type
//////////////////////////////////////////////////

idtTest::idTestType
idtTest::qryTestType() const
{
    return( mTestType );
}


//////////////////////////////////////////////////
// !METHOD_DESC_S
// !NAME reportException
// !TEXT
// Reports the status of the exception test.
//////////////////////////////////////////////////

dtVoid
idtTest::reportException(
    dtULong             aMsgID,
    const bcStringi18n* aExInfo,
    const dtChar*       aExprString,
    const dtChar*       aFile,
    dtUInt              aLine,
    const dtChar*       aTestName )
{
    if( !aExInfo )
    {
        dtChar Buf[50];
        strcpy( Buf, "EXCEPTION NOT THROWN: ID: " );
        dtFmtULong Line( aMsgID );
        strcat( Buf, (dtChar*)Line );
        announceErrorMsg( Buf, aTestName, aFile, aLine, aExprString );
        incNumErr();
    }
    else
    {
        qryOutputStream( dtMarcamStream::MED )
                << " CHECKED: Exception ID: " << aMsgID
                << ", which was thrown from: " << (const dtChar*)*aExInfo
                << ", in test: " << aTestName
                << ", at line: " << aLine
                << ", file: " << aFile
                << endl;
    }
}
```

```
//////////////////////////////////////////////////
// PROTECTED:
// This is the default constructor.
//////////////////////////////////////////////////

idtTest::idtTest(
    dtStreamExecutive*  aStreamExec,
    dtMemoryExecutive&  aMemExec,
    idtTestArgs&            aTestArgs
    ) : idtKrnl( aStreamExec ),
        mMemExec( aMemExec ),
        mTestArgs( aTestArgs )
{
    mNumTest = 0;
    mTestType = ID_TESTTYPECOUNT;
}


//////////////////////////////////////////////////
// PRIVATE:
// This is the copy constructor.  Does nothing.
//////////////////////////////////////////////////

idtTest::idtTest(
    const idtTest& aIdtTest
    ): idtKrnl( aIdtTest ),

       mMemExec( aIdtTest.qryMemExec() ) ,
       mTestArgs( aIdtTest.mTestArgs )
{}
```

```
////////////////////////////////////////////////////////////////////////////
// FILE_NAME:   idttest.hh
//      ADT Inspection Test Object Header
//
// Copyright 1993 by Marcam Corp., Newton, MA USA
//
// This unpublished copyrighted work contains
// TRADE SECRET information of Marcam Corporation.
//
// Use, transfer, disclosure, or copying without its expressed
// written permission is strictly forbidden.
//
// History:
//  1/24/94. aibel: Modified to allow the "harness-lite" (a minimum
//          dependency version of the test harness) to run.
//          All code specific to the harness lite is bracketed
//          by TESTLITE ifdef's.
//
////////////////////////////////////////////////////////////////////////////

#ifndef idttestHH
#define idttestHH


#include "idtkrnl.hh"           // For primary parent class
#include "idtsrvs.hh"                   // For secondary parent class
#include "idttargs.hh"          // For idtTestArgs.
#include "idtexcpt.hh"          // For idtExceptionTester
#include "dtmemexe.hh"          // For dtMemoryExecutive.
#include "dtmemory.hh"

#ifndef TESTLITE
        // only include globals for regular harness builds
#include "fddeskgl.hh"          // For fdDesktopGlobal
#include "fdtoolgl.hh"          // For fdToolGlobal
#include "bcsti18n.hh"          // For bcStringi18n
#endif

#ifdef DB_BYPASS
#include "dbcntrl.hh"           // For oDBControl
#endif // DB_BYPASS

// Poor man's function template for generating test stub.  Prior to calling
// TESTRUN, a TESTRUNdeclare must exist. The usage is similar to a function
// template.  For example, the erMsg inspection class source contains:
//
//  TESTRUNdelcare( i_erMsg )
//
//  dtInt testmain( idtTestArgs& aTestArgs )
//  {
//    return( TESTRUN(i_erMsg)( aTestArgs ) );
//  }
//
#define TESTRUN(T) TESTRUN_##T

#ifdef TESTLITE
           // LITE version
#define TESTRUNdeclare(T) \
const dtChar* const cThisFile = __FILE__; \
dtInt TESTRUN(T) (idtTestArgs& A) \
```

```
{ \
    const dtChar* filename = A.qryDestination(); \
    dtStreamExecutive streamExec = dtStreamExecutive( filename,
dtMarcamStream::HIGH ); \
    dtMemoryExecutive memExec = dtMemoryExecutive( ); \
    dtMemoryMgr* testMM = memExec.createMemoryMgr(); \
    T* iObj = new T( &streamExec, memExec, A, testMM ); \
    iObj->setTestType( idtTest::ID_LITE ); \
    iObj->runTest(); \
    dtUInt result = iObj->qryNumErr(); \
    delete iObj ; \
    memExec.destroyMemoryMgr( testMM ); \
    return( result ); \
}

#else
        // Normal version
#define TESTRUNdeclare(T) \
const dtChar* const cThisFile = __FILE__; \
dtInt TESTRUN(T) (idtTestArgs& A) \
{ \
    const dtChar* filename = A.qryDestination(); \
    dtStreamExecutive streamExec = dtStreamExecutive( filename,
dtMarcamStream::HIGH ); \
    dtMemoryMgr* testMM = DESK_TEST_MM; \
    T* iObj = new T( &streamExec, DESK_MEM_EXEC, A, testMM ); \
    iObj->setTestType( idtTest::ID_REGULAR ); \
    iObj->runTest(); \
    dtUInt result = iObj->qryNumErr(); \
    delete iObj ; \
    return( result ); \
}

#endif

// Redefine existing checkExpr to make use of single file name string.
//     REMOVED: This def. does not work in setup objects
//#ifdef checkExpr
//#undef checkExpr
//#define checkExpr( expr, testname )    checkExpression( expr, #expr,
cThisFile, __LINE__, testname )
//#endif

// testExpr - check expression in current test
//  NOTE: only use between TEST_START and TEST_END macros!
#define testExpr( expr )    checkExpression( expr, #expr, cThisFile, __LINE__, currTest )

// Exception testing macro, general form.
//
#define checkExcept( msgid, expr, testname ) \
{ \
    idtExceptionTester ET( msgid ); \
    if ( ::Catch( ET.rtnEnv() ) == 0 ) \
    { expr; } \
    reportException( msgid, ET.rtnExInfo(), #expr, cThisFile, __LINE__, testname ); \
}


// Exception testing macro, to be used only between TEST_START and TEST_END macros.
//
```

```
#define testExcept( msgid, expr ) \
{ \
    idtExceptionTester ET( msgid ); \
    if ( ::Catch( ET.rtnEnv() ) == 0 ) \
    { expr; } \
    reportException( msgid, ET.rtnExInfo(), #expr, cThisFile, __LINE__, currTest ); \
}


//////////////////////////////////////////////////////////////////////////
//
// Macros for checking results:
//      checkErMsg( msg, testname): Checks that the erMsg passed in is NULL; if the test
//                                  fails, the message is announced and deleted.
//      checkErMsg( msg, value, testname):  Checks that the erMsg passed in is value; if
//                                          the test fails, the message is announced and
deleted.
//////////////////////////////////////////////////////////////////////////

#ifndef TESTLITE

// checkErMsg - check that msg is NULL
//
//#define checkErMsg( msg, testname )
//  if( ! checkExpression( ((erMsg*) NULL == msg), "(erMsg*)NULL == msg",
__FILE__, __LINE__, testname ) )
//  {
//      announceObject( msg );
//      delete msg;
///     msg = (erMsg*) NULL;
//  }

#define checkErMsg( msg, testname ) \
    ( !checkExpression( ((erMsg*) NULL == msg), "(erMsg*)NULL == msg",
cThisFile, __LINE__, testname ) ? \
        announceObject( (dtCore*) msg ), delete msg, msg = (erMsg*) NULL, dtFALSE  \
        : dtTRUE )

// checkErMsgVal - check that msg matches value
//
#define checkErMsgVal( msg, value, testname ) \
    ( checkExpression( ( (erMsg*) NULL != msg ), "(erMsg*)NULL != msg",
cThisFile, __LINE__, testname ) ? \
        ( ! checkExpression( (value == msg->qryMsgID() ), "value == msg",
cThisFile, __LINE__, testname ) ? \
            announceObject( (dtCore*) msg ), delete msg, msg = (erMsg*) NULL, dtFALSE \
            : dtTRUE ) \
        : dtFALSE )

// checkErList - check that List contains no Errors
//
#define checkErList( erList, testname ) \
    (  (erMsgList*)NULL != erList ? \
        ( !checkExpression( ( 0 == erList->qryNumMessages(erMsgList::ANERROR) ),
"erList contains zero errors", \
                cThisFile, __LINE__, testname ) ? \
            announceObject( erList ), delete erList, erList = (erMsgList*) NULL, dtFALSE \
            : dtTRUE ) \
        : checkExpression( ( (erMsgList*) NULL == erList ), "erMsgList is NULL",
cThisFile, __LINE__, testname ) )
```

```
#endif

//////////////////////////////////////////////////////////////////////////
//
// Macros for starting/ending tests:
//      T_INIT    - Initialize a t_* method
//      T_START   - Start a unit test
//      T_END     - End a unit test
//      T_CLEANUP - End a t_* method
//      TEST      - T_START and T_END for a test that consists of a single
//                  expresstion to check.
//      TLIFE_INIT, TLIFE_START, TLIFE_END, TLIFE_CLEANUP
//                - similar macros for t_LifeCycle.
//
//  These help keep track of
//          - Name of the current test - stored in currTest
//          - Memory managers - mm, and in t_LifeCycle, mm2
//          - Errors
//          - Output announcing the start and end of tests
//  These macros are the preferred way to start and end tests.
//////////////////////////////////////////////////////////////////////////

//dtChar* TEST_UNDEFINED = "<undefined>";  // Used by Macros.

// LIFECYCLE TEST MACROS

    // Set up T_LifeCycle
    //      currNumErr stores the current number of errors
    //      currTest stores the current test name
    //      mm0 is a memory manager which is not under test
    //      mm and mm2 are memory managers which may be used in testing
    //
#ifdef TESTLITE
        // LITE version
#define TLIFE_INIT \
    announceStatus( "========================================\n Starting", "t_LifeCycle" );
    dtUInt              currNumErr=0; \
    dtChar*             currTest=TEST_UNDEFINED; \
    dtMemoryMgr*        mm=(dtMemoryMgr*) NULL; \
    dtMemoryMgr*        mm2=(dtMemoryMgr*) NULL; \
    {

#else
      // Normal version
#define TLIFE_INIT \
    announceStatus( "========================================\n Starting", "t_LifeCycle" );
    dtUInt              currNumErr=0; \
    dtChar*             currTest=TEST_UNDEFINED; \
    bcStringi18n        TLife1( (const dtUChar*)"Unit Test Harness-TLIFE 1", DESK_DEF_MM ); \
    bcStringi18n        TLife2( (const dtUChar*)"Unit Test Harness-TLIFE 2", DESK_DEF_MM ); \
    fdToolGlobal*       tool=(fdToolGlobal*) NULL; \
    fdToolGlobal*       tool2=(fdToolGlobal*) NULL; \
    dtMemoryMgr*        mm=(dtMemoryMgr*) NULL; \
    dtMemoryMgr*        mm2=(dtMemoryMgr*) NULL; \
    {

#endif

    // Start a LifeCycle test with two memory managers
```

```
    //
#ifdef TESTLITE
            // LITE version
#define TLIFE_START( LABEL )\
    currTest = LABEL ; \
    mm = qryMemExec().createMemoryMgr(); \
    mm2 = qryMemExec().createMemoryMgr(); \
    currNumErr = qryNumErr(); \
    announceStatus( "-----------------------------------------\n Starting",
currTest ); \
    {

#else
        // Normal version
#define TLIFE_START( LABEL )\
    currTest = LABEL ; \
    tool = fdDesktopGlobal::createToolGlobal( &TLife1 ); \
    mm = tool->rtnMemoryMgr(); \
    tool2 = fdDesktopGlobal::createToolGlobal( &TLife2 ); \
    mm2 = tool2->rtnMemoryMgr(); \
    currNumErr = qryNumErr(); \
    announceStatus( "-----------------------------------------\n Starting",
currTest ); \
    {

#endif

    // End a LifeCycle test with two memory managers
    //
#ifdef TESTLITE
            // LITE version
#define TLIFE_END \
    } \
    if ( !checkMemMgr( mm, currTest ) )\
    {   mm->dumpStatistics( qryOutputStream( dtMarcamStream::MED ), 1 ); \
        mm->dumpContents( qryOutputStream( dtMarcamStream::MED ), 1 ); }\
    if ( !checkMemMgr( mm2, currTest ) )\
    {   mm2->dumpStatistics(qryOutputStream( dtMarcamStream::MED ), 1 ); \
        mm->dumpContents( qryOutputStream( dtMarcamStream::MED ), 1 ); }\
    if( currNumErr != qryNumErr() ) \
        announceStatus( " FAILED", currTest ); \
    else \
        announceStatus( " PASS", currTest ); \
    mNumTest++; \
    currNumErr = qryNumErr(); \
    currTest = TEST_UNDEFINED; \
    qryMemExec().destroyMemoryMgr( mm ); \
    qryMemExec().destroyMemoryMgr( mm2 ); \
    mm = (dtMemoryMgr*) NULL; \
    mm2 = (dtMemoryMgr*) NULL;

#else
        // Normal version
#define TLIFE_END \
    } \
    if ( !checkMemMgr( mm, currTest ) ) \
    {   mm->dumpStatistics(qryOutputStream( dtMarcamStream::MED ), 1 ); \
        mm->dumpContents( qryOutputStream( dtMarcamStream::MED ), 1 ); }\
    if ( !checkMemMgr( mm2, currTest ) ) \
    {   mm2->dumpStatistics(qryOutputStream( dtMarcamStream::MED ), 1 ); \
```

```
        mm->dumpContents( qryOutputStream( dtMarcamStream::MED ), 1 ); }\
    if( currNumErr != qryNumErr() ) \
        announceStatus( " FAILED", currTest ); \
    else \
        announceStatus( " PASS", currTest ); \
    mNumTest++; \
    currNumErr = qryNumErr(); \
    currTest = TEST_UNDEFINED; \
    fdDesktopGlobal::destroyToolGlobal( tool ); \
    mm = (dtMemoryMgr*) NULL; \
    fdDesktopGlobal::destroyToolGlobal( tool2 ); \
    mm2 = (dtMemoryMgr*) NULL;
#endif

    // End t_LifeCycle - Defensive programming for cleanup.
    // Make sure no tools or memory managers are accidentally left around.
    // The globals will trigger a memory leak as well.

#ifdef TESTLITE
            // LITE version
#define TLIFE_CLEANUP \
    } \
    if ( mm || mm2 ) \
    {  announceStatus( "*****UNIT TEST ERROR: Improper use of TLIFE_START and
TLIFE_END detected.", "t_LifeCycle" ); \
    if( mm ) { \
        qryMemExec().destroyMemoryMgr( mm ); \
        mm = (dtMemoryMgr*) NULL; \
    } \
    if( mm2 ) { \
        qryMemExec().destroyMemoryMgr( mm2 ); \
        mm2 = (dtMemoryMgr*) NULL; \
    } \
    } announceMethodEnd( "t_LifeCycle" );

#else
        // Normal version
#define TLIFE_CLEANUP \
    } \
    if ( tool || mm || tool2 || mm2 ) \
    {  announceStatus( "*****UNIT TEST ERROR: Improper use of TLIFE_START and
TLIFE_END detected.", "t_LifeCycle" ); \
        if( tool ){ \
            fdDesktopGlobal::destroyToolGlobal( tool ); \
            mm = (dtMemoryMgr*) NULL; } \
        if( tool2 ){ \
            fdDesktopGlobal::destroyToolGlobal( tool2 );  \
            mm = (dtMemoryMgr*) NULL; } \
    } announceMethodEnd( "t_LifeCycle" );

#endif

//
// Test Macros for other tests
//

// Initialize a t_* method
//

#ifdef TESTLITE
```

```
            // LITE version
#define T_INIT( LABEL ) \
    dtChar*          currSection = LABEL; \
    announceStatus(  "=====================================\n Starting", currSection ); \
    dtMemoryMgr*     mm = qryMemExec().createMemoryMgr(); \
    dtUInt           currNumErr=0; \
    dtChar*          currTest=TEST_UNDEFINED; \
    {

#else
        // Normal version
#define T_INIT( LABEL ) \
    dtChar*          currSection = LABEL; \
    announceStatus(  "=====================================\n Starting", currSection ); \
    bcStringi18n     ToolName( (const dtUChar*)"Unit Test Harness", DESK_DEF_MM ); \
    fdToolGlobal*    tool = fdDesktopGlobal::createToolGlobal( &ToolName ); \
    dtMemoryMgr*     mm = tool->rtnMemoryMgr(); \
    dtUInt           currNumErr=0; \
    dtChar*          currTest=TEST_UNDEFINED; \
    {

#endif

    // Standard start of test
    //
#define TEST_START( LABEL ) \
    currTest = LABEL ; \
    currNumErr = qryNumErr(); \
    announceStatus( "-----------------------------------------\n Starting", currTest ); \
    {

    // Conditional start of test
    //
#define TEST_GATE( LABEL, expr ) \
    currTest = LABEL ; \
    currNumErr = qryNumErr(); \
    if( !expr ) \
    { \
        announceStatus( "-----------------------------------------\n>>>>>>>>>>>
SKIPPING  >>>>:", currTest ); \
        currNumErr = -1; \
    } else { \
        announceStatus( "-----------------------------------------\n Starting", currTest );

    // Standard end of test
    //      used for both TEST_START & TEST_GATE
    //      So currNumErr is checked to see if we ran the test
    //
#define TEST_END \
    } \
    if( currNumErr != -1 ) \
    { \
        if( currNumErr != qryNumErr() ) \
            announceStatus( " FAILED", currTest ); \
        else \
            announceStatus( " PASS", currTest ); \
        mNumTest++; \
    } \
    currTest = TEST_UNDEFINED; \
    currNumErr = qryNumErr();
```

```
    // Quickie for tests which are only a single expression to check
    // This is useful for testing Set and Query
    //
#define TEST( LABEL, EXPR ) \
    currTest = LABEL ; \
    currNumErr = qryNumErr(); \
    announceStatus( "----------------------------------------\n Starting", currTest ); \
    checkExpr( EXPR, currTest ); \
    if( currNumErr != qryNumErr() ) \
        announceStatus( " FAILED", currTest ); \
    else \
        announceStatus( " PASS", currTest ); \
    mNumTest++; \
    currTest = TEST_UNDEFINED; \
    currNumErr = qryNumErr();

    // Clean up at the end of a t_* method
    //
#ifdef TESTLITE
            // LITE version

#define T_CLEANUP \
    } \
    if (! checkMemMgr( mm, currSection ) ) \
    {   mm->dumpStatistics(qryOutputStream( dtMarcamStream::MED ), 1 ); \
        mm->dumpContents( qryOutputStream( dtMarcamStream::MED ), 1 ); }\
    qryMemExec().destroyMemoryMgr( mm ); \
    mm = (dtMemoryMgr*) NULL; \
    announceMethodEnd( currSection );

#else
        // Normal version
#define T_CLEANUP \
    } \
    if ( !checkMemMgr( mm, currSection ) ) \
    {   mm->dumpStatistics(qryOutputStream( dtMarcamStream::MED ), 1 ); \
        mm->dumpContents( qryOutputStream( dtMarcamStream::MED ), 1 ); }\
    fdDesktopGlobal::destroyToolGlobal( tool ); \
    mm = (dtMemoryMgr*) NULL; \
    announceMethodEnd( currSection );

#endif


///////////////////////////////////////////////////////////////////////////
// !CLASS_DECL_S
// !LIBRARY ADT
// !NAME idtTest
// :SATISFIES
// 1)
// !TEXT
// This idtKrnl derived class provides the framework for the
// implementation of an inspection class.  This is an abstract class.
///////////////////////////////////////////////////////////////////////////

class EXPORT idtTest : public idtKrnl , public idtSrvs
{

public:
```

```
enum    idTestType
{
    ID_REGULAR,             // Regular-style testing
    ID_LITE,                // TESTLITE-style testing
    ID_TESTTYPECOUNT
};

//////////////////////////////////////////////////
// :METHOD_DECL_S
// !NAME idtTest_dtor
// !TEXT
// This is a destructor for a idtTest.
//////////////////////////////////////////////////

virtual ~idtTest ();


//////////////////////////////////////////////////
// :METHOD_DECL_S
// :NAME idtTest_test_suite_functions
// !TEXT
// These functions must be implemented by the
// derived inspection class.  These pure virtual
// functions provide the framework in which the
// unit testing is performed.
//
// The verbosities are set in idtTestArg, passed
// from the Unit Test Harness.  The default
// verbosity is dtMarcamStream::HIGH.
//////////////////////////////////////////////////

virtual dtVoid t_LifeCycle( ) = 0;
virtual dtVoid t_Operators( ) = 0;
virtual dtVoid t_Semantics( ) = 0;
virtual dtVoid t_SetQrys( ) = 0;
virtual dtVoid t_Persist( ) = 0;

//////////////////////////////////////////////////
// !METHOD_DECL_S
// !NAME qryCoverage
// !TEXT
// This function puts a record of the methods which
// have been executed in an integer array pointed to
// by aCovAry.  This function must be implemented by
// the derived inspection class, as the array is
// indexed by the enum FUNCS defined in the inspection
// class.  The size of the array is numFuncs, and
// each position is filled with an integer indicating
// the number of times the associated method has been
// invoked.
//////////////////////////////////////////////////
virtual dtVoid qryCoverage( dtInt*& aCovAry, dtInt& aNumFuncs ) const = 0;

//////////////////////////////////////////////////
// !METHOD_DECL_S
// !NAME idtTest_unit_test_control_functions
// !TEXT
// These functions control the running of the
// unit test.  The runTest member function is
// invoked by the testmain().  The runTest()
```

```
// in turn invokes preTest(), test(), and
// postTest(). These are virtuals with default
// implementation, however preTest() doesn't do
// anything. test() calls the t_* methods, and
// postTest() reports on the tests run, and the errors
// found. The author of the inspection
// class may override the implementation to
// provide additional behavior.
//////////////////////////////////////////////////

dtVoid runTest();

virtual dtVoid preTest();
virtual dtVoid test();
virtual dtVoid postTest();

//////////////////////////////////////////////////
// !METHOD_DECL_S
// !NAME reportCoverage
// !TEXT
// This function reports on methods which have not
// been invoked (as error messages) and reports on
// the calling frequency of the methods which have
// been invoked (at HIGH verbosity). This allows
// test coverage to be analyzed.
//////////////////////////////////////////////////
dtVoid reportCoverage();

//////////////////////////////////////////////////
// !METHOD_DECL_S
// !NAME qryMemExec
// !TEXT
// Returns a reference to the memory executive
// being used for this unit test. A memory
// manager can be created from this executive.
//////////////////////////////////////////////////

dtMemoryExecutive& qryMemExec() const;

//////////////////////////////////////////////////
// !METHOD_DECL_S
// !NAME qryNumTest
// !TEXT
// Returns the number of tests which have been run.
// For the user's information only.
//////////////////////////////////////////////////

dtUInt qryNumTest() const;

//////////////////////////////////////////////////
// !METHOD_DECL_S
// !NAME setTestType, qryTestType
// !TEXT
// Allows the inspection class to set and
// retrieve the test type
//////////////////////////////////////////////////

dtVoid     setTestType( idTestType pType );
idTestType qryTestType() const;
```

```
//////////////////////////////////////////////
// :METHOD_DECL_S
// :NAME reportException
// .TEXT
// Status reporting method invoked by the
// checkExcept and testExcept macros.
//////////////////////////////////////////////

    dtVoid reportException(
        dtULong             aMsgID,
        const bcStringi18n* aExInfo,
        const dtChar*       aExprString,
        const dtChar*       aFile,
        dtUInt              aLine,
        const dtChar*       aTestName );

protected:

//////////////////////////////////////////////
// :METHOD_DECL_S
// :NAME idtTest_def_ctor
// .TEXT
// This is the default constructor for this
// abstract class.
//////////////////////////////////////////////

    idtTest( dtStreamExecutive* aStreamExec,
             dtMemoryExecutive& aMemExec,
             idtTestArgs&       aTestArgs );

//////////////////////////////////////////////
// Counter to keep track of how many tests have been run
//
//////////////////////////////////////////////
    dtUInt   mNumTest;

//////////////////////////////////////////////
// Flag to keep track of the type of testing being done
//
//////////////////////////////////////////////
    idTestType       mTestType;

private:

    dtMemoryExecutive&  mMemExec;

    idtTestArgs&        mTestArgs;

//////////////////////////////////////////////
// :METHOD_DECL_S
// :NAME idtTest_copy_ctor
// :TEXT
// This is the copy constructor. Does nothing.
//////////////////////////////////////////////

    idtTest( const idtTest& aIdtTest );

//////////////////////////////////////////////
```

```
    // !METHOD_DECL_S
    // !NAME operator=
    // !TEXT
    // Assignment operator.  Not implemented.
    //////////////////////////////////////////////////////

    idtTest& operator=( const idtTest& aRhs );

};

#endif // IDTTEST_HH
```

```
/////////////////////////////////////////////////////////////////////////
//
// FILE_NAME:  utg.hh
//
// Copyright 1993 by Marcam Corp., Newton, MA USA
//
// This unpublished copyrighted work contains
// TRADE SECRET information of Marcam Corporation.
//
// Use, transfer, disclosure, or copying without
// its expressed written permission is strictly
// forbidden.
//
//
/////////////////////////////////////////////////////////////////////////


#ifndef utgHH
#define utgHH


#include "dtcore.hh"            // For dtCore


////////////////////////////////////////////////////////////////////////////
// !CLASS_DECL_S
// !LIBRARY ER
// !NAME utg
// !TEXT
// Test case for the unit test generator.  This class header attempts
// to test a number of different items that need to be transformed
// when creating the inspection class header.  This includes the
// public and protected member functions, operators, static and nonstatic
// member functions, and nonclass functions appearing in a header file.
// Also, various styles of using spaces in a member function delcaration
// are tested.
//
// !AUTHOR      John Dalton                     (dalton@opl.com)
// !REVIEWER    <Reviewer's name> <(Reviewer's E-mail address)>
// !REVIEW_DATE <date>
///////////////////////////////////////////////////////////////////////////

class EXPORT utg : public dtCore
{

public:
       // Public enumeration should not end up in inspection class.
       enum stringSize
       {
              STRING_SIZE = 10
       };


   ///////////////////////////////////////////////////
   // !METHOD_DECL_S
   // !NAME utg_def_ctor
   // !TEXT
   // The default constructor.  Most classes are
   // required to have one.
```

```
//////////////////////////////////////////////////

utg( dtMemoryMgr* aMemMgr );

//////////////////////////////////////////////////
// !METHOD_DECL_S
// !NAME utg_ctor1
// !TEXT
// This constructor takes 3 arguments, all of which are required.
//////////////////////////////////////////////////

utg( dtULong            aArg1,
     const dtChar* const aArg2,
     dtMemoryMgr*       aMemMgr );

//////////////////////////////////////////////////
// !METHOD_DECL_S
// !NAME utg_ctor2
// !TEXT
// This constructor takes 4 arguments, all are required.
//////////////////////////////////////////////////

utg( dtULong            aArg1,
     const dtChar* const aArg2,
     dtInt                  aArg3,
     dtMemoryMgr*       aMemMgr );

//////////////////////////////////////////////////
// !METHOD_DECL_S
// !NAME utg_copy_ctor
// !TEXT
// utg copy constructor.
//////////////////////////////////////////////////

utg(const utg&   aUtg,
    dtMemoryMgr* aMemMgr=(dtMemoryMgr*)NULL);

//////////////////////////////////////////////////
// !METHOD_DECL_S
// !NAME utg_dtor
// !TEXT
// utg destructor.  Does nothing special.
//////////////////////////////////////////////////

~utg();

//////////////////////////////////////////////////
// !METHOD_DECL_S
// !NAME utg_operator=
// !TEXT
// utg assignment operator.
//////////////////////////////////////////////////
```

```
    utg& operator= ( const utg& aRhs );


    //////////////////////////////////////////////////
    // !METHOD_DECL_S
    // !NAME utg_operator_dtULong()
    // !TEXT
    // utg conversion operator.
    //////////////////////////////////////////////////

    operator dtULong() const;

    //////////////////////////////////////////////////
    // !METHOD_DECL_S
    // !NAME utg_operator+=()
    // !TEXT
    // An overloaded Addition Assignment operator.
    //////////////////////////////////////////////////

    utg& operator += ( dtInt aRhs);

    //////////////////////////////////////////////////
    // !METHOD_DECL_S
    // !NAME utg_openForRead
    // !TEXT
    // Static method generates a utg.
    // Static specifier is dropped on inspection
    // member function.
    //////////////////////////////////////////////////

    static erStatus openForRead( utg*& aUtg, dtMemoryMgr* aMM);


    // Public member data.  Should not appear in generated inspection class.
    dtUInt           publicID;
    dtChar           publicIDstring[STRING_SIZE];

protected:

    //////////////////////////////////////////////////
    // !METHOD_DECL_S
    // !NAME utg_operator[]()
    // !TEXT
    // An overloaded index operator.
    //////////////////////////////////////////////////

    dtChar operator []( dtInt aIndex ) const;


    //////////////////////////////////////////////////
    // !METHOD_DECL_S
    // !NAME utg_rtnID
    // !TEXT
    // Returns ID. A pure virtual member function.
    // makes this an abstract class.  These don't
    // get tested by the unit test, but must be
    // declared (as private) in the inspection class
    // to satisfy compiler (instantiating an abstract
    // class).  No source is generated for this, it
    // can be declared and implemented.
```

```
   //////////////////////////////////////////////////

   virtual dtULong rtnID() const = 0;


   //////////////////////////////////////////////////
   // !METHOD_DECL_S
   // !NAME utg_setID
   // !TEXT
   // Set the ID, has an optional parameter.
   // Virtual function declaration is not used
   // on generated inspection member function.
   //////////////////////////////////////////////////

   virtual dtBoolean setID( const dtULong aID,
                            const dtChar* const aName = (const dtChar* const) NULL );


#ifdef    OPLDEBUG
   //////////////////////////////////////////////////
   // !METHOD_DECL_S
   // !NAME utg_dump
   // !TEXT
   // This is used by the announceXXX() methods, so
   // there is no need to include this in the
   // generated inspection class.
   //////////////////////////////////////////////////

   dtVoid dump(dtOStream& aOutStream, dtUInt aIndentLevel = 0) const;
#endif // OPLDEBUG


   // Protected member data.  Should not appear in generated inspection class.
   dtUInt          protectedID;
   dtChar          protectedIDstring[STRING_SIZE];


private:

   // Of course, nothing private will appear in the inspection class.
   dtULong         mMsgID;


   //////////////////////////////////////////////////
   // !METHOD_DECL_S
   // !NAME utg_privateMemberFunction
   // !TEXT
   // Private member functions do not appear in the
   // generated inspection class.
   //////////////////////////////////////////////////

   const utg* copy( const utg* const aUtg ) const;
};


// Nonclass function appearing in the header.
// These appear in the generated header prepended
// with the name of the inspection class.

dtBoolean export( const utg& aUtg );
```

```
// Global operator (also a nonclass function)
utg& operator+( const utg& aLhs, const utg& aRhs );
#endif // utgHH
```

In view of the foregoing, what we claim is:

1. A method for testing a subject class in an object-oriented digital data processing system, said method comprising the step of:

(A) responding to a source signal defining said subject class to generate an inspection signal defining an inspection class having one or more members for (i) creating a test object as an instantiation of any of said subject class and a class derived therefrom, (ii) invoking one or more selected method members of said test object, (iii) generating a signal, hereinafter referred to as a report signal, reporting an effect of such invocation.

2. A method according to claim 1, comprising (B) responding to said source signal to generate a test signal defining a test class that comprises any of (i) said subject class, and (ii) an instantiable class derived from said subject class, and step (A)(i) includes the step of generating said inspection signal to define said inspection class to include one or more members for creating said test object as an instantiation of said test class.

3. A method according to claim 2, wherein step (B) includes the step of generating said test signal to define an instantiable test class that inherits one or more members of said subject class.

4. A method according to claim 3, wherein step (B) includes the step of generating said test signal to define said test class to substantially duplicate pure virtual functions of said subject class, absent constructs that denote those functions as having both pure and virtual attributes.

5. A method according to claim 3, wherein step (B) includes the step of generating said test signal to define said test class to substantially duplicate at least one constructor and a destructor of said subject class.

6. A method according to claim 3, wherein step (B) includes the step of generating said test signal to define said test class to give instantiations of said inspection class access to members of said subject class.

7. A method according to claim 1, wherein step (A) includes the step of generating said inspection signal to define said inspection class to include one or more method members, referred to hereinafter as inspection members, for testing corresponding method members of said test object.

8. A method according to claim 7, wherein step (A) includes the step of generating said inspection signal to define said inspection members to include method member functions corresponding to at least one constructor in said test object, wherein each of those method member functions take substantially the same arguments as the corresponding constructor in said test object.

9. A method according to claim 7, wherein step (A) includes the step of generating said inspection signal to define said inspection members to include method member functions corresponding to a destructor in said test object.

10. A method according to claim 7, wherein step (A) includes the step of generating said inspection signal to define said inspection members to include method member functions corresponding to at least one operator function in said test object.

11. A method according to claim 7, wherein step (A) includes the step of generating said inspection signal to define said inspection members to have function names similar to those of the corresponding method members of the test object that they test.

12. A method according to claim 7, wherein step (A) includes the step of generating said inspection signal to define said inspection class to include one or more method members, referred to hereinafter as test suite members, for exercising one or more of said inspection members.

13. A method according to claim 12, wherein step (A) includes the step of generating said inspection signal to define said test suite members to include one or more members for at least one of (i) testing for memory leaks in connection with at least one of creation and destruction of said test object, (ii) testing accessor and transformer members of said test object, (iii) testing operator member methods of said test object, (iv) testing members involved in persistence of said test object, and (v) testing method members semantically unique to said test object.

14. A method according to claim 12, wherein step (A) includes the step of generating said inspection signal to define said inspection class to include one or more method members, hereinafter referred to as test run members, for invoking said one or more test suite members.

15. A method according to claim 12, wherein step (A) includes the step of generating said inspection signal to define said inspection class to comprise one or more method members providing common services for invocation by said test suite members.

16. A method according to claim 12, wherein step (A) includes the step of generating said inspection signal to define said inspection class to comprise one or more method members providing common reporting services for invocation by said test suite members.

17. A method according to claim 1, comprising the step of (B) responding to said inspection signal to create an inspection object as an instantiation of said inspection class, and (C) invoking one or more members of said inspection object to (i) create said test object, (ii) invoke one or more selected method members of said test object, (iii) generate a signal, hereinafter referred to as a report signal, reporting an effect of such invocation.

18. A method according to claim 17, wherein step (C)(ii) includes the step of preventing exceptions that occur during invocation of said one or more selected method members from discontinuing execution of steps (C)(ii) and C(iii).

19. A method according to claim 17, wherein step (C)(iii) includes comparing said result of such invocation with one or more expected values thereof, and generating said report signal to be indicative of such comparison.

20. A method according to claim 17, wherein said method includes the step of executing step (B) a plurality of times, each for invoking a different group of one or more selected method members of said test object.

21. A method according to claim 17, wherein step (C)(ii) includes applying at least one argument to one or more of said selected method members of said test object in connection with invocation thereof.

22. A method according to claim 21, wherein step (C)(i) includes applying at least one argument to a constructor member of said test object in connection with creation thereof.

23. A method according to claim 17, wherein step (C)(iii) includes the step of storing said report signal in a data member of said inspection object.

24. A method according to claim 23, wherein step (C)(iii) includes the step of generating said report signal to be indicative of at least one of (i) a comparison of results of invocation of one or more method members of said test object with one or more expected values thereof, and (ii) detection of a memory leak.

25. A method according to claim 23, wherein step (C)(iii) includes the step of storing in said data member of said inspection object a signal indicative of a number of errors incurred in connection with invocation of said one or more selected method members of said test object.

26. A method according to claim 25, wherein step (C)(iii) includes the step of storing in said data member of said inspection object a signal indicating coverage of testing associated with invocation of said one or more method members of said test object.

27. A method according to claim 17, wherein step (C)(ii) includes the step of invoking one or more method members of said inspection object, referred to hereinafter as inspection members, for testing corresponding method members of said test object.

28. A method according to claim 27, wherein step (C)(ii) includes the step of invoking one or more method members one or more members of said inspection object, referred to hereinafter as test suite members, for exercising one or more of said inspection members.

29. A method according to claim 28, wherein step (C)(ii) includes the step of invoking one or more test suite members to at least one of (i) test for memory leaks in connection with at least one of creation and destruction of said test object, (ii) test accessor and transformer members of said test object, (iii) test operator member methods of said test object, (iv) test members involved in persistence of said test object, and (v) test method members semantically unique to said test object.

30. A method according to claim 28, wherein step (C)(ii) includes the step invoking one or more method members of said inspection object for invoking one or more test suite members.

31. A method according to claim 17, wherein step (B)(i) includes the step of placing said digital data processor in a mode of a desired runtime environment.

32. A method according to any of claims 18–24, comprising:

invoking one or more method members of said inspection object to generate said report signal.

33. A method according to any of claims 32, comprising:

responding to a verbosity control signal to generate report signals with a selected level of verbosity.

34. A method for testing a subject class in an object-oriented digital data processing system, said method comprising:

(A) creating an inspection object as an instantiation of an inspection class having one or more members for (i) creating a test object as an instantiation of any of said subject class and a class derived therefrom, (ii) invoking one or more selected method members of said test object, (iii) generating a signal, hereinafter referred to as a report signal, reporting an effect of such invocation (B) invoking one or more members of said inspection object to (i) create said test object, (ii) invoke one or more selected method members of said test object, (iii) generate a signal, hereinafter referred to as a report signal, reporting an effect of such invocation.

35. A method according to claim 34, wherein step (B)(i) includes the step of creating said test object as an instantiation of a test class that comprises any of (a) said subject class, and (b) an instantiable class derived from said subject class.

36. A method according to claim 34, wherein step (B)(ii) includes applying at least one argument to one or more of said selected method members of said test object in connection with invocation thereof.

37. A method according to claim 36, wherein step (B)(ii) includes applying at least one argument to a constructor member of said test object in connection with creation of said test object.

38. A method according to claim 34, wherein step (B)(ii) includes the step of preventing exceptions that occur during invocation of said one or more selected method members from discontinuing execution of steps (B)(ii) and (B)(iii).

39. A method according to claim 34, wherein step (B)(iii) includes comparing said result of such invocation with one or more expected values thereof, and generating said report signal to be indicative of such comparison.

40. A method according to claim 39, wherein step (B)(iii) includes the step of storing a signal indicative of said effects in a data member of said inspection object.

41. A method according to claim 34, wherein said method includes the step of executing step (B) a plurality of times, each for invoking a different group of one or more selected method members of said test object.

42. A method according to claim 41, wherein step (B)(iii) includes the step of generating said report signal to be indicative of at least one of (i) comparison of results of invocation of one or more method members of said test object with one or more expected values thereof, and (ii) detection of a memory leak.

43. A method according to claim 34, wherein step (B)(ii) includes the step of invoking one or more method members of said inspection object, referred to hereinafter as inspection members, for testing corresponding method members of said test object.

44. A method according to claim 43, wherein step (B)(ii) includes the step of invoking one or more method members of said inspection object, referred to hereinafter as test suite members, for exercising one or more of said inspection members.

45. A method according to claim 44, wherein step (B)(ii) includes the step of invoking one or more test suite members to at least one of (i) test for memory leaks in connection with at least one of creation and destruction of said test object, (ii) test accessor and transformer members of said test object, (iii) test operator member methods of said test object, (iv) test members involved in persistence of said test object, and (v) test method members semantically unique to said test object.

46. A method according to claim 44, wherein step (B)(ii) includes the step invoking one or more method members of said inspection object for invoking one or more test suite members.

47. A method according to claim 34, wherein step (B)(i) includes the step of placing said digital data processor in a desired runtime environment.

48. A method according to any of claims 38–42, comprising:

invoking one or more method members of said inspection object to generate said report signal.

49. A method according to any of claims 48, comprising:

responding to a verbosity control signal to generate said report signal with a selected level of verbosity.

50. Apparatus for testing a subject class in an object-oriented digital data processing system, said apparatus comprising:

(A) code generator means for responding to a source signal defining said subject class to generate an inspection signal defining an inspection class having one or more members for (i) creating a test object as an instantiation of any of said subject class and a class derived therefrom, (ii) invoking one or more selected method members of said test object, (iii) generate a signal, hereinafter referred to as a report signal, reporting an effect of such invocation, and (B) test harness means, coupled to said code generator means, for responding to said inspection signal for creating an inspection object instantiating said inspection class, and for generating an inspection object invocation signal for invoking one or more members thereof.

51. An apparatus according to claim 50, wherein said code generator means includes test class generating means for responding to said source signal to generate a test signal defining a test class that comprises any of (i) said subject class, and (ii) an instantiable class derived from said subject class, and wherein said code generator further includes means for generating said inspection signal to define said inspection class to include one or more members for creating said test object as an instantiation of said test class.

52. An apparatus according to claim 50, wherein said code generator means includes means for generating said inspection signal to define said inspection class to include one or more method members, referred to hereinafter as inspection members, for testing corresponding method members of said test object.

53. An apparatus according to claim 52, wherein said code generator means includes means for generating said inspection signal to define said inspection class to include one or more method members, referred to hereinafter as test suite members, for exercising one or more of said inspection members.

54. An apparatus according to claim 53, wherein said code generator means includes means for generating said inspection signal to define said inspection class to include one or more method members, hereinafter referred to as run members, for invoking said one or more test suite members.

55. An apparatus according to claim 53, wherein said code generator means includes means for generating said inspection signal to define said inspection class to include one or more method members providing common services for invocation by said test suite members.

56. An apparatus according to claim 53, wherein said code generator means includes means for generating said inspection signal to define said inspection class to include one or more method members providing common reporting services for invocation by said test suite members.

57. An apparatus according to claim 50, comprising:

(A) inspection object execution means, coupled to said test harness means, for responding to said inspection object invocation signal for (i) creating said test object, (ii) generating a test object invocation signal to invoke one or more selected method members of said test object, (iii) generate a signal, hereinafter referred to as a report signal, reporting an effect of such invocation, (B) test object execution means, coupled to said inspection object execution means, for responding to said test object invocation signal to execute one or more selected method members thereof.

58. An apparatus according to claim 57, wherein said inspection object execution means includes means for creating said test object as an instantiation of a test class that comprises any of (a) said subject class, and (b) an instantiable class derived from said subject class.

59. An apparatus according to claim 57, wherein said inspection object execution means includes means for applying at least one argument to one or more of said selected method members of said test object in connection with invocation thereof.

60. An apparatus according to claim 57, wherein said inspection object execution means includes exception service means preventing exceptions that occur during invocation of said one or more selected method members from discontinuing at least reporting on effects of invocation of said test object.

61. An apparatus according to claim 57, wherein said inspection object execution means includes means for comparing a result of invocation of said one or more selected method members of said test object with expected results of such invocation, and for generating said report signal to be indicative of such comparison.

62. An apparatus according to any of claims 57 and 59, wherein said inspection object execution means includes means for executing one or more member methods of said inspection object to generate said report signal.

63. An apparatus according to any of claims 61, wherein:

said inspection object execution means includes means responding to a verbosity control signal to generate said report signals with a selected level of verbosity.

64. An apparatus according to claim 57, wherein said inspection object execution means includes means for executing one or more method members of said inspection object, referred to hereinafter as inspection members, for testing corresponding method members of said test object.

65. An apparatus according to claim 64, wherein said inspection object execution means includes means for executing one or more members of said inspection object, referred to hereinafter as test suite members, for exercising one or more of said inspection members.

66. An apparatus according to claim 65, wherein said inspection object execution means includes means for executing said test suite members for at least one of (i) testing for memory leaks in connection with at least one of creation and destruction of said test object, (ii) testing accessor and transformer members of said test object, (iii) testing operator member methods of said test object, (iv) testing members involved in persistence of said test object, and (v) testing method members semantically unique to said test object.

67. An apparatus according to claim 65, wherein said inspection object execution means includes means for executing a method member of said inspection object for invoking one or more test suite members.

68. An apparatus according to claim 57, wherein said inspection object execution means includes means for placing said digital data processor in a desired runtime environment.

69. Apparatus for testing a subject class in an object-oriented digital data processing system, said apparatus comprising:

test harness means for responding to an inspection signal defining an inspection class having one or more members for (i) creating a test object as an instantiation of any of said subject class and a class derived therefrom, (ii) invoking one or more selected method members of said test object, (iii) generating a signal, hereinafter referred to as a report signal, reporting an effect of such invocation for creating an inspection object instantiating an inspection class, and for generating an inspection object invocation signal for invoking one or members thereof, (B) inspection object execution means, coupled to said test harness means, for responding to said inspection object invocation signal for (i) creating said test object, (ii) generating a test object invocation signal to invoke one or more selected method members of said test object, (iii) generate a signal, hereinafter referred to as a report signal, reporting an effect of such invocation, (C) test object execution means, coupled to said inspection object execution means, for responding to said test object invocation signal to execute one or more selected method members thereof.

70. An apparatus according to claim 69, wherein said inspection object execution means includes means for creating said test object as an instantiation of a test class that comprises any of (a) said subject class, and (b) an instantiable class derived from said subject class.

71. An apparatus according to claim 69, wherein said inspection object execution means includes means for applying at least one argument to one or more of said selected method members of said test object in connection with invocation thereof.

72. An apparatus according to claim 69, wherein said inspection object execution means includes exception service means preventing exceptions that occur during invocation of said one or more selected method members from discontinuing at least reporting on effects of invocation of said test object.

73. An apparatus according to claim 69, wherein said inspection object execution means includes means for comparing a result of invocation of said one or more selected method members of said test object with expected results of such invocation, and for generating said report signal to be indicative of such comparison.

74. An apparatus according to any of claims 69 and 73, wherein said inspection object execution means includes means for executing one or more member methods of said inspection object to generate said report signal.

75. An apparatus according to any of claims 69, wherein:

said inspection object execution means includes means responding to a verbosity control signal to generate said report signals with corresponding verbosity.

76. An apparatus according to claim 69, wherein said inspection object execution means includes means for executing one or more method members of said inspection object, referred to hereinafter as inspection members, for testing corresponding method members of said test object.

77. An apparatus according to claim 76, wherein said inspection object execution means includes means for executing one or more members of said inspection object, referred to hereinafter as test suite members, for exercising one or more of said inspection members.

78. An apparatus according to claim 77, wherein said inspection object execution means includes means for executing said test suite members for at least one of (i) testing for memory leaks in connection with at least one of creation and destruction of said test object, (ii) testing accessor and transformer members of said test object, (iii) testing operator member methods of said test object, (iv) testing members involved in persistence of said test object, and (v) testing method members semantically unique to said test object.

79. An apparatus according to claim 77, wherein said inspection object execution means includes means for executing a method member of said inspection object for invoking one or more test suite members.

80. An apparatus according to claim 69, wherein said inspection object execution means includes means for placing said digital data processor in a desired runtime environment.

81. An object-oriented computer program having a subject class tested by a method comprising the step of:

(A) responding to a source signal defining said subject class to generate inspection signal defining an inspection class having one or more members for (i) creating a test object as an instantiation of any of said subject class and a class derived therefrom, (ii) invoking one or more selected method members of said test object, (iii) generating a signal, hereinafter referred to as a report signal, reporting an effect of such invocation.

82. A method according to claim 81, comprising an additional step of (B) responding to said source signal to generate a test signal defining a test class that comprises any of (i) said subject class, and (ii) an instantiable class derived from said subject class, and step (A)(i) includes the step of generating said inspection signal to define said inspection class to include one or more members for creating said test object as an instantiation of said test class.

83. A method according to claim 81, wherein step (A) includes the step of generating said inspection signal to define said inspection class to include one or more method members, referred to hereinafter as inspection members, for testing corresponding method members of said test object.

84. A method according to claim 81, comprising the step of (B) responding to said inspection signal to create an inspection object as an instantiation of said inspection class, and (C) invoking one or more members of said inspection object to (i) create said test object, (ii) invoke one or more selected method members of said test object, (iii) generate a signal, hereinafter referred to as a report signal, reporting an effect of such invocation.

85. An object-oriented computer program having a subject class tested by a method comprising:

(A) creating an inspection object as an instantiation of an inspection class having one or more members for (i) creating a test object as an instantiation of any of said subject class and a class derived therefrom, (ii) invoking one or more selected method members of said test object, (iii) generating a signal, hereinafter referred to as a report signal, reporting an effect of such invocation (B) invoking one or more members of said inspection object to (i) create said test object, (ii) invoke one or more selected method members of said test object, (iii) generate a signal, hereinafter referred to as a report signal, reporting an effect of such invocation.

86. A method according to claim 85, wherein step (B)(i) includes the step of creating said test object as an instantiation of a test class that comprises any of (a) said subject class, and (b) an instantiable class derived from said subject class.

87. A method according to claim 85, wherein step (B)(ii) includes applying at least one argument to one or more of said selected method members of said test object in connection with invocation thereof.

88. A method according to claim 85, wherein step (B)(ii) includes the step of preventing exceptions that occur during invocation of said one or more selected method members from discontinuing execution of steps (B)(ii) and (B)(iii).

89. A method according to claim 85, wherein step (B)(iii) includes comparing said result of such invocation with one or more expected values thereof, and generating said report signal to be indicative of such comparison.

90. A method according to claim 85, wherein said method includes the step of executing step (B) a plurality of times, each for invoking a different group of one or more selected method members of said test object.

91. A method according to claim 85, wherein step (B)(ii) includes the step of invoking one or more method members of said inspection object, referred to hereinafter as inspection members, for testing corresponding method members of said test object.

92. A method according to claim 85, wherein step (B)(i) includes the step of placing said digital data processor in a desired runtime environment.

* * * * *